US012731273B2

(12) United States Patent
Vorobyova et al.

(10) Patent No.: US 12,731,273 B2
(45) Date of Patent: Sep. 8, 2026

(54) SYSTEMS AND METHODS FOR IMAGE REGISTRATION OR ALIGNMENT

(71) Applicant: 10x Genomics, Inc., Pleasanton, CA (US)

(72) Inventors: Olga Vorobyova, Pleasanton, CA (US); Brynn Claypoole, Pleasanton, CA (US); Dongyao Li, Pleasanton, CA (US); Neil Ira Weisenfeld, Pleasanton, CA (US); Didem Pelin Sarikaya, Pleasanton, CA (US); Peigeng Li, Pleasanton, CA (US); Guy Joseph, Pleasanton, CA (US); Eric Siegel, Pleasanton, CA (US); Naga Sudha Kodavatikanti, Cupertino, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 330 days.

(21) Appl. No.: 18/692,758

(22) PCT Filed: Sep. 16, 2022

(86) PCT No.: PCT/US2022/043897

§ 371 (c)(1),
(2) Date: Mar. 15, 2024

(87) PCT Pub. No.: WO2023/044071

PCT Pub. Date: Mar. 23, 2023

(65) Prior Publication Data

US 2024/0378734 A1 Nov. 14, 2024

Related U.S. Application Data

(60) Provisional application No. 63/350,593, filed on Jun. 9, 2022, provisional application No. 63/245,453, filed on Sep. 17, 2021.

(51) Int. Cl.
*G06T 7/33* (2017.01)
*G06T 7/13* (2017.01)

(52) U.S. Cl.
CPC ................ *G06T 7/337* (2017.01); *G06T 7/13* (2017.01); *G06T 2207/10024* (2013.01);
(Continued)

(58) Field of Classification Search
CPC . G06T 2207/30024; G06T 2207/10056; G06T 7/0012; G06T 2207/10064; G06T 2207/30096; G06V 20/69
See application file for complete search history.

(56) References Cited

U.S. PATENT DOCUMENTS 7,709,198 B2 5/2010 Luo et al.
8,604,182 B2 12/2013 Luo et al.
(Continued)

FOREIGN PATENT DOCUMENTS

WO WO 2011/094669 8/2011
WO WO 2011/127099 10/2011
(Continued)

OTHER PUBLICATIONS

10X, "Inside Visium spatial capture technology," Oct. 14, 2019, product brochure, retrieved from the Internet: https://pages.10xgenomics.com/rs/446-PBO-704/images/10x_BR060_Inside_Visium_Spatial_Technology.pdf.
(Continued)

*Primary Examiner* — Raphael Schwartz

(57) ABSTRACT

Systems and methods for overlaying image data for a biological sample on spatial analyte data are provided. A first image of the sample on a first substrate and a second image of the sample on the first substrate overlayed on a second substrate are obtained. The second substrate includes spatial fiducials and capture spots. At least one of the first substrate
(Continued)

and the second substrate is transparent. A registration for the first image and the second image is determined, using a first pattern of the sample in the first image and a second pattern of the sample in the second image. The registration is used to overlay the first image onto a spatial dataset including spatial analyte data for the capture spots from the sample. A frame of reference of the spatial dataset is known with respect to the second image, based on the spatial fiducials of the second image.

21 Claims, 66 Drawing Sheets

(52) U.S. Cl.
CPC ............... *G06T 2207/10056* (2013.01); *G06T 2207/10064* (2013.01); *G06T 2207/20036* (2013.01); *G06T 2207/20101* (2013.01); *G06T 2207/30024* (2013.01)

(56) References Cited

U.S. PATENT DOCUMENTS

| | | | |
|---|---|---|---|
| 8,951,726 | B2 | 2/2015 | Luo et al. |
| 9,012,022 | B2 | 4/2015 | George et al. |
| 9,727,810 | B2 | 8/2017 | Fodor et al. |
| 9,783,841 | B2 | 10/2017 | Nolan et al. |
| 10,002,316 | B2 | 6/2018 | Fodor et al. |
| 10,041,949 | B2 | 8/2018 | Bendall et al. |
| 10,059,990 | B2 | 8/2018 | Boyden et al. |
| 10,640,816 | B2 | 5/2020 | Beechem et al. |
| 10,913,397 | B2 | 2/2021 | Pribisic |
| 11,501,440 | B2 | 11/2022 | Weisenfeld et al. |
| 11,514,575 | B2 | 11/2022 | Mellen et al. |
| 2011/0059865 | A1 | 3/2011 | Smith et al. |
| 2016/0019695 | A1* | 1/2016 | Chukka ................. G06T 7/0014 382/128 |
| 2018/0253871 | A1* | 9/2018 | Bredno ................... G06T 11/00 |
| 2020/0277663 | A1 | 9/2020 | Ramachandran Iyer |
| 2021/0062272 | A1 | 3/2021 | Williams et al. |
| 2021/0150707 | A1 | 5/2021 | Weisenfeld et al. |
| 2021/0155982 | A1* | 5/2021 | Yin ....................... G06T 7/0012 |
| 2021/0183034 | A1* | 6/2021 | Chang ................ G01N 21/6456 |
| 2022/0065787 | A1* | 3/2022 | Kim ................... G01N 21/6456 |

FOREIGN PATENT DOCUMENTS

| | | | |
|---|---|---|---|
| WO | WO 2012/140224 | | 10/2012 |
| WO | WO 2014/060483 | | 4/2014 |
| WO | WO 2014/163886 | A1 | 10/2014 |
| WO | WO 2014/210225 | | 12/2014 |
| WO | WO 2014/210233 | | 12/2014 |
| WO | WO 2015/161173 | | 10/2015 |
| WO | WO 2016/007839 | A1 | 1/2016 |
| WO | WO 2016/057552 | | 4/2016 |
| WO | WO 2016/162309 | | 10/2016 |
| WO | WO 2016/166128 | | 10/2016 |
| WO | WO 2017/027367 | A1 | 2/2017 |
| WO | WO 2017/027368 | | 2/2017 |
| WO | WO 2017/144338 | A1 | 8/2017 |
| WO | WO 2017/147483 | | 8/2017 |
| WO | WO 2017/222453 | A1 | 12/2017 |
| WO | WO 2018/022809 | A1 | 2/2018 |
| WO | WO 2018/045181 | A1 | 3/2018 |
| WO | WO 2018/045186 | A1 | 3/2018 |
| WO | WO 2018/057999 | A1 | 3/2018 |
| WO | WO 2018/091676 | A1 | 5/2018 |
| WO | WO 2018/107054 | A1 | 6/2018 |
| WO | WO 2018/136856 | A1 | 7/2018 |
| WO | WO 2019/068880 | A1 | 4/2019 |
| WO | WO 2019/075091 | A1 | 4/2019 |
| WO | WO 2020/123320 | A2 | 6/2020 |
| WO | WO 2020/176788 | A1 | 9/2020 |
| WO | WO 2021/092433 | A2 | 5/2021 |
| WO | WO 2022/061150 | A2 | 3/2022 |

OTHER PUBLICATIONS

10X, "Spatially Resolved Transcriptomics: The Landscape of Tools for Spatial Gene Expression," Sep. 9, 2020, webinar, retrieved from the Internet: https://www.10xgenomics.com/videos/80lda5wtby?autoplay=true.
10X, "Visium Spatial Gene Expression Solution," May 29, 2020, product brochure, retrieved from the Internet: https://pages.10xgenomics.com/rs/446-PBO-704/images/10x_LIT054_Spatial-Gene-Expression_Flyer_Letter_Digital.pdf.
Achim et al., 2015, "High-throughput spatial mapping of single-cell RNA-seq data to tissue of origin," Nature Biotechnology 33: 503-509, doi:10.1038/nbt.3209.
Bolognesi et al., 2017, J. Histochem. Cytochem. 65(8): 431-444.
Boykov, et al., 2001, "Interactive graph cuts for optimal boundary and region segmentation of objects in N-D images," Proc. IEEE Int. Conf. on Computer Vision, CD-ROM.
Canny, 1986, "A Computational Approach to Edge Detection," IEEE Trans Pattern Anal Mach Intell. 8(6):679-98.
Carter et al., 2007, Applied Optics 46:421-427),.
Chen et al., Science 348(6233): aaa6090, 2015.
Chetverikov et al., 2002, "The Trimmed Iterative Closest Point Algorithm," Object recognition supported by user interaction for service robots, Quebec City, Quebec, Canada, ISSN: 1051-4651.
Chetverikov et al., 2005, "Robust Euclidean alignment of 3D point sets; the trimmed iterative closest point algorithm," Image and Vision Computing 23(3), pp. 299-309.
Chuang, et al., 2001, "A Bayesian approach to digital matting," Proc. IEEE Conf.
Chui and Rangarajanb, 2003, "A new point matching algorithm for non-rigid registration," Computer Vision and Image Understanding 89(2-3), pp. 114-141.
Gao et al., 2017, BMC Biology 15:50, doi:10.1186/s12915-017-0393-3.
Glass et al., 2009, J. Histochem. Cytochem. 57:899-905.
Greig et al., 1989, "Exact MAP estimation for binary images," J. Roy. Stat. Soc. B. 51, 271-279.
Gupta et al., *Nature Biotechnol.* 36:1197-1202, 2018.
Lee et al., *Nat. Protoc.* 10(3):442-458, 2015.
Lin et al., 2015, Nat Commun. 6:8390.
McCormick et al., "ITK: enabling reproducible research and open science," Front Neuroinform 2014;8:13; doi:10.3389/fninf.2014.00013.
Myronenko, Andriy, et al. "Non-rigid point set registration: Coherent Point Drift", Department of Computer Science and Electrical Engineering, OGI School of Science and Engineering, Beaverton, OR, pp. 1-8 (2006).
Myronenko, Andriy, et al. "Point Set Registration: Coherent Point Drift", Department of Science and Engineering, School of Medicine, Oregon Health and Science University, Porland, OR, May 15, 2009, pp. 1-14.
Phogat, et al., 2012, "Different Image Registration Methods—An Overview," Int J Sci Eng Res 5(12): 44-49.
Pirici et al., 2009, J. Histochem. Cytochem. 57:567-75.
Rodriques et al., *Science* 363(6434):1463-1467, 2019.
Rother et al., 2004, "'GrabCut'—Interactive Foreground Extraction using Iterated Graph Cuts," ACM Transactions on Graphics. 23(3):309-314, doi:10.1145/1186562.1015720.
Satija et al., 2015, "Spatial reconstruction of single-cell gene expression data," Nature Biotechnology. 33, 495-502, doi:10.1038.nbt.3192.
Trejo et al., *PLoS ONE* 14(2):e0212031, 2019.
Uchida, 2013, "Image processing and recognition for biological images," Develop. Growth Differ., The Japanese Society of Developmental Biologists 55, 523-549.
Woo, J., "Multimodal Registration via Mutual Information Incorporating Geometric and Spatial Context," IEEE Trans Image Process. Feb. 2015 ; 24(2): 757-769.

(56) References Cited

OTHER PUBLICATIONS

Yang, 2011, "The thin plate spline robust point matching (TPS-RPM) algorithm: A revisit," Pattern Recognition Letters 32(7), pp. 910-918.
Yoo, et al., "Engineering and Algorithm Design for an Image Processing API: A Technical Report on ITK—The Insight Toolkit," In Proc of Medicine Meets Virtual Reality, J Westwood, ed, IOS Press Amsterdam pp. 586-592 (2002),.

* cited by examiner

Figure 1:
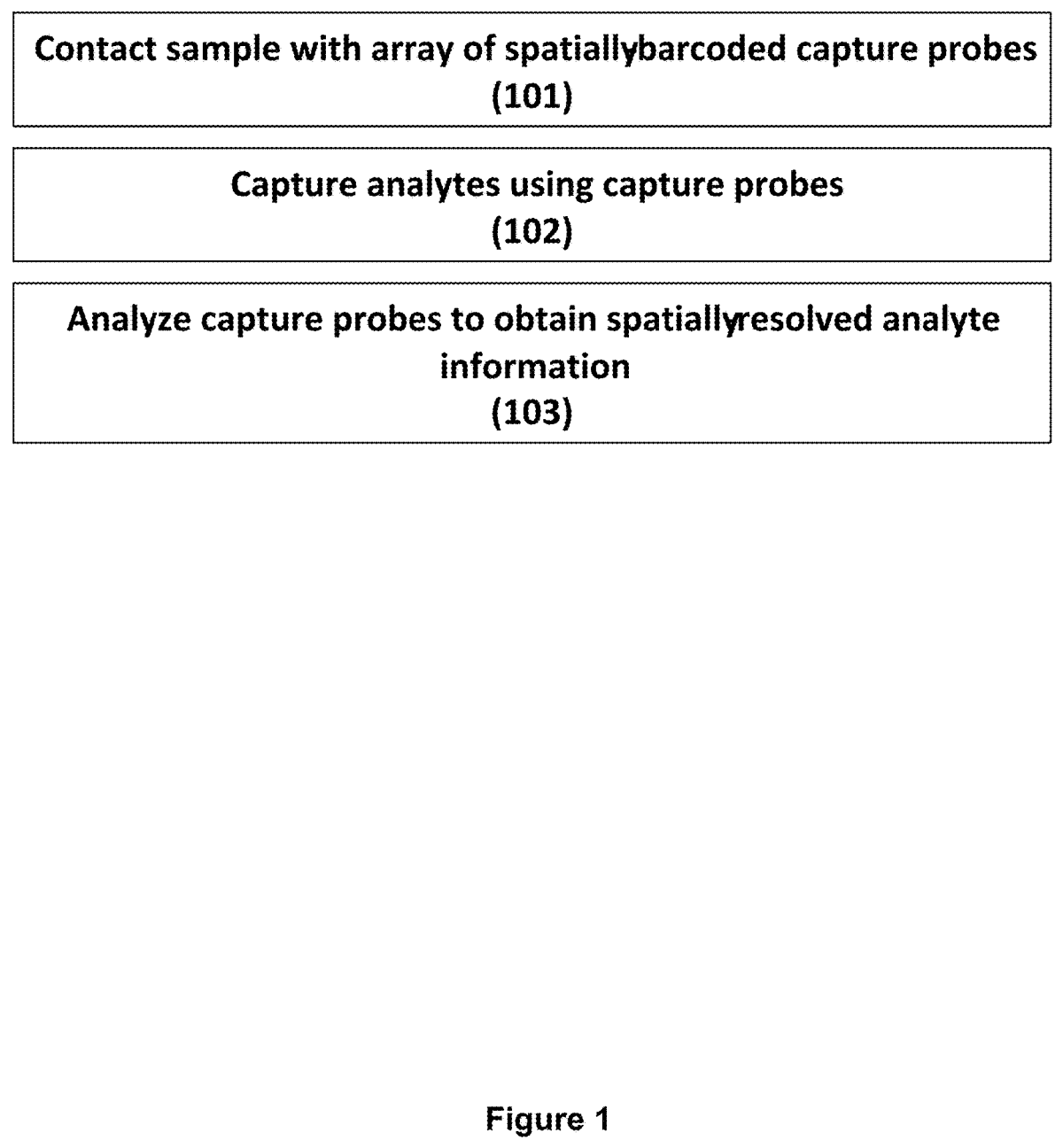

Contact sample with array of spatiallybarcoded capture probes
(101)

Capture analytes using capture probes
(102)

Analyze capture probes to obtain spatiallyresolved analyte information
(103)

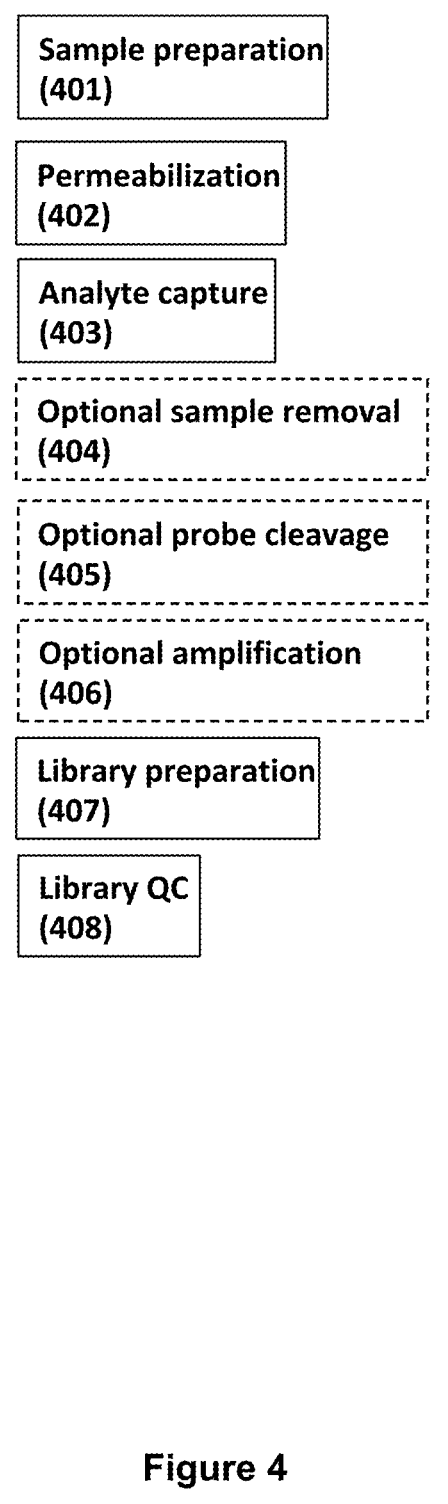

Sample preparation (401)

Permeabilization (402)

Analyte capture (403)

Optional sample removal (404)

Optional probe cleavage (405)

Optional amplification (406)

Library preparation (407)

Library QC (408)

Figure 4

Figure 5:
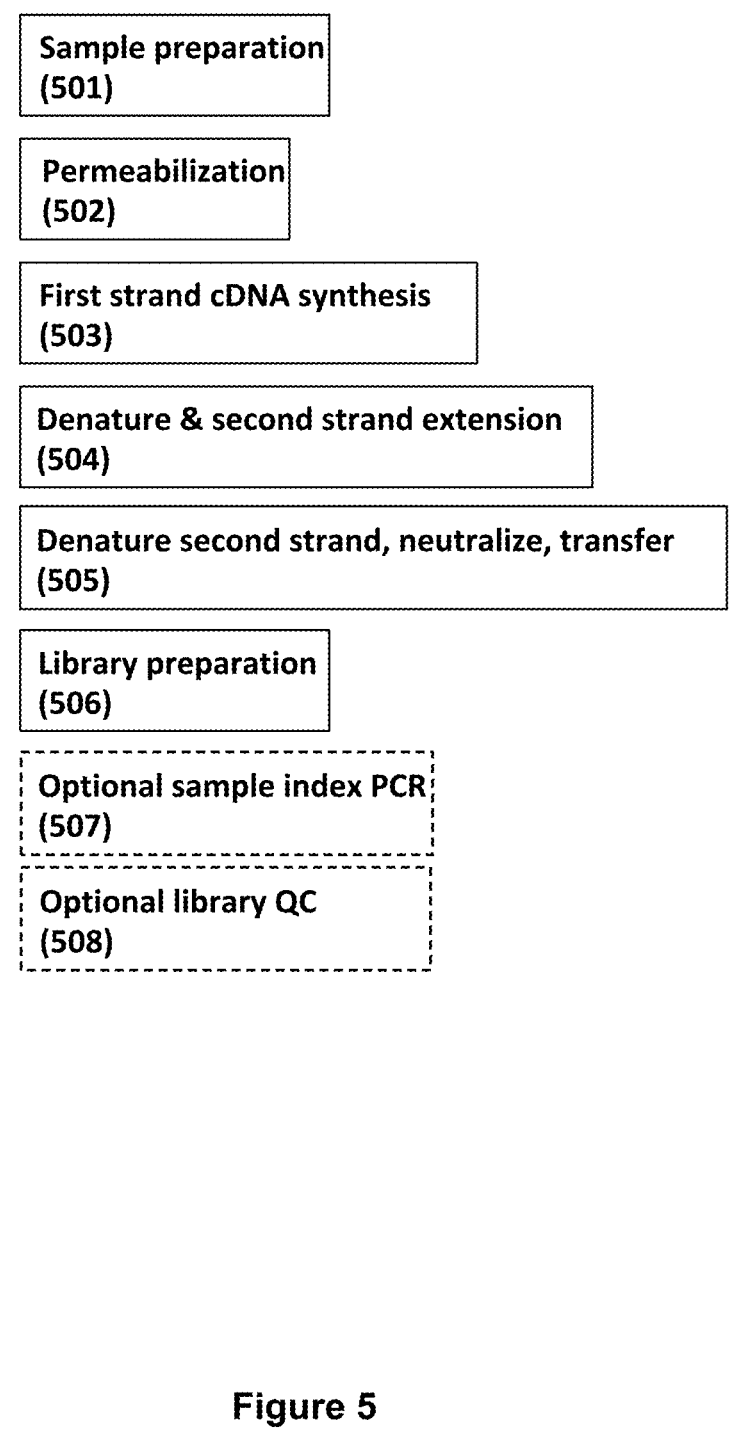

Sample preparation (501)

Permeabilization (502)

First strand cDNA synthesis (503)

Denature & second strand extension (504)

Denature second strand, neutralize, transfer (505)

Library preparation (506)

Optional sample index PCR (507)

Optional library QC (508)

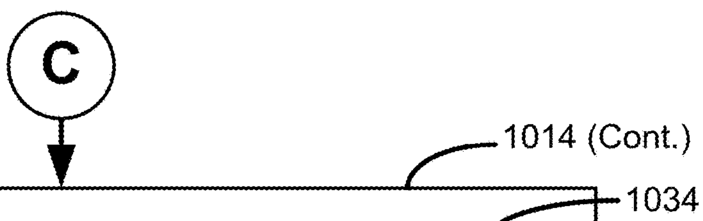

The determining the registration for the first and second image comprises obtaining a respective first area of the first pattern and a respective first centroid for the first area from an analysis of the first pattern and obtaining a respective second area of the second pattern and a respective second centroid for the second area from an analysis of the second pattern.

Scale at least one of the first image and the second image based on a relative proportion of the first and second area and center the first image with the second image based on an alignment between the first and second centroid.

Sample, for each respective rotation angle in a plurality of rotation angles, a corresponding transformation between the first and second image, by a procedure that comprises rotating one of the first and second image relative to the other of the first and second image by the respective rotation angle to obtain a respective candidate rotational alignment of the first and second image; refining the respective candidate rotational alignment to obtain a respective refined candidate rotational alignment; and scoring the respective refined candidate rotational alignment of the first and second image by determining a similarity metric across a respective intensity of a first plurality of pixels in the first image compared to corresponding pixels in a second plurality of pixels in the second image that are overlayed onto each other by the respective candidate rotational alignment of the first and second image, thereby obtaining a plurality of refined candidate rotational alignments and a corresponding plurality of similarity metrics.

Select the rotational alignment from among the plurality of refined candidate rotational alignments that yields the highest similarity metric in the corresponding plurality of similarity metrics as the registration for the first and second image.

1036

The plurality of rotation angles comprises 4 or more different rotation angles, where each rotation angle in the plurality of rotation angles is between 0 and 2π radians.

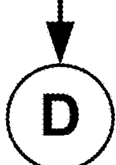

Figure 10D

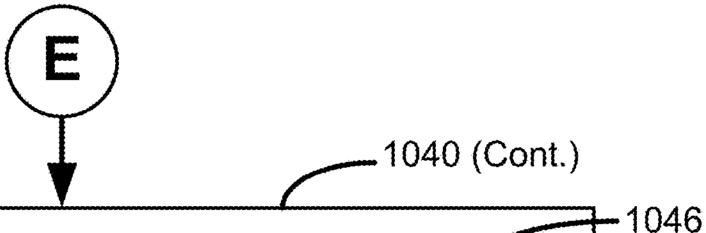

The spatial dataset is obtained by a procedure comprising obtaining one or more images of the biological sample on the second substrate. Each respective image of the one or more images comprises a corresponding plurality of pixels in the form of an array of pixel values.

Obtain a plurality of sequence reads, in electronic form, from the set of capture spots. Each respective capture probe plurality in a set of capture probe pluralities is (i) at a different capture spot in the set of capture spots and (ii) directly or indirectly associates with one or more analytes from the biological sample, where each respective capture probe plurality in the set of capture probe pluralities is characterized by at least one unique spatial barcode in a plurality of spatial barcodes. The plurality of sequence reads comprises sequence reads corresponding to all or portions of the plurality of analytes, and each respective sequence read in the plurality of sequence reads includes a spatial barcode of the corresponding capture probe plurality in the set of capture probe pluralities or a complement thereof.

Use all or a subset of the plurality of spatial barcodes to localize respective sequence reads in the plurality of sequence reads to corresponding capture spots in the set of capture spots, thereby dividing the plurality of sequence reads into a plurality of subsets of sequence reads, each respective subset of sequence reads corresponding to a different capture spot in the plurality of capture spots.

Use the one or more spatial fiducials of the second substrate to provide a composite representation comprising (i) the one or more images aligned to the set of capture spots on the substrate and (ii) a representation of all or a portion of each subset of sequence reads at each respective position within the one or more images that maps to a respective capture spot corresponding to the respective position of the one or more analytes in the sample.

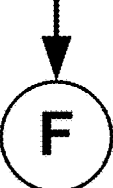

Figure 10F

1808
Spatial dataset (1806)
1802
1804

2d transform *T* from Instrument image coordinate system to microscope coordinate system < Back to home page Choose you manual alignment case

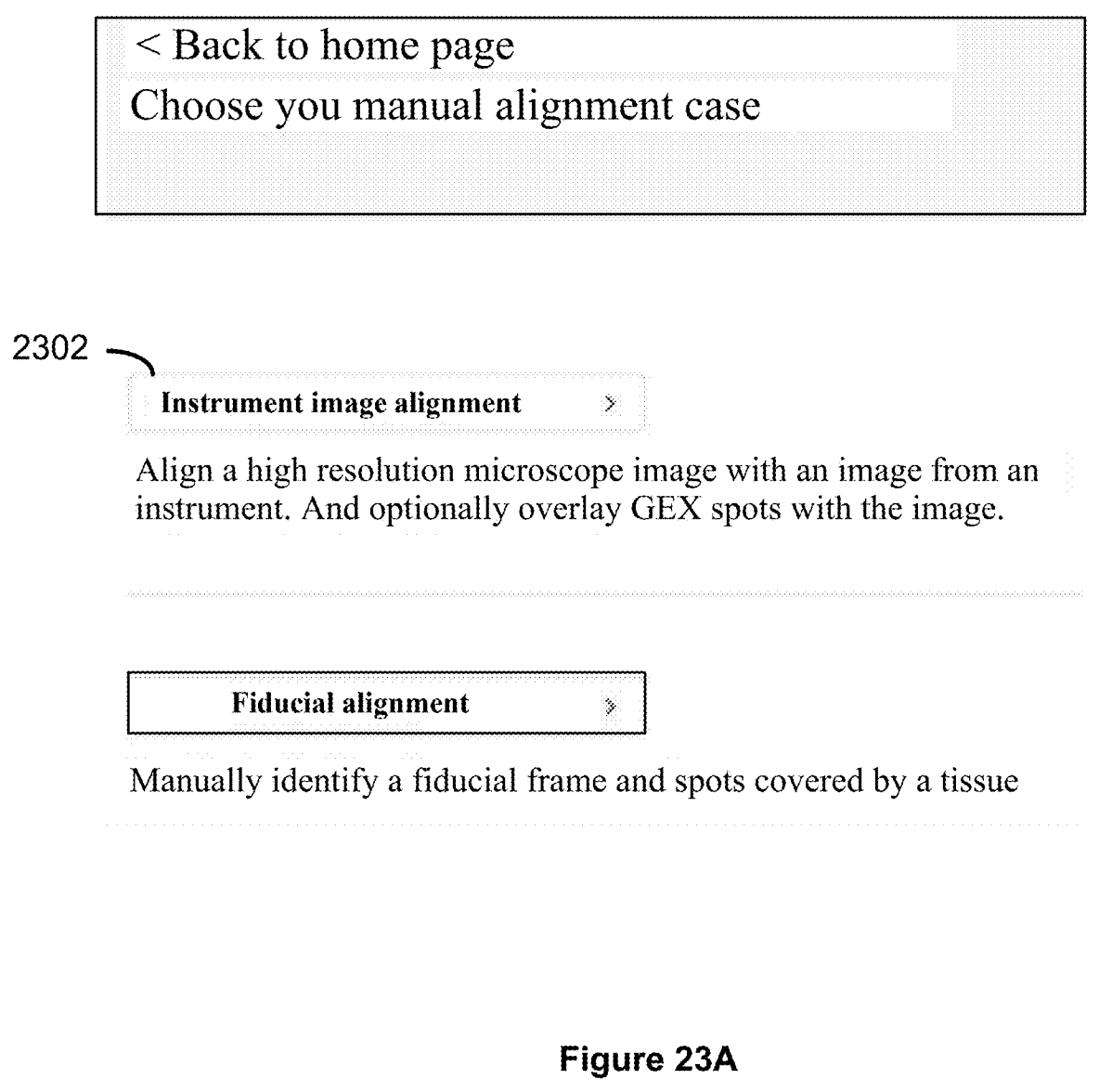

2302

Instrument image alignment ›

Align a high resolution microscope image with an image from an instrument. And optionally overlay GEX spots with the image.

Fiducial alignment ›

Manually identify a fiducial frame and spots covered by a tissue

Figure 23A

Manual Alignment

1. Open images

2. Mark key points

3. Assess alignment

4. Export

Mark key points

Look at the tissues carefully to identify common visually recognizable features on both images. Those features are where the key points should be marked. Our system will align two images based on the key points.

- Click on the images to mark 3-5 corresponding key points.
- When you're done, each image should have the same number of key points.
- Click here for further guidance.

Restart marking key points

Instrument Image 3-5 key points are sufficient

Microscope Image 3-5 key points are sufficient

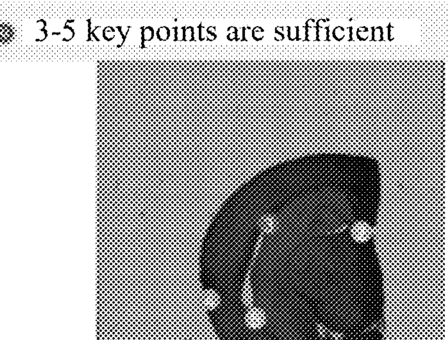

◄ Change the alignment case

Back

Next

SYSTEMS AND METHODS FOR IMAGE REGISTRATION OR ALIGNMENT

CROSS REFERENCE TO RELATED PATENT APPLICATIONS

The present application claims priority to U.S. Provisional Patent Application No. 63/245,453, entitled "SYSTEMS AND METHODS FOR IMAGE REGISTRATION OR ALIGNMENT," filed Sep. 17, 2021 and to U.S. Provisional Patent Application No. 63/350,593, entitled "SYSTEMS AND METHODS FOR IMAGE REGISTRATION OR ALIGNMENT," filed Jun. 9, 2022, each of which is hereby incorporated by reference.

TECHNICAL FIELD

This specification describes technologies relating to image registration, particularly for use in analyzing spatial analyte data.

BACKGROUND

Cells within a tissue of a subject have differences in cell morphology and/or function due to varied analyte levels (e.g., gene and/or protein expression) within the different cells. The specific position of a cell within a tissue (e.g., the cell's position relative to neighboring cells or the cell's position relative to the tissue microenvironment) can affect, for instance, the cell's morphology, differentiation, fate, viability, proliferation, behavior, and signaling and cross-talk with other cells in the tissue.

Spatial heterogeneity has been previously studied using techniques that can provide data for a small handful of analytes in the context of an intact tissue or a portion of a tissue or provide a large amount of analyte data for single cells, but do not provide information regarding the position of the single cell in a parent biological sample (e.g., a tissue sample).

Detailed tissue (e.g., histological) image data (e.g., fluorescent images) can also be utilized to assess the spatial heterogeneity of analyte levels for cells and tissues.

To accurately determine the degree of spatial heterogeneity and analyte activity (e.g., transcriptomic, proteomic, etc.) within a cell or tissue, it would be desirable to provide improved ways in which the anatomical, histological, and morphological features from detailed tissue images are correlated with spatial analyte data (e.g., spatial sequencing data) in order to examine differences in cell morphology and/or function due to varied analyte levels at resolutions (e.g., exceeding 100 microns or greater).

Thus, there is a need in the art for systems and methods that provide improved ways of using spatial analyte data and detailed tissue images to analyze biological samples, particularly in a spatial context.

SUMMARY

Technical solutions (e.g., computing systems, methods, and non-transitory computer readable storage mediums) for addressing improved use of spatial analyte data and tissue images to analyze biological samples are provided in the present disclosure. In particular, the present disclosure allows for high resolution mapping of tissue images, such as histological images, onto spatial datasets (e.g., spatial sequencing datasets), where the tissue images and the spatial datasets are taken of the same biological sample, in order to better use these two sources of data to analyze differences in cell morphology and/or function due to varied analyte levels (e.g., gene and/or protein expression) within the different cells of the biological sample and to correlate anatomical, histological, and morphological features from the tissue images with changes in expression and/or abundance values of particular analytes represented in the spatial datasets. That is, the present disclosure provides methods for mapping the frame of reference of tissue images, or other high resolution images of a spatial biological sample, onto the frame of reference of spatial datasets of the biological sample, even in instances where the images and spatial datasets are taken of the biological sample at different time points, with different imaging devices, or at different resolutions.

Once the frame of reference of the histological images (or other high resolution image) is mapped to the frame of reference of the spatial dataset, it is possible to selectively query data (e.g., sequencing data) from the spatial dataset and superimpose it in the frame of reference of the high resolution image to provide improved insight on differences in cell morphology and/or function due to varied analyte levels (e.g., gene and/or protein expression) within the different cells within the biological sample. This is possible in the present disclosure even in instances where the tissue image (e.g., histological image) has no discernable fiducials, or fiducials that differ from those used to form the frame of reference of the spatial dataset.

Thus, one aspect of the present disclosure provides a method for overlaying image data for a biological sample (e.g., a histological image) onto spatial data for a plurality of analytes (e.g., RNA, DNA, protein) of the biological sample.

A first image of the biological sample on a first substrate is taken. This image can, for example, be a histological image taken at any desired resolution on any desired instrument.

A second image of the biological sample on the first substrate, where the first substrate is now further overlayed on a second substrate, is taken. The second substrate comprises the one or more spatial fiducials and the set of capture spots that are used to create the spatial dataset. In some embodiments, there is a liquid interface between the first and second substrate which allows analytes to flow from the tissue sample on the first substrate to capture spots on the second substrate. A library can be generated from barcoded polynucleotides corresponding to the analytes and capture probes within the capture spots, and subsequently sequences. The sequencing data is then used to create the spatial dataset. At least one of the first substrate and the second substrate is transparent. This transparency allows the second image to include the fiducials of the second substrate, and guarantees that the second image can be mapped onto the fiducials associated with the spatial dataset. Moreover, in typical embodiments, the second image is taken while the relative positions of first and second substrate are the same as when the spatial dataset was taken. Regardless, the frame of reference of the second image, by virtue of the common fiducials, has a discoverable relationship with the frame of reference of the spatial dataset.

With the second image in hand, it is now possible to register the frame of reference of the first and second image to each other because both images are taken of the same spatial biological sample and thus will have the same rough morphological features. These common rough morphological features of the biological sample found in both images are used to register the first image and the second image to each other (e.g., using a first pattern of the biological sample in the first image and a second pattern of the biological sample in the second image). In some embodiments, this mapping using the rough morphological features is further assisted by user intervention, where a user identifies common landmarks within both images. The coordinates of these common landmarks in the two images are then superimposed onto each other to provide a registration which a user can then fine tune using image translation and rotation tools in order to perfect the registration between the first and second images.

The registration between the first and second images is used to overlay the first image onto the spatial dataset comprising spatial analyte data for the set of capture spots from the biological sample. As discussed above, the frame of reference of the spatial dataset is known with respect to the second image, based on the one or more spatial fiducials of the second image. Thus, in this way, the first image, optionally taken without fiducials, and taken at any desired resolution, can be mapped all the way to the frame of reference of the spatial dataset using the two registrations, the first registration being from the first image to the second image (based on common morphological features), and the second being from the second image to the spatial dataset (based on common fiducials).

The use of common morphological features augmented by user selected landmarks allows for registration of images even in instances where contrast is low (e.g., because of washing techniques that are used in preparation of images) and even in instances where the images are taken at distinctly different resolutions. Moreover, the disclosed systems and methods allow for the alignment of capture spot data in spatial datasets, acquired using substrates in which the capture spots are printed at resolutions that are not visible without substantial magnification, onto the high resolution images (e.g., histological images) because the capture spots are spatially barcoded, and there is a look up table that maps the relative location of the capture spots to the fiducials.

The disclosed techniques thus solve technical problems in the field by combining three different elements: (i) transfer of the fiducials used to create a spatial dataset for a biological sample onto an image of the biological sample by taking an image of the biological sample while the biological sample is in a first frame of reference used to create the spatial dataset, (ii) use of morphological features of another image of the biological sample, taken at some other time, to morphological features of the image taken of the biological sample in the first frame of reference, and (iii) use of fiducials in the image taken of the biological sample in the first frame of reference to map to the frame of reference of the spatial dataset.

It should be understood that this summary is not an extensive overview of the present disclosure. It is not intended to identify key/critical elements of the present disclosure or to delineate the scope of the present disclosure. Its sole purpose is to present some of the aspects of the present disclosure in a simplified form as a prelude to the more detailed description that is presented later.

One aspect of the present disclosure provides a method for overlaying image data for a biological sample onto spatial analyte data for a plurality of analytes of the biological sample. The method includes, at a computer system comprising one or more processing cores and a memory, obtaining a first image of the biological sample on a first substrate and receiving a second image of the biological sample on the first substrate overlayed on a second substrate, where the second substrate comprises one or more spatial fiducials and a set of capture spots, and where at least one of the first substrate and the second substrate is transparent. In some embodiments, the second substrate comprises one or more spatial fiducials and at least 1000 capture spots.

The method includes determining a registration for the first image and the second image, where the registration registers the first image and the second image to each other, using a first pattern of the biological sample in the first image and a second pattern of the biological sample in the second image. The registration is used to overlay the first image onto a spatial dataset comprising spatial analyte data for the set of capture spots from the biological sample, where a frame of reference of the spatial dataset is known with respect to the second image, based on the one or more spatial fiducials of the second image, thereby overlaying image data for the biological sample onto spatial analyte data for the plurality of analytes of the biological sample.

In some embodiments, the determining the registration for the first image and the second image is manual or automatic.

In some embodiments, the determining the registration for the first image and the second image comprises identifying one or more landmarks, each respective landmark comprising a respective pair of reference positions including a first respective reference position for the first pattern of the biological sample in the first image and a corresponding second respective reference position for the second pattern of the biological sample in the second image, thus identifying a first set of landmark coordinates for the first image and a second set of landmark coordinates for the second image. The first set of landmark coordinates for the first image and the second set of landmark coordinates for the second image are used to obtain a transformation between the first set of landmark coordinates and the second set of landmark coordinates with an alignment algorithm, thus obtaining a first alignment of the first image with the second image.

In some embodiments, the identifying one or more landmarks is performed, on a display, via manual user selection of each respective pair of reference positions in the first image and the second image.

In some embodiments, the determining the registration for the first and second image comprises obtaining a respective first area of the first pattern and a respective first centroid for the first area from an analysis of the first pattern and obtaining a respective second area of the second pattern and a respective second centroid for the second area from an analysis of the second pattern. At least one of the first image and the second image is scaled, based on a relative proportion of the first and second area, and the first image is centered with the second image based on an alignment between the first and second centroid. For each respective rotation angle in a plurality of rotation angles, a corresponding transformation between the first and second image is sampled by a procedure that comprises: rotating one of the first and second image relative to the other of the first and second image by the respective rotation angle to obtain a respective candidate rotational alignment of the first and second image, refining the respective candidate rotational alignment to obtain a respective refined candidate rotational alignment, and scoring the respective refined candidate rotational alignment of the first and second image by determining a similarity metric across a respective intensity of a first plurality of pixels in the first image compared to corresponding pixels in a second plurality of pixels in the second image that are overlayed onto each other by the respective candidate rotational alignment of the first and second image. Thus, a plurality of refined candidate rotational alignments and a corresponding plurality of similarity metrics are obtained. The determining the registration further includes selecting the rotational alignment from among the plurality of refined candidate rotational alignments that yields the highest similarity metric in the corresponding plurality of similarity metrics as the registration for the first and second image.

In some embodiments, the procedure for sampling the corresponding transformation further includes rotating one of a mirror image of the first image and the second image relative to the other of the mirror image of the first image and the second image by the respective rotation angle to obtain a respective candidate rotational alignment of the mirror image of the first image and the second image, and scoring the respective candidate rotational alignment of the mirror image of the first image and the second image by determining a similarity metric for the respective candidate rotational alignment of the mirror image of the first image and the second image.

Another aspect of the present disclosure provides a computer system comprising one or more processors, and memory. One or more programs are stored in the memory and are configured to be executed by the one or more processors. It will be appreciated that this memory can be on a single computer, a network of computers, one or more virtual machines, or in a cloud computing architecture. The one or more programs are for overlaying image data for a biological sample onto spatial analyte data for a plurality of analytes for the biological sample and include instructions for obtaining a first image of the biological sample on a first substrate and receiving a second image of the biological sample on the first substrate overlayed on a second substrate, where the second substrate comprises one or more spatial fiducials and a set of capture spots (e.g., at least 1000 capture spots), and where at least one of the first substrate and the second substrate is transparent.

The method includes determining a registration for the first image and the second image, where the registration registers the first image and the second image to each other, using a first pattern of the biological sample in the first image and a second pattern of the biological sample in the second image. The registration is used to overlay the first image onto a spatial dataset comprising spatial analyte data for the set of capture spots from the biological sample, where a frame of reference of the spatial dataset is known with respect to the second image, based on the one or more spatial fiducials of the second image, thereby overlaying image data for the biological sample onto spatial analyte data for the plurality of analytes of the biological sample.

Still another aspect of the present disclosure provides a computer readable storage medium storing one or more programs. The one or more programs comprise instructions, which when executed by an electronic device with one or more processors and a memory, cause the electronic device to perform a method for overlaying image data for a biological sample onto spatial analyte data for a plurality of analytes for the biological sample. The method includes obtaining a first image of the biological sample on a first substrate and receiving a second image of the biological sample on the first substrate overlayed on a second substrate, where the second substrate comprises one or more spatial fiducials and a set of capture spots (e.g., at least 1000 capture spots), and where at least one of the first substrate and the second substrate is transparent.

The method includes determining a registration for the first image and the second image, where the registration registers the first image and the second image to each other, using a first pattern of the biological sample in the first image and a second pattern of the biological sample in the second image. The registration is used to overlay the first image onto a spatial dataset comprising spatial analyte data for the set of capture spots from the biological sample, where a frame of reference of the spatial dataset is known with respect to the second image, based on the one or more spatial fiducials of the second image, thereby overlaying image data for the biological sample onto spatial analyte data for the plurality of analytes of the biological sample.

Another aspect of the present disclosure provides a computing system including one or more processors and memory storing one or more programs for overlaying image data for a biological sample onto spatial analyte data for a plurality of analytes for the biological sample. It will be appreciated that this memory can be on a single computer, a network of computers, one or more virtual machines, or in a cloud computing architecture. The one or more programs are configured for execution by the one or more processors and include instructions for performing any of the methods disclosed above.

Still another aspect of the present disclosure provides a computer readable storage medium storing one or more programs to be executed by an electronic device. The one or more programs include instructions for the electronic device to perform a method for overlaying image data for a biological sample onto spatial analyte data for a plurality of analytes for the biological sample using any of the methods disclosed above. It will be appreciated that the computer readable storage medium can exist as a single computer readable storage medium or any number of component computer readable storage mediums that are physically separated from each other.

Other embodiments are directed to systems, portable consumer devices, and computer readable media associated with methods described herein.

As disclosed herein, any embodiment disclosed herein, when applicable, can be applied to any aspect.

Various embodiments of systems, methods, and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used.

INCORPORATION BY REFERENCE

All publications, patents, patent applications, and information available on the Internet and mentioned in this specification are herein incorporated by reference to the same extent as if each individual publication, patent, patent application, or item of information was specifically and individually indicated to be incorporated by reference. To the extent publications, patents, patent applications, or item of information available on the Internet incorporated by reference contradict the disclosure contained in the specification, the specification is intended to supersede and/or take precedence over any such contradictory material.

DESCRIPTION OF DRAWINGS

The following drawings illustrate certain embodiments of the features and advantages of this disclosure. These embodiments are not intended to limit the scope of the appended claims in any manner. Like reference symbols throughout the several views of the patent application indicate like elements.

FIG. 1 shows an exemplary spatial analysis workflow in accordance with an embodiment of the present disclosure.

FIG. 2 shows an exemplary spatial analysis workflow in which optional steps are indicated by dashed boxes in accordance with an embodiment of the present disclosure.

FIG. 4 shows an exemplary spatial analysis workflow in which optional steps are indicated by dashed boxes in accordance with an embodiment of the present disclosure.

FIG. 5 shows an exemplary spatial analysis workflow in which optional steps are indicated by dashed boxes in accordance with an embodiment of the present disclosure.

FIGS. 10A, 10B, 10C, 10D, 10E, 10F, and 10G illustrate non-limiting methods for overlaying image data for a biological sample onto spatial analyte data for a plurality of analytes of the biological sample in accordance with some embodiments of the present disclosure, in which optional steps are illustrated by dashed line boxes.

FIGS. 23A, 23B, 23C, 23D, 23E, 23F, 23G, 23H and 23I collectively illustrate an example manual workflow for determining a registration for a first image and a second image, in accordance with an embodiment of the present disclosure.

FIGS. 28A, 28B, and 28C illustrate a computer interface for image registration in accordance with some embodiments of the present disclosure.

DETAILED DESCRIPTION

I. Introduction

Figure 3A:
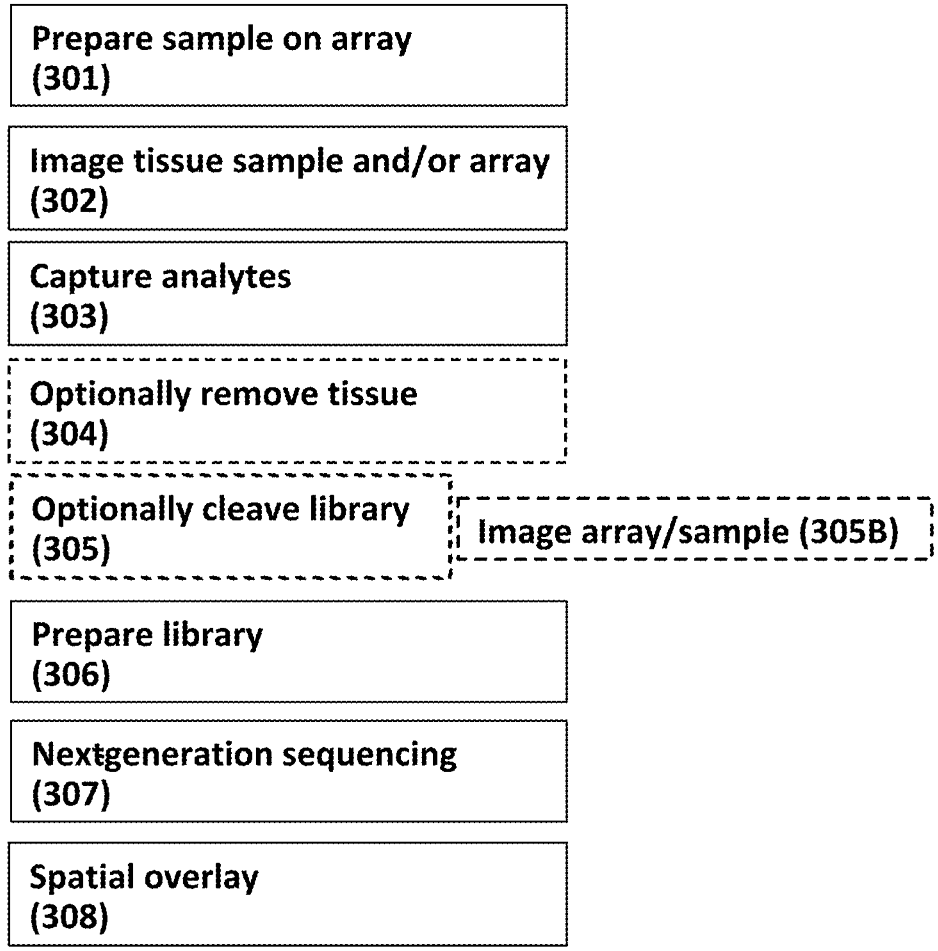
FIGS. 3A and 3B show exemplary spatial analysis workflows in which, in FIG. 3A, optional steps are indicated by dashed boxes in accordance with embodiments of the present disclosure.

This disclosure describes apparatus, systems, methods, and compositions for spatial analysis of biological samples using image registration. This section in particular describes certain general terminology, analytes, sample types, and preparative steps that are referred to in later sections of the disclosure.

Spatial resolution of analytes in complex tissues provides new insights into the processes underlying biological function and morphology, such as cell fate and development, disease progression and detection, and cellular and tissue-level regulatory networks. See, Satija et al., 2015, "Spatial reconstruction of single-cell gene expression data," Nature Biotechnology. 33, 495-502, doi:10.1038.nbt.3192 and Achim et al., 2015, "High-throughput spatial mapping of single-cell RNA-seq data to tissue of origin," Nature Biotechnology 33:503-509, doi:10.1038/nbt.3209, each of which is hereby incorporated herein by reference in its entirety. An understanding of the spatial patterns or other forms of relationships between analytes can provide information on differential cell behavior. This, in turn, can help to elucidate complex conditions such as complex diseases.

For example, tissues and cells obtained from a subject (e.g., a human) often have varied analyte levels (e.g., gene and/or protein expression) that can result in differences in cell morphology and/or function. The position of a cell or subset of cells (e.g., neighboring cells and/or non-neighboring cells) within a tissue can affect, for example, the cell's fate, behavior, morphology, signaling and cross-talk with other cells in the tissue. Specifically, in some implementations, the determination that the abundance of an analyte (e.g., a gene) is associated with a tissue subpopulation of a particular tissue class (e.g., disease tissue, healthy tissue, the boundary of disease and healthy tissue, etc.) provides inferential evidence of the association of the analyte with a condition such as complex disease. Likewise, the determination that the abundance of an analyte is associated with a particular subpopulation of a heterogeneous cell population in a complex 2-dimensional or 3-dimensional tissue (e.g., a mammalian brain, liver, kidney, heart, a tumor, or a developing embryo of a model organism) provides inferential evidence of the association of the analyte in the particular subpopulation.

Advantageously, information regarding the differences in analyte levels (e.g., gene and/or protein expression) within different cells in a tissue of a mammal can also help physicians select or administer a treatment that will be effective and can allow researchers to identify and elucidate differences in cell morphology and/or cell function in single-cell or multicellular organisms (e.g., a mammal) based on the detected differences in analyte levels within different cells in the tissue. For instance, differences in analyte levels within different cells in a tissue of a mammal can provide information on how tissues (e.g., healthy and diseased tissues) function and/or develop. Differences in analyte levels within different cells in a tissue of a mammal can also provide information on mechanisms of disease pathogenesis, mechanisms of action of therapeutic treatments, and/or drug resistance mechanisms and the development of the same in the tissue. Moreover, differences in the presence or absence of analytes within difference cells in a tissue of a multicellular organism (e.g., a mammal) can provide information on drug resistance mechanisms and the development of the same in a tissue of a multicellular organism. Thus, in some embodiments, spatial analysis of analytes can provide information for the early detection of disease by identifying at-risk regions in complex tissues and characterizing the analyte profiles present in these regions through spatial reconstruction (e.g., of gene expression, protein expression, DNA methylation, and/or single nucleotide polymorphisms, among others).

Spatial analysis of analytes can be performed by capturing analytes and/or analyte capture agents or analyte binding domains and mapping them to known locations (e.g., using barcoded capture probes attached to a substrate) using a reference image indicating the tissues or regions of interest that correspond to the known locations. For example, in some implementations of spatial analysis, a sample is prepared (e.g., fresh-frozen tissue is sectioned, placed onto a slide, fixed, and/or stained for imaging). The imaging of the sample provides the reference image to be used for spatial analysis. Analyte detection is then performed using, e.g., analyte or analyte ligand capture via barcoded capture probes, library construction, and/or sequencing. The resulting barcoded analyte data and the reference image can be combined during data visualization for spatial analysis. See, e.g., 10X, 2019, "Inside Visium Spatial Technology." Non-limiting aspects of spatial analysis methodologies are described herein and in WO 2011/127099, WO 2014/210233, WO 2014/210225, WO 2016/162309, WO 2018/091676, WO 2012/140224, WO 2014/060483, U.S. Pat. Nos. 10,002,316, 9,727,810, U.S. Patent Application Publication No. 2017/0016053, Rodriques et al., *Science* 363 (6434): 1463-1467, 2019; WO 2018/045186, Lee et al., *Nat. Protoc.* 10(3): 442-458, 2015; WO 2016/007839, WO 2018/045181, WO 2014/163886, Trejo et al., *PLoS ONE* 14(2): e0212031, 2019, U.S. Patent Application Publication No. 2018/0245142, Chen et al., *Science* 348(6233): aaa6090, 2015, Gao et al., *BMC Biol.* 15:50, 2017, WO 2017/144338, WO 2018/107054, WO 2017/222453, WO 2019/068880, WO 2011/094669, U.S. Pat. Nos. 7,709,198, 8,604,182, 8,951,726, 9,783,841, 10,041,949, WO 2016/057552, WO 2017/147483, WO 2018/022809, WO 2016/166128, WO 2017/027367, WO 2017/027368, WO 2018/136856, WO 2019/075091, U.S. Pat. No. 10,059,990, WO 2018/057999, WO 2015/161173, Gupta et al., *Nature Biotechnol.* 36:1197-1202, 2018, and U.S. patent application Ser. No. 16/992,569, entitled "Systems and Methods for Using Spatial Distribution of Haplotypes to Determine a Biological Condition," filed Aug. 13, 2020, and can be used herein in any combination. Spatial analysis of analytes is further described in U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

Furthermore, high-resolution spatial mapping of analytes to their specific location within a region or subregion can reveal spatial expression patterns of analytes, provide relational data, and further implicate analyte network interactions relating to disease or other morphologies or phenotypes of interest, resulting in a holistic understanding of cells in their morphological context. See, e.g., 10X, 2019, "Spatially-Resolved Transcriptomics," 10X, 2019, "Inside Visium Spatial Technology," and 10X, 2019, "Visium Spatial Gene Expression Solution," each of which is hereby incorporated herein by reference in its entirety.

Difficulties arise, however, during the proper alignment of a sample or an image of a sample (e.g., a tissue section or an image of a tissue section) with the barcoded capture probes (e.g., using fiducial alignment). Technical limitations in the field are further compounded by the frequent introduction of imperfections in sample quality during conventional wet-lab methods for tissue sample preparation and sectioning. These issues arise either due to the nature of the tissue sample itself (including, inter alia, interstitial regions, vacuoles and/or general granularity that is often difficult to interpret after imaging) or from improper handling or sample degradation resulting in gaps or holes in the sample (e.g., tearing samples or obtaining only a partial sample such as from a biopsy). Additionally, wet-lab methods for imaging result in further imperfections, including but not limited to air bubbles, debris, crystalline stain particles deposited on the substrate or tissue, inconsistent or poor-contrast staining, and/or microscopy limitations that produce image blur, over- or under-exposure, and/or poor resolution. See, Uchida, 2013, "Image processing and recognition for biological images," Develop. Growth Differ. 55, 523-549, doi:10.1111/dgd.12054, which is hereby incorporated herein by reference in its entirety. Such imperfections make the alignment more difficult.

Moreover, imaging techniques performed separately from the obtaining of spatial analyte data, such as high-resolution microscopy, present additional challenges during alignment with spatial analyte data. For instance, an imaging technique can be performed for a biological sample mounted onto a substrate such as a specimen slide prior to the application of spatial fiducials for spatial imaging and/or prior to the contacting the biological sample with one or more capture spots for detection, capture, and/or analysis of analytes. As such, an image of the biological sample can have different characteristics from an image of the same biological sample obtained during spatial analyte analysis, including but not limited to, different resolutions, different image sizes, different portions of the biological sample (e.g., an entire tissue section, a portion of the tissue section, etc.), different orientations, and/or the presence or absence of spatial fiducials for determining a frame of reference of a first image (e.g., a high-resolution microscopy image) with respect to the second image (e.g., a low-resolution image obtained during spatial analyte analysis). These different characteristics can hamper the alignment of the first image with the second image, and thus create obstacles in the ability to overlay spatial analyte data with, e.g., a high-resolution image that contains other morphological characteristics of interest used for biological interpretation and contextualization. Accordingly, it can be difficult to correctly align spatial analyte data with an image of the biological sample obtained separately from the spatial analyte analysis.

Thus, there is a need in the art for systems and methods that provide improved image registration for spatial analysis of analytes within a histological context (e.g., mapping of analyte data to a respective position in an image of the biological sample from which the data has been obtained).

Benefit

Advantageously, the present disclosure provides systems and methods for overlaying image data for a biological sample onto spatial analyte data for a plurality of analytes of the biological sample.

For instance, in some embodiments, it is advantageous to obtain one or more microscopy images of the biological sample, such as to obtain histological or morphological information about the biological sample that is preferentially visualized using techniques separate from or prior to preparation of the biological sample for spatial analyte analysis. These techniques can include high-resolution imaging, staining methods for detection or localization of particular cells or analyte expression patterns, and/or other microscopy techniques such as immunofluorescence. A microscopy image and/or a spatial analyte analysis may be limited in size by experimental constraints, such that the portion of the biological sample used for the particular imaging is smaller (or larger) than the portion of the biological sample used for the spatial analyte analysis. In some instances, the microscopy image is obtained from the biological sample mounted onto a substrate that lacks fiducials.

Accordingly, the presently disclosed systems and methods provide a method for overlaying image data for a biological sample onto spatial analyte data for a plurality of analytes of the biological sample. Generally, the method includes obtaining a first image of the biological sample on a first substrate and a second image of the sample on the first substrate overlayed on a second substrate including spatial fiducials and a set of capture spots. A registration for the first image and the second image is determined and used to overlay the first image onto a spatial dataset comprising spatial analyte data for the set of capture spots from the biological sample, where the frame of reference of the spatial dataset is known with respect to the second image, based on the spatial fiducials. In some embodiments, the registration for the first and second images is determined manually or automatically.

For example, in some embodiments, the determining the registration includes identifying landmarks that mark a first reference position in the first image and a second reference position in the second image. The landmarks are used with an alignment algorithm to obtain a transformation between the reference positions of the first and second images.

In some embodiments, the determining the registration includes obtaining the areas and the centroids for the first image and the second image, scaling and centering the images, and sampling candidate rotational alignments of the first and second image for each of a plurality of rotation angles and for each flipped (e.g., mirror image) relative orientation. Generally, the sampling includes determining a score (e.g., a similarity metric) for each rotation angle and each orientation and selecting the highest scoring candidate rotational alignment for the image registration.

The systems and methods of the present disclosure thus improve upon the prior art by allowing for manual and/or automatic image registration for spatial analysis of analytes. These systems and methods allow for the registration of, for example, a first image (e.g., a high-resolution microscopy image) that lacks fiducials and thus cannot be easily aligned with a second image (e.g., a low-resolution image obtained during spatial analyte analysis). In turn, because spatial analyte data can be aligned with the second image (using, for example, an alignment based on fiducial markers), the ability to register the first image with the second image thereby allows for the overlay of spatial analyte data with histological and/or morphological information provided by the first image.

Advantageously, the methods for automated image registration disclosed herein provides for a streamlined workflow the overlaying a first image with spatial analyte data. Additionally, the methods for manual image registration disclosed herein provides for users to proceed with image registration in cases where automated alignment performs poorly or fails (e.g., due to differences in image characteristics). Furthermore, in some implementations, manual image registration is performed after an automated image registration (e.g., where manual image registration is used to correct for errors or failures in the automated process). Alternately, in some implementations, manual image registration is performed before an automated image registration (e.g., where the manual registration is used to set an initialization point for the automated process). In such cases, the manual image registration provides an initialization point that guides the alignment of the two images and thus improves the likelihood that the automated image registration process will perform accurately.

Thus, the present disclosure advantageously provides systems and methods that allow for automated and/or manual image registration, as well as methods that allow a user to initialize image registration and/or correct for any errors or failures in the registration process.

Definitions

Specific terminology is used throughout this disclosure to explain various aspects of the apparatus, systems, methods, and compositions that are described. This sub-section includes explanations of certain terms that appear in later sections of the disclosure. To the extent that the descriptions in this section are in apparent conflict with usage in other sections of this disclosure, the definitions in this section will control.

(A) General Definitions

Analytes

As used herein, the term "analyte" refers to any biological substance, structure, moiety, or component to be analyzed. The term "target" is similarly used herein to refer to an analyte of interest. In some embodiments, the apparatus, systems, methods, and compositions described in this disclosure can be used to detect and analyze a wide variety of different analytes.

Analytes can be broadly classified into one of two groups: nucleic acid analytes, and non-nucleic acid analytes. Examples of non-nucleic acid analytes include, but are not limited to, lipids, carbohydrates, peptides, proteins, glycoproteins (N-linked or O-linked), lipoproteins, phosphoproteins, specific phosphorylated or acetylated variants of proteins, amidation variants of proteins, hydroxylation variants of proteins, methylation variants of proteins, ubiquitylation variants of proteins, sulfation variants of proteins, viral proteins (e.g., viral capsid, viral envelope, viral coat, viral accessory, viral glycoproteins, viral spike, etc.), extracellular and intracellular proteins, antibodies, and antigen binding fragments. In some embodiments, the analyte is an organelle (e.g., nuclei or mitochondria). In some embodiments, the analyte(s) can be localized to subcellular location(s), including, for example, organelles, e.g., mitochondria, Golgi apparatus, endoplasmic reticulum, chloroplasts, endocytic vesicles, exocytic vesicles, vacuoles, lysosomes, etc. In some embodiments, analyte(s) can be peptides or proteins, including without limitation antibodies and enzymes. Additional examples of analytes can be found in Section (I)(c) of WO 2020/176788 and/or U.S. Patent Application Publication No. 2020/0277663. In some embodiments, an analyte can be detected indirectly, such as through detection of an intermediate agent, for example, a connected probe (e.g., a ligation product) or an analyte capture agent (e.g., an oligonucleotide-conjugated antibody), such as those described herein. In some embodiments, analytes can include one or more intermediate agents, e.g., connected probes or analyte capture agents that bind to nucleic acid, protein, or peptide analytes in a sample.

Cell surface features corresponding to analytes can include, but are not limited to, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, an extracellular matrix protein, a posttranslational modification (e.g., phosphorylation, glycosylation, ubiquitination, nitrosylation, methylation, acetylation or lipidation) state of a cell surface protein, a gap junction, and an adherens junction.

Analytes can be derived from a specific type of cell and/or a specific sub-cellular region. For example, analytes can be derived from cytosol, from cell nuclei, from mitochondria, from microsomes, and more generally, from any other compartment, organelle, or portion of a cell. Permeabilizing agents that specifically target certain cell compartments and organelles can be used to selectively release analytes from cells for analysis. Tissue permeabilization is illustrated in FIG. 37.

Examples of nucleic acid analytes include DNA analytes such as genomic DNA, methylated DNA, specific methylated DNA sequences, fragmented DNA, mitochondrial DNA, in situ synthesized PCR products, and RNA/DNA hybrids.

Examples of nucleic acid analytes also include RNA analytes such as various types of coding and non-coding RNA. Examples of the different types of RNA analytes include messenger RNA (mRNA), ribosomal RNA (rRNA), transfer RNA (tRNA), microRNA (miRNA), and viral RNA. The RNA can be a transcript (e.g., present in a tissue section). The RNA can be small (e.g., less than 200 nucleic acid bases in length) or large (e.g., RNA greater than 200 nucleic acid bases in length). Small RNAs mainly include 5.8S ribosomal RNA (rRNA), 5S rRNA, transfer RNA (RNA), microRNA (miRNA), small interfering RNA (siRNA), small nucleolar RNA (snoRNAs), Piwi-interacting RNA (piRNA), tRNA-derived small RNA (tsRNA), and small rDNA-derived RNA (srRNA). The RNA can be double-stranded RNA or single-stranded RNA. The RNA can be circular RNA. The RNA can be a bacterial rRNA (e.g., 16s rRNA or 23s rRNA).

Additional examples of analytes include mRNA and cell surface features (e.g., using the labelling agents described herein), mRNA and intracellular proteins (e.g., transcription factors), mRNA and cell methylation status, mRNA and accessible chromatin (e.g., ATAC-seq, DNase-seq, and/or MNase-seq), mRNA and metabolites (e.g., using the labelling agents described herein), a barcoded labelling agent (e.g., the oligonucleotide tagged antibodies described herein) and a V(D)J sequence of an immune cell receptor (e.g., T-cell receptor), mRNA and a perturbation agent (e.g., a CRISPR crRNA/sgRNA, TALEN, zinc finger nuclease, and/or antisense oligonucleotide as described herein). In some embodiments, a perturbation agent is a small molecule, an antibody, a drug, an aptamer, a miRNA, a physical environmental (e.g., temperature change), or any other known perturbation agents.

Analytes can include a nucleic acid molecule with a nucleic acid sequence encoding at least a portion of a V(D)J sequence of an immune cell receptor (e.g., a TCR or BCR).

In some embodiments, the nucleic acid molecule is cDNA first generated from reverse transcription of the corresponding mRNA, using a poly(T) containing primer. The generated cDNA can then be barcoded using a capture probe, featuring a barcode sequence (and optionally, a UMI sequence) that hybridizes with at least a portion of the generated cDNA. In some embodiments, a template switching oligonucleotide hybridizes to a poly(C) tail added to a 3' end of the cDNA by a reverse transcriptase enzyme. The original mRNA template and template switching oligonucleotide can then be denatured from the cDNA and the barcoded capture probe can then hybridize with the cDNA and a complement of the cDNA generated. Additional methods and compositions suitable for barcoding cDNA generated from mRNA transcripts including those encoding V(D)J regions of an immune cell receptor and/or barcoding methods and composition including a template switch oligonucleotide are described in PCT Patent Application PCT/US2017/057269, filed Oct. 18, 2017, and U.S. patent application Ser. No. 15/825,740, filed Nov. 29, 2017, both of which are incorporated herein by reference in their entireties. V(D)J analysis can also be completed with the use of one or more labelling agents that bind to particular surface features of immune cells and associated with barcode sequences. The one or more labelling agents can include an MHC or MHC multimer.

As described above, the analyte can include a nucleic acid capable of functioning as a component of a gene editing reaction, such as, for example, clustered regularly interspaced short palindromic repeats (CRISPR)-based gene editing. Accordingly, the capture probe can include a nucleic acid sequence that is complementary to the analyte (e.g., a sequence that can hybridize to the CRISPR RNA (crRNA), single guide RNA (sgRNA), or an adapter sequence engineered into a crRNA or sgRNA).

In certain embodiments, an analyte is extracted from a live cell. Processing conditions can be adjusted to ensure that a biological sample remains live during analysis, and analytes are extracted from (or released from) live cells of the sample. Live cell-derived analytes can be obtained only once from the sample or can be obtained at intervals from a sample that continues to remain in viable condition.

In general, the systems, apparatus, methods, and compositions can be used to analyze any number of analytes. For example, the number of analytes that are analyzed can be at least about 2, at least about 3, at least about 4, at least about 5, at least about 6, at least about 7, at least about 8, at least about 9, at least about 10, at least about 11, at least about 12, at least about 13, at least about 14, at least about 15, at least about 20, at least about 25, at least about 30, at least about 40, at least about 50, at least about 100, at least about 1,000, at least about 10,000, at least about 100,000 or more different analytes present in a region of the sample or within an individual capture spot of the substrate. Methods for performing multiplexed assays to analyze two or more different analytes will be discussed in a subsequent section of this disclosure.

In some embodiments, more than one analyte type (e.g., nucleic acids and proteins) from a biological sample can be detected (e.g., simultaneously or sequentially) using any appropriate multiplexing technique, such as those described in Section (IV) of WO 2020/176788 and/or U.S. Patent Application Publication No. 2020/0277663.

In some embodiments, detection of one or more analytes (e.g., protein analytes) can be performed using one or more analyte capture agents. As used herein, an "analyte capture agent" refers to an agent that interacts with an analyte (e.g., an analyte in a biological sample) and with a capture probe (e.g., a capture probe attached to a substrate or a feature) to identify the analyte. In some embodiments, the analyte capture agent includes: (i) an analyte binding moiety (e.g., that binds to an analyte), for example, an antibody or antigen-binding fragment thereof; (ii) analyte binding moiety barcode; and (iii) a capture handle sequence. As used herein, the term "analyte binding moiety barcode" refers to a barcode that is associated with or otherwise identifies the analyte binding moiety. As used herein, the term "analyte capture sequence" or "capture handle sequence" refers to a region or moiety configured to hybridize to, bind to, couple to, or otherwise interact with a capture domain of a capture probe. In some embodiments, a capture handle sequence is complementary to a capture domain of a capture probe. In some cases, an analyte binding moiety barcode (or portion thereof) may be able to be removed (e.g., cleaved) from the analyte capture agent.

Additional examples of analytes suitable for use in the present disclosure are described in U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

Barcodes

As used herein, the term "barcode" refers to a label, or identifier, that conveys or is capable of conveying information (e.g., information about an analyte in a sample, a bead, and/or a capture probe). A barcode can be part of an analyte, or independent of an analyte. A barcode can be attached to an analyte. A particular barcode can be unique relative to other barcodes. Barcodes suitable for use in the present disclosure are further described in U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

Biological Samples

As used herein, the term "sample" or "biological sample" refers to any material obtained from a subject for analysis using any of a variety of techniques including, but not limited to, biopsy, surgery, and laser capture microscopy (LCM), and generally includes cells and/or other biological material from the subject. In addition to the subjects described above, a biological sample can also be obtained from non-mammalian organisms (e.g., plants, insects, arachnids, nematodes, fungi, amphibians, and fish. A biological sample can be obtained from a prokaryote such as a bacterium, e.g., *Escherichia coli*, Staphylococci or *Mycoplasma pneumoniae*; archaea; a virus such as Hepatitis C virus or human immunodeficiency virus; or a viroid. A biological sample can also be obtained from a eukaryote, such as a patient derived organoid (PDO) or patient derived xenograft (PDX). The biological sample can include organoids, a miniaturized and simplified version of an organ produced in vitro in three dimensions that shows realistic micro-anatomy. Organoids can be generated from one or more cells from a tissue, embryonic stem cells, and/or induced pluripotent stem cells, which can self-organize in three-dimensional culture owing to their self-renewal and differentiation capacities. In some embodiments, an organoid is a cerebral organoid, an intestinal organoid, a stomach organoid, a lingual organoid, a thyroid organoid, a thymic organoid, a testicular organoid, a hepatic organoid, a pancreatic organoid, an epithelial organoid, a lung organoid, a kidney organoid, a gastruloid, a cardiac organoid, or a retinal organoid. Subjects from which biological samples can be obtained can be healthy or asymptomatic individuals, individuals that have or are suspected of having a disease (e.g., cancer) or a pre-disposition to a disease, and/or individuals that are in need of therapy or suspected of needing therapy.

The biological sample can include any number of macromolecules, for example, cellular macromolecules and organelles (e.g., mitochondria and nuclei). The biological sample can be a nucleic acid sample and/or protein sample. The biological sample can be a nucleic acid sample and/or protein sample. The biological sample can be a carbohydrate sample or a lipid sample. The biological sample can be obtained as a tissue sample, such as a tissue section, biopsy, a core biopsy, needle aspirate, or fine needle aspirate. The sample can be a fluid sample, such as a blood sample, urine sample, or saliva sample. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions and/or disaggregated cells.

Cell-free biological samples can include extracellular polynucleotides. Extracellular polynucleotides can be isolated from a bodily sample, e.g., blood, plasma, serum, urine, saliva, mucosal excretions, sputum, stool, and tears.

Biological samples can be derived from a homogeneous culture or population of the subjects or organisms mentioned herein or alternatively from a collection of several different organisms, for example, in a community or ecosystem.

Biological samples can include one or more diseased cells. A diseased cell can have altered metabolic properties, gene expression, protein expression, and/or morphologic features. Examples of diseases include inflammatory disorders, metabolic disorders, nervous system disorders, and cancer. Cancer cells can be derived from solid tumors, hematological malignancies, cell lines, or obtained as circulating tumor cells.

Biological samples can also include fetal cells. For example, a procedure such as amniocentesis can be performed to obtain a fetal cell sample from maternal circulation. Sequencing of fetal cells can be used to identify any of a number of genetic disorders, including, e.g., aneuploidy such as Down's syndrome, Edwards syndrome, and Patau syndrome. Further, cell surface features of fetal cells can be used to identify any of a number of disorders or diseases.

Biological samples can also include immune cells. Sequence analysis of the immune repertoire of such cells, including genomic, proteomic, and cell surface features, can provide a wealth of information to facilitate an understanding the status and function of the immune system. By way of example, determining the status (e.g., negative or positive) of minimal residue disease (MRD) in a multiple myeloma (MM) patient following autologous stem cell transplantation is considered a predictor of MRD in the MM patient (see, e.g., U.S. Patent Publication No. 2018/0156784, the entire contents of which are incorporated herein by reference).

Examples of immune cells in a biological sample include, but are not limited to, B cells, T cells (e.g., cytotoxic T cells, natural killer T cells, regulatory T cells, and T helper cells), natural killer cells, cytokine induced killer (CIK) cells, myeloid cells, such as granulocytes (basophil granulocytes, eosinophil granulocytes, neutrophil granulocytes/hyper-segmented neutrophils), monocytes/macrophages, mast cells, thrombocytes/megakaryocytes, and dendritic cells.

As discussed above, a biological sample can include a single analyte of interest, or more than one analyte of interest. Methods for performing multiplexed assays to analyze two or more different analytes in a single biological sample will be discussed in a subsequent section of this disclosure.

A variety of steps can be performed to prepare a biological sample for analysis. Except where indicated otherwise, the preparative steps for biological samples can generally be combined in any manner to appropriately prepare a particular sample for analysis.

For instance, in some embodiments, the biological sample is a tissue section. In some embodiments, the biological sample is prepared using tissue sectioning. A biological sample can be harvested from a subject (e.g., via surgical biopsy, whole subject sectioning, grown in vitro on a growth substrate or culture dish as a population of cells, or prepared for analysis as a tissue slice or tissue section). Grown samples may be sufficiently thin for analysis without further processing steps. Alternatively, grown samples, and samples obtained via biopsy or sectioning, can be prepared as thin tissue sections using a mechanical cutting apparatus such as a vibrating blade microtome. As another alternative, in some embodiments, a thin tissue section can be prepared by applying a touch imprint of a biological sample to a suitable substrate material. The thickness of the tissue section can be a fraction of (e.g., less than 0.9, 0.8, 0.7, 0.6, 0.5, 0.4, 0.3, 0.2, or 0.1) the maximum cross-sectional dimension of a cell. However, tissue sections having a thickness that is larger than the maximum cross-section cell dimension can also be used. For example, cryostat sections can be used, which can be, e.g., 10-20 micrometers thick.

More generally, the thickness of a tissue section typically depends on the method used to prepare the section and the physical characteristics of the tissue, and therefore sections having a wide variety of different thicknesses can be prepared and used. For example, the thickness of the tissue section can be at least 0.1, 0.2, 0.3, 0.4, 0.5, 0.7, 1.0, 1.5, 2, 3, 4, 5, 6, 7, 8, 9, 10, 11, 12, 13, 14, 15, 20, 30, 40, or 50 micrometers. Thicker sections can also be used if desired or convenient, e.g., at least 70, 80, 90, or 100 micrometers or more. Typically, the thickness of a tissue section is between 1-100 micrometers, 1-50 micrometers, 1-30 micrometers, 1-25 micrometers, 1-20 micrometers, 1-15 micrometers, 1-10 micrometers, 2-8 micrometers, 3-7 micrometers, or 4-6 micrometers, but as mentioned above, sections with thicknesses larger or smaller than these ranges can also be analyzed.

In some embodiments, a tissue section is a similar size and shape to a substrate (e.g., the first substrate and/or the second substrate). In some embodiments, a tissue section is a different size and shape from a substrate. In some embodiments, a tissue section is on all or a portion of the substrate.

Figure 14:
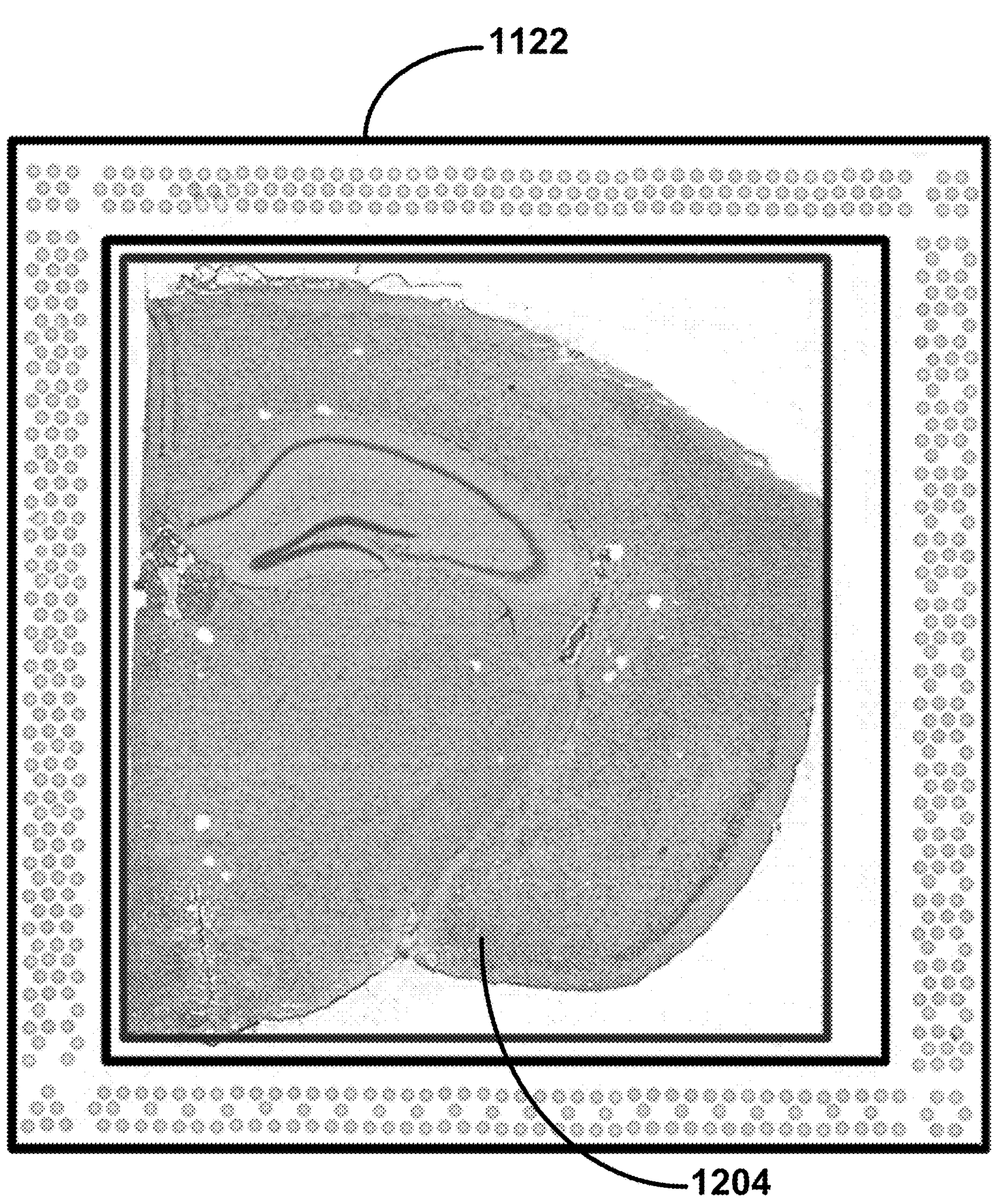
FIG. 14 illustrates a substrate with an image of a biological sample (e.g., tissue sample) on the substrate, in accordance with an embodiment of the present disclosure.

For example, FIG. 14 illustrates a tissue section with dimensions roughly comparable to the substrate, such that a large proportion of the substrate is in contact with the tissue section. In some embodiments, several biological samples from a subject are concurrently analyzed. For instance, in some embodiments several different sections of a tissue are concurrently analyzed. In some embodiments, 1, 2, 3, 4, 5, 6, 7, 8, 9, 10, 11, 12, 13, 14, 15, 16, 17, 18, 19, or 20 different biological samples from a subject are concurrently analyzed. For example, in some embodiments, 1, 2, 3, 4, 5, 6, 7, 8, 9, 10, 11, 12, 13, 14, 15, 16, 17, 18, 19, or 20 different tissue sections from a single biological sample from a single subject are concurrently analyzed. In some embodiments, one or more images are acquired of each such tissue section.

Figure 12:
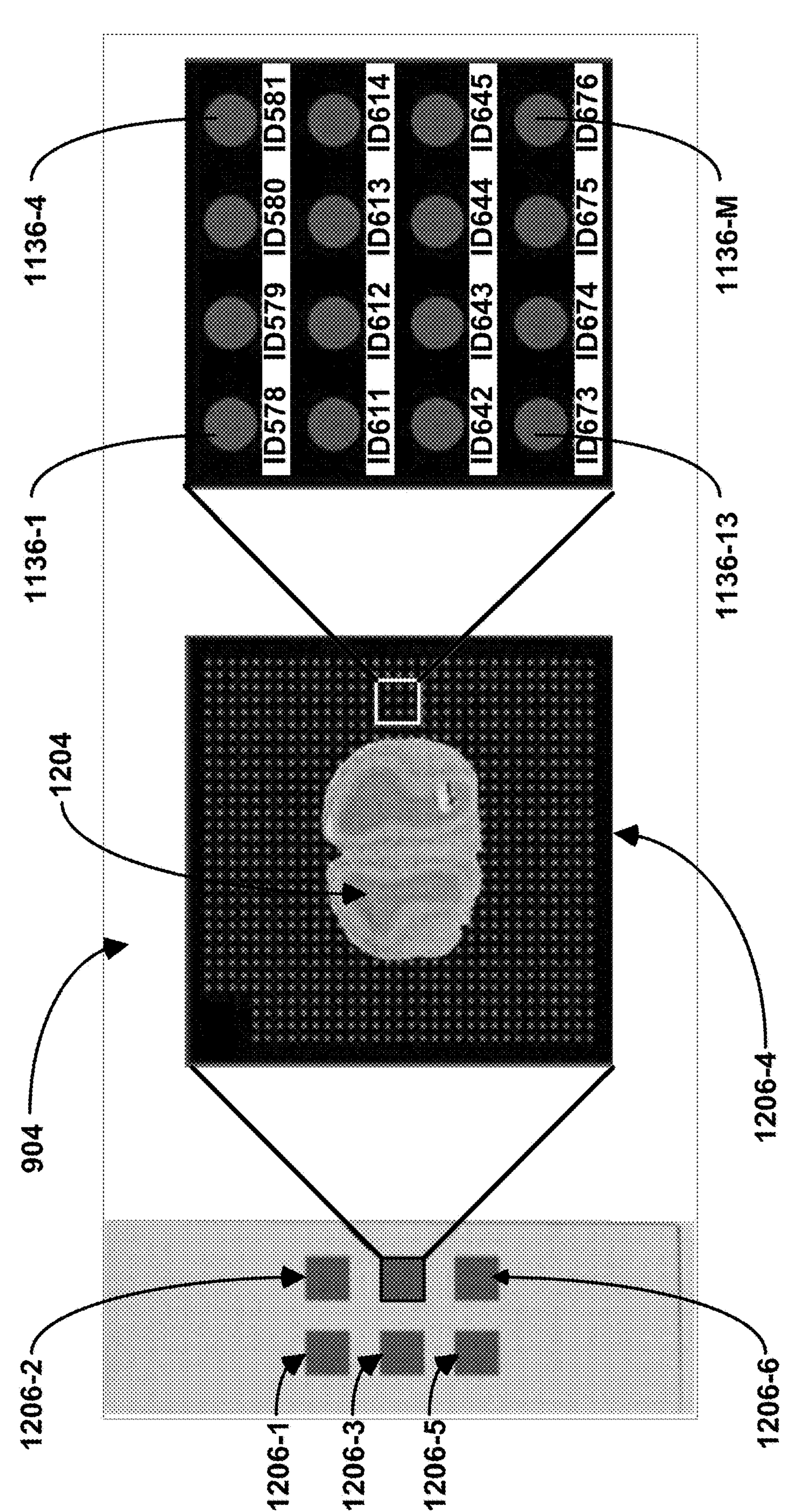
FIG. 12 is a schematic showing the arrangement of barcoded capture spots within an array in accordance with some embodiments of the present disclosure.

In some embodiments, a tissue section on a substrate is a single uniform section. In some embodiments, multiple tissue sections are on a substrate. In some such embodiments, a single capture area such as capture area 1206 on a substrate, as illustrated in FIG. 12, can contain multiple tissue sections 1204, where each tissue section is obtained from either the same biological sample and/or subject or from different biological samples and/or subjects. In some embodiments, a tissue section is a single tissue section that comprises one or more regions where no cells are present (e.g., holes, tears, or gaps in the tissue). Thus, in some embodiments, such as the above, an image of a tissue section on a substrate can contain regions where tissue is present and regions where tissue is not present.

Additional examples of tissue samples are shown in Table 1 and catalogued, for example, in 10X, 2019, "Visium Spatial Gene Expression Solution," and in U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

TABLE 1

Examples of tissue samples

| Organism | Tissue | Healthy/Diseased |
|---|---|---|
| Human | Brain | Cerebrum Glioblastoma Multiforme |
| Human | Breast | Healthy |
| Human | Breast | Invasive Ductal Carcinoma |
| Human | Breast | Invasive Lobular Carcinoma |
| Human | Heart | Healthy |
| Human | Kidney | Healthy |
| Human | Kidney | Nephritis |
| Human | Large Intestine | Colorectal Cancer |
| Human | Lung | Papillary Carcinoma |
| Human | Lymph Node | Healthy |
| Human | Lymph Node | Inflamed |
| Human | Ovaries | Tumor |
| Human | Spleen | Inflamed |
| Mouse | Brain | Healthy |
| Mouse | Eyes | Healthy |
| Mouse | Heart | Healthy |
| Mouse | Kidney | Healthy |
| Mouse | Large Intestine | Healthy |
| Mouse | Liver | Healthy |
| Mouse | Lungs | Healthy |
| Mouse | Ovary | Healthy |

TABLE 1-continued

Examples of tissue samples

| Organism | Tissue | Healthy/Diseased |
|---|---|---|
| Mouse | Quadriceps | Healthy |
| Mouse | Small Intestine | Healthy |
| Mouse | Spleen | Healthy |
| Mouse | Stomach | Healthy |
| Mouse | Testes | Healthy |
| Mouse | Thyroid | Healthy |
| Mouse | Tongue | Healthy |
| Rat | Brain | Healthy |
| Rat | Heart | Healthy |
| Rat | Kidney | Healthy |
| Mouse | Tongue | Healthy |
| Rat | Brain | Healthy |
| Rat | Heart | Healthy |
| Rat | Kidney | Healthy |

Multiple sections can also be obtained from a single biological sample. For example, multiple tissue sections can be obtained from a surgical biopsy sample by performing serial sectioning of the biopsy sample using a sectioning blade. Spatial information among the serial sections can be preserved in this manner, and the sections can be analyzed successively to obtain three-dimensional information about the biological sample.

In some embodiments, a biological sample is prepared using one or more steps including, but not limited to, freezing, fixation, embedding, formalin fixation and paraffin embedding, hydrogel embedding, biological sample transfer, isometric expansion, cell disaggregation, cell suspension, cell adhesion, permeabilization, lysis, protease digestion, selective permeabilization, selective lysis, selective enrichment, enzyme treatment, library preparation, and/or sequencing pre-processing. Methods for biological sample preparation that are contemplated in the present disclosure are described in further detail in U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

In some embodiments, a biological sample is prepared by staining. To facilitate visualization, biological samples can be stained using a wide variety of stains and staining techniques. In some embodiments, for example, a sample can be stained using any number of biological stains, including but not limited to, acridine orange, Bismarck brown, carmine, Coomassie blue, cresyl violet, DAPI, eosin, ethidium bromide, acid fuchsine, hematoxylin, Hoechst stains, iodine, methyl green, methylene blue, neutral red, Nile blue, Nile red, osmium tetroxide, propidium iodide, rhodamine, safranin, or a combination thereof.

The sample can be stained using known staining techniques, including Can-Grunwald, Giemsa, hematoxylin and eosin (H&E), Jenner's, Leishman, Masson's trichrome, Papanicolaou, Romanowsky, silver, Sudan, Wright's, and/or Periodic Acid Schiff (PAS) staining techniques. PAS staining is typically performed after formalin or acetone fixation.

In some embodiments, the sample is stained using a detectable label (e.g., radioisotopes, fluorophores, chemiluminescent compounds, bioluminescent compounds, and dyes). In some embodiments, a biological sample is stained using only one type of stain or one technique. In some embodiments, staining includes biological staining techniques such as H&E staining. In some embodiments, staining includes identifying analytes using fluorescently-labeled antibodies. In some embodiments, a biological sample is stained using two or more different types of stains, or two or more different staining techniques. For example, a biological sample can be prepared by staining and imaging using one technique (e.g., H&E staining and bright-field imaging), followed by staining and imaging using another technique (e.g., IHC/IF staining and fluorescence microscopy) for the same biological sample.

In some embodiments, biological samples can be destained. Methods of destaining or discoloring a biological sample are known in the art, and generally depend on the nature of the stain(s) applied to the sample. For example, H&E staining can be destained by washing the sample in HCl, or any other low pH acid (e.g., selenic acid, sulfuric acid, hydroiodic acid, benzoic acid, carbonic acid, malic acid, phosphoric acid, oxalic acid, succinic acid, salicylic acid, tartaric acid, sulfurous acid, trichloroacetic acid, hydrobromic acid, hydrochloric acid, nitric acid, orthophosphoric acid, arsenic acid, selenous acid, chromic acid, citric acid, hydrofluoric acid, nitrous acid, isocyanic acid, formic acid, hydrogen selenide, molybdic acid, lactic acid, acetic acid, carbonic acid, hydrogen sulfide, or combinations thereof). In some embodiments, destaining can include 1, 2, 3, 4, 5, or more washes in a low pH acid (e.g., HCl). In some embodiments, destaining can include adding HCl to a downstream solution (e.g., permeabilization solution). In some embodiments, destaining can include dissolving an enzyme used in the disclosed methods (e.g., pepsin) in a low pH acid (e.g., HCl) solution. In some embodiments, after destaining hematoxylin with a low pH acid, other reagents can be added to the destaining solution to raise the pH for use in other applications. For example, SDS can be added to a low pH acid destaining solution in order to raise the pH as compared to the low pH acid destaining solution alone. As another example, in some embodiments, one or more immunofluorescence stains are applied to the sample via antibody coupling. Such stains can be removed using techniques such as cleavage of disulfide linkages via treatment with a reducing agent and detergent washing, chaotropic salt treatment, treatment with antigen retrieval solution, and treatment with an acidic glycine buffer. Methods for multiplexed staining and destaining are described, for example, in Bolognesi et al., 2017, J. Histochem. Cytochem. 65 (8): 431-444, Lin et al., 2015, Nat Commun. 6:8390, Pirici et al., 2009, J. Histochem. Cytochem. 57:567-75, and Glass et al., 2009, J. Histochem. Cytochem. 57:899-905, the entire contents of each of which are incorporated herein by reference.

In some embodiments, the biological sample can be attached to a substrate (e.g., a slide and/or a chip). Examples of substrates suitable for this purpose are described in detail elsewhere herein (see, for example, Definitions: "Substrates," below). Attachment of the biological sample can be irreversible or reversible, depending upon the nature of the sample and subsequent steps in the analytical method.

In certain embodiments, the sample can be attached to the substrate reversibly by applying a suitable polymer coating to the substrate and contacting the sample to the polymer coating. The sample can then be detached from the substrate using an organic solvent that at least partially dissolves the polymer coating. Hydrogels are examples of polymers that are suitable for this purpose. More generally, in some embodiments, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

Biological samples contemplated for use in the present disclosure are further described in U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

Capture Probes

A "capture probe," also interchangeably referred to herein as a "probe," refers to any molecule capable of capturing (directly or indirectly) and/or labelling an analyte (e.g., an analyte of interest) in a biological sample. In some embodiments, the capture probe is a nucleic acid or a polypeptide. In some embodiments, the capture probe is a conjugate (e.g., an oligonucleotide-antibody conjugate). In some embodiments, the capture probe includes a barcode (e.g., a spatial barcode and/or a unique molecular identifier (UMI)) and a capture domain.

Figure 6:
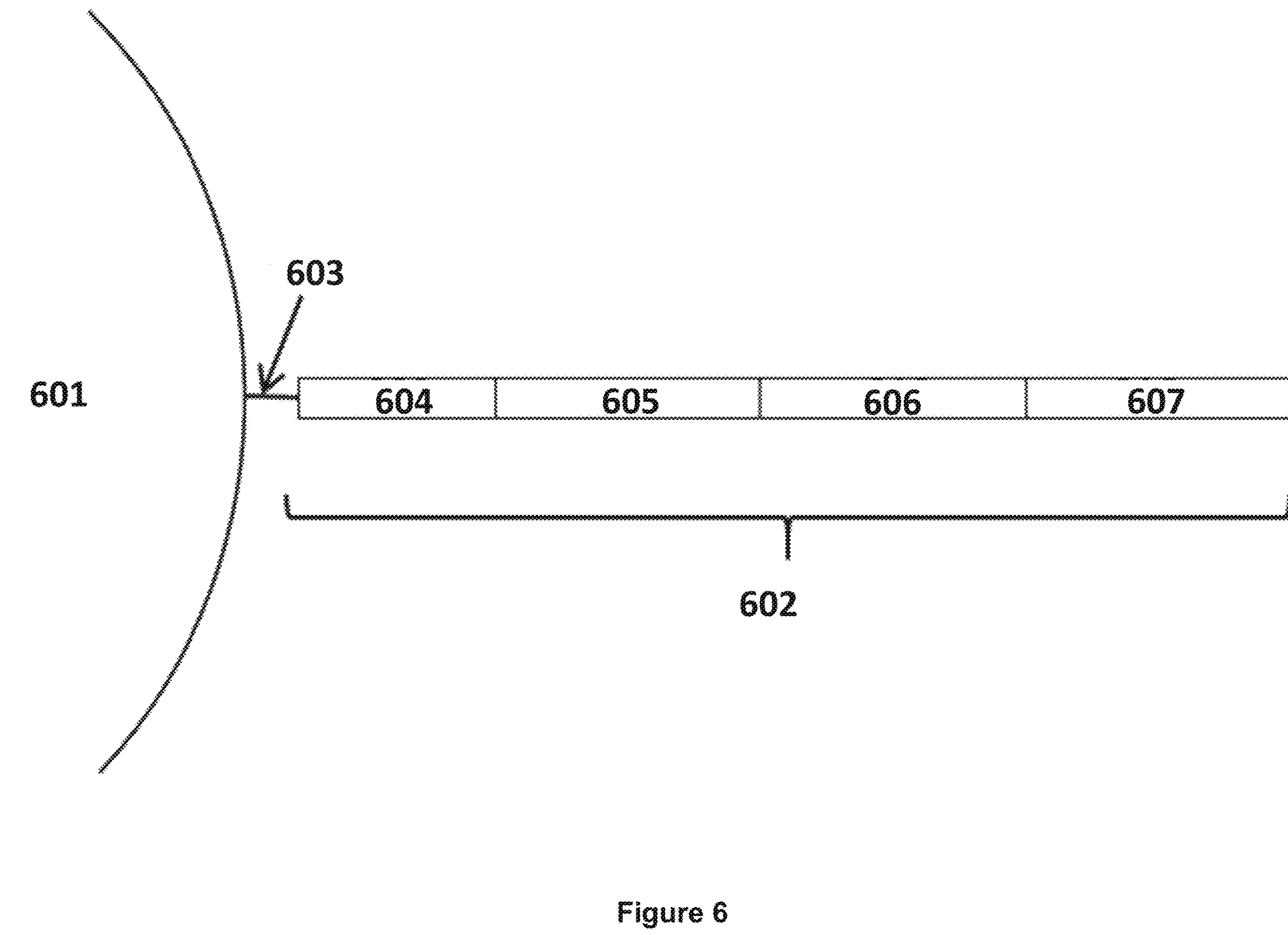
FIG. 6 is a schematic diagram showing an example of a barcoded capture probe, as described herein in accordance with an embodiment of the present disclosure.

FIG. 6 is a schematic diagram showing an example of a capture probe, as described herein. As shown, the capture probe 602 is optionally coupled to a capture spot 601 by a cleavage domain 603, such as a disulfide linker.

The capture probe 602 can include functional sequences that are useful for subsequent processing, such as functional sequence 604, which can include a sequencer specific flow cell attachment sequence, e.g., a P5 sequence, as well as functional sequence 606, which can include sequencing primer sequences, e.g., an R1 primer binding site, an R2 primer binding site. In some embodiments, sequence 604 is a P7 sequence and sequence 606 is a R2 primer binding site.

A spatial barcode 605 can be included within the capture probe for use in barcoding the target analyte. The functional sequences can be selected for compatibility with a variety of different sequencing systems, e.g., 454 Sequencing, Ion Torrent Proton or PGM, Illumina sequencing instruments, PacBio, Oxford Nanopore, etc., and the requirements thereof. In some embodiments, functional sequences can be selected for compatibility with non-commercialized sequencing systems. Examples of such sequencing systems and techniques, for which suitable functional sequences can be used, include (but are not limited to) Ion Torrent Proton or PGM sequencing, Illumina sequencing, PacBio SMRT sequencing, and Oxford Nanopore sequencing. Further, in some embodiments, functional sequences can be selected for compatibility with other sequencing systems, including non-commercialized sequencing systems.

In some embodiments, the spatial barcode 605, functional sequences 604 (e.g., flow cell attachment sequence) and 606 (e.g., sequencing primer sequences) can be common to all of the probes attached to a given capture spot. The spatial barcode can also include a capture domain 607 to facilitate capture of a target analyte.

Other aspects of capture probes contemplated for use in the present disclosure are known in the art. For instance, example suitable cleavage domains are described in further detail in PCT publication 202020176788A1, entitled "Profiling of biological analytes with spatially barcoded oligonucleotide arrays," the entire contents of which is incorporated herein by reference. Example suitable functional domains are described in further detail in U.S. patent application Ser. No. 16/992,569, entitled "Systems and Methods for Using the Spatial Distribution of Haplotypes to Determine a Biological Condition," filed Aug. 13, 2020, as well as PCT publication 202020176788A1, entitled "Profiling of biological analytes with spatially barcoded oligonucleotide arrays," each of which is hereby incorporated herein by reference. Example suitable spatial barcodes and unique molecular identifiers are described in further detail in U.S. patent application Ser. No. 16/992,569, entitled "Systems and Methods for Using the Spatial Distribution of Haplotypes to Determine a Biological Condition," filed Aug. 13, 2020, and PCT publication 202020176788A1, entitled "Profiling of biological analytes with spatially barcoded oligonucleotide arrays," each of which is hereby incorporated herein by reference.

Capture probes contemplated for use in the present disclosure are further described in U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

Capture Spots

As used interchangeably herein, the terms "capture spot," "capture feature," "capture area," or "capture probe plurality" refer to an entity that acts as a support or repository for various molecular entities used in sample analysis. Examples of capture spots include, but are not limited to, a bead, a spot of any two- or three-dimensional geometry (e.g., an ink jet spot, a masked spot, a square on a grid), a well, and a hydrogel pad. In some embodiments, a capture spot is an area on a substrate at which capture probes labelled with spatial barcodes are clustered. Specific non-limiting embodiments of capture spots and substrates are further described below in the present disclosure.

In some embodiments, capture spots are directly or indirectly attached or fixed to a substrate (e.g., of a chip or a slide). In some embodiments, the capture spots are not directly or indirectly attached or fixed to a substrate, but instead, for example, are disposed within an enclosed or partially enclosed three dimensional space (e.g., wells or divots). In some embodiments, some or all capture spots in an array include a capture probe.

In some embodiments, a capture spot includes different types of capture probes attached to the capture spot. For example, the capture spot can include a first type of capture probe with a capture domain designed to bind to one type of analyte, and a second type of capture probe with a capture domain designed to bind to a second type of analyte. In general, capture spots can include one or more (e.g., two or more, three or more, four or more, five or more, six or more, eight or more, ten or more, 12 or more, 15 or more, 20 or more, 30 or more, 50 or more) different types of capture probes attached to a single capture spot.

In some embodiments, a capture spot on the array includes a bead. In some embodiments, two or more beads are dispersed onto a substrate to create an array, where each bead is a capture spot on the array. Beads can optionally be dispersed into wells on a substrate, e.g., such that only a single bead is accommodated per well.

In some embodiments, each respective capture spot in the set of capture spots is contained within a 10 micron by 10 micron square on the substrate. In some embodiments, a distance between a center of each respective capture spot to a neighboring capture spot in the set of capture spots on the substrate is between 4 microns and 8 microns. In some embodiments, a shape of each capture spot in the set of capture spots on the substrate is a closed-form shape. In some embodiments, the closed-form shape is circular and each capture spot in the set of capture spots has a width of between 3 microns and 7 microns. In some embodiments, the closed-form shape is square and each capture spot in the set of capture spots has a width of between 6 microns and 10 microns. In some embodiments, a capture spot is not visible by a human without magnification.

Further details and non-limiting embodiments relating to capture spots, including but not limited to beads, bead arrays, bead properties (e.g., structure, materials, construction, cross-linking, degradation, reagents, and/or optical properties), and for covalently and non-covalently bonding beads to substrates are described in U.S. patent application Ser. No. 16/992,569, U.S. Patent Publication No. 20110059865A1, U.S. Provisional Application No. 62/839,346, U.S. Pat. No. 9,012,022, and PCT publication 202020176788A1, entitled "Profiling of biological analytes with spatially barcoded oligonucleotide arrays"; U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

Capture Spot Arrays

In some embodiments, capture spots are collectively positioned on a substrate. As used herein, the term "capture spot array" or "array" refers to a specific arrangement of a plurality of capture spots (also termed "features") that is either irregular or forms a regular pattern. Individual capture spots in the array differ from one another based on their relative spatial locations. In general, at least two of the plurality of capture spots in the array include a distinct capture probe (e.g., any of the examples of capture probes described herein).

Arrays can be used to measure large numbers of analytes simultaneously. In some embodiments, oligonucleotides are used, at least in part, to create an array. For example, one or more copies of a single species of oligonucleotide (e.g., capture probe) can correspond to or be directly or indirectly attached to a given capture spot in the array. In some embodiments, a given capture spot in the array includes two or more species of oligonucleotides (e.g., capture probes). In some embodiments, the two or more species of oligonucleotides (e.g., capture probes) attached directly or indirectly to a given capture spot on the array include a common (e.g., identical) spatial barcode.

FIG. 12 depicts an exemplary arrangement of barcoded capture spots within an array. From left to right, FIG. 12 shows (L) a slide including six spatially-barcoded arrays 1206, (C) An enlarged schematic of one of the six spatially-barcoded arrays, showing a grid of barcoded capture spots 1136 in relation to a biological sample 1204, and (R) an enlarged schematic of one section of an array, showing the specific identification of multiple capture spots 1136 within the array (labelled as ID578, ID579, ID580, etc.).

In some embodiments, a substrate and/or an array (e.g., two-dimensional array) comprises a plurality of capture spots. In some embodiments, a substrate and/or an array includes between 4000 and 10,000 capture spots, or any range within 4000 to 6000 capture spots. For example, a substrate and/or an array includes between 4,000 to 4,400 capture spots, 4,000 to 4,800 capture spots, 4,000 to 5,200 capture spots, 4,000 to 5,600 capture spots, 5,600 to 6,000 capture spots, 5,200 to 6,000 capture spots, 4,800 to 6,000 capture spots, or 4,400 to 6,000 capture spots. In some embodiments, the substrate and/or array includes between 4,100 and 5,900 capture spots, between 4,200 and 5,800 capture spots, between 4,300 and 5,700 capture spots, between 4,400 and 5,600 capture spots, between 4,500 and 5,500 capture spots, between 4,600 and 5,400 capture spots, between 4,700 and 5,300 capture spots, between 4,800 and 5,200 capture spots, between 4,900 and 5,100 capture spots, or any range within the disclosed sub-ranges. For example, the substrate and/or array can include about 4,000 capture spots, about 4,200 capture spots, about 4,400 capture spots, about 4,800 capture spots, about 5,000 capture spots, about 5,200 capture spots, about 5,400 capture spots, about 5,600 capture spots, or about 6,000 capture spots. In some embodiments, the substrate and/or array comprises at least 4,000 capture spots. In some embodiments, the substrate and/or array includes approximately 5,000 capture spots.

Arrays suitable for use in the present disclosure are further described in PCT publication 202020176788A1, entitled "Profiling of biological analytes with spatially barcoded oligonucleotide arrays"; U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

Contact

As used herein, the terms "contact," "contacted," and/or "contacting" of a biological sample with a substrate comprising capture spots refers to any contact (e.g., direct or indirect) such that capture probes can interact (e.g., capture) with analytes from the biological sample. For example, the substrate may be near or adjacent to the biological sample without direct physical contact, yet capable of capturing analytes from the biological sample. In some embodiments the biological sample is in direct physical contact with the substrate. In some embodiments, the biological sample is in indirect physical contact with the substrate. For example, a liquid layer may be between the biological sample and the substrate. In some embodiments, the analytes diffuse through the liquid layer. In some embodiments the capture probes diffuse through the liquid layer. In some embodiments, reagents may be delivered via the liquid layer between the biological sample and the substrate. In some embodiments, indirect physical contact may be the presence of a second substrate (e.g., a hydrogel, a film, a porous membrane) between the biological sample and the first substrate comprising capture spots with capture probes. In some embodiments, reagents are delivered by the second substrate to the biological sample.

In some embodiments, a cell immobilization agent can be used to contact a biological sample with a substrate (e.g., by immobilizing non-aggregated or disaggregated sample on a spatially-barcoded array prior to analyte capture). A "cell immobilization agent" as used herein can refer to an agent (e.g., an antibody), attached to a substrate, which can bind to a cell surface marker. Non-limiting examples of a cell surface marker include CD45, CD3, CD4, CD8, CD56, CD19, CD20, CD11c, CD14, CD33, CD66b, CD34, CD41, CD61, CD235a, CD146, and epithelial cellular adhesion molecule (EpCAM). A cell immobilization agent can include any probe or component that can bind to (e.g., immobilize) a cell or tissue when on a substrate. A cell immobilization agent attached to the surface of a substrate can be used to bind a cell that has a cell surface maker. The cell surface marker can be a ubiquitous cell surface marker, wherein the purpose of the cell immobilization agent is to capture a high percentage of cells within the sample. The cell surface marker can be a specific, or more rarely expressed, cell surface marker, wherein the purpose of the cell immobilization agent is to capture a specific cell population expressing the target cell surface marker. Accordingly, a cell immobilization agent can be used to selectively capture a cell expressing the target cell surface marker from a population of cells that do not have the same cell surface marker.

Generally, analytes can be captured when contacting a biological sample with, e.g., a substrate comprising capture probes (e.g., substrate with capture probes embedded, spotted, printed on the substrate or a substrate with capture spots (e.g., beads, wells) comprising capture probes). Capture can be performed using passive capture methods and/or active capture methods.

In some embodiments, capture of analytes is facilitated by treating the biological sample with permeabilization reagents. If a biological sample is not permeabilized sufficiently, the amount of analyte captured on the substrate can be too low to enable adequate analysis. Conversely, if the biological sample is too permeable, the analyte can diffuse away from its origin in the biological sample, such that the relative spatial relationship of the analytes within the biological sample is lost. Hence, a balance between permeabilizing the biological sample enough to obtain good signal intensity while still maintaining the spatial resolution of the analyte distribution in the biological sample is desired. Methods of preparing biological samples to facilitate capture are known in the art and can be modified depending on the biological sample and how the biological sample is prepared (e.g., fresh frozen, FFPE, etc.). Examples of analyte capture suitable for use in the present disclosure are further described in U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

Spatial Fiducials

As used interchangeably herein, the terms "fiducial," "spatial fiducial," "fiducial marker," and "fiducial spot" generally refers to a point of reference or measurement scale. In some embodiments, imaging is performed using one or more fiducial markers, i.e., objects placed in the field of view of an imaging system that appear in the image produced. Fiducial markers can include, but are not limited to, detectable labels such as fluorescent, radioactive, chemiluminescent, calorimetric, and colorimetric labels. The use of fiducial markers to stabilize and orient biological samples is described, for example, in Carter et al., *Applied Optics* 46:421-427, 2007), the entire contents of which are incorporated herein by reference.

In some embodiments, a fiducial marker can be present on a substrate to provide orientation of the biological sample. In some embodiments, a microsphere can be coupled to a substrate to aid in orientation of the biological sample. In some examples, a microsphere coupled to a substrate can produce an optical signal (e.g., fluorescence). In another example, a microsphere can be attached to a portion (e.g., corner) of an array in a specific pattern or design (e.g., hexagonal design) to aid in orientation of a biological sample on an array of capture spots on the substrate. In some embodiments, a fiducial marker can be an immobilized molecule with which a detectable signal molecule can interact to generate a signal. For example, a marker nucleic acid can be linked or coupled to a chemical moiety capable of fluorescing when subjected to light of a specific wavelength (or range of wavelengths). Such a marker nucleic acid molecule can be contacted with an array before, contemporaneously with, or after the tissue sample is stained to visualize or image the tissue section. In some embodiments, it can be advantageous to use a marker that can be detected using the same conditions (e.g., imaging conditions) used to detect an analyte of interest.

In some embodiments, fiducial markers are included to facilitate the orientation of a tissue sample or an image thereof in relation to an immobilized capture probes on a substrate. Any number of methods for marking an array can be used such that a marker is detectable only when a tissue section is imaged. For instance, a molecule, e.g., a fluorescent molecule that generates a signal, can be immobilized directly or indirectly on the surface of a substrate. Markers can be provided on a substrate in a pattern (e.g., an edge, one or more rows, one or more lines, etc.).

In some embodiments, a fiducial marker can be stamped, attached, or synthesized on the substrate and contacted with a biological sample. Typically, an image of the sample and the fiducial marker is taken, and the position of the fiducial marker on the substrate can be confirmed by viewing the image.

In some examples, fiducial markers can surround the array. In some embodiments the fiducial markers allow for detection of, e.g., mirroring. In some embodiments, the fiducial markers may completely surround the array. In some embodiments, the fiducial markers may not completely surround the array. In some embodiments, the fiducial markers identify the corners of the array. In some embodiments, one or more fiducial markers identify the center of the array.

Example spatial fiducials suitable for use in the present disclosure are further described in U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

Imaging

As used herein, the term "imaging" refers to any method of obtaining an image, e.g., a microscope image. For example, images include bright-field images, which are transmission microscopy images where broad-spectrum, white light is placed on one side of the sample mounted on a substrate and the camera objective is placed on the other side and the sample itself filters the light in order to generate colors or grayscale intensity images.

In some embodiments, in addition to or instead of bright-field imaging, emission imaging, such as fluorescence imaging is used. In emission imaging approaches, the sample on the substrate is exposed to light of a specific narrow band (first wavelength band) of light and the light that is re-emitted from the sample at a slightly different wavelength (second wavelength band) is measured. This absorption and re-emission is due to the presence of a fluorophore that is sensitive to the excitation used and can be either a natural property of the sample or an agent the sample has been exposed to in preparation for the imaging. As an example, in an immunofluorescence experiment, an antibody that binds to a certain protein or class of proteins, and that is labeled with a certain fluorophore, is added to the sample. The locations on the sample that include the protein or class of proteins will then emit the second wavelength band. In some implementations, multiple antibodies with multiple fluorophores can be used to label multiple proteins in the sample. Each such fluorophore undergoes excitation with a different wavelength of light and further emits a different unique wavelength of light. In order to spatially resolve each of the different emitted wavelengths of light, the sample is subjected to the different wavelengths of light that will excite the multiple fluorophores on a serial basis and images for each of these light exposures is saved as an image thus generating a plurality of images. For instance, the image is subjected to a first wavelength that excites a first fluorophore to emit at a second wavelength and a first image of the sample is taken while the sample is being exposed to the first wavelength. The exposure of the sample to the first wavelength is discontinued and the sample is exposed to a third wavelength (different from the first wavelength) that excites a second fluorophore at a fourth wavelength (different from the second wavelength) and a second image of the sample is taken while the sample is being exposed to the third wavelength. Such a process is repeated for each different fluorophore in the multiple fluorophores (e.g., two or more fluorophores, three or more fluorophores, four or more fluorophores, five or more fluorophores). In this way, a series of images of the tissue, each depicting the spatial arrangement of some different parameter such as a particular protein or protein class, is obtained. In some embodiments, more than one fluorophore is imaged at the same time. In such an approach a combination of excitation wavelengths are used, each for one of the more than one fluorophores, and a single image is collected.

In some embodiments, each of the images collected through emission imaging is a grayscale image. To differentiate such grayscaled images, in some embodiments each of the images are assigned a color (shades of red, shades of blue, etc.). In some implementations, each image is then combined into one composite color image for viewing. This allows for the spatial analysis of analytes (e.g., spatial proteomics, spatial transcriptomics, etc.) in the sample. In some embodiments, spatial analysis of one type of analyte is performed independently of any other analysis. In some embodiments, spatial analysis is performed together for a plurality of types of analytes.

Nucleic Acid and Nucleotide

As used herein, the terms "nucleic acid" and "nucleotide" are intended to be consistent with their use in the art and to include naturally-occurring species or functional analogs thereof. Particularly useful functional analogs of nucleic acids are capable of hybridizing to a nucleic acid in a sequence-specific fashion (e.g., capable of hybridizing to two nucleic acids such that ligation can occur between the two hybridized nucleic acids) or are capable of being used as a template for replication of a particular nucleotide sequence. Naturally-occurring nucleic acids generally have a backbone containing phosphodiester bonds. An analog structure can have an alternate backbone linkage including any of a variety of those known in the art. Naturally-occurring nucleic acids generally have a deoxyribose sugar (e.g., found in deoxyribonucleic acid (DNA)) or a ribose sugar (e.g., found in ribonucleic acid (RNA)).

A nucleic acid can contain nucleotides having any of a variety of analogs of these sugar moieties that are known in the art. A nucleic acid can include native or non-native nucleotides. In this regard, a native deoxyribonucleic acid can have one or more bases selected from the group consisting of adenine (A), thymine (T), cytosine (C), or guanine (G), and a ribonucleic acid can have one or more bases selected from the group consisting of uracil (U), adenine (A), cytosine (C), or guanine (G). Useful non-native bases that can be included in a nucleic acid or nucleotide are known in the art.

Region of Interest

As used herein, the term "region of interest" generally refers to a region or area within a biological sample that is selected for specific analysis (e.g., a region in a biological sample that has morphological features of interest). A biological sample can have regions that show morphological feature(s) that may indicate the presence of disease or the development of a disease phenotype. For example, morphological features at a specific site within a tumor biopsy sample can indicate the aggressiveness, therapeutic resistance, metastatic potential, migration, stage, diagnosis, and/or prognosis of cancer in a subject. A change in the morphological features at a specific site within a tumor biopsy sample often correlate with a change in the level or expression of an analyte in a cell within the specific site, which can, in turn, be used to provide information regarding the aggressiveness, therapeutic resistance, metastatic potential, migration, stage, diagnosis, and/or prognosis of cancer in a subject. A region of interest in a biological sample can be used to analyze a specific area of interest within a biological sample, and thereby, focus experimentation and data gathering to a specific region of a biological sample (rather than an entire biological sample). This results in increased time efficiency of the analysis of a biological sample.

A region of interest can be identified in a biological sample using a variety of different techniques, e.g., expansion microscopy, bright field microscopy, dark field microscopy, phase contrast microscopy, electron microscopy, fluorescence microscopy, reflection microscopy, interference microscopy, and confocal microscopy, and combinations thereof. For example, the staining and imaging of a biological sample can be performed to identify a region of interest. In some examples, the region of interest can correspond to a specific structure of cytoarchitecture. In some embodiments, a biological sample can be stained prior to visualization to provide contrast between the different regions of the biological sample. The type of stain can be chosen depending on the type of biological sample and the region of the cells to be stained. In some embodiments, more than one stain can be used to visualize different aspects of the biological sample, e.g., different regions of the sample, specific cell structures (e.g., organelles), or different cell types. In other embodiments, the biological sample can be visualized or imaged without staining the biological sample.

In some examples, a region of interest can be removed from a biological sample and then the region of interest can be contacted to the substrate and/or array (e.g., as described herein). A region of interest can be removed from a biological sample using microsurgery, laser capture microdissection, chunking, a microtome, dicing, trypsinization, labelling, and/or fluorescence-assisted cell sorting.

Subject

As used herein, the term "subject" refers to an animal, such as a mammal (e.g., human or a non-human simian), avian (e.g., bird), or other organism, such as a plant. Examples of subjects include, but are not limited to, a mammal such as a rodent, mouse, rat, rabbit, guinea pig, ungulate, horse, sheep, pig, goat, cow, cat, dog, primate (e.g., human or non-human primate); a plant such as *Arabidopsis thaliana*, corn, sorghum, oat, wheat, rice, canola, or soybean; an algae such as *Chlamydomonas reinhardtii*; a nematode such as *Caenorhabditis elegans*; an insect such as *Drosophila melanogaster*, mosquito, fruit fly, honey bee or spider; a fish such as zebrafish; a reptile; an amphibian such as a frog or *Xenopus laevis*; a Dictyostelium discoideum; a fungi such as *Pneumocystis carinii, Takifugu rubripes*, yeast, *Saccharamoyces cerevisiae* or *Schizosaccharomyces pombe*; or a *Plasmodium falciparum.*

Substrates

As used herein, a "substrate" refers to a support that is insoluble in aqueous liquid and that allows for positioning of biological samples, analytes, capture spots, and/or capture probes on the substrate. For instance, a substrate can be any surface onto which a sample and/or capture probes can be affixed (e.g., a chip, solid array, a bead, a slide, a coverslip, etc.). For the spatial analytical methods described in this section, a substrate is used to provide support to a biological sample, particularly, for example, a thin tissue section. In addition, in some embodiments, a substrate (e.g., the same substrate or a different substrate) functions as a support for direct or indirect attachment of capture probes to capture spots of the array.

A wide variety of different substrates can be used for the foregoing purposes. In general, a substrate can be any suitable support material. Exemplary substrates include, but are not limited to, glass, modified and/or functionalized glass, hydrogels, films, membranes, plastics (including e.g., acrylics, polystyrene, copolymers of styrene and other materials, polypropylene, polyethylene, polybutylene, polyurethanes, Teflon™, cyclic olefins, polyimides, etc.), nylon, ceramics, resins, Zeonor, silica or silica-based materials including silicon and modified silicon, carbon, metals, inorganic glasses, optical fiber bundles, and polymers, such as polystyrene, cyclic olefin copolymers (COCs), cyclic olefin polymers (COPs), polypropylene, polyethylene and polycarbonate.

The substrate can also correspond to a flow cell. Flow cells can be formed of any of the foregoing materials, and can include channels that permit reagents, solvents, capture spots, and molecules to pass through the flow cell.

The substrate can generally have any suitable form or format. For example, the substrate can be flat, curved, e.g., convexly or concavely curved towards the area where the interaction between a biological sample, e.g., tissue sample, and the substrate takes place. In some embodiments, the substrate is a flat, e.g., planar, chip or slide. The substrate can contain one or more patterned surfaces within the substrate (e.g., channels, wells, projections, ridges, divots, etc.). A substrate can be of any desired shape. For example, a substrate can be typically a thin, flat shape (e.g., a square or a rectangle). In some embodiments, a substrate structure has rounded corners (e.g., for increased safety or robustness). In some embodiments, a substrate structure has one or more cut-off corners (e.g., for use with a slide clamp or cross-table). In some embodiments, where a substrate structure is flat, the substrate structure can be any appropriate type of support having a flat surface (e.g., a chip or a slide such as a microscope slide).

Figure 15:
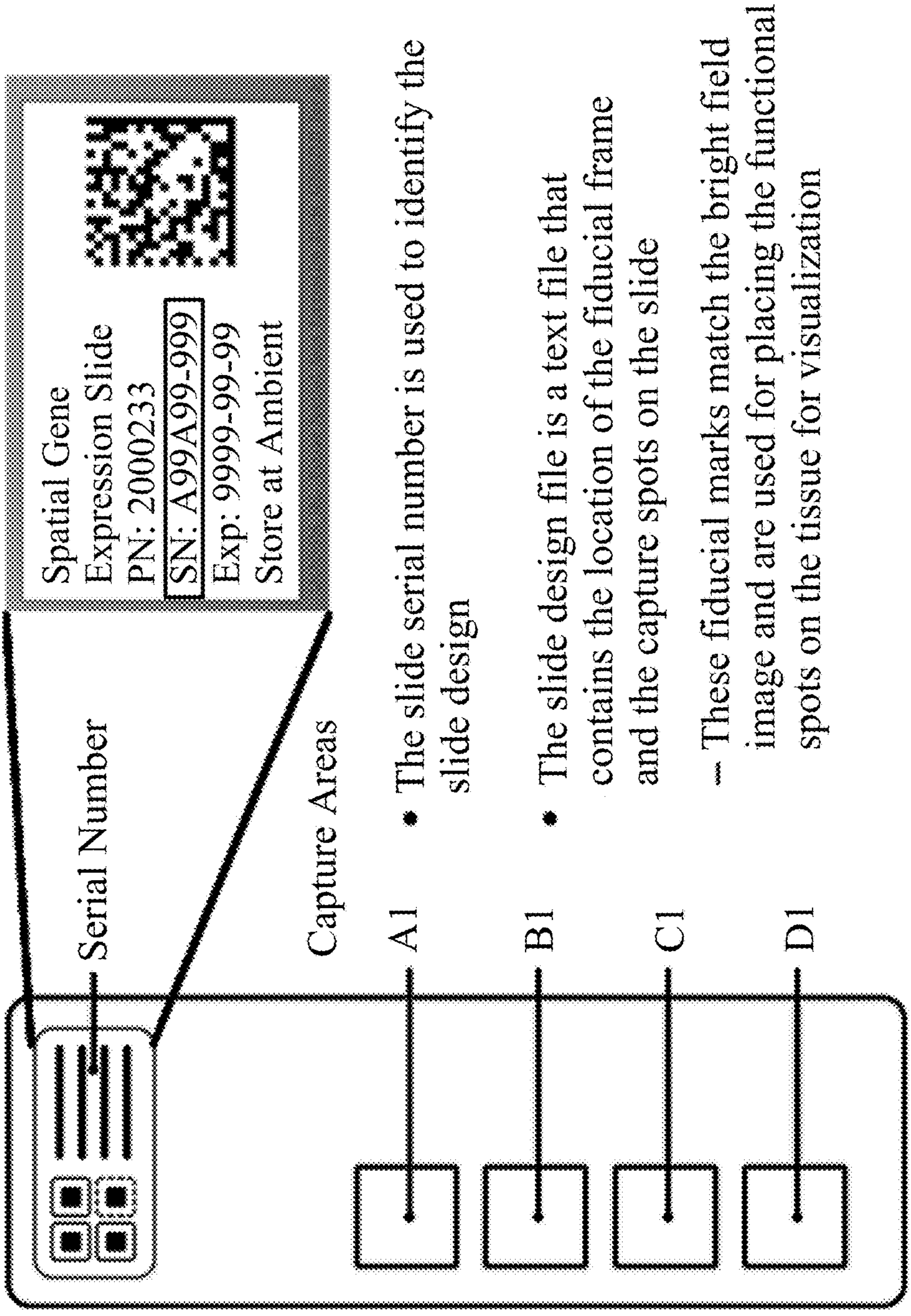
FIG. 15 illustrates a substrate that has a number of capture areas and a substrate identifier, in accordance with an embodiment of the present disclosure.

In some embodiments, a substrate includes one or more markings on a surface of the substrate, e.g., to provide guidance for correlating spatial information with the characterization of the analyte of interest. For example, a substrate can be marked with a grid of lines (e.g., to allow the size of objects seen under magnification to be easily estimated and/or to provide reference areas for counting objects). In some embodiments, fiducials (e.g., fiducial markers, fiducial spots, or fiducial patterns) can be included on the substrate. Fiducials can be made using techniques including, but not limited to, printing, sand-blasting, and depositing on the surface. In some embodiments, the substrate (e.g., or a bead or a capture spot on an array) includes a plurality of oligonucleotide molecules (e.g., capture probes). In some embodiments, the substrate includes tens to hundreds of thousands or millions of individual oligonucleotide molecules (e.g., at least about 10,000, 50,000, 100,000, 500,000, 1,000,000, 10,000,000, 100,000,000, 1,000,000,000 or 10,000,000,000 oligonucleotide molecules). In some embodiments, as illustrated in FIG. 15, a substrate can include a substrate identifier, such as a serial number.

Further examples of substrates, including for example fiducial markers on such substrates, are disclosed in PCT publication 202020176788A1, entitled "Profiling of biological analytes with spatially barcoded oligonucleotide arrays"; U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

Spatial Analyte Data. As used herein, "spatial analyte data" refers to any data measured, either directly, from the capture of analytes on capture probes, or indirectly, through intermediate agents disclosed herein that bind to analytes in a sample, e.g., connected probes disclosed herein, analyte capture agents or portions thereof (such as, e.g., analyte binding moieties and their associated analyte binding moiety barcodes). Spatial analyte data thus may, in some aspects, include two different labels from two different classes of barcodes. One class of barcode identifies the analyte, while the other class of barcodes identifies the specific capture probe in which an analyte was detected.

(B) Methods for Spatial Analysis of Analytes

Array-based spatial analysis methods involve the transfer of one or more analytes from a biological sample to an array of capture spots on a substrate, each of which is associated with a unique spatial location on the array. Subsequent analysis of the transferred analytes includes determining the identity of the analytes and the spatial location of each analyte within the sample. The spatial location of each analyte within the sample is determined based on the capture spot to which each analyte is bound in the array, and the capture spot's relative spatial location within the array.

There are at least two general methods to associate a spatial barcode with one or more neighboring cells, such that the spatial barcode identifies the one or more cells, and/or contents of the one or more cells, as associated with a particular spatial location. One general method is to promote analytes out of a cell and towards the spatially-barcoded array. FIG. 1 depicts an exemplary embodiment of this general method. In FIG. 1, the spatially-barcoded array populated with capture probes (as described further herein) is contacted with a sample 101, and the sample is permeabilized 102, allowing the target analyte to migrate away from the sample and toward the array 102. The target analyte interacts with a capture probe on the spatially-barcoded array. Once the target analyte hybridizes/is bound to the capture probe, the sample is optionally removed from the array and the capture probes are analyzed in order to obtain spatially-resolved analyte information 103.

Figure 2:
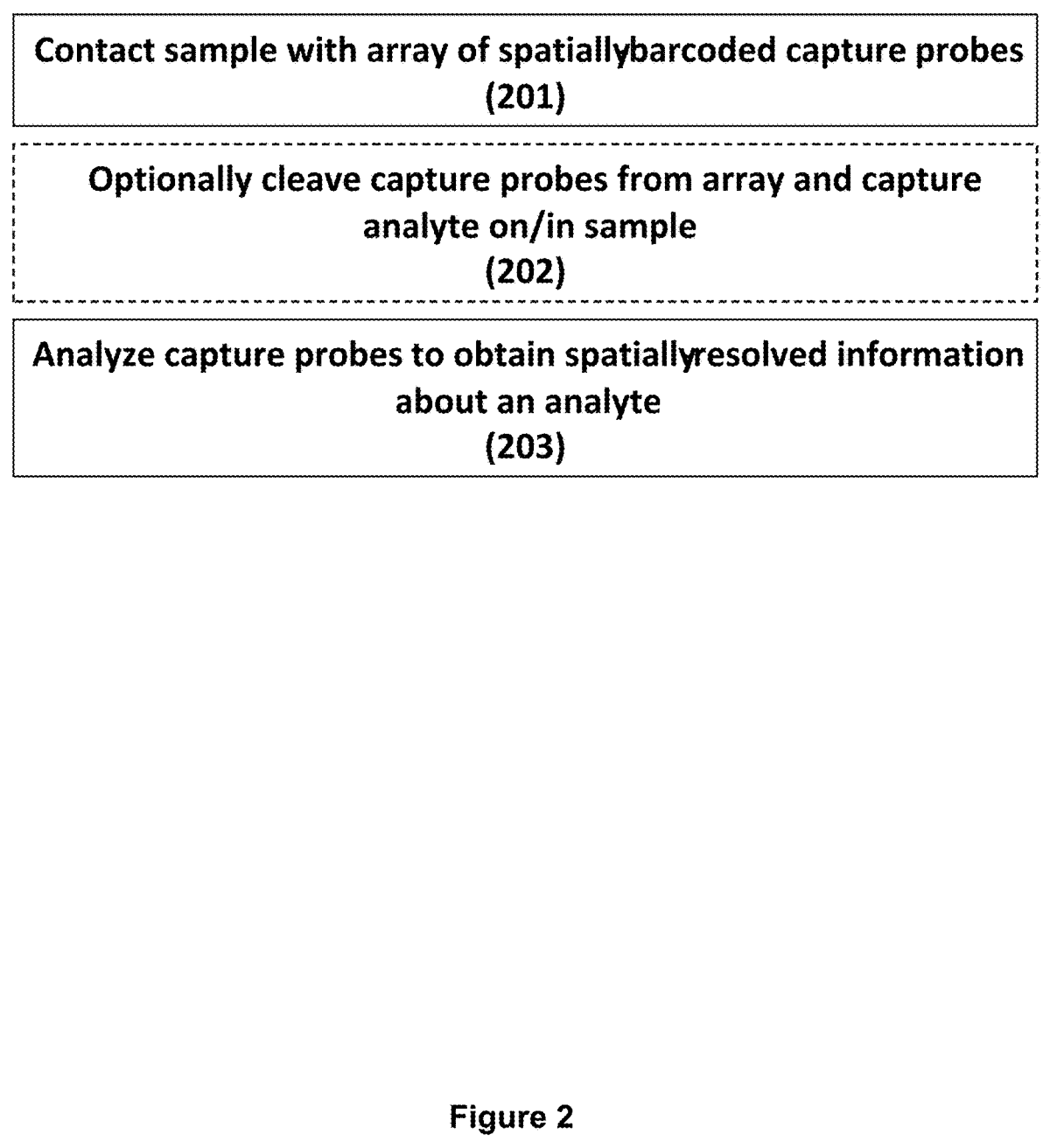

Another general method is to cleave the spatially-barcoded capture probes from an array and promote the spatially-barcoded capture probes towards and/or into or onto the sample. FIG. 2 depicts an exemplary embodiment of this general method, the spatially-barcoded array populated with capture probes (as described further herein) can be contacted with a sample 201. The spatially-barcoded capture probes are cleaved and then interact with cells within the provided sample 202. The interaction can be a covalent or non-covalent cell-surface interaction. The interaction can be an intracellular interaction facilitated by a delivery system or a cell penetration peptide. Once the spatially-barcoded capture probe is associated with a particular cell, the sample can be optionally removed for analysis. The sample can be optionally dissociated before analysis. Once the tagged cell is associated with the spatially-barcoded capture probe, the capture probes can be analyzed to obtain spatially-resolved information about the tagged cell 203.

Figure 3B:
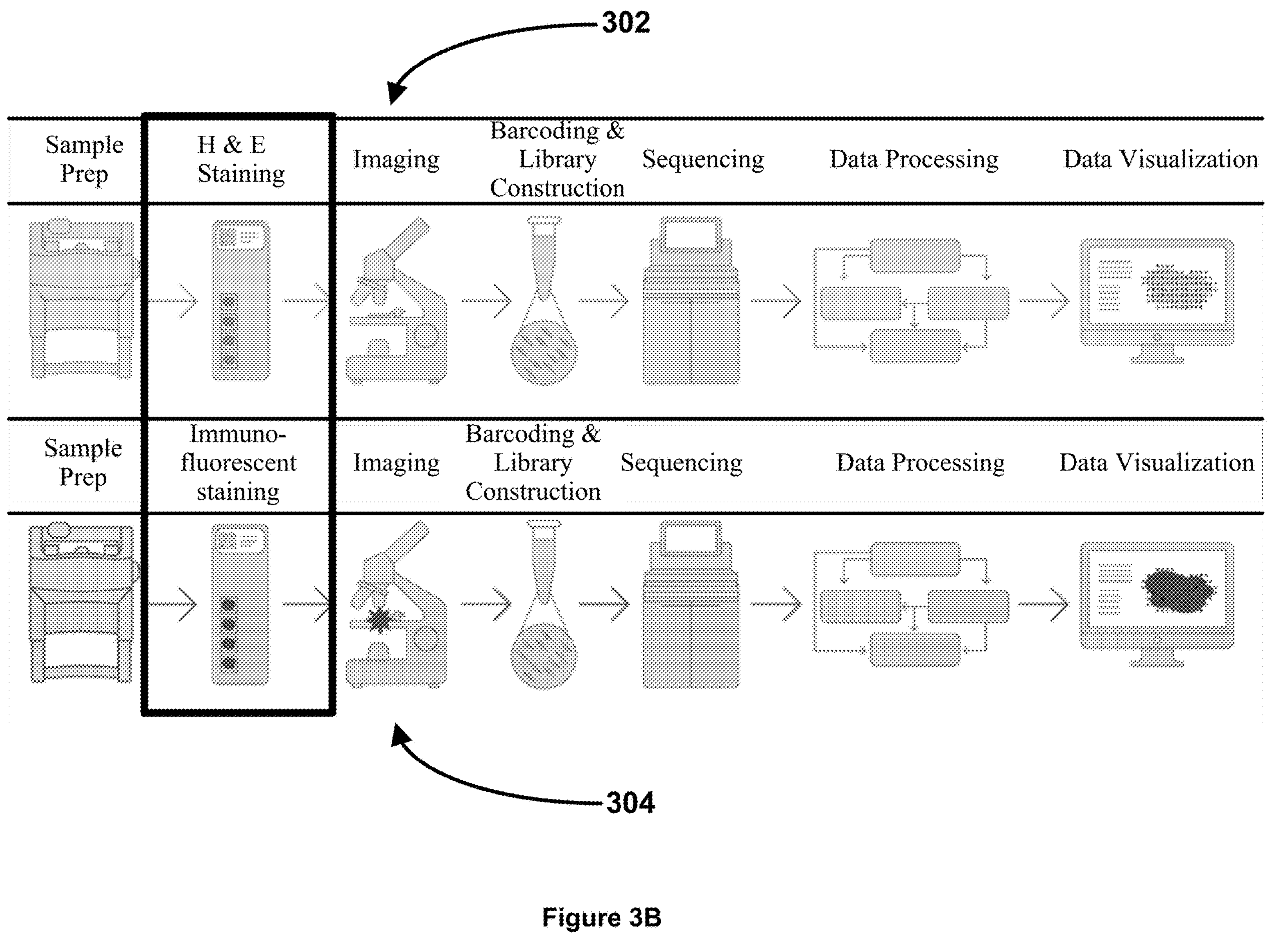

FIGS. 3A and 3B show exemplary workflows that include preparing a sample on a spatially-barcoded array 301. Sample preparation may include placing the sample on a substrate (e.g., chip, slide, etc.), fixing the sample, and/or staining the sample for imaging. The sample (stained or not stained) is then imaged on the array 302 using bright-field (to image the sample, e.g., using a hematoxylin and eosin stain) or fluorescence (to image capture spots) as illustrated in the upper panel 302 of FIG. 3B) and/or emission imaging modalities (as illustrated in the lower panel 304 of FIG. 3B).

In some embodiments where the sample is analyzed with transcriptomics, along with the bright-field and/or emission imaging (e.g., fluorescence imaging), target analytes are released from the sample and capture probes forming a spatially-barcoded array hybridize or bind the released target analytes 303. The sample can be optionally removed from the array 304 and the capture probes can be optionally cleaved from the array 305. The sample and array are then optionally imaged a second time in both modalities 305B while the analytes are reverse transcribed into cDNA, and an amplicon library is prepared 306 and sequenced 307. The images are then spatially-overlaid in order to correlate spatially-identified sample information 308. When the sample and array are not imaged a second time, 305B, a spot coordinate file is supplied instead. The spot coordinate file replaces the second imaging step 305B. Further, amplicon library preparation 306 can be performed with a unique PCR adapter and sequenced 307.

FIG. 4 shows another exemplary workflow that utilizes a spatially-barcoded array on a substrate (e.g., chip), where spatially-barcoded capture probes are clustered at areas called capture spots. The spatially-labelled capture probes can include a cleavage domain, one or more functional sequences, a spatial barcode, a unique molecular identifier, and a capture domain. The spatially-labelled capture probes can also include a 5' end modification for reversible attachment to the substrate. The spatially-barcoded array is contacted with a sample 401, and the sample is permeabilized through application of permeabilization reagents 402. Permeabilization reagents may be administered by placing the array/sample assembly within a bulk solution. Alternatively, permeabilization reagents may be administered to the sample via a diffusion-resistant medium and/or a physical barrier such as a lid, where the sample is sandwiched between the diffusion-resistant medium and/or barrier and the array-containing substrate. The analytes are migrated toward the spatially-barcoded capture array using any number of techniques disclosed herein. For example, analyte migration can occur using a diffusion-resistant medium lid and passive migration. As another example, analyte migration can be active migration, using an electrophoretic transfer system, for example. Once the analytes are in close proximity to the spatially-barcoded capture probes, the capture probes can hybridize or otherwise bind a target analyte 403. The sample can be optionally removed from the array 404.

The capture probes can be optionally cleaved from the array 405, and the captured analytes can be spatially-barcoded by performing a reverse transcriptase first strand cDNA reaction. A first strand cDNA reaction can be optionally performed using template switching oligonucleotides. For example, a template switching oligonucleotide can hybridize to a poly(C) tail added to a 3' end of the cDNA by a reverse transcriptase enzyme. Template switching is illustrated in FIG. 37 and described, for example, in U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety. The original mRNA template and template switching oligonucleotide can then be denatured from the cDNA and the spatially-barcoded capture probe can then hybridize with the cDNA and a complement of the cDNA can be generated. The first strand cDNA can then be purified and collected for downstream amplification steps. The first strand cDNA can be optionally amplified using PCR 406, where the forward and reverse primers flank the spatial barcode and target analyte regions of interest, generating a library associated with a particular spatial barcode 407. In some embodiments, the library preparation can be quantified and/or subjected to quality control to verify the success of the library preparation steps 408. In some embodiments, the cDNA comprises a sequencing by synthesis (SBS) primer sequence. The library amplicons are sequenced and analyzed to decode spatial information 407, with an additional library quality control (QC) step 408.

FIG. 5 depicts an exemplary workflow where the sample is removed from the spatially-barcoded array and the spatially-barcoded capture probes are removed from the array for barcoded analyte amplification and library preparation. Another embodiment includes performing first strand synthesis using template switching oligonucleotides on the spatially-barcoded array without cleaving the capture probes. In this embodiment, sample preparation 501 and permeabilization 502 are performed as described elsewhere herein. Once the capture probes capture the target analyte(s), first strand cDNA created by template switching and reverse transcriptase 503 is then denatured and the second strand is then extended 504. The second strand cDNA is then denatured from the first strand cDNA, neutralized, and transferred to a tube 505. cDNA quantification and amplification can be performed using standard techniques discussed herein. The cDNA can then be subjected to library preparation 506 and indexing 507, including fragmentation, end-repair, and a-tailing, and indexing PCR steps. The library can also be optionally tested for quality control (QC) 508.

Further details and non-limiting embodiments relating to methods for spatial analysis of analytes in biological samples, including removal of sample from the array, release and amplification of analytes, analysis of captured analytes (e.g., by sequencing and/or multiplexing), and spatial resolution of analyte information (e.g., using lookup tables) are described in U.S. patent application Ser. No. 16/992,569 entitled "Systems and Methods for Using the Spatial Distribution of Haplotypes to Determine a Biological Condition," filed Aug. 13, 2019; U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

II. Exemplary System Embodiments

Now that a general summary of the methods and terminology has been presented, detailed descriptions of various implementations of the present disclosure will now be described in conjunction with the figures.

Figure 11A:
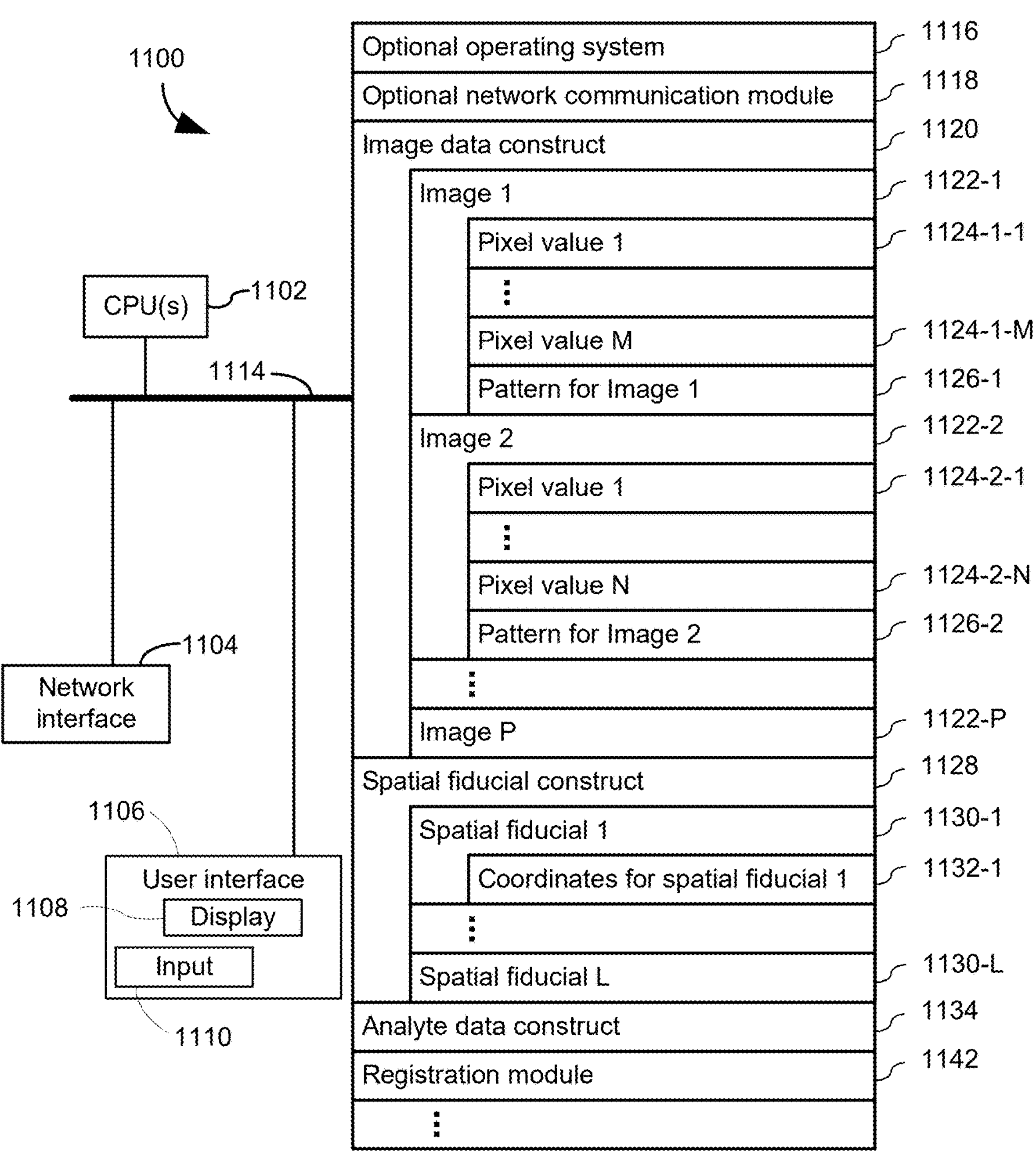
FIGS. 11A and 11B collectively illustrate an example block diagram illustrating a computing device in accordance with some embodiments of the present disclosure.
Figure 11B:
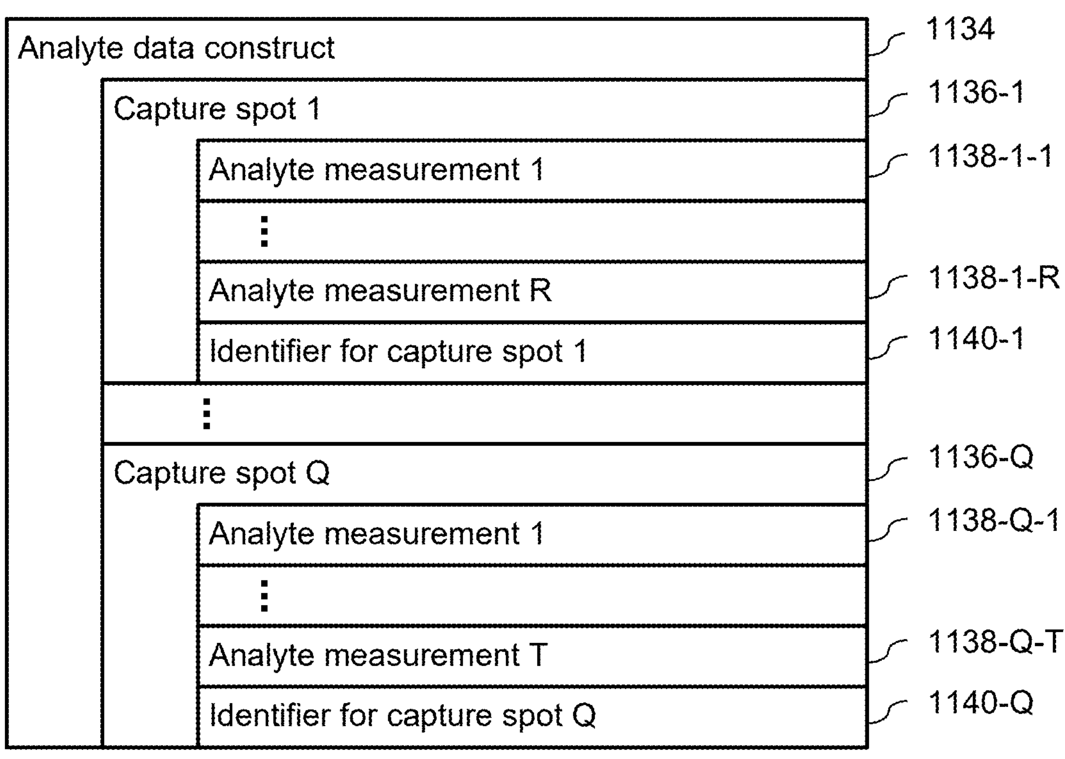

FIGS. 11A and 11B collectively illustrate a block diagram illustrating an exemplary, non-limiting system for overlaying image data for a biological sample onto spatial analyte data in accordance with some implementations. The system 1100 in some implementations includes one or more processing units CPU(s) 1102 (also referred to as processors), one or more network interfaces 1104, a user interface 1106, a memory 1112, and one or more communication buses 1114 for interconnecting these components. The communication buses 1114 optionally include circuitry (sometimes called a chipset) that interconnects and controls communications between system components. The memory 1112 typically includes high-speed random access memory, such as DRAM, SRAM, DDR RAM, ROM, EEPROM, flash memory, CD-ROM, digital versatile disks (DVD) or other optical storage, magnetic cassettes, magnetic tape, magnetic disk storage or other magnetic storage devices, other random access solid state memory devices, or any other medium which can be used to store desired information; and optionally includes non-volatile memory, such as one or more magnetic disk storage devices, optical disk storage devices, flash memory devices, or other non-volatile solid state storage devices. The memory 1112 optionally includes one or more storage devices remotely located from the CPU(s) 1102. The memory 1112, or alternatively the non-volatile memory device(s) within the memory 1112, comprises a non-transitory computer readable storage medium. It will be appreciated that this memory 1112 can be distributed across one or more computers. In some implementations, the memory 1112 or alternatively the non-transitory computer readable storage medium stores the following programs, modules and data structures, or a subset thereof:

- an optional operating system 1116, which includes procedures for handling various basic system services and for performing hardware dependent tasks;
- an optional network communication module (or instructions) 1118 for connecting the device 1100 with other devices, or a communication network;
- an image data construct 1120 comprising one or more images 1122 (e.g., 1122-1, 1122-2, . . . 1122-P) of a biological sample, including at least a first image 1122-1 of the biological sample on a first substrate and a second image 1122-2 of the biological sample on the first substrate overlayed on a second substrate, each respective image comprising a plurality of pixel values 1124 (e.g., 1124-1-1, 1124-1-M, 1124-2-1, 1124-2-N) and a corresponding pattern 1126 (e.g., 1126-1, 1126-2) representative of the respective image;
- a spatial fiducial construct 1128 comprising a plurality of spatial fiducials 1130 (e.g., 1130-1, . . . 1130-L) and, for each respective spatial fiducial in the plurality of spatial fiducials, corresponding coordinates 1132 (e.g., 1132-1) for the respective spatial fiducial in at least the second image 1122-2 of the biological sample;
- an analyte data construct 1134 for a set of capture spots 1136 (e.g., 1136-1, . . . 1136-Q) comprising, for each respective capture spot, a plurality of analyte measurements 1138 (e.g., 1138-1-1, 1138-1-R, 1138-Q-1, 1138-Q-T) and a respective identifier 1140 (e.g., 1140-1, 1140-Q) for the respective capture spot (e.g., spatial barcodes, unique molecular identifiers, and/or coordinates for the capture spot in at least the second image 1122-2 of the biological sample); and
- a registration module 1142 for determining a registration for the first image and the second image, using the first pattern of the biological sample in the first image 1126-1 and the second pattern of the biological sample in the second image 1126-2.

In some implementations, the user interface 1106 includes an input device (e.g., a keyboard, a mouse, a touchpad, a track pad, and/or a touch screen) 1110 for a user to interact with the system 1100 and a display 1108.

In some implementations, one or more of the above identified elements are stored in one or more of the previously mentioned memory devices and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 1112 optionally stores a subset of the modules and data structures identified above. Furthermore, in some embodiments, the memory stores additional modules and data structures not described above. In some embodiments, one or more of the above identified elements is stored in a computer system, other than that of system 1100, that is addressable by system 1100 so that system 1100 may retrieve all or a portion of such data when needed.

Although FIG. 11 shows an exemplary system 1100, the figure is intended more as functional description of the various features that may be present in computer systems than as a structural schematic of the implementations described herein. In practice, and as recognized by those of ordinary skill in the art, items shown separately could be combined and some items could be separated.

While a system in accordance with the present disclosure has been disclosed with reference to FIG. 11, methods in accordance with the present disclosure are now detailed with reference to FIGS. 10A, 10B, 10C, 10D, 10E, 10F, and 10G.

III. Specific Embodiments

This disclosure also provides methods and systems for overlaying image data for a biological sample onto spatial analyte data. Provided below are detailed descriptions and explanations of various embodiments of the present disclosure. These embodiments are non-limiting and do not preclude any alternatives, variations, changes, and substitutions that can occur to those skilled in the art from the scope of this disclosure.

One aspect of the present disclosure provides a method for overlaying image data for a biological sample onto spatial analyte data for a plurality of analytes of the biological sample. The method comprises, at a computer system comprising one or more processing cores and a memory, obtaining a first image of the biological sample on a first substrate. The method further comprises receiving a second image of the biological sample on the first substrate overlayed on a second substrate (e.g., a sandwich), where the second substrate comprises one or more spatial fiducials and a set of capture spots. A registration for the first image and the second image is determined, where the registration registers the first image and the second image to each other, using a first pattern of the biological sample in the first image and a second pattern of the biological sample in the second image. The registration is used to overlay the first image onto a spatial dataset comprising spatial analyte data for the set of capture spots from the biological sample, where a frame of reference of the spatial dataset is known with respect to the second image, based on the one or more spatial fiducials of the second image. Thus, image data for the biological sample is overlayed onto spatial analyte data for the plurality of analytes of the biological sample.

Figure 17:
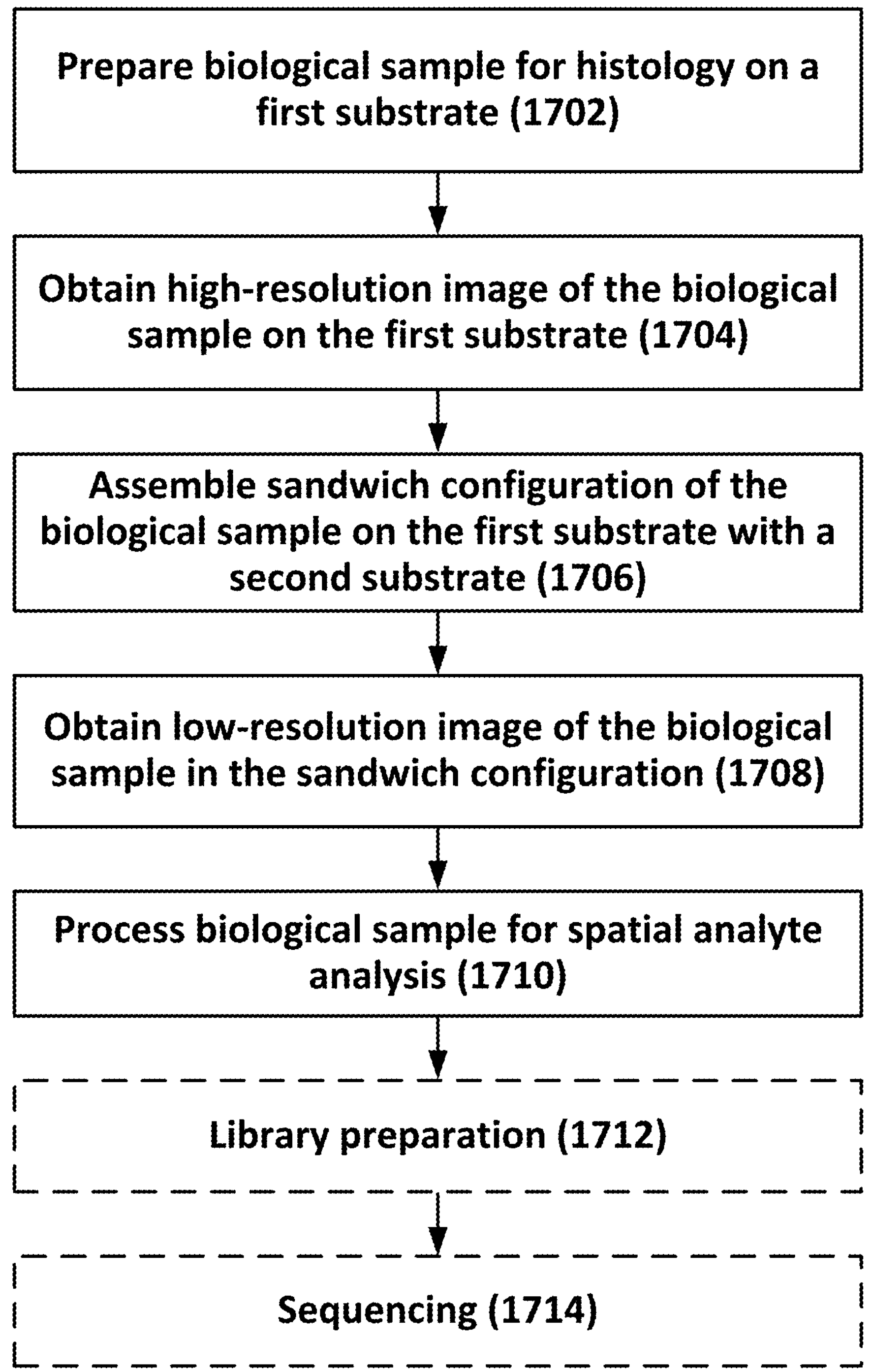
FIG. 17 illustrates an example workflow for obtaining image data and spatial analyte data for a plurality of analytes of a biological sample, in which optional steps are illustrated by dashed line boxes in accordance with an embodiment of the present disclosure.
Figure 18:
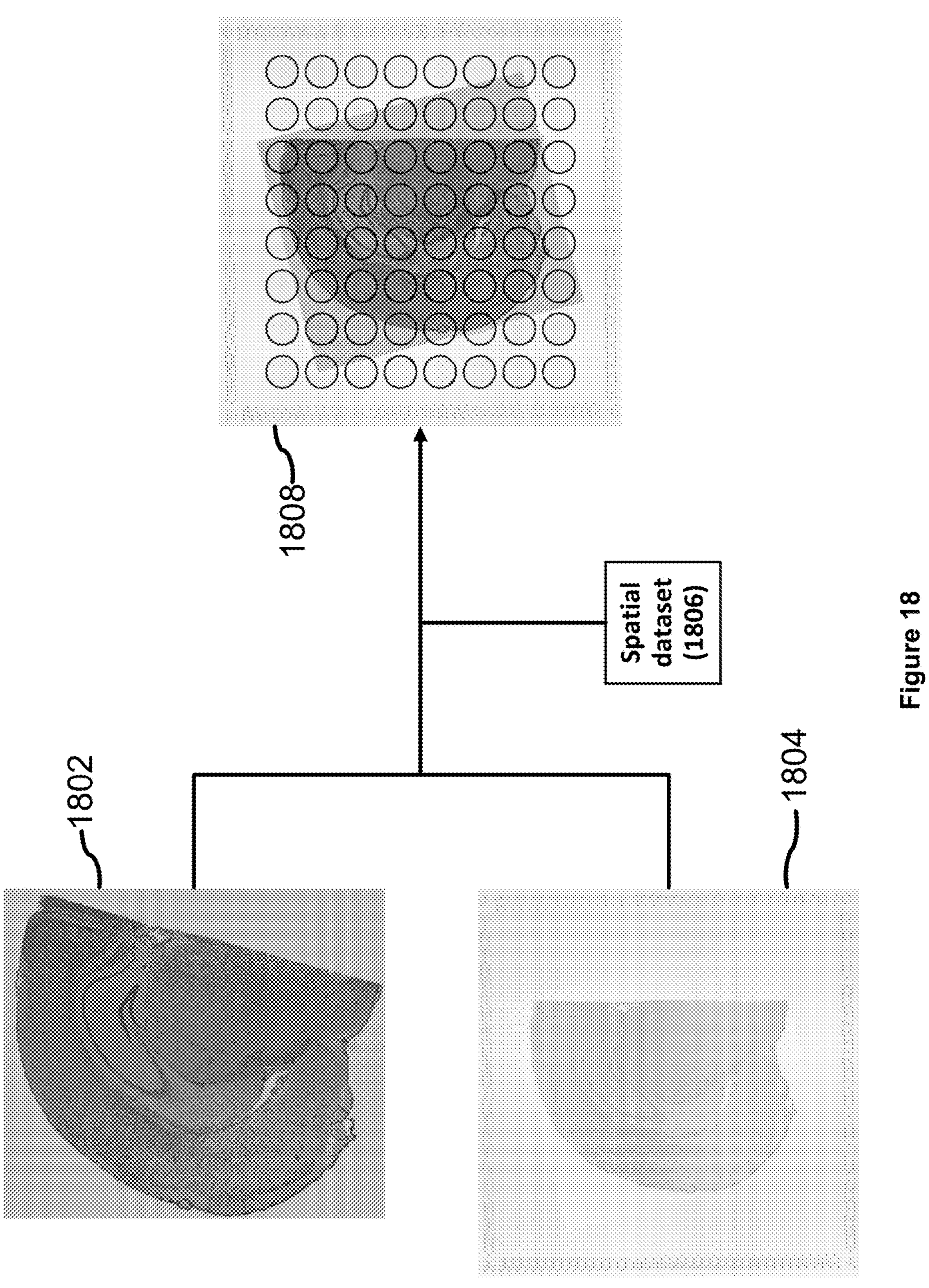
FIG. 18 illustrates overlaying image data for a biological sample onto spatial analyte data for a plurality of analytes of the biological sample, in accordance with some embodiments of the present disclosure.

An overview of an example workflow for a method of obtaining and overlaying image data for a biological sample onto spatial analyte data for a plurality of analytes of the biological sample is illustrated in FIGS. 17 and 18, in accordance with some embodiments of the present disclosure. For instance, at step 1702, the biological sample is prepared on a first substrate. At step 1704, a first image 1802 (e.g., a high-resolution image) of the biological sample on the first substrate is obtained. In some embodiments the first image is acquired with correction for field of view flatness. At step 1706, the biological sample on the first substrate is overlayed on a second substrate by assembling a sandwich configuration, where the second substrate comprises one or more spatial fiducials and a set of capture spots. At step 1708, the workflow further includes obtaining a second image 1804 (e.g., a low-resolution image) of the biological sample in the sandwich configuration, where the second image includes the one or more spatial fiducials. At steps 1710, 1712, and 1714, the biological sample is processed for spatial analyte analysis, including, optionally, library preparation and sequencing, thus obtaining a spatial dataset 1806 comprising spatial analyte data for the set of capture spots from the biological sample. A registration for the first image 1802 and the second image 1804 is used to overlay the first image onto the spatial dataset 1806, thus obtaining an overlay 1808 of image data for the biological sample onto spatial analyte data for the plurality of analytes of the biological sample.

Details of a method 1000 for overlaying image data for a biological sample onto spatial analyte data for a plurality of analytes of the biological sample will now be provided with reference to FIGS. 10A, 10B, 10C, 10D, 10E, 10F, and 10G, in accordance with some embodiments of the present disclosure. In some embodiments, the method is performed at a computer system comprising one or more processing cores and a memory.

Biological Samples and Substrates.

Referring to Block 1002, the method includes obtaining a first image of the biological sample on a first substrate and receiving a second image of the biological sample on the first substrate overlayed on a second substrate, where the second substrate comprises one or more spatial fiducials and a set of capture spots (e.g., where the set of capture spots comprises at least 1000 capture spots), and where at least one of the first substrate and the second substrate is transparent.

In some embodiments, the biological sample is tissue. In some embodiments, the biological sample is a plurality of cells. In some embodiments, for instance, the biological sample is a plurality of spatially arrayed cells. Examples of suitable biological samples contemplated for use in the present disclosure are described in further detail herein (see, "Definitions: (A) General Definitions: Biological Samples," above).

Referring to Block 1004, in some embodiments, the biological sample is a tissue section (e.g., a sectioned tissue sample). In some embodiments, the biological sample is a sectioned tissue sample having a depth of 500 microns or less. In some embodiments, the biological sample is a sectioned tissue sample having a depth of 100 microns or less. In some embodiments, the sectioned tissue sample has a depth of 80 microns or less, 70 microns or less, 60 microns or less, 50 microns or less, 40 microns or less, 25 microns or less, 20 microns or less, 15 microns or less, 10 microns or less, 5 microns or less, 2 microns or less, or 1 micron or less. In some embodiments, the biological sample is a sectioned tissue sample having a depth of at least 0.1 microns, at least 1 micron, at least 5 microns, at least 10 microns, at least 15 microns, at least 20 microns, at least 30 microns, at least 50 microns, or at least 80 microns. In some embodiments, the sectioned tissue sample has a depth of between 10 microns and 20 microns, between 1 and 10 microns, between 0.1 and 5 microns, between 20 and 100 microns, between 1 and 50 microns, or between 0.5 and 10 microns. In some embodiments, the sectioned tissue sample falls within another range starting no lower than 0.1 microns and ending no higher than 500 microns. Further embodiments of tissue sections are provided herein (see, "Definitions: (A) General Definitions: Biological Samples," above).

In some embodiments, the biological sample comprises a plurality of analytes. In some embodiments, the plurality of analytes of the biological sample comprises five or more analytes, ten or more analytes, fifty or more analytes, one hundred or more analytes, five hundred or more analytes, 1000 or more analytes, 2000 or more analytes, or between 2000 and 100,000 analytes.

In some embodiments, the plurality of analytes comprises at least 5, at least 10, at least 20, at least 50, at least 100, at least 200, at least 300, at least 400, at least 500, at least 600, at least 700, at least 800, at least 900, at least 1000, at least 2000, at least 3000, at least 5000, at least 6000, at least 7000, at least 8000, at least 9000, at least 10,000, at least 20,000, at least 30,000, at least 40,000, at least 50,000, at least 100,000, at least 200,000, or at least 300,000 analytes. In some embodiments, the plurality of analytes comprises no more than 500,000, no more than 200,000, no more than 100,000, no more than 80,000, no more than 50,000, no more than 30,000, no more than 20,000, no more than 10,000, no more than 5000, no more than 3000, no more than 2000, no more than 1000, no more than 500, no more than 100, or no more than 50 analytes. In some embodiments, the plurality of analytes comprises between 5 and 2000, between 1000 and 100,000, between 2000 and 10,000, between 5000 and 50,000, between 50 and 5000, or between 100 and 10,000 analytes. In some embodiments, the plurality of analytes falls within another range starting no lower than 5 analytes and ending no higher than 500,000 analytes.

Referring to Block 1006, in some embodiments, the plurality of analytes comprises DNA, RNA, proteins, or a combination thereof. For instance, in some embodiments, each respective analyte in the plurality of analytes is the same type of analyte. In some embodiments, the plurality of analytes includes at least an analyte of a first type (e.g., RNA molecule) and an analyte of a second type (e.g., protein). In some embodiments, the plurality of analytes comprises a plurality of analyte types (e.g., RNA and protein, RNA and DNA, DNA and protein, or a combination of RNA, DNA, and protein). Examples of suitable analytes contemplated for use in the present disclosure are described in further detail herein (see, "Definitions: (A) General Definitions: Analytes," above).

Figure 7:
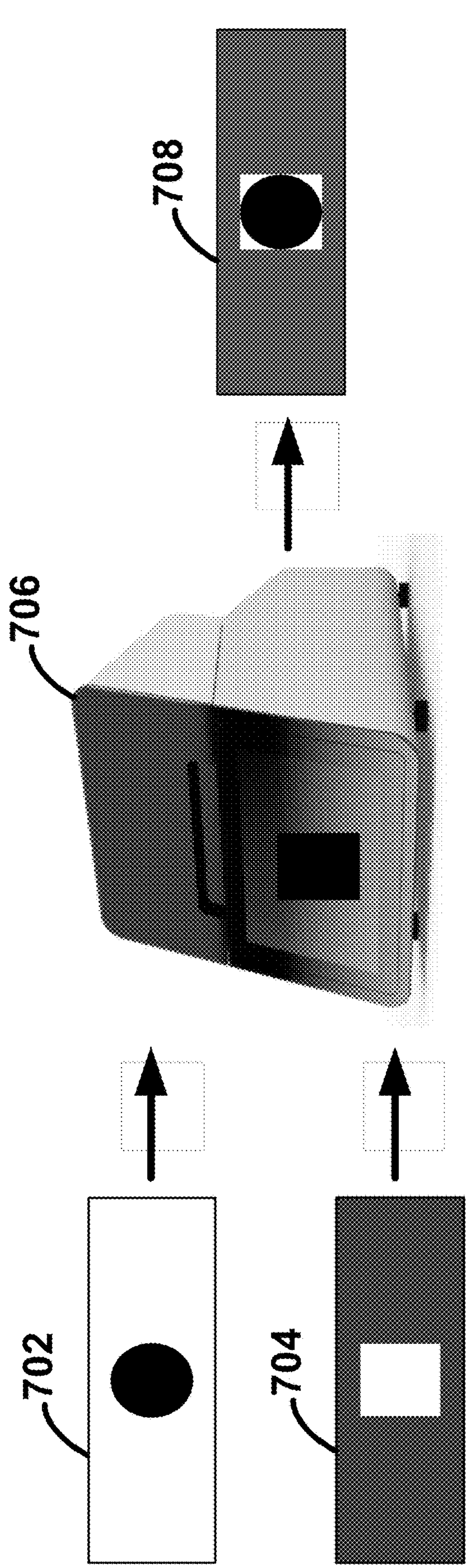
FIG. 7 illustrates example substrates and sample handling apparatus, in accordance with an embodiment of the present disclosure.
Figure 8:
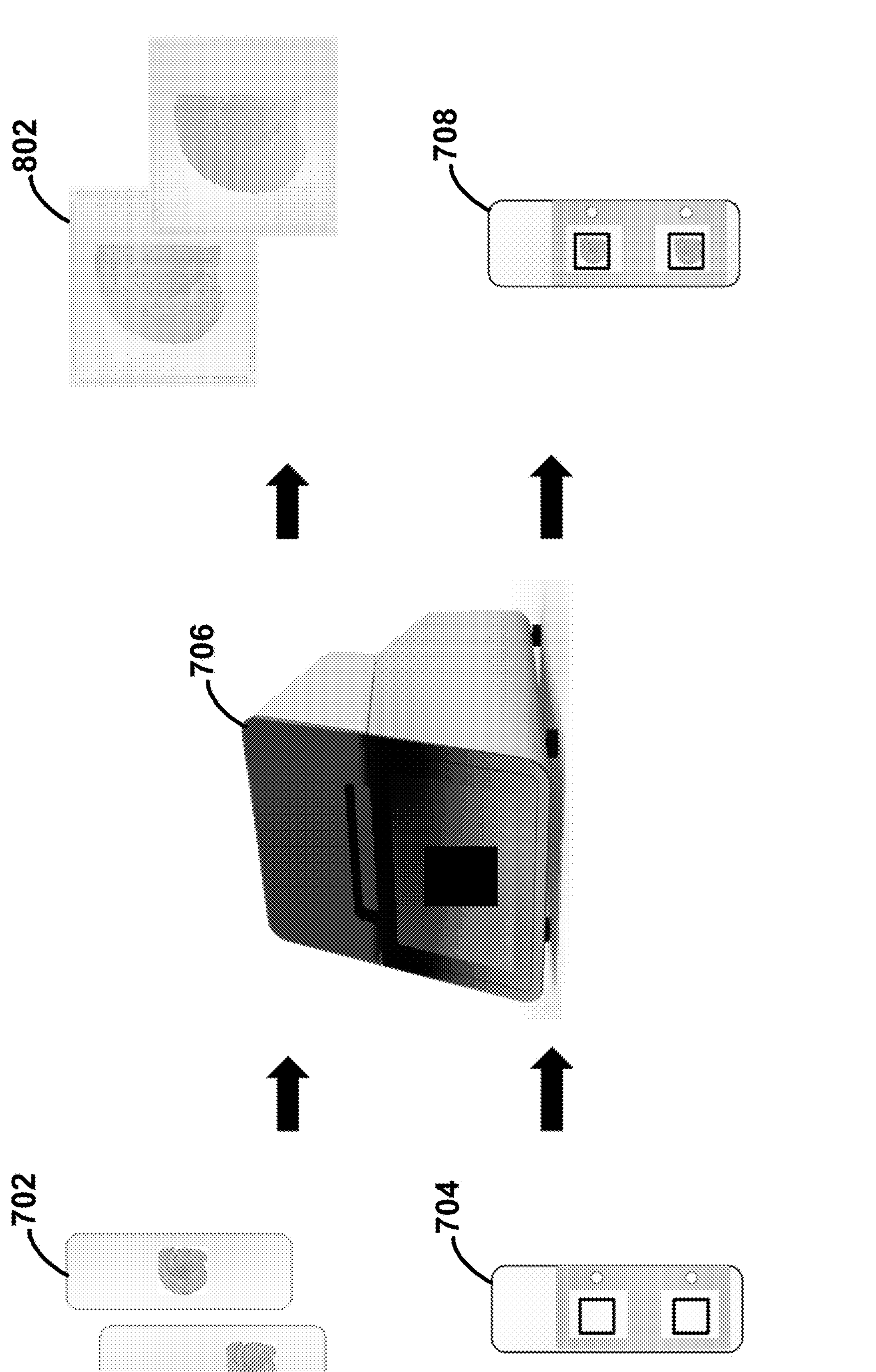
FIG. 8 illustrates obtaining an image of a biological sample on a first substrate overlayed on a second substrate using an example sample handling apparatus, in accordance with an embodiment of the present disclosure.

In some embodiments, the biological sample is attached (e.g., mounted) onto a substrate (e.g., the first substrate). For instance, as illustrated in FIGS. 7-8, in some embodiments, the biological sample is mounted onto a first substrate 702. In some embodiments, each respective tissue in a plurality of tissues from a biological sample and/or each respective biological sample in a plurality of biological samples is mounted onto a respective substrate 702, as illustrated in FIG. 8.

In some embodiments, a first substrate comprises a sample area into which the sample is to be placed. In some embodiments, the first substrate further includes a sample area indicator identifying the sample area. In some embodiments, the first substrate includes one or more spatial fiducials 1130. For instance, in some embodiments, spatial fiducials are used to aid alignment of a sample area on a first substrate 702 with an array area on a second substrate, such as second substrate 704 described in relation to FIGS. 7-8. In some such embodiments, the biological sample overlaps at least a portion of the one or more spatial fiducials on the first substrate.

In some embodiments, the first substrate does not include spatial fiducials.

In some embodiments, the biological sample on the first substrate is overlayed on a second substrate (e.g., in a sandwich configuration). In some embodiments, the second substrate includes any of the embodiments disclosed herein with respect to the first substrate. In some embodiments, the first substrate further includes any of the embodiments disclosed herein with respect to the second substrate.

For instance, in some embodiments, the second substrate comprises a sample area into which the sample is to be placed. In some embodiments, the second substrate further includes a sample area indicator identifying the sample area. In some embodiments, the second substrate includes one or more spatial fiducials 1130. For instance, in some embodiments, spatial fiducials are used to aid alignment of a sample area on a first substrate 702 with an array area on a second substrate, such as second substrate 704 described in relation to FIGS. 7-8. In some such embodiments, the biological sample overlaps at least a portion of the one or more spatial fiducials on the second substrate.

In some embodiments, at least one of the first substrate and the second substrate comprises one or more spatial fiducials. In some embodiments, at least one of the first substrate and the second substrate is transparent or partially transparent. In some such embodiments, a transparent or partially transparent substrate allows for an object (e.g., a biological sample and/or one or more spatial fiducials) positioned on a first side of the substrate to be visible from the second side of the substrate (e.g., through the substrate). In some such embodiments, a transparent or partially transparent substrate allows for an object (e.g., a biological sample and/or one or more spatial fiducials) positioned behind the respective substrate (e.g., in a sandwich configuration between two substrates) to be visible through the respective substrate.

Additional suitable embodiments for substrates (e.g., including a first substrate and/or a second substrate) that are contemplated for use in the present disclosure include any of the embodiments described herein, such as those disclosed above (see, "Definitions: (A) General Definitions: Substrates") and in PCT publication 202020176788A1, entitled "Profiling of biological analytes with spatially barcoded oligonucleotide arrays"; U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

In some embodiments, the one or more spatial fiducials comprises any suitable indicator that denotes a point of reference on a respective substrate. In some embodiments, the one or more spatial fiducials comprises one or more fiducial marks (e.g., spots). Examples of suitable spatial fiducials contemplated for use in the present disclosure are described in further detail herein (see, "Definitions: (A) General Definitions: Spatial fiducials," above).

In some embodiments, a respective substrate (e.g., the second substrate) comprises a set of capture spots. In some embodiments, the set of capture spots comprises at least 50, at least 100, at least 200, at least 300, at least 400, at least 500, at least 1000, at least 2000, at least 3000, at least 4000, at least 5000, at least 10,000, at least 15,000, at least 20,000, or at least 40,000 capture spots. In some embodiments, the set of capture spots comprises no more than 100,000, no more than 50,000, no more than 20,000, no more than 10,000, no more than 5000, no more than 1000, no more than 500, or no more than 100 capture spots. In some embodiments, the set of capture spots comprises from 100 to 500, between 500 and 1000, from 1000 to 5000, from 5000 to 10,000, from 10,000 to 15,000, or from 15,000 to 20,000 capture spots. In some embodiments, the set of capture spots falls within another range starting no lower than 50 capture spots and ending no higher than 100,000 capture spots.

In some embodiments, each respective capture spot in the set of capture spots includes a plurality of capture probes. In some embodiments, the plurality of capture probes includes 500 or more, 1000 or more, 2000 or more, 3000 or more, 5000 or more, 10,000 or more, 20,000 or more, 30,000 or more, 50,000 or more, 100,000 or more, 500,000 or more, $1\times10^6$ or more, $2\times10^6$ or more, or $5\times10^6$ or more capture probes. In some embodiments, the plurality of capture probes includes no more than $1\times10^7$, no more than $1\times10^6$, no more than 100,000, no more than 50,000, no more than 10,000, no more than 5000, no more than 2000, or no more than 1000 capture probes. In some embodiments, the plurality of capture probes is from 500 to 10,000, from 5000 to 100,000, from 1000 to $1\times10^6$, from 10,000 to 500,000, or from $1\times10^6$ to $1\times10^7$ capture probes. In some embodiments, the plurality of capture probes falls within another range starting no lower than 500 capture probes and ending no higher than $1\times10^7$ capture probes.

In some embodiments, a respective capture spot comprises any area of any two- or three-dimensional geometry (e.g., of any shape). For instance, in some embodiments, a respective capture spot is circular. In some embodiments, a respective capture spot is not circular. In some embodiments, the set of capture spots is positioned on a respective substrate (e.g., the second substrate) in a specific arrangement. In some such embodiments, the set of capture spots is provided as a capture spot array.

Numerous additional embodiments of capture domain types, capture spot sizes, arrays, probes, spatial barcodes, analytes, and/or other features of capture spots including but not limited to dimensions, designs, and modifications, and any substitutions and/or combinations thereof, are discussed in detail at length above (e.g., in "Definitions: (A) General Definitions: Capture Probes," "Definitions: (A) General Definitions: Capture spots," and "Definitions: (A) General Definitions: Capture spot arrays," above).

In some embodiments, the first substrate does not include spatial fiducials, and the second substrate comprises one or more spatial fiducials.

In some embodiments, the first substrate does not include capture spots, and the second substrate comprises a plurality of capture spots.

Figure 16:
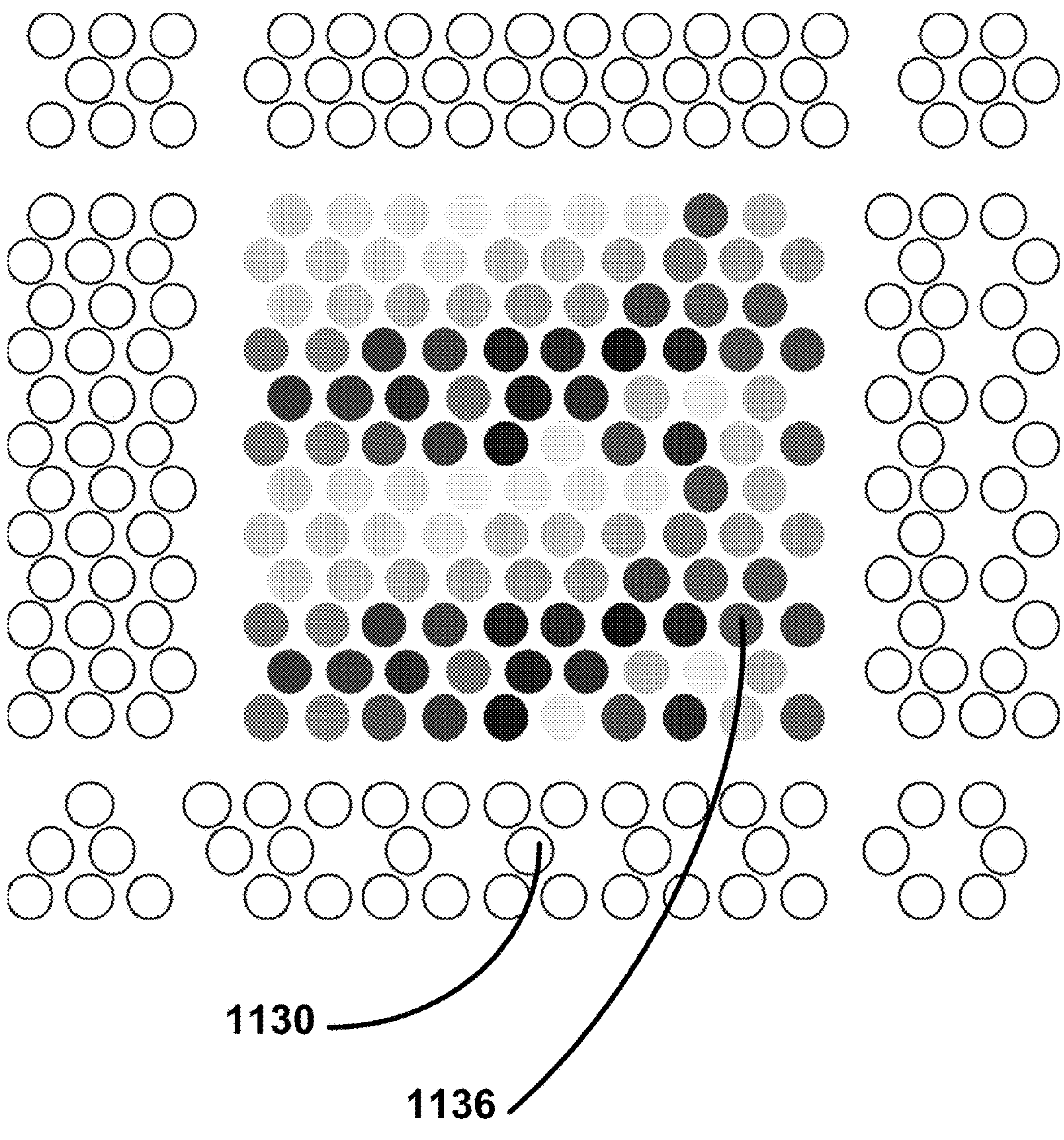
FIG. 16 illustrates a substrate that has a plurality of fiducial markers and a set of capture spots, in accordance with an embodiment of the present disclosure.

For instance, FIG. 16 illustrates a substrate (e.g., a chip) that has a plurality of spatial fiducials 1130 and a set of capture spots 1136, in accordance with an embodiment of the present disclosure.

In some embodiments, the overlaying the biological sample on the first substrate on a second substrate comprises contacting the biological sample disposed on an area of the first substrate with at least one capture spot of the second substrate. In some embodiments, the contacting comprises bringing the two substrates into proximity such that the sample on the first substrate is aligned with the set of capture spots on the second substrate. In some instances, the contacting is achieved by arranging the first substrate and the second substrate in a sandwich configuration and/or a sandwich assembly. For instance, FIGS. 7-8 illustrate a sandwich configuration 708 of a biological sample on a first substrate 702 with a second substrate 704.

In some embodiments, alignment of the biological sample on the first substrate with the second substrate comprising one or more spatial fiducials and a set of capture spots is achieved manually or automatically (e.g., via a motorized alignment). In some embodiments, manual alignment is performed with minimal optical or mechanical assistance. In some embodiments, automated alignment of the first and second substrates is performed using a sample handling apparatus, such as sample handling apparatus 706.

In some embodiments, a location of the first substrate can be adjusted relative to the second substrate to cause all or a portion of the biological sample on the first substrate to be aligned with the set of capture spots of the second substrate. In some such embodiments, the first substrate comprises a sample area indicator that indicates a region of the first substrate upon which the biological sample is attached and the second substrate comprises one or more spatial fiducials that indicate a region of the second substrate within which the set of capture spots is contained. In some embodiments, adjusting the location of the first substrate relative to the second substrate can be performed to cause the sample area indicator to be aligned with the one or more spatial fiducials. In some embodiments, the location of the first substrate relative to the second substrate can be adjusted by a user. For example, the user can manually manipulate a location of the first substrate and/or the second substrate within the sample handling apparatus 706 to cause the biological sample to be aligned with the set of capture spots. In some embodiments, the location of the first substrate can be adjusted relative to the second substrate, which can be fixed in position within the sample handling apparatus 706. In some embodiments, the location of the second substrate can be adjusted relative to the first substrate, which can be fixed in position within the sample handling apparatus 706.

Alignment of substrates, including sandwich configurations and sample handling devices such as sample handling apparatus 706 are further described in U.S. Patent Application No. 63/080,547, entitled "Sample Handling Apparatus and Image Registration Methods," filed Sep. 18, 2020, U.S. Patent Application No. 63/080,514, entitled "Sample Handling Apparatus and Fluid Delivery Methods," filed Sep. 18, 2020, U.S. Patent Application No. 63/155,173, entitled "Sample Handling Apparatus and Image Registration Methods," filed Mar. 1, 2021, and PCT Application No. US2019/065100, entitled "Imaging system hardware," filed Dec. 6, 2019, each of which is hereby incorporated by reference herein in its entirety.

Obtaining Images.

Referring again to Block 1002, in some embodiments, the obtaining the first image and the receiving the second image are performed using any suitable imaging technique known in the art. As used herein, the terms "obtaining an image" and "receiving an image" are interchangeable and generally refer to any suitable imaging technique, and any substitutions, modifications, additions, deletions, and/or combinations thereof, as will be apparent to one skilled in the art. In some embodiments, the obtaining the first image includes any of the embodiments disclosed herein with respect to the receiving the second image. In some embodiments, the receiving the second image includes any of the embodiments disclosed herein with respect to the obtaining the first image.

Similarly, in some embodiments, the first image includes any of the embodiments disclosed herein with respect to the second image. In some embodiments, the second image includes any of the embodiments disclosed herein with respect to the first image.

For example, referring to Block 1008, in some embodiments, the first image of the biological sample is a histological image of the biological sample. In some embodiments, the second image of the biological sample is a histological image of the biological sample. In some embodiments, a histological image generally refers to any image that contains structural information for a biological sample and/or a biological tissue. In some embodiments, a histological image is obtained using any suitable stain, as described in further detail below. For instance, FIG. 8 illustrates an image 802 obtained using a biological sample on a first slide overlayed on a second slide in a sandwich configuration. Similarly, FIG. 18 illustrates an example of a first image 1802 of a biological sample on a first substrate and a second image 1804 of the biological sample on the first substrate overlayed on a second substrate.

In some embodiments, the first image is obtained when the sample is not in contact with the second substrate and the second image is obtained when the biological sample is in contact with the second substrate. In other words, in some embodiments, the first image is obtained when the biological sample is on the first substrate but before the first substrate is overlayed on the second substrate, and the second image is obtained after the first substrate is overlayed on the second substrate, where the biological sample is sandwiched between the first and the second substrates.

In some embodiments, both the first image and the second image are taken when the biological sample is in contact with the second substrate (e.g., where the biological sample is sandwiched between the first and the second substrates).

In some embodiments, the first image includes one or more spatial fiducials (e.g., where the first substrate comprises the one or more spatial fiducials). In some embodiments, the first image does not include spatial fiducials. In some embodiments, the second image includes one or more spatial fiducials (e.g., where at least one of the first and second substrate comprises the one or more spatial fiducials)
.

In some embodiments, a respective image (e.g., the first image and/or the second image) is obtained by bright-field microscopy, immunohistochemistry, or fluorescence microscopy. In some embodiments, a respective image (e.g., the first image and/or the second image) is obtained by immunofluorescence microscopy. In general, when fluorescence microscopy is used to acquire an image, in some embodiments, the image is acquired with correction for the field of view flatness to correct for lower fluorescence intensity values at the edge of the field of view compared to its center. In some embodiments correction for the field of view flatness is applied to the first image and not the second image.

In some embodiments, the biological sample is prepared for imaging on the first substrate using a detectable marker selected from the group consisting of: an antibody, a fluorescent label (e.g., a fluorophore), a radioactive label, a chemiluminescent label, a calorimetric label, a colorimetric label, and/or a combination thereof. For instance, in some embodiments, the biological sample is prepared for imaging on the first substrate using a stain selected from the group consisting of: live/dead stain, trypan blue, periodic acid-Schiff reaction stain, Masson's trichrome, Alcian blue, van Gieson, reticulin, Azan, Giemsa, Toluidine blue, isamin blue, sudan black and osmium, acridine orange, Bismarck brown, carmine, Coomassie blue, cresyl violet, DAPI, eosin, ethidium bromide, acid fuchsine, hematoxylin, Hoechst stains, iodine, methyl green, methylene blue, neutral red, Nile blue, Nile red, osmium tetroxide, propidium iodide, rhodamine, safranin, or a combination thereof.

In some embodiments, for example, the first image is obtained using a hematoxylin and eosin stain and the second image is obtained using an eosin stain. In some embodiments, the first image is obtained using an immunofluorescence stain and the second image is obtained using an eosin stain. In some embodiments, a single staining technique is used for the obtaining the first image and the receiving the second image. In some embodiments, different staining techniques are used for the obtaining the first image and the receiving the second image. In some embodiments, the method includes performing a first staining of the biological sample prior to the obtaining the first image and performing a second staining of the biological sample after the obtaining the first image but prior to the receiving the second image. In some embodiments, the method includes performing a first staining of the biological sample prior to the obtaining the first image, performing a destaining of the biological sample after the obtaining the first image, and performing a second staining of the biological sample after the destaining but prior to the receiving the second image.

In some embodiments, the same imaging technique is used for the obtaining the first image and the receiving the second image. In some embodiments, different imaging techniques are used for the obtaining the first image and the receiving the second image. In some embodiments, a respective image (e.g., the first image and/or the second image) is obtained using any imaging technique appropriate for the type of staining used, as will be apparent to one skilled in the art.

For instance, in some embodiments, a respective image (e.g., the first image and/or the second image) is acquired using transmission light microscopy (e.g., bright field transmission light microscopy, dark field transmission light microscopy, oblique illumination transmission light microscopy, dispersion staining transmission light microscopy, phase contrast transmission light microscopy, differential interference contrast transmission light microscopy, emission imaging, etc.). See, for example, Methods in Molecular Biology, 2018, *Light Microscopy Method and Protocols*, Markaki and Harz eds., Humana Press, New York, New York, ISBN-13:978-1493983056, which is hereby incorporated by reference. As an illustration, FIG. 14 shows an example of an image 1122 of a biological sample on a substrate in accordance with some embodiments.

In some embodiments, an image 1122 is a bright-field microscopy image in which the imaged sample appears dark on a bright background. In some such embodiments, the sample has been stained. For instance, in some embodiments, the sample has been stained with Hematoxylin and Eosin and the image 1122 is a bright-field microscopy image. In some embodiments the sample has been stained with a Periodic acid-Schiff reaction stain (stains carbohydrates and carbohydrate rich macromolecules a deep red color) and the image is a bright-field microscopy image. In some embodiments the sample has been stained with a Masson's trichrome stain (nuclei and other basophilic structures are stained blue, cytoplasm, muscle, erythrocytes and keratin are stained bright-red, collagen is stained green or blue, depending on which variant of the technique is used) and the image is a bright-field microscopy image. In some embodiments, the sample has been stained with an Alcian blue stain (a mucin stain that stains certain types of mucin blue, and stains cartilage blue and can be used with H&E, and with van Gieson stains) and the image is a bright-field microscopy image. In some embodiments the sample has been stained with a van Gieson stain (stains collagen red, nuclei blue, and erythrocytes and cytoplasm yellow, and can be combined with an elastin stain that stains elastin blue/black) and the image is a bright-field microscopy image. In some embodiments the sample has been stained with a reticulin stain, an Azan stain, a Giemsa stain, a Toluidine blue stain, an isamin blue/eosin stain, a Nissl and methylene blue stain, and/or a sudan black and osmium stain and the image is a bright-field microscopy image.

In some embodiments, rather than being a bright-field microscopy image of a sample, an image 1122 is an immunohistochemistry (IHC) image. IHC imaging may utilize a staining technique using antibody labels. One form of immunohistochemistry (IHC) imaging is immunofluorescence (IF) imaging. In an example of IF imaging, primary antibodies are used that specifically label a protein in the biological sample, and then a fluorescently labelled secondary antibody or other form of probe is used to bind to the primary antibody, to show up where the first (primary) antibody has bound. A light microscope, equipped with fluorescence, is used to visualize the staining. The fluorescent label is excited at one wavelength of light and emits light at a different wavelength. Using the right combination of filters, the staining pattern produced by the emitted fluorescent light is observed. In some embodiments, a biological sample is exposed to several different primary antibodies (or other forms of probes) in order to quantify several different proteins in a biological sample. In some such embodiments, each such respective different primary antibody (or probe) is then visualized with a different fluorescence label (different channel) that fluoresces at a unique wavelength or wavelength range (relative to the other fluorescence labels used). In this way, several different proteins in the biological sample can be visualized.

More generally, in some embodiments of the present disclosure, in addition to bright-field imaging or instead of bright-field imaging, fluorescence imaging is used to acquire a respective image (e.g., the first image and/or the second image) of the sample. As used herein the term "fluorescence imaging" refers to imaging that relies on the excitation and re-emission of light by fluorophores, regardless of whether they are added experimentally to the sample and bound to antibodies (or other compounds) or naturally occurring features of the sample. The above-described IHC imaging, and in particular IF imaging, is just one form of fluorescence imaging. Accordingly, in some embodiments, a respective image 1122 (e.g., of a biological sample) represents a respective channel in one or more channels, where each respective channel in the one or more channels represents an independent (e.g., different) wavelength or a different wavelength range (e.g., corresponding to a different emission wavelength). In some embodiments, a respective image 1122 comprises a plurality of instances of the respective image, where each respective instance of the respective image represents an independent (e.g., different) wavelength or a different wavelength range (e.g., corresponding to a different emission wavelength).

In some embodiments, a respective image 1122 comprises a plurality of instances of the respective image, where each respective instance of the respective image is obtained at multiple wavelengths, and where each such wavelength corresponds to the excitation frequency of a different kind of substance (containing a fluorophore) within or spatially associated with the sample. This substance can be a natural feature of the sample (e.g., a type of molecule that is naturally within the sample), or one that has been added to the sample. One manner in which such substances are added to the sample is in the form of probes that excite at specific wavelengths. Such probes can be directly added to the sample, or they can be conjugated to antibodies that are specific for some sort of antigen occurring within the sample, such as one that is exhibited by a particular protein. In this way, a user can use the plurality of instances of the respective image 1122 to view spatial analyte data overlayed onto fluorescence image data, thus providing information on the relationship between gene (or antibody) expression and other cellular markers (e.g., proteins exhibit particular antigens).

In some embodiments in which fluorescence imaging is conducted, a respective image (e.g., the first image and/or the second image) is acquired using Epi-illumination mode, where both the illumination and detection are performed from one side of the sample.

In some such embodiments, a respective image (e.g., the first image and/or the second image) is acquired using confocal microscopy, two-photon imaging, wide-field multiphoton microscopy, single plane illumination microscopy or light sheet fluorescence microscopy. See, for example, *Adaptive Optics for Biological Imaging,* 2013, Kubby ed., CRC Press, Boca Raton, Florida; and *Confocal and Two-Photon Microscopy: Foundations, Applications and Advances,* 2002, Diaspro ed., Wiley Liss, New York, New York; and *Handbook of Biological Confocal Microscopy,* 2002, Pawley ed., Springer Science+Business Media, LLC, New York, New York each of which is hereby incorporated by reference.

In some embodiments, a respective image (e.g., the first image and/or the second image) is obtained using various immunohistochemistry (IHC) probes that excite at various different wavelengths. See, for example, Day and Davidson, 2014, "The Fluorescent Protein Revolution (In Cellular and Clinical Imaging)," CRC Press, Taylor & Francis Group, Boca Raton, Florida; "Quantitative Imaging in Cell Biology" Methods in Cell Biology 123, 2014, Wilson and Tran, eds.; Advanced Fluorescence Reporters in Chemistry and Biology II: Molecular Constructions, Polymers and Nanoparticles (Springer Series on Fluorescence), 2010, Demchenko, ed., Springer-Verlag, Berlin, Germany; Fluorescence Spectroscopy and Microscopy: Methods and Protocols (Methods in Molecular Biology) 2014th Edition, 2014, Engelborghs and Visser, eds., HumanPress, each of which is hereby incorporated by reference for their disclosure on fluorescence imaging.

An image can be obtained in any electronic image file format, including but not limited to JPEG/JFIF, TIFF, Exif, PDF, EPS, GIF, BMP, PNG, PPM, PGM, PBM, PNM, WebP, HDR raster formats, HEIF, BAT, BPG, DEEP, DRW, ECW, FITS, FLIF, ICO, ILBM, IMG, PAM, PCX, PGF, JPEG XR, Layered Image File Format, PLBM, SGI, SID, CD5, CPT, PSD, PSP, XCF, PDN, CGM, SVG, PostScript, PCT, WMF, EMF, SWF, XAML, and/or RAW.

Additional suitable embodiments for obtaining and/or receiving images (e.g., a first image and/or a second image) that are contemplated for use in the present disclosure include any of the embodiments described herein, such as those disclosed above (see, "Definitions: (A) General Definitions: Imaging") and U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

In some embodiments, a respective image (e.g., the first image and/or the second image) is obtained in any electronic color mode, including but not limited to grayscale, bitmap, indexed, RGB, CMYK, HSV, lab color, duotone, and/or multichannel. In some embodiments, the image is manipulated (e.g., stitched, compressed and/or flattened). In some embodiments, a respective image 1122 is a color image (e.g., 3×8 bit, 2424×2424 pixel resolution). In some embodiments, a respective image 1122 is a monochrome image (e.g., 14 bit, 2424×2424 pixel resolution).

For instance, in some embodiments, the first image is a color image, and the second image is a grayscale image. In some embodiments, a respective image (e.g., the first image and/or the second image) in a plurality of images is obtained using a plurality of channels, each respective channel in the plurality of channels comprising a respective instance of the image acquired at a different respective illumination. In some such embodiments, each respective channel in the plurality of channels represents an independent (e.g., different) wavelength or a different wavelength range (e.g., corresponding to a different emission wavelength).

In some embodiments, the plurality of channels includes at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, or at least 20 channels. In some embodiments, the plurality of channels includes no more than 40, no more than 20, no more than 15, no more than 10, no more than 8, or no more than 5 channels. In some embodiments, the plurality of channels comprises between 2 and 5 channels, between 2 and 10 channels, or between 3 and 15 channels. In some embodiments, the plurality of channels includes at least 3 channels corresponding to a red channel, a green channel, and a blue channel.

In some embodiments, a respective image (e.g., the first image and/or the second image) is a stack of monochrome RGB images.

In some embodiments, a respective image (e.g., the first image and/or the second image) is a multichannel image comprising, for each respective channel in a plurality of channels, a respective instance of the image acquired at a different respective illumination, and the obtaining (e.g., receiving) the respective image comprises using all of the instances of the image across the plurality of channels.

In some embodiments, a respective image (e.g., the first image and/or the second image) is a multichannel image comprising, for each respective channel in a plurality of channels, a respective instance of the image acquired at a different respective illumination, and the obtaining (e.g., receiving) the respective image comprises selecting a respective channel for the image from the plurality of channels, thereby obtaining (e.g., receiving) the respective instance of the image corresponding to the respective channel.

In some embodiments, a respective image (e.g., the first image and/or the second image) is a multichannel image comprising, for each respective channel in a plurality of channels, a respective instance of the image acquired at a different respective illumination, and the obtaining (e.g., receiving) the respective image comprises selecting a first respective channel for the image from the plurality of channels for a first process and selecting a second respective channel for the image from the plurality of channels for a second process, thereby obtaining (e.g., receiving) a first instance of the image for the first process and a second instance of the image for the second process. Thus, in some such implementations, different instances of a respective image obtained at different illuminations are utilized for different processes relating to image analysis, such as fiducial registration and tissue segmentation, as further described herein (see, for instance, the sections entitled “Fiducial registration” and “Image segmentation,” below).

As an example, in some embodiments, the receiving a second image comprises selecting a channel for the second image from a plurality of channels, each respective channel in the plurality of channels comprising a respective instance of the second image acquired at a different respective illumination. In some embodiments, the plurality of channels comprises a first instance of the second image acquired at a first respective illumination that causes a contrast of the biological sample to be lower than a contrast of the one or more spatial fiducials of the second substrate, and a second instance of the second image acquired at a second respective illumination that causes a contrast of the biological sample to be higher than a contrast of the one or more spatial fiducials of the second substrate. Thus, in some embodiments, the first instance of the second image can be used to perform a detection of spatial fiducials, and the second instance of the second image can be used to perform a tissue segmentation to locate the biological sample in the image.

In some embodiments, the first illumination includes a wavelength between 564 nm and 580 nm or a wavelength between 700 nm and 1 mm. In some embodiments, the second illumination includes a wavelength between 534 nm and 545 nm.

In some embodiments, a respective image (e.g., the first image and/or the second image) comprises a plurality of pixels 1124. In some embodiments, the plurality of pixels comprises at least 100, at least 500, at least 1000, at least 5000, at least 10,000, at least 50,000, at least 100,000, at least 500,000, at least $1\times10^6$, at least $2\times10^6$, at least $3\times10^6$, at least $5\times10^6$, at least $8\times10^6$, at least $1\times10^7$, at least $1\times10^8$, at least $1\times10^9$, at least $1\times10^{10}$, or at least $1\times10^{11}$ pixels. In some embodiments, the plurality of pixels comprises no more than $1\times10^{12}$, no more than $1\times10^{11}$, no more than $1\times10^{10}$, no more than $1\times10^9$, no more than $1\times10^8$, no more than $1\times10^7$, no more than $1\times10^6$, no more than 100,000, no more than 10,000, or no more than 1000 pixels. In some embodiments, the plurality of pixels comprises from 1000 to 100,000, from 10,000 to 500,000, from 100,000 to $1\times10^6$, from 500,000 to $1\times10^9$, or from $1\times10^6$ to $1\times10^8$ pixels. In some embodiments, the plurality of pixels falls within another range starting no lower than 100 pixels and ending no higher than $1\times10^{12}$ pixels.

In some embodiments, each pixel in the plurality of pixels of the first image or the second image has a pixel size (resolution) between 0.8 μm and 4.0 μm. In some embodiments this pixel size is derived by dividing the camera pixel size (resolution) by the magnification of the objective lens of the camera used to capture values for the plurality of pixels. In some embodiments, each pixel in the plurality of pixels has a pixel size between 0.4 μm and 5.0 μm. In some embodiments, each pixel in the plurality of pixels of the first image has a pixel size (resolution) between 0.8 μm and 4.0 μm or between 0.4 μm and 5.0 μm.

In some embodiments, a respective image (e.g., the first image and/or the second image) is represented as an array (e.g., matrix) comprising a plurality of pixels, such that the location of each respective pixel in the plurality of pixels in the array (e.g., matrix) corresponds to its original location in the image. In some embodiments, a respective image is represented as a vector comprising a plurality of pixels, such that each respective pixel in the plurality of pixels in the vector comprises spatial information corresponding to its original location in the image.

In some embodiments, the plurality of pixels in a respective image (e.g., the first image and/or the second image) corresponds to the location of each capture spot in a set of capture spots on at least one of the first substrate and the second substrate. In some embodiments, each capture spot in the set of capture spots is represented by five or more, ten or more, 100 or more, 1000 or more, 10,000 or more, 50,000 or more, 100,000 or more, or 200,000 or more contiguous pixels in a respective image. In some embodiments, each capture spot in the set of capture spots is represented by no more than 500,000, no more than 200,000, no more than 100,000, no more than 50,000, no more than 10,000, or no more than 1000 contiguous pixels in a respective image. In some embodiments, each capture spot is represented by between 1000 and 250,000, between 100,000 and 500,000, between 10,000 and 100,000, or between 5000 and 20,000 contiguous pixels in a respective image. In some embodiments, each capture spot is represented by another range of contiguous pixels in a respective image starting no lower than 5 pixels and ending no higher than 500,000 pixels.

In some embodiments, a respective image (e.g., the first image and/or the second image) has an image size between 1 KB and 1 MB, between 1 MB and 0.5 GB, between 0.5 GB and 5 GB, between 5 GB and 10 GB, or greater than 10 GB.

In some embodiments, the first image and the second image have different image resolutions. The resolution of a respective image (e.g., the first image and/or the second image) can be the overall resolution of the image and/or can be based on the magnification, the numerical aperture, the resolution of the sensor or capture device in megapixels, and wavelength. For instance, referring to block 1010 of FIG. 10A, in some embodiments, the first image is a high resolution image, and the second image is a low resolution image. In some implementations, high resolution images include images suitable for resolving subcellular histological and pathological features and/or images having a resolution less than 5-10 microns.

In some embodiments, a respective image (e.g., the first image and/or the second image) is obtained using an image capture device, such as a microscope. In some embodiments, the first image and the second image are obtained using the same image capture device. In some embodiments, the first image is obtained using a first image capture device and the second image is obtained using a second image capture device other than the first image capture device.

In some embodiments, a respective image is obtained by a high-resolution image capture device (e.g., a bright-field and/or fluorescent microscope). In some embodiments, a respective image is obtained by a low-resolution image capture device attached to a sample handling apparatus, such as sample handling apparatus 706.

For instance, in some such embodiments, a respective image is received by a data processor of a computing device communicatively coupled to a sample handling apparatus 706. The sample handling apparatus 706 can receive and retain a substrate including the sample therein (e.g., a first substrate comprising the biological sample thereon). The sample handling apparatus can receive and retrain a second substrate, e.g., a second substrate comprising one or more spatial fiducials and a set of capture spots. The computing device can be further communicatively coupled to an image capture device, such as a microscope, a camera, an optical sensor, an imaging device, or the like configured to acquire and provide an image of the sample to the computing device. In some embodiments, the data processor of the computing device is configured to receive the image of the sample from a data processor of a remote computing device communicatively coupled to the computing device at which the process 2300 is performed.

In some embodiments, the data processor provides the respective image for display via a display of the computing device. In some embodiments, the image is provided for display via a GUI configured within the display of the computing device. In some embodiments, the data processor receives an input identifying one or more modifications and/or one or more image analysis steps based on the provided image. For example, the display of the computing device can include a touch-screen display configured to receive a user input identifying a respective pattern (e.g., a first or second pattern) of a respective image of the biological sample on the displayed image. In some embodiments, the GUI can be configured to receive a user provided input identifying the one or more modifications and/or one or more image analysis steps.

In some embodiments, the data processor accesses and executes computer-readable, executable instructions configured to automatically perform one or more modifications and/or one or more image analysis steps based on processing the sample image (e.g., using image segmentation functionality). In some embodiments, the data processor accesses and executes computer-readable, executable instructions configured to automatically determine the one or more modifications and/or one or more image analysis steps based on one or more sample metrics, including but not limited to a type of sample, a size of sample, a shape of the sample, and/or an area of the sample.

Devices and methods for obtaining images of biological samples, including sample handling apparatus 706, and related methods, are further described in, e.g., U.S. Patent Application No. 63/080,547, entitled "Sample Handling Apparatus and Image Registration Methods," filed Sep. 18, 2020, U.S. Patent Application No. 63/080,514, entitled "Sample Handling Apparatus and Fluid Delivery Methods," filed Sep. 18, 2020, U.S. Patent Application No. 63/155,173, entitled "Sample Handling Apparatus and Image Registration Methods," filed Mar. 1, 2021, and PCT Application No. US2019/065100, entitled "Imaging system hardware," filed Dec. 6, 2019, each of which is hereby incorporated by reference herein in its entirety.

In some embodiments, the method further comprises modifying the first image and/or the second image prior to the determining the registration for the first image and the second image. In some embodiments, the modifying an image comprises adjusting a brightness of the image, adjusting a contrast of the image, flipping the image, rotating the image, cropping the image, zooming a view of the image, panning across the image, or overlaying a grid onto the respective image.

In some embodiments, the second image of the biological sample further comprises all or a portion of a spacer, and the modifying comprises cropping the second image to remove the all or a portion of the spacer from the second image.

In some embodiments, the spacer is positioned between the first substrate and the second substrate.

For instance, a spacer can be used to ensure a seal between the first and the second substrates. In some embodiments, a spacer is used to separate the first and the second substrates by a predefined distance determined by the width of the spacer. In some embodiments, the spacer is used to advantageously ensure that the biological sample (e.g., tissue) is not disturbed (e.g., deformed, torn, etc.) by the overlay of the first substrate on the second substrate. In some embodiments, a spacer is advantageously used to ensure that one or more reagents, analytes, fiducials, and/or capture spots are retained and/or are not disturbed (e.g., deformed, torn, etc.) between the first and the second substrate.

Figure 29:
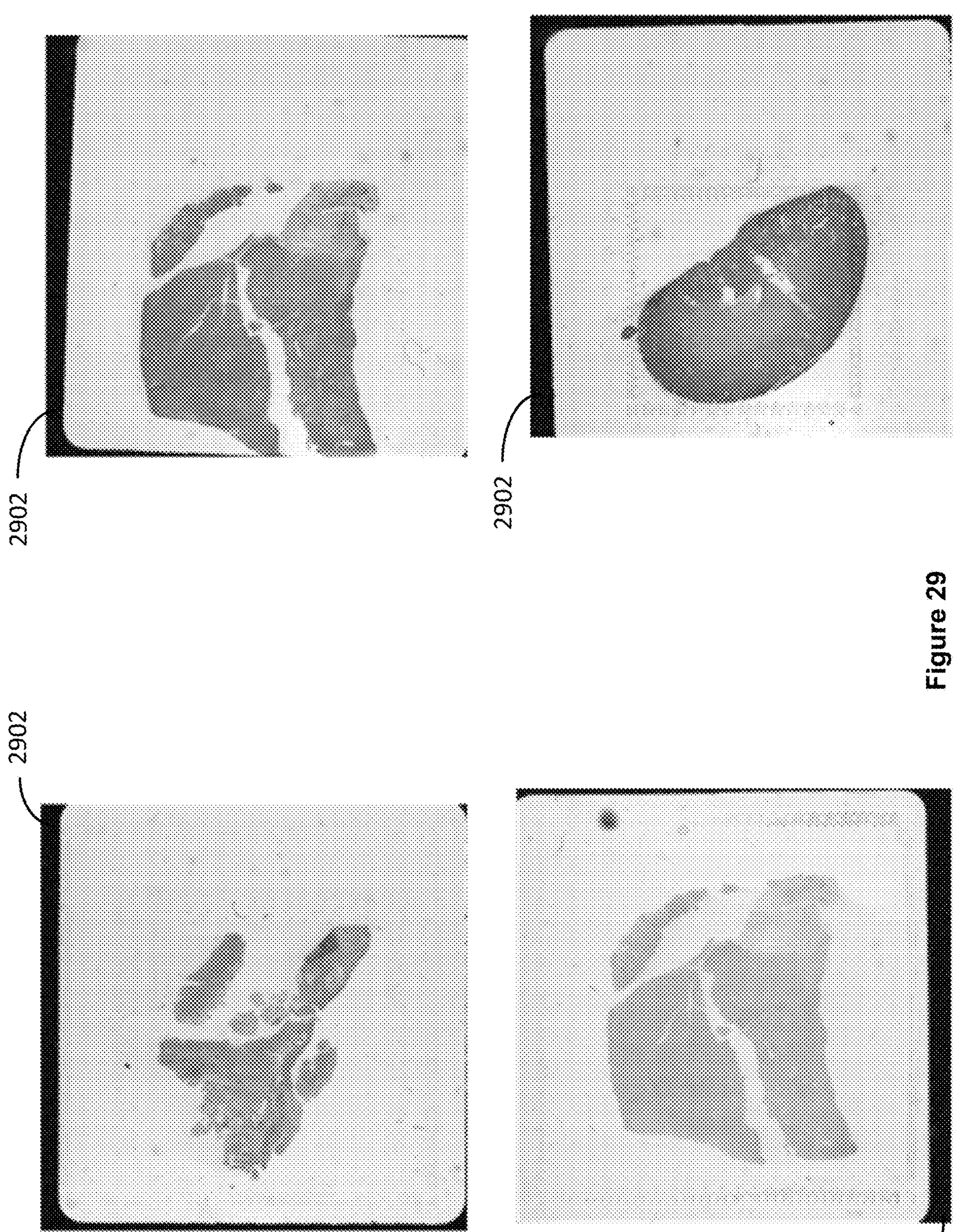
FIG. 29 illustrates example variations of spacers in images, in accordance with some embodiments of the present disclosure.

Accordingly, image capture of the second image comprising the biological sample on the first substrate overlayed on the second substrate can further capture all or a portion of the spacer within the second image. Example images of a biological sample on a first substrate overlayed on a second substrate where the spacer is visible are displayed in FIG. 29. In FIG. 29, spacers are shown as black regions around the perimeter of the image and indicated as reference numeral 2902.

In some embodiments, the removing the all or a portion of the spacer from the second image is performed manually (e.g., using a manual cropping tool).

In some embodiments, the removing the all or a portion of the spacer from the second image is performed using an automated method (e.g., using an algorithm).

For example, in some embodiments, the removing the all or a portion of the spacer from the second image comprises determining a spacer perimeter for the second image, where the spacer perimeter comprises, for each respective edge in the spacer perimeter, a corresponding thickness that indicates a subset of pixels, in a plurality of pixels for the second image, thereby obtaining a set of pixels. The removing further comprises applying a spacer segmentation algorithm to each respective pixel in the set of pixels to independently assign a probability that the respective pixel corresponds to presence or absence of the spacer. The removing further comprises overlaying a spacer mask on the second image, where the spacer mask causes each respective pixel in the set of pixels that has been assigned a greater probability of corresponding to presence of the spacer to be assigned a first attribute and each respective pixel in the set of pixels that has been assigned a greater probability of corresponding to absence of the spacer to be assigned a second attribute. The method further includes generating a bounding box comprising each respective pixel in the set of pixels that has been assigned the first attribute, and removing each respective pixel in the set of pixels that is within the bounding box, thereby cropping the second image to remove the all or a portion of the spacer from the second image.

For instance, in an example embodiment, the method comprises determining the spacer perimeter for the second image as a boundary within which to search for the spacer in the second image using the automated method.

In some embodiments, the spacer perimeter extends a predefined distance from each respective edge of the second image. Thus, in some embodiments, for each respective edge in the spacer perimeter, the corresponding thickness that indicates a subset of pixels, in a plurality of pixels for the second image, indicates the predefined distance from the corresponding edge of the second image within which the pixels of the image will be applied to a segmentation algorithm.

In some embodiments, the predefined distance is a number of pixels. In some embodiments, the predefined distance is at least 2, at least 3, at least 4, at least 5, at least 10, at least 15, at least 20, at least 50, at least 100, at least 200, or at least 300 pixels. In some embodiments, the predefined distance is no more than 500, no more than 300, no more than 200, no more than 100, no more than 50, no more than 20, or no more than 10 pixels. In some embodiments, the predefined distance is from 2 to 10, from 5 to 40, from 10 to 30, from 20 to 100, from 40 to 300, or from 100 to 500 pixels. In some embodiments, the predefined distance falls within another range starting no lower than 2 pixels and ending no higher than 500 pixels.

In some embodiments, the predefined distance is a percentage of the total number of pixels in the second image.

In some embodiments, the predefined distance is at least 0.005%, at least 0.008%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 15%, at least 20%, or at least 30% of the total pixels in the second image. In some embodiments, the predefined distance is no more than 50%, no more than 30%, no more than 20%, no more than 10%, no more than 5%, no more than 1%, no more than 0.5%, or no more than 0.1% of the total pixels in the second image. In some embodiments, the predefined distance is from 0.01% to 10%, from 0.1% to 20%, from 0.05% to 1%, from 0.005% to 30%, from 0.5% to 15%, or from 1% to 10% of the total pixels in the second image. In some embodiments, the predefined distance falls within another range starting no lower than 0.005% of the total pixels in the second image and ending no higher than 50% of the total pixels in the second image.

In some embodiments, the predefined distance is the same or different for each respective edge in the spacer perimeter.

In some embodiments, the number of edges in the spacer perimeter is the same as the number of edges in the second image (e.g., a predefined distance extending from each edge of the second image).

As described above, in the example embodiment, each respective pixel in the set of pixels (e.g., the pixels within the boundary of the spacer perimeter) is applied to a spacer segmentation algorithm. In some such embodiments, this set of pixels is used to calculate a threshold value that can be used to segment the pixels within the spacer perimeter between spacer and foreground (e.g., not spacer).

In some embodiments, the spacer segmentation algorithm is a global thresholding algorithm. For instance, in some implementations, the spacer segmentation algorithm is Otsu's method.

In some embodiments, the spacer segmentation algorithm is a local intensity gradient algorithm. In some embodiments, the spacer segmentation algorithm uses any of the embodiments for image segmentation disclosed herein (see, e.g., the section entitled "Image segmentation," below).

As described above, the example embodiment comprises independently assigning a probability that the respective pixel corresponds to presence or absence of the spacer and overlaying a spacer mask on the second image, where the spacer mask causes each respective pixel in the set of pixels that has been assigned a greater probability of corresponding to presence of the spacer to be assigned a first attribute and each respective pixel in the set of pixels that has been assigned a greater probability of corresponding to absence of the spacer to be assigned a second attribute.

For example, in some implementations, the first attribute is a first color and the second attribute is a second color.

In some embodiments, a respective pixel in the set of pixels is assigned a greater probability of corresponding to presence of the spacer when the assigned probability satisfies an image thresholding cutoff value. For instance, in some implementations, a first respective pixel in the set of pixels is assigned a greater probability of corresponding to presence of the spacer when the assigned probability is greater than or equal to the image thresholding cutoff value, and a second respective pixel in the set of pixels is assigned a greater probability of corresponding to absence of the spacer when the assigned probability is less than the image thresholding cutoff value. In some embodiments, a first respective pixel in the set of pixels is assigned a greater probability of corresponding to presence of the spacer when the assigned probability is less than the image thresholding cutoff value, and a second respective pixel in the set of pixels is assigned a greater probability of corresponding to absence of the spacer when the assigned probability is greater than or equal to the image thresholding cutoff value.

In some embodiments, the image thresholding cutoff value is a measure of central tendency of the pixel values for the set of pixels (e.g., a mean value of the pixels in the set of pixels). In some embodiments, the overlaying a mask comprises applying gaussian blur to the mask.

In some implementations, the generating a bounding box comprising each respective pixel in the set of pixels that has been assigned the first attribute (e.g., based on the masking) indicates the region of the second image that contains the all or the portion of the spacer. Accordingly, the bounding box indicates the region of the second image to be cropped. Thus, in some implementations, the removing each respective pixel in the set of pixels that is within the bounding box, crops the all or a portion of the spacer from the second image.

In some embodiments, the determining the bounding box is performed using a procedure for identifying one or more corners that represent the region comprising the subset of pixels that have been assigned the first attribute. In some such embodiments, the procedure comprises: identifying a convex hull of the subset of pixels assigned the first attribute; generating a plurality of angles, where each respective angle in the plurality of angles is between a pair of neighboring pixels on the convex hull; and transforming the subset of pixels using the plurality of angles, thereby determining a set of coordinates that represent the corners of the bounding box.

In some embodiments, the set of coordinates includes a minimum x value, a minimum y value, a maximum x value, and/or a maximum y value representing possible corners of the bounding box. In some such embodiments, the bounding box is determined using a minimum x value or a maximum x value. Alternatively or in addition, in some embodiments, the bounding box is determined using a minimum y value or a maximum y value.

In some embodiments, the bounding box indicates, for each respective edge of the second image, a corresponding cropping distance to be removed from the second image. In some implementations, the corresponding cropping distance is a number of pixels.

In some embodiments, the cropping distance is at least 2, at least 3, at least 4, at least 5, at least 10, at least 15, at least 20, at least 50, at least 100, at least 200, or at least 300 pixels. In some embodiments, the cropping distance is no more than 500, no more than 300, no more than 200, no more than 100, no more than 50, no more than 20, or no more than 10 pixels. In some embodiments, the cropping distance is from 2 to 10, from 5 to 40, from 10 to 30, from 20 to 100, from 40 to 300, or from 100 to 500 pixels. In some embodiments, the cropping distance falls within another range starting no lower than 2 pixels and ending no higher than 500 pixels.

In some embodiments, the corresponding cropping distance is a percentage of the total number of pixels in the second image. In some embodiments, the corresponding cropping distance is at least 0.005%, at least 0.008%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 15%, at least 20%, or at least 30% of the total pixels in the second image. In some embodiments, the corresponding cropping distance is no more than 50%, no more than 30%, no more than 20%, no more than 10%, no more than 5%, no more than 1%, no more than 0.5%, or no more than 0.1% of the total pixels in the second image. In some embodiments, the corresponding cropping distance is from 0.01% to 10%, from 0.1% to 20%, from 0.05% to 1%, from 0.005% to 30%, from 0.5% to 15%, or from 1% to 10% of the total pixels in the second image. In some embodiments, the corresponding cropping distance falls within another range starting no lower than 0.005% of the total pixels in the second image and ending no higher than 50% of the total pixels in the second image.

In some embodiments, the corresponding cropping distance is the same or different for each respective edge in the second image.

In some embodiments, the cropping comprises, prior to the applying the spacer segmentation algorithm, padding and/or adjusting one or more edges of the second image. In some embodiments, the cropping comprises, prior to the applying the spacer segmentation algorithm, performing a morphological closing to adjust one or more edges in the spacer perimeter. Advantageously, morphological closing allows the corresponding one or more edges of the spacer perimeter to be enclosed within straight (e.g., horizontal or vertical lines), thus allowing uniform cropping.

In some embodiments, the generating a bounding box comprises assigning the first attribute to one or more pixels, within the bounding box, that have not been assigned the first attribute. For instance, in some such embodiments, the generating a bounding box comprises filling in holes, thus generating a uniform bounding box for the "spacer" attribute to be cropped.

In some embodiments, the modifying an image comprises preprocessing the image. For example, in some embodiments, preprocessing is performed on the first image and/or the second image. In some embodiments, the preprocessing includes matching pixelwise resolution (upsampling), mirror image flipping, and angular rotation. In some embodiments, an initial image transformation is generated based on an initial transform type and an initial transformation matrix. The initial transformation matrix type includes, in some implementations, a similarity transformation matrix based on translation, rotation, and scale. In some embodiments, the initial transformation matrix includes an affine transformation matrix based on translation, rotation, scale, and shear. Preprocessing of images is further described in, e.g., U.S. Patent Application No. 63/080,547, entitled "Sample Handling Apparatus and Image Registration Methods," filed Sep. 18, 2020, U.S. Patent Application No. 63/080,514, entitled "Sample Handling Apparatus and Fluid Delivery Methods," filed Sep. 18, 2020, U.S. Patent Application No. 63/155,173, entitled "Sample Handling Apparatus and Image Registration Methods," filed Mar. 1, 2021, and PCT Application No. US2019/065100, entitled "Imaging system hardware," filed Dec. 6, 2019, each of which is hereby incorporated by reference herein in its entirety.

In some embodiments, the modifying the first image and/or the second image prior to the determining the registration comprises downsampling the first image and/or the second image. Referring to Block 1012 of FIG. 10A, in some embodiments, the method further comprises downsampling the first image (e.g., where the first image is a high resolution image, and the second image is a low resolution image). In some embodiments, the downsampling the first image comprises downsampling the first image to a resolution that is no lower than the resolution of the second image. In some embodiments, the downsampling the first image comprises downsampling the first image to a resolution that is no lower than 2× the resolution of the second image. In some embodiments, the downsampling the first image comprises downsampling the first image to a resolution that is no lower than 1×, no lower than 1.5×, no lower than 2×, no lower than 3×, no lower than 4×, no lower than 5×, no lower than 6×, no lower than 7×, no lower than 8×, no lower than 9×, or no lower than 10× the resolution of the second image. In some embodiments, the downsampling the first image comprises downsampling the first image to a resolution that is no higher than 20×, no higher than 15×, no higher than 10×, or no higher than 5× the resolution of the second image. In some embodiments, the downsampling the first image comprises downsampling the first image to a resolution that is from 1× to 5×, from 2× to 10×, or from 1.5× to 20× the resolution of the second image. In some embodiments, the downsampling the first image comprises downsampling the first image to a resolution that falls within another range starting no lower than 1× the resolution of the second image and ending no higher than 20× the resolution of the second image.

In some embodiments, the first image and/or the second image has a starting resolution (e.g., a plurality of pixels) of at least $1\times10^8$ and is downsampled to an ending resolution of no more than $1\times10^7$. In some embodiments, the first image and/or the second image has a starting resolution of at least $1\times10^8$ and is downsampled to an ending resolution of no more than $1\times10^6$. In some embodiments, the first image and/or the second image has a starting resolution of at least $1\times10^9$ and is downsampled to an ending resolution of no more than $1\times10^8$.

In some embodiments, the first image and/or the second image has a starting resolution of at least $1\times10^8$ and is downsampled to an ending resolution of at least $1\times10^5$. In some embodiments, the first image and/or the second image has a starting resolution of at least $1\times10^8$ and is downsampled to an ending resolution of at least $1\times10^6$. In some embodiments, the first image and/or the second image has a starting resolution of at least $1\times10^7$ and is downsampled to an ending resolution of at least $1\times10^5$.

In some embodiments, the first image and/or the second image has a starting resolution of at least $1\times10^8$ and is downsampled to an ending resolution of from $1\times10^5$ to $1\times10^7$.

In some embodiments, the first image and/or the second image has a starting resolution of at least 5000, at least 10,000, at least 50,000, at least 100,000, at least 500,000, at least $1\times10^6$, at least $2\times10^6$, at least $3\times10^6$, at least $5\times10^6$, at least $8\times10^6$, at least $1\times10^7$, at least $1\times10^8$, at least $1\times10^9$, at least $1\times10^{10}$, or at least $1\times10^{11}$ and is downsampled to an ending resolution of at least 100, at least 500, at least 1000, at least 5000, at least 10,000, at least 50,000, at least 100,000, at least 500,000, at least $1\times10^6$, at least $2\times10^6$, at least $3\times10^6$, at least $5\times10^6$, at least $8\times10^6$, at least $1\times10^7$, or at least $1\times10^8$.

In some embodiments, the first image and/or the second image has a starting resolution of at least 5000, at least 10,000, at least 50,000, at least 100,000, at least 500,000, at least $1\times10^6$, at least $2\times10^6$, at least $3\times10^6$, at least $5\times10^6$, at least $8\times10^6$, at least $1\times10^7$, at least $1\times10^8$, at least $1\times10^9$, at least $1\times10^{10}$, or at least $1\times10^{11}$ and is downsampled to an ending resolution of no more than $1\times10^9$, no more than $1\times10^8$, no more than $1\times10^7$, no more than $1\times10^6$, no more than 100,000, no more than 10,000, or no more than 1000.

In some embodiments, the first image and/or the second image has a starting resolution of at least 5000, at least 10,000, at least 50,000, at least 100,000, at least 500,000, at least $1\times10^6$, at least $2\times10^6$, at least $3\times10^6$, at least $5\times10^6$, at least $8\times10^6$, at least $1\times10^7$, at least $1\times10^8$, at least $1\times10^9$, at least $1\times10^{10}$, or at least $1\times10^{11}$ and is downsampled to an ending resolution of from 1000 to 100,000, from 10,000 to 500,000, from 100,000 to $1\times10^6$, from 500,000 to $1\times10^9$, from $1\times10^6$ to $1\times10^8$, or from $1\times10^5$ to $1\times10^7$. In some embodiments, the first image and/or the second image has a starting resolution that falls within another range starting no lower than 5000 and ending no higher than $1\times10^{11}$ and is downsampled to an ending resolution that falls within another range starting no lower than 100 and ending no higher than $1\times10^9$.

In some embodiments, the first image is not downsampled. Alternatively or in addition, in some embodiments, the second image is not downsampled.

In some embodiments, the method further comprises performing a normalization of pixel values within the first image. In some embodiments, the method further comprises performing a normalization of pixel values within the second image. In some embodiments, the normalization is a log normalization.

In some embodiments, the performing the normalization comprises, for each respective pixel in the first image, reassigning the pixel value to the log of the pixel value when the respective pixel has a corresponding pixel value that is greater than 1, and performing a linear transformation across the plurality of pixels in the first image, such that the pixel value of each respective pixel in the first image is normalized to a corresponding value between 0 and 1. Other suitable methods of image normalization and modification are contemplated, including smoothing, noise reduction, color normalization, contrast stretching, histogram stretching, Reinhard method, Macenko method, stain color descriptor (SCD), complete color normalization and structure preserving color normalization (SPCN), as will be apparent to one skilled in the art. See, e.g., Roy et al., "Novel Color Normalization Method for Hematoxylin & Eosin Stained Histopathology Images," 2019 IEEE Access 7:2169-3536; doi:10.1109/ACCESS.2019.2894791, which is hereby incorporated herein by reference in its entirety.

Image Registration Workflows.

Referring to Block 1014, the method further includes determining a registration for the first image and the second image, where the registration registers the first image and the second image to each other, using a first pattern of the biological sample in the first image and a second pattern of the biological sample in the second image. Generally, image registration refers to a geometric alignment of two or more images, such that the images are within a single frame of reference or coordinate system.

In some embodiments, a respective pattern of the biological sample in a respective image indicates the location of the biological sample in the respective image (e.g., where the biological sample is overlayed onto a substrate). In some embodiments, a respective pattern of the biological sample in a respective image denotes regions of the image that contain sample (e.g., tissue) compared to regions of the image that contain background (e.g., non-tissue). In some embodiments, the first pattern of the biological sample in the first image and the second pattern of the biological sample in the second image are obtained using an image segmentation process. Image segmentation processes suitable for use in obtaining the first pattern of the biological sample and the second pattern of the biological sample are further described herein (see, e.g., the section entitled "Image segmentation," below).

Figures 19A, 19B:
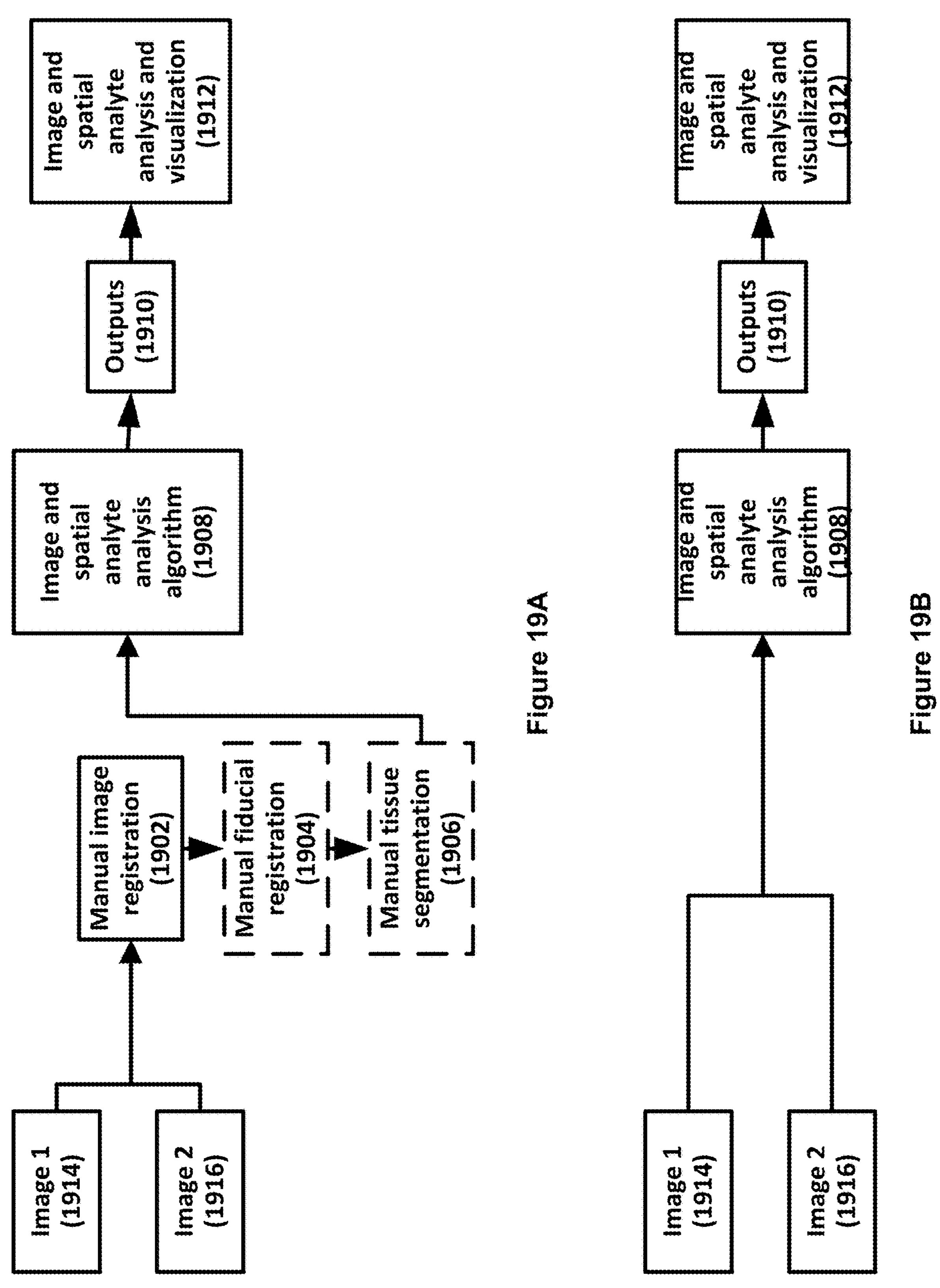
FIGS. 19A and 19B illustrate example manual and automated workflows for determining a registration for a first image and a second image, in which optional steps are indicated by dashed boxes in accordance with some embodiments of the present disclosure.

Referring to Block 1016, the determining the registration for the first image and the second image is manual or automatic. FIGS. 19A-19B illustrate example workflows in which the determining the registration for the first image and the second image is manual or automatic. For instance, in some embodiments, as shown in FIG. 19A, a first image 1914 and a second image 1916 are provided by a user. A manual image registration process 1902 is performed using the first image 1914 and the second image 1916, including an optional manual fiducial registration 1904 and an optional manual tissue segmentation 1906. The output of the manual image registration 1902 is then passed to an image and spatial analyte analysis algorithm 1908, comprising an automated process for image analysis and spatial analyte analysis. Outputs from the automated algorithm 1910 are then passed to a visualization system 1912 for visualization and further analysis of the image and spatial analyte data, including the overlay of the spatial analyte data with the first image of the biological sample.

Figure 20A:
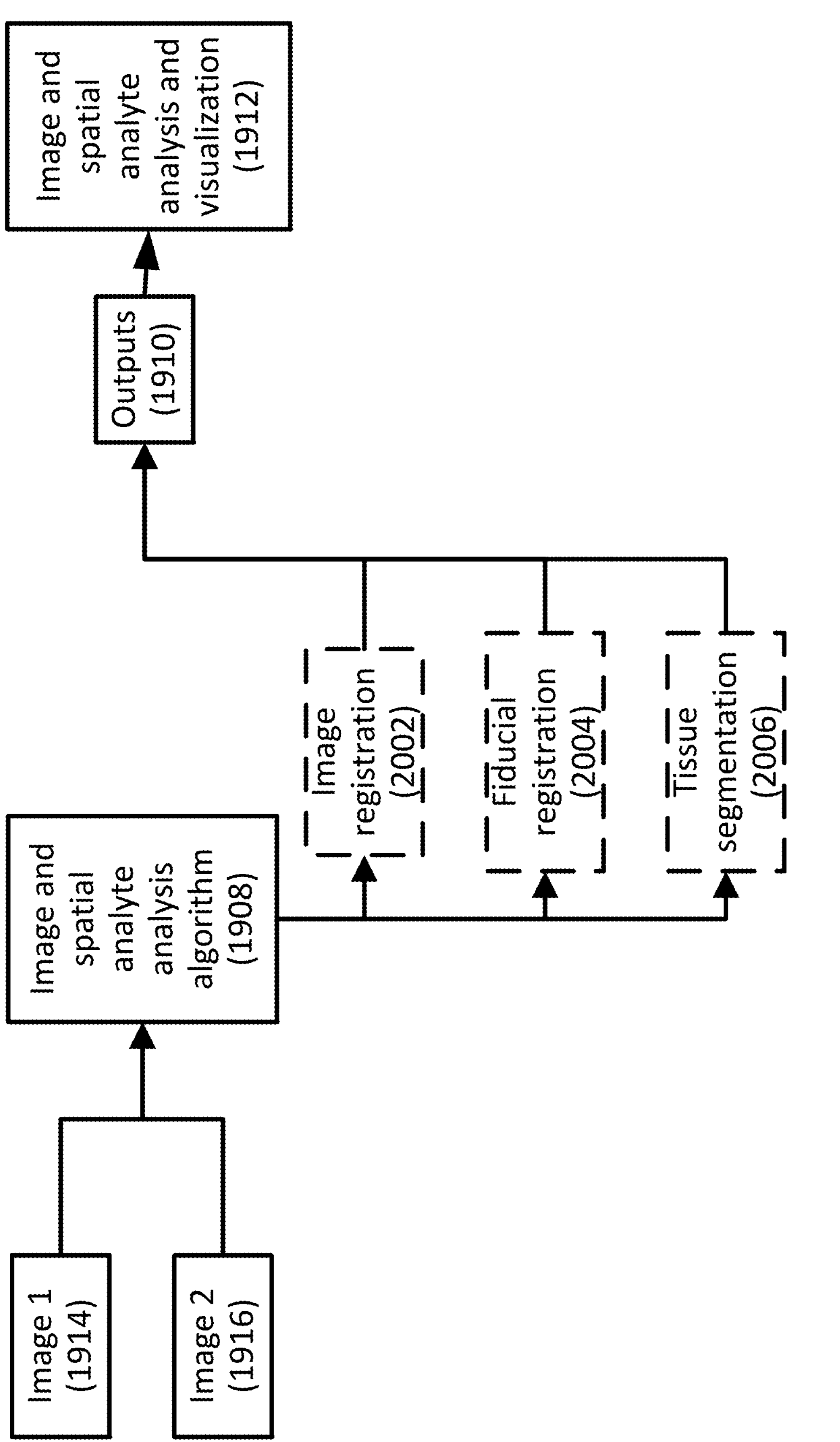
FIGS. 20A and 20B illustrate example automated workflows for determining a registration for a first image and a second image, in which optional steps are indicated by dashed boxes in accordance with some embodiments of the present disclosure.

In some embodiments, as shown in FIGS. 19B and 20A, the determining the registration does not include the manual image registration process 1902. In some such embodiments, the first image 1914 and the second image 1916 are passed directly to the image and spatial analyte analysis algorithm 1908 comprising the automated process for image analysis and spatial analyte analysis that includes, optionally, an automated process for image registration 2002, an automated process for fiducial registration 2004, and/or an automated process for tissue segmentation 2006. Outputs from the automated algorithm 1910 are then passed to a visualization system 1912 for visualization and further analysis of the image and spatial analyte data, including the overlay of the spatial analyte data with the first image of the biological sample.

Figure 20B:
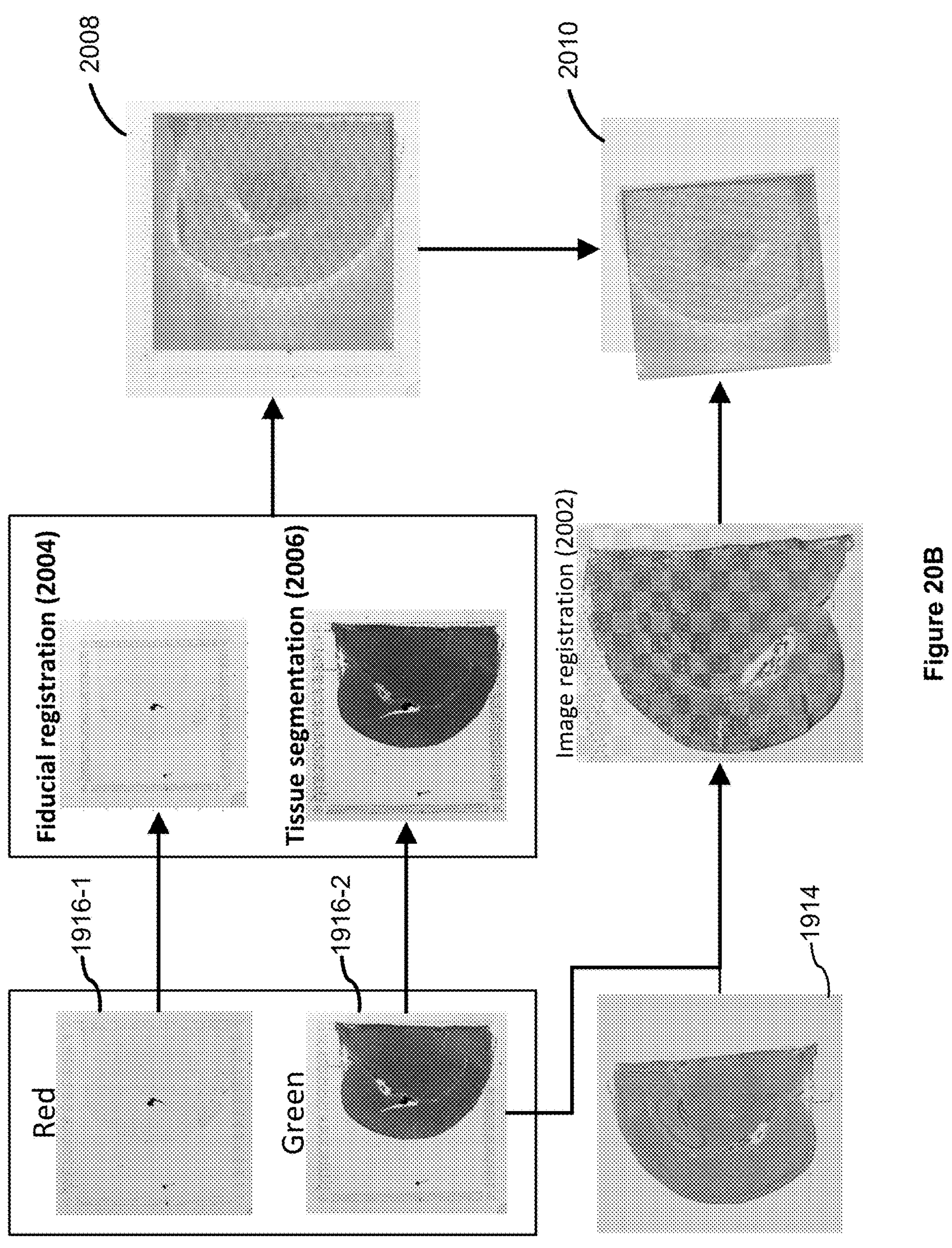

Example inputs and outputs for a spatial analysis workflow, including an image registration workflow, as outlined in FIGS. 19A-B, and 20A are further illustrated in FIG. 20B, in accordance with some embodiments of the present disclosure. In some embodiments, the first image 1914 is a high-resolution, color microscopy image obtained from the biological sample on the first substrate. In some embodiments, the first image 1914 is obtained using a hematoxylin and eosin stain or an immunofluorescence stain. In some embodiments, the second image 1916 is a low-resolution, grayscale image obtained from the biological sample on the first substrate overlayed with a second substrate comprising one or more spatial fiducials and a set of capture spots. In some embodiments, the second image 1916 is a multichannel image comprising a plurality of instances of the second image, each respective instance of the second image being captured at a different corresponding illumination for a different corresponding channel. In some such embodiments, the second image 1916 comprises a first instance acquired at a first illumination (e.g., a red channel 1916-1) and a second instance acquired at a second illumination (e.g., a green channel 1916-2). In some embodiments, the first image does not comprise spatial fiducials, and each respective instance in the plurality of instances of the second image comprises the one or more spatial fiducials of the second substrate.

Figures 19C, 19D, 19E:
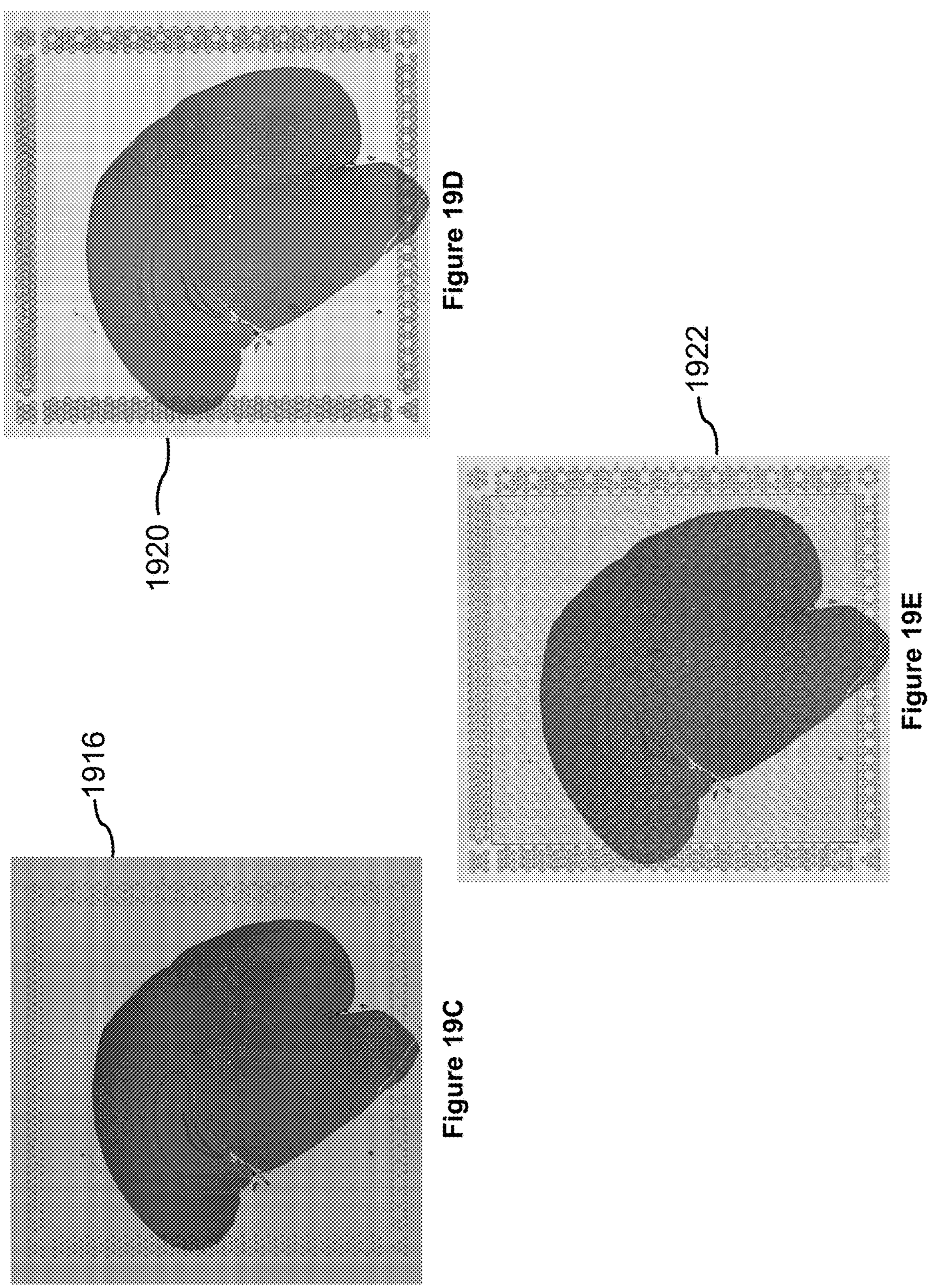
FIGS. 19C, 19D and 19E illustrate example image data used for determining a registration for a first image and a second image, in accordance with some embodiment of the present disclosure.

As shown in FIG. 20A, the first image 1914 and each respective instance of the second image 1916-1 and 1916-2 are inputted into the image and spatial analyte analysis algorithm 1908. In some embodiments, any one of the plurality of instances of a respective image (e.g., the red channel and/or the green channel of the second image) can be selected to perform any of the image and/or spatial analyte analysis steps, including but not limited to fiducial registration 2004, tissue segmentation 2006, and/or image registration 2002. In some embodiments, the selection of a respective instance of an image for use in a particular step or process is determined by the respective illumination at which the instance of the image is acquired. For instance, as described above, in some embodiments, the selection of a respective instance of the second image is determined based on the relative contrast of the biological sample to the one or more spatial fiducials of the second substrate captured by the respective illumination. In some embodiments, as illustrated in FIG. 20B, the red channel of the second image 1916-1 is selected for use in fiducial registration 2004, and the green channel of the second image 1916-2 is selected for use in tissue segmentation 2006. FIGS. 19C-E further illustrate a first instance of an image of a biological sample acquired using bright-field microscopy 1916, a second instance of the image acquired using a first illumination (e.g., red) used for fiducial detection and registration 1920, and a third instance of the image acquired using a second illumination (e.g., green) used for tissue segmentation 1922. Acquisition and selection of multichannel images are further described herein (see, e.g., the section entitled "Obtaining images," above).

In some embodiments, the tissue segmentation 2006 identifies a location of the biological sample in the second image, and the fiducial registration 2004 provides a frame of reference for the biological sample with respect to the one or more spatial fiducials of the second image and to spatial analyte data obtained from a spatial dataset. Using the frame of reference, spatial analyte data is mapped onto the second image of the biological sample. Output 2008 illustrates the second image overlayed onto spatial analyte data.

Output 2010 illustrates the final overlay of spatial analyte data onto the first image, using the registration of the spatial analyte data with the second image and the registration of the second image with the first image. While FIG. 20B illustrates the registration of the second image with the first image using an automated image registration algorithm 2002, any method for determining the registration between the first image and the second image disclosed herein, such as manual image registration 1902, is suitable for use in the method of obtaining an overlay of spatial analyte data onto the first image.

Accordingly, methods for determining a registration between a first image and a second image are further detailed in the following sections.

Selecting Landmarks.

Figure 22:
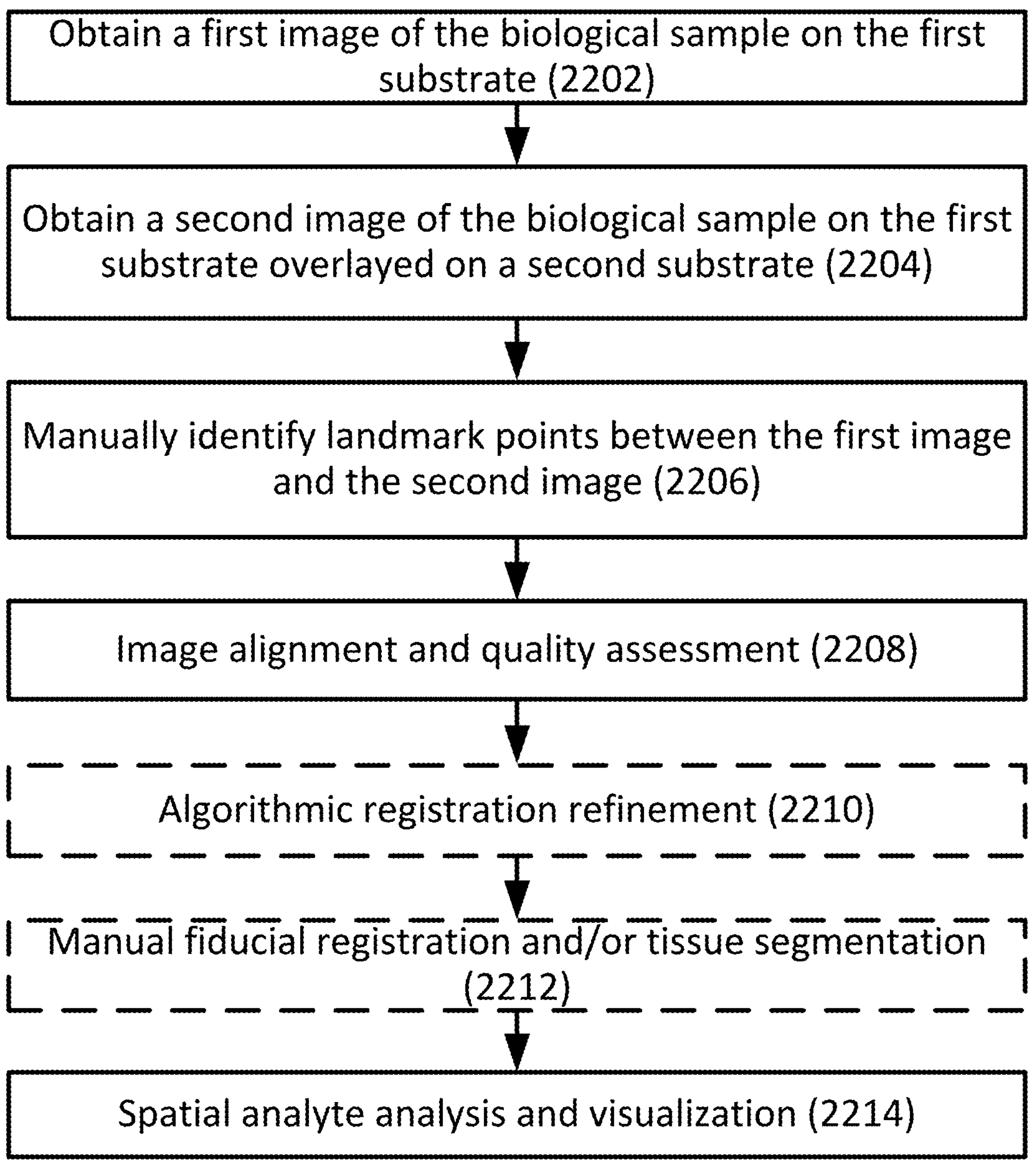
FIG. 22 illustrates an example manual workflow for determining a registration for a first image and a second image, in which optional steps are indicated by dashed boxes in accordance with some embodiments of the present disclosure.

In some embodiments, the determining the registration includes selecting one or more landmarks in order to determine the registration (e.g., via a manual image registration process). For example, as illustrated in FIG. 22, an example manual image registration workflow includes obtaining a first image of the biological sample on a first substrate 2202, obtaining a second image of the biological sample on the first substrate overlayed on a second substrate 2204, manually identifying landmark points between the first image and the second image 2206, performing image alignment and quality assessment 2208, optionally performing algorithmic registration refinement 2210, manual fiducial registration and/or tissue segmentation 2212, and performing spatial analyte analysis and visualization 2214.

For instance, referring to Block 1018, the determining the registration for the first image and the second image includes identifying one or more landmarks 2206. Each respective landmark comprises a respective pair of reference positions including a first respective reference position for the first pattern of the biological sample in the first image and a corresponding second respective reference position for the second pattern of the biological sample in the second image. Thus, a first set of landmark coordinates for the first image and a second set of landmark coordinates for the second image are identified. The method further includes using the first set of landmark coordinates for the first image and the second set of landmark coordinates for the second image to obtain a transformation between the first set of landmark coordinates and the second set of landmark coordinates with an alignment algorithm, thus obtaining a first alignment of the first image with the second image.

In some embodiments, the alignment algorithm transforms the first set of landmark coordinates for the first image relative to the second set of landmark coordinates for the second image. In some embodiments, the alignment algorithm transforms the second set of landmark coordinates for the second image relative to the first set of landmark coordinates for the first image.

Referring to Block 1020, in some embodiments, the identifying one or more landmarks is performed, on a display, via manual user selection of each respective pair of reference positions in the first image and the second image. In some such embodiments, the method further comprises displaying, on the display, the first image and the second image, thus allowing the user to view, locate and identify the corresponding reference positions on the first image and the second image.

In some embodiments, the manual user selection is performed on a visualization system (e.g., a computer with a display). In some embodiments, the visualization system comprises a display on the computer system comprising one or more processing cores and a memory. In some embodiments, the visualization system comprises a display on the sample handling apparatus 706.

In some embodiments, the visualization system includes visualization tools that can be configured to provide the first image, the second image, and/or the one or more landmarks in one or more visual formats. In some embodiments, the first image and the second image are provided in a GUI of a display of the sample handling apparatus 706. In some embodiments, the visualization tools can be configured on a remote computing device that is communicatively coupled to the sample handling apparatus 706, such that the first image, the second image, and/or the one or more landmarks can be visualized and/or manipulated on the remote computing device.

In some embodiments, the visualization tools are configured to provide a user input system and user interface, such as a desktop application that provides interactive visualization functionality to perform landmark selection, image registration, fiducial registration, image segmentation and/or any other workflows or processes described herein. In some embodiments, the visualization tools include a browser that can be configured to enable users to evaluate and interact with different views of the first image and/or the second image.

In some embodiments, the visualization system includes a display comprising image setting functionality for adjusting or configuring settings associated with image display, fiducial display, scale display, rotation, image segmentation, and/or resetting the image data. In some embodiments, the display includes one or more image manipulation tools, such as a pointer to select images, landmarks, or menu items, a lasso to select data, and a pen to annotate or mark data. In some embodiments, the display includes one or more viewing panels for viewing the first image, the second image, and/or any associated data. For example, in addition to a primary viewing panel, the display can include a secondary viewing panel that allows a user to interact with the opacity and magnification settings of the first image and/or the second image. In some embodiments, the one or more viewing panels can each individually be configured with image manipulation tools including, but not limited to, image resize functionality, image cropping functionality, image zoom functionality, image capture functionality, tile view functionality, list view functionality, or the like.

Thus, in some embodiments, the selection of landmarks includes modifying the first and/or the second image. For example, in some implementations, the manual user selection of the one or more landmarks is performed by manually selecting (e.g., clicking, circling, and/or dragging and dropping a marker) the corresponding positions in the first and second images of the biological sample, as displayed on the display.

Figure 30A:
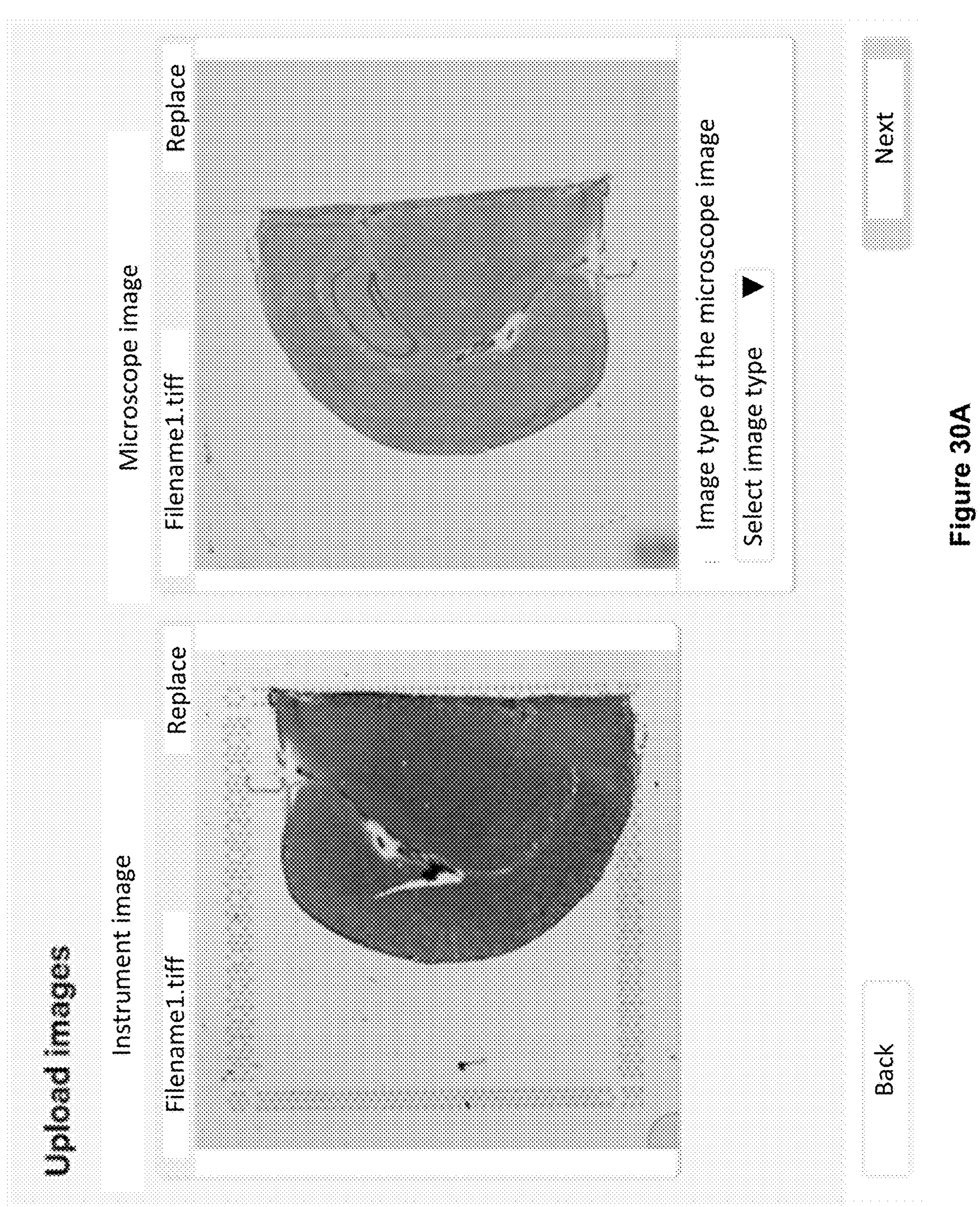
FIGS. 30A, 30B, and 30C collectively illustrate an example method for selecting landmarks, in accordance with some embodiments of the present disclosure.
Figure 30B:
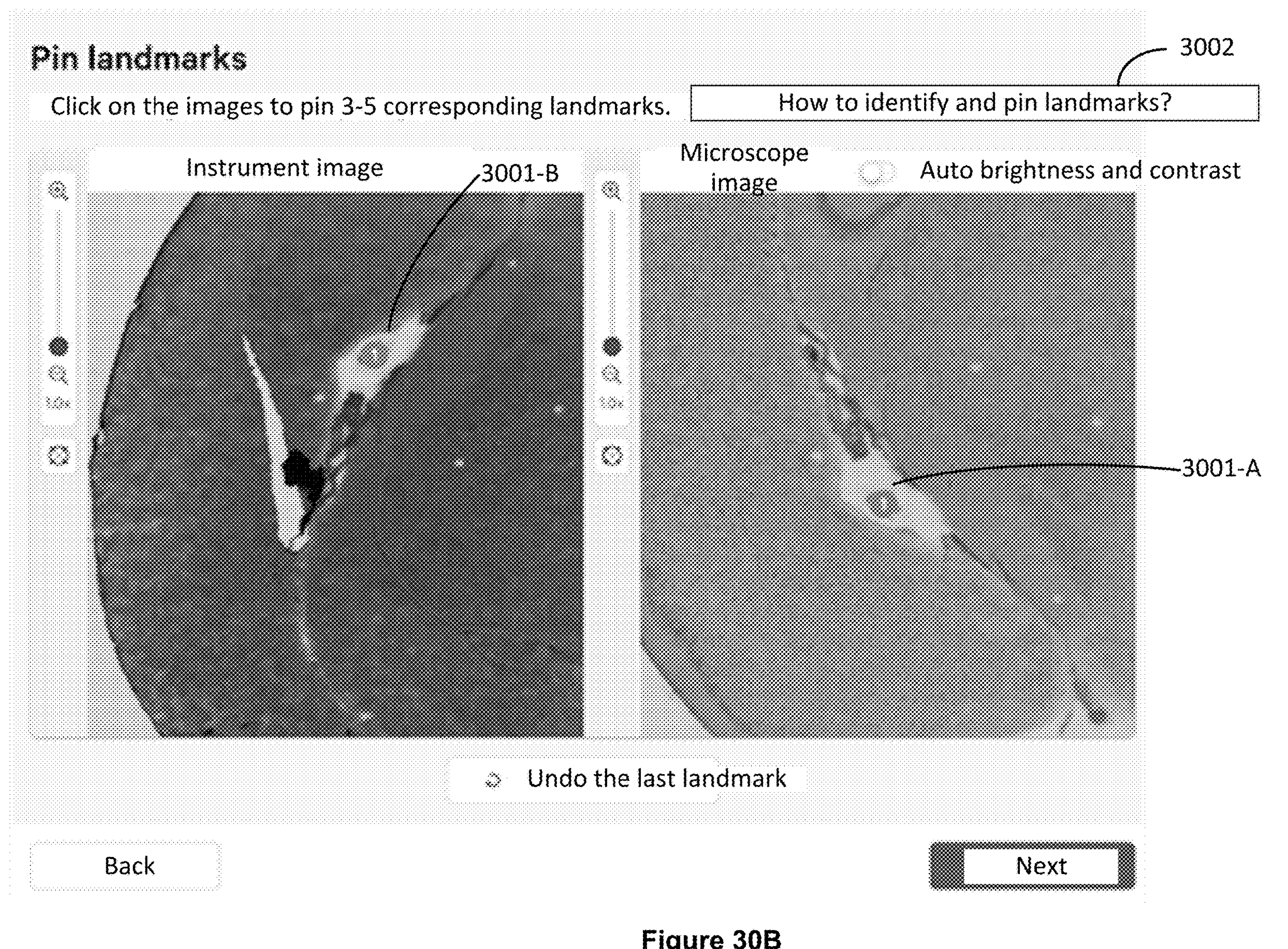
Figure 30C:
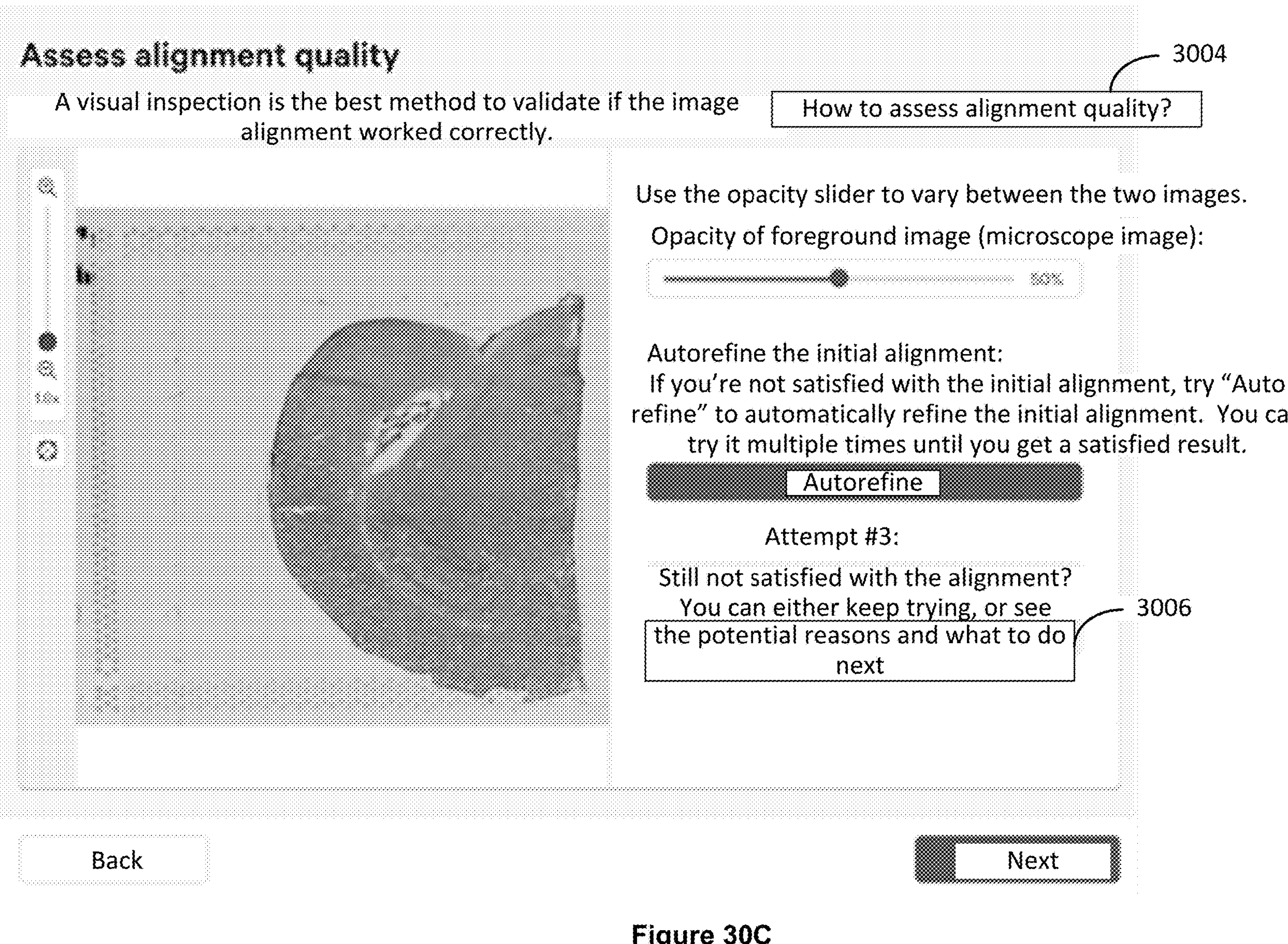

As another example, zoom functionality for landmark selection is illustrated in the workflow in FIGS. 30A-30C. FIG. 30A illustrates a first image (e.g., "Microscope image") and a second image (e.g., "Instrument image"). Portions of the first image (e.g., "Microscope image") and the second image (e.g., "Instrument image") after zooming are shown in FIG. 30B. FIG. 30B also illustrates placement of a landmark 3001, in which a first respective reference position for the first pattern of the biological sample in the first image 3001-A and a second respective reference position for the second pattern of the biological sample in the second image 3001-B are placed at distinctive features in the zoomed-in portions of the first and second images. Alignment of the first and second images based on the placement of one or more landmarks is shown in FIG. 30C, which can be assessed for alignment quality.

As described above, in some embodiments, the first image and/or the second image is downsampled. Advantageously, in some such embodiments, the downsampling of a respective image is performed such that the image registration, including visualization, landmark selection, transformation, and/or assessment of image alignment, can be performed in a computationally efficient manner.

As indicated above, for instance, in some embodiments, the downsampling of a respective image results in an ending resolution of no more than $1\times10^9$, no more than $1\times10^8$, no more than $1\times10^7$, no more than $1\times10^6$, no more than 100,000, no more than 10,000, or no more than 1000.

Moreover, in some embodiments, the downsampling of a respective image is performed such that the downsampled image retains a sufficiently high resolution to allow for image zoom functionality while retaining clear visualization of the features in the respective image.

As indicated above, for instance, in some embodiments, the downsampling of a respective image results in an ending resolution of at least 100, at least 500, at least 1000, at least 5000, at least 10,000, at least 50,000, at least 100,000, at least 500,000, at least $1\times10^6$, at least $2\times10^6$, at least $3\times10^6$, at least $5\times10^6$, at least $8\times10^6$, at least $1\times10^7$, or at least $1\times10^8$.

In some embodiments, the first image and/or the second image has a starting resolution of at least $1\times10^8$ and is downsampled to an ending resolution of from $1\times10^5$ to $1\times10^7$.

Visualization systems, including sample handling apparatus 706, are further described in, e.g., U.S. Patent Application No. 63/080,547, entitled "Sample Handling Apparatus and Image Registration Methods," filed Sep. 18, 2020, U.S. Patent Application No. 63/080,514, entitled "Sample Handling Apparatus and Fluid Delivery Methods," filed Sep. 18, 2020, U.S. Patent Application No. 63/155,173, entitled "Sample Handling Apparatus and Image Registration Methods," filed Mar. 1, 2021, and PCT Application No. US2019/065100, entitled "Imaging system hardware," filed Dec. 6, 2019, each of which is hereby incorporated by reference herein in its entirety.

In some embodiments, the one or more landmarks comprises 3, 4, 5, 6, 7, 8, 9, or 10 landmarks. In some embodiments, the one or more landmarks comprises at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 25, at least 30, or at least 40 landmarks. In some embodiments, the one or more landmarks comprises no more than 50, no more than 40, no more than 30, no more than 20, no more than 15, no more than 10, or no more than 5 landmarks. In some embodiments, the one or more landmarks comprises from 3 to 20, from 3 to 10, from 3 to 5, from 5 to 40, or from 10 to 20 landmarks. In some embodiments, the one or more landmarks falls within another range starting no lower than 3 landmarks and ending no higher than 50 landmarks.

In some embodiments, the one or more landmarks consists of 3, 4, 5 or 6 landmarks. In some embodiments, the one or more landmarks consists of 3, 4, or 5 landmarks.

In some embodiments, a respective landmark in the one or more landmarks is selected by identifying a distinctive element in the biological sample. In some such embodiments, the first respective reference position for the first pattern of the biological sample in the first image and the corresponding second respective reference position for the second pattern of the biological sample in the second image are identified by visually assessing the first and second images for matching elements and marking, by a manual user selection, the positions of the matching elements.

For instance, in some embodiments, a respective reference position for a respective pattern of the biological sample is identified at a histological feature of the biological sample. In some embodiments, the histological feature of the biological sample is a fissure, a hole, or an edge of the biological sample. In some embodiments, the histological feature of the biological sample is a structural element of the biological sample on the first and/or the second substrate.

In some embodiments, the determining the registration for the first image and the second image includes identifying the one or more landmarks using the first image and the second image. In some embodiments, the determining the registration for the first image and the second image includes identifying the one or more landmarks using the first pattern (e.g., a mask) of the biological sample in the first image and the second pattern (e.g., a mask) of the biological sample in the second image.

In some embodiments, the method includes adding a reference position to at least one of the first image and the second image. In some embodiments, the method includes removing a reference position from at least one of the first image and the second image. In some embodiments, the method includes manually selecting a user affordance to remove all of the previously selected reference positions from at least one of the first image and the second image.

In some embodiments, the method includes adding a landmark to the one or more landmarks in both the first and second images. In some embodiments, the method includes removing a landmark from the one or more landmarks in both the first and second images. In some embodiments, the method includes manually selecting a user affordance to remove all of the previously selected landmarks from both the first image and the second image.

In some embodiments, the identifying one or more landmarks further comprises displaying, on a display, a selection guidance window comprising one or more landmark selection recommendations.

In some embodiments, the displaying the selection guidance window is performed responsive to a user selection of a recommendation affordance on the display. For example, FIG. 30B illustrates a recommendation affordance 3002 on a display.

Figure 33:
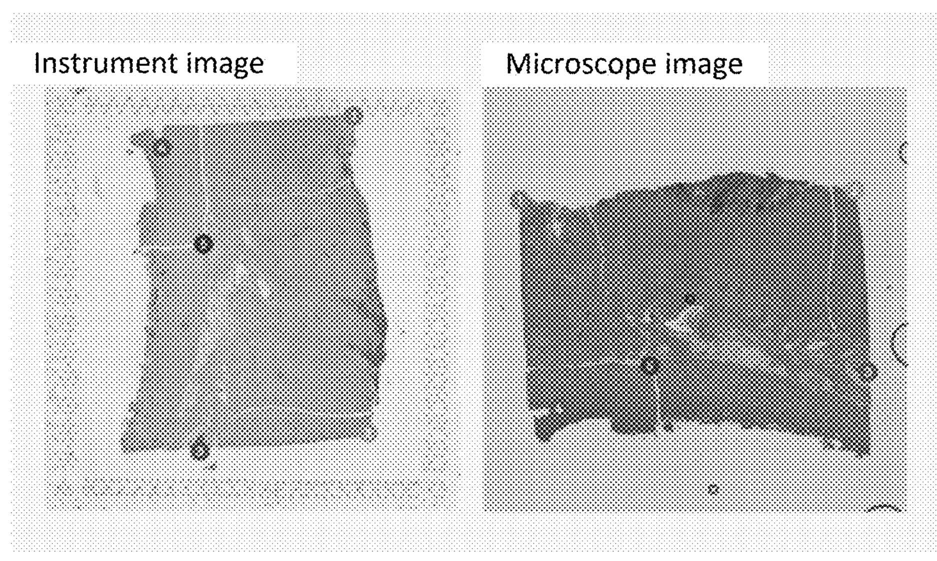
FIG. 33 illustrates example selection of landmarks, in accordance with an embodiment of the present disclosure.
Figure 33:
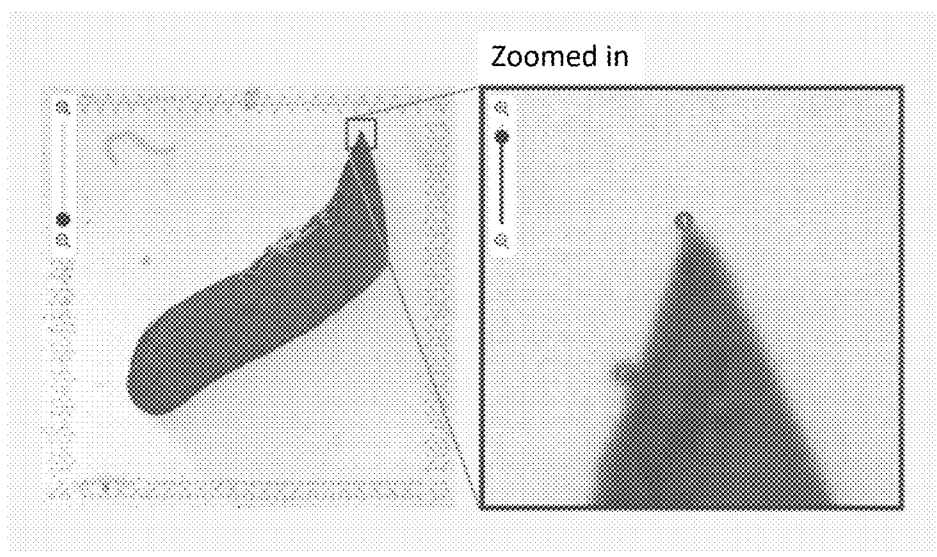

In some embodiments, the one or more landmark selection recommendations comprises a recommendation to identify common visually recognizable features on the first image and the second image, and to place corresponding reference positions for the respective landmarks at the common features. Examples of landmark selection are illustrated in FIG. 33.

In some embodiments, the one or more landmark selection recommendations is selected from the group consisting of a minimum number of landmarks, a maximum number of landmarks, an edge positioning recommendation, a region positioning recommendation, a minimum distance, a non-linear placement recommendation, a pixel level selection recommendation, a unique feature recommendation, and/or a minimum zoom.

In some embodiments, the identifying one or more landmarks comprises identifying a minimum number of landmarks. In some such embodiments, the minimum number of landmarks is 1 or more, 2 or more, 3 or more, 4 or more, 5 or more, 6 or more, 7 or more, 8 or more, 9 or more, 10 or more, 15 or more, or 20 or more, or more than 20 landmarks. In some embodiments, the minimum number of landmarks is no more than 30, no more than 20, no more than 10, no more than 5, or no more than 3 landmarks. In some embodiments, the minimum number of landmarks is from 2 to 5, from 1 to 10, from 3 to 8, from 5 to 20, or from 10 to 30 landmarks. In some embodiments, the minimum number of landmarks falls within another range starting no lower than 1 landmark and ending no higher than 30 landmarks.

In some embodiments, the identifying one or more landmarks comprises identifying a maximum number of landmarks. In some such embodiments, the maximum number of landmarks is at least 3, at least 4, at least 5, at least 6, at least 7, at least 8, at least 9, at least 10, at least 15, at least 20, at least 30, or at least 50 landmarks. In some embodiments, the maximum number of landmarks is no more than 100, no more than 50, no more than 20, or no more than 10 landmarks. In some embodiments, the maximum number of landmarks is from 3 to 10, from 5 to 15, from 10 to 20, from 20 to 50, or from 30 to 100 landmarks. In some embodiments, the maximum number of landmarks falls within another range starting no lower than 3 landmarks and ending no higher than 100 landmarks.

In some embodiments, the identifying one or more landmarks comprises identifying from 3 to 5, from 1 to 10, from 2 to 20, from 3 to 16, or from 5 to 8 landmarks. In some embodiments, the one or more landmarks falls within another range starting no lower than 1 landmark and ending no higher than 100 landmarks.

In some embodiments, identifying one or more landmarks comprises identifying a respective landmark at a visually distinct edge. For instance, in some such embodiments, for a respective landmark in the one or more landmarks, the first respective reference position is placed at a visually distinct edge for the first pattern of the biological sample in the first image and the second respective reference position is placed at a corresponding visually distinct edge for the second pattern of the biological sample in the second image.

In some embodiments, the identifying one or more landmarks comprises identifying at least a first number of landmarks in at least a first plurality of regions for each respective image. For instance, in some implementations, the identifying one or more landmarks comprises, for each respective image in the first image and the second image, identifying a corresponding reference position in each respective region in a plurality of regions for the corresponding pattern of the biological sample. In some such embodiments, each respective region in the plurality of regions is a different quadrant of the corresponding pattern of the biological sample. Accordingly, in some such embodiments, the identifying one or more landmarks identifies at least one landmark in each of all four quadrants of the image. In some embodiments, the identifying one or more landmarks identifies at least one landmark in three of the four quadrants of the image.

In some embodiments, the first number of landmarks is at least 1, at least 2, at least 3, at least 4, or at least 5. In some embodiments, the first number of landmarks falls within the ranges disclosed herein for the minimum and/or maximum numbers of landmarks. In some embodiments, the first plurality of regions is at least 1, at least 2, at least 3, at least 4, at least 5, at least 6, at least 7, at least 8, at least 9, or at least 10 regions. In some embodiments, the first plurality of regions is no more than 20, no more than 10, no more than 5, or no more than 3 regions. In some embodiments, the first plurality of regions is from 3 to 5, from 2 to 10, or from 5 to 20 regions. In some embodiments, the first plurality of regions falls within another range starting no lower than 1 region and ending no higher than 20 regions. In some embodiments, the first plurality of regions for a respective image is a plurality of quadrants for the respective image.

In some embodiments, a landmark of the one or more landmarks is identified at a minimum distance from another landmark in the one or more landmarks. In some embodiments, each respective landmark of the one or more landmarks is identified at a minimum distance from any other landmark of the one or more landmarks.

In some embodiments, the minimum distance is a number of pixels. In some embodiments, the minimum distance is at least 2, at least 3, at least 4, at least 5, at least 10, at least 15, at least 20, at least 50, at least 100, at least 200, or at least 300 pixels. In some embodiments, the minimum distance is no more than 500, no more than 300, no more than 200, no more than 100, no more than 50, no more than 20, or no more than 10 pixels. In some embodiments, the minimum distance is from 2 to 10, from 5 to 40, from 10 to 30, from 20 to 100, from 40 to 300, or from 100 to 500 pixels. In some embodiments, the minimum distance falls within another range starting no lower than 2 pixels and ending no higher than 500 pixels.

In some embodiments, the minimum distance is a percentage of the total number of pixels in one or both of the first and second images. In some embodiments, the minimum distance is at least 0.005%, at least 0.008%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 15%, at least 20%, or at least 30% of the total pixels in one or both of the first and second images. In some embodiments, the minimum distance is no more than 50%, no more than 30%, no more than 20%, no more than 10%, no more than 5%, no more than 1%, no more than 0.5%, or no more than 0.1% of the total pixels in one or both of the first and second images. In some embodiments, the minimum distance is from 0.01% to 10%, from 0.1% to 20%, from 0.05% to 1%, from 0.005% to 30%, from 0.5% to 15%, or from 1% to 10% of the total pixels in one or both of the first and second images. In some embodiments, the minimum distance falls within another range starting no lower than 0.005% of the total pixels in one or both of the first and second images and ending no higher than 50% of the total pixels in one or both of the first and second images.

In some embodiments, a landmark of the one or more landmarks is identified at a maximum distance from another landmark of the one or more landmarks. In some embodiments, each respective landmark of the one or more landmarks is identified at a maximum distance from any other landmark of the one or more landmarks. In some embodiments, the maximum distance is a number of pixels. In some embodiments, the maximum distance is at least 2, at least 3, at least 4, at least 5, at least 10, at least 15, at least 20, at least 50, at least 100, at least 200, or at least 300 pixels. In some embodiments, the maximum distance is no more than 500, no more than 300, no more than 200, no more than 100, no more than 50, no more than 20, or no more than 10 pixels. In some embodiments, the maximum distance is from 2 to 10, from 5 to 40, from 10 to 30, from 20 to 100, from 40 to 300, or from 100 to 500 pixels. In some embodiments, the maximum distance falls within another range starting no lower than 2 pixels and ending no higher than 500 pixels.

In some embodiments, the maximum distance is a percentage of the total number of pixels in one or both of the first and second images. In some embodiments, the maximum distance is at least 0.005%, at least 0.008%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 15%, at least 20%, or at least 30% of the total pixels in one or both of the first and second images. In some embodiments, the maximum distance is no more than 50%, no more than 30%, no more than 20%, no more than 10%, no more than 5%, no more than 1%, no more than 0.5%, or no more than 0.1% of the total pixels in one or both of the first and second images. In some embodiments, the maximum distance is from 0.01% to 10%, from 0.1% to 20%, from 0.05% to 1%, from 0.005% to 30%, from 0.5% to 15%, or from 1% to 10% of the total pixels in one or both of the first and second images. In some embodiments, the maximum distance falls within another range starting no lower than 0.005% of the total pixels in one or both of the first and second images and ending no higher than 50% of the total pixels in one or both of the first and second images.

In some embodiments, the one or more landmarks comprises at least 3 landmarks, and the identifying one or more landmarks comprises identifying landmarks that are placed in a non-linear manner. For instance, in some such implementations, the one or more landmarks comprises at least 3 landmarks, and, for each respective image in the first image and the second image, the corresponding reference position for a first respective landmark in the at least 3 landmarks is placed in a non-linear manner from the corresponding reference positions for at least a second respective landmark and a third respective landmark in the at least 3 landmarks. As another example, in some such embodiments, the one or more landmarks comprises at least 3 landmarks placed in a triangular formation. In some embodiments, the one or more landmarks comprises at least 4 landmarks placed in a quadrilateral formation.

Figure 31:
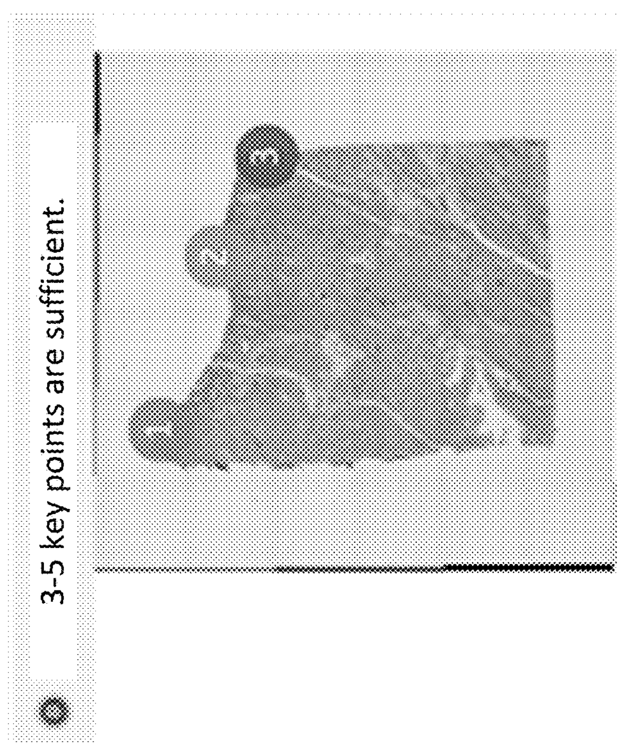
FIG. 31 illustrates an example of landmark selection, in accordance with an embodiment of the present disclosure.
Figure 31:
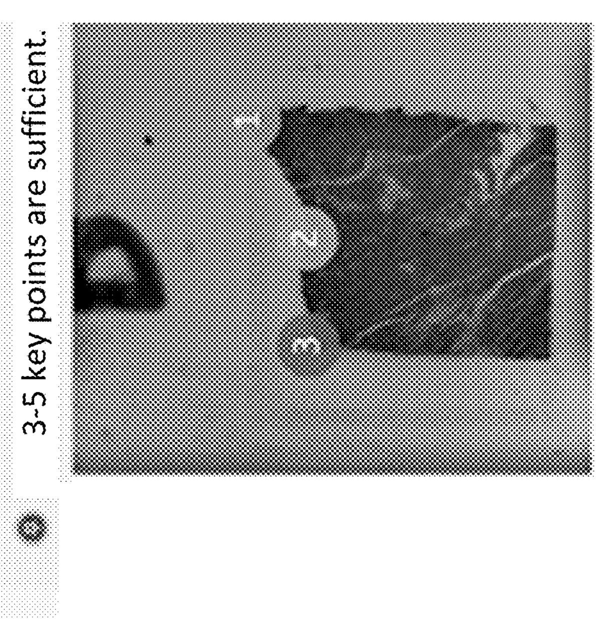

For example, FIG. 31 illustrates the one or more landmarks placed in a linear manner.

In some embodiments, the identifying one or more landmarks comprises identifying landmarks at the pixel level (e.g., at a high level of zoom).

In some embodiments, the identifying one or more landmarks comprises identifying landmarks at the same unique feature across both images.

In some embodiments, the identifying one or more landmarks comprises identifying landmarks at a minimum zoom. In some embodiments, the minimum zoom is at least 1.1×, at least 1.2×, at least 1.5×, at least 2×, at least 3×, at least 4×, at least 5×, at least 10×, or at least 20×.

In some embodiments, the method comprises rejecting one or more landmarks that do not meet one or more selection criteria. In some such embodiments, the one or more selection criteria include any of the characteristics of the one or more landmarks disclosed above (e.g., selection of a landmark is rejected if it is not a minimum distance from another previously selected landmark, if it falls within a linear path with two or more previously selected landmarks, and/or if it is not placed at the pixel level).

In some embodiments, the method comprises issuing a warning and/or an error message to a user based on a selection of one or more landmarks that do not meet a respective selection criterion in the one or more selection criteria. For example, in some embodiments, the method comprises issuing a warning and/or an error message when the selection of landmarks does not meet a minimum and/or a maximum landmark recommendation, when a respective landmark is not a minimum distance from another previously selected landmark, when a respective landmark falls within a linear path with two or more previously selected landmarks, and/or when a respective landmark is not placed at the pixel level.

In some embodiments, the identifying one or more landmarks comprises applying, for each respective landmark in the one or more landmarks, a maximum value for an offset between (i) the first respective reference position for the first pattern of the biological sample in the first image and (ii) the second respective reference position for the second pattern of the biological sample in the second image, wherein the offset between the first and second reference positions is determined relative to a common feature in both the first image and the second image.

For example, in some such embodiments, the maximum offset value advantageously determines whether, for each respective image in the first and second images, the respective reference position of a corresponding landmark in the respective image is sufficiently close to a common feature.

Figure 32A:
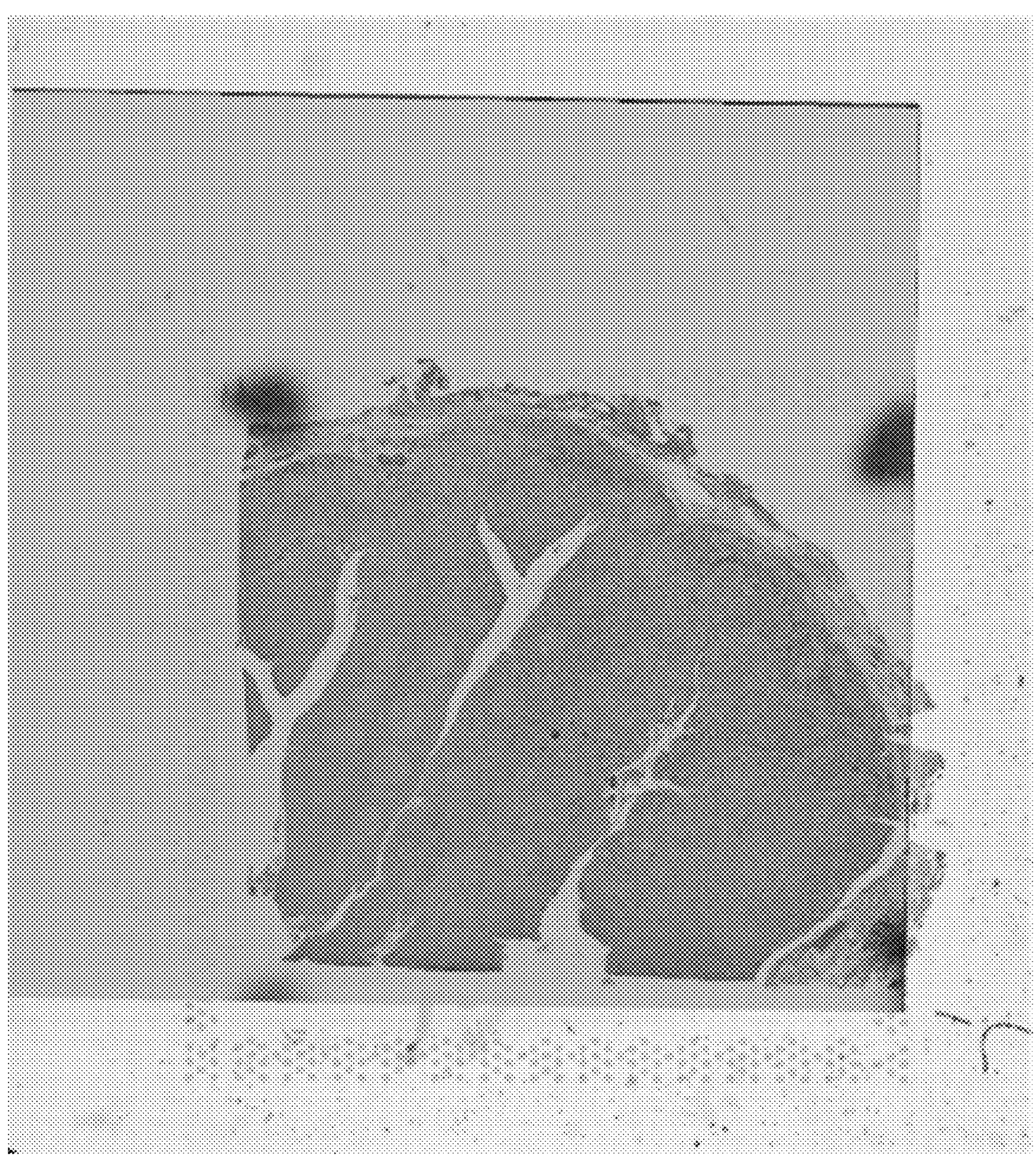
FIGS. 32A, 32B, 32C, and 32D illustrate examples of image alignment based on a first set of landmark coordinates for a first image relative to a second set of landmark coordinates for a second image, in accordance with some embodiments of the present disclosure.
Figure 32B:
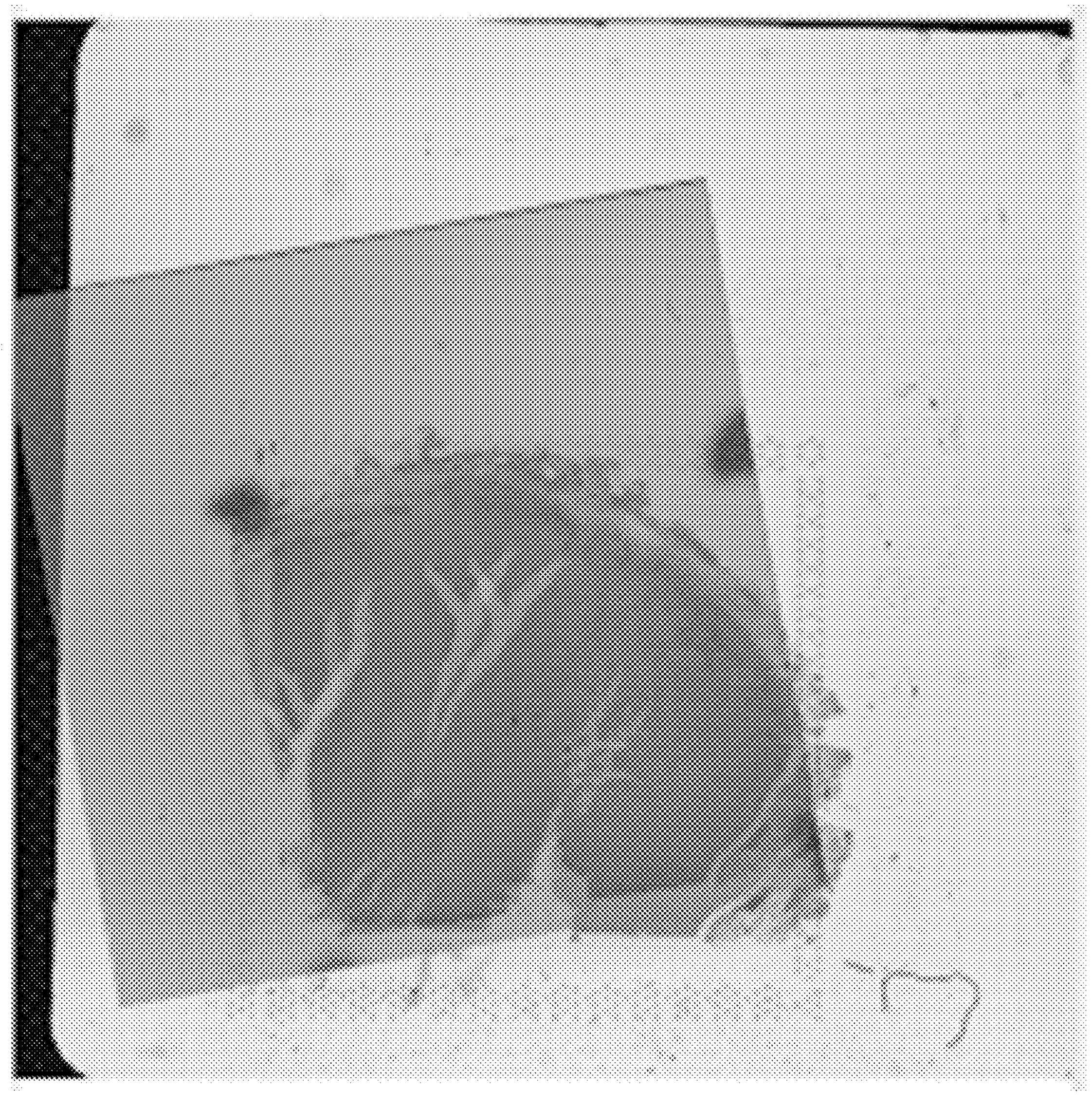
Figure 32C:
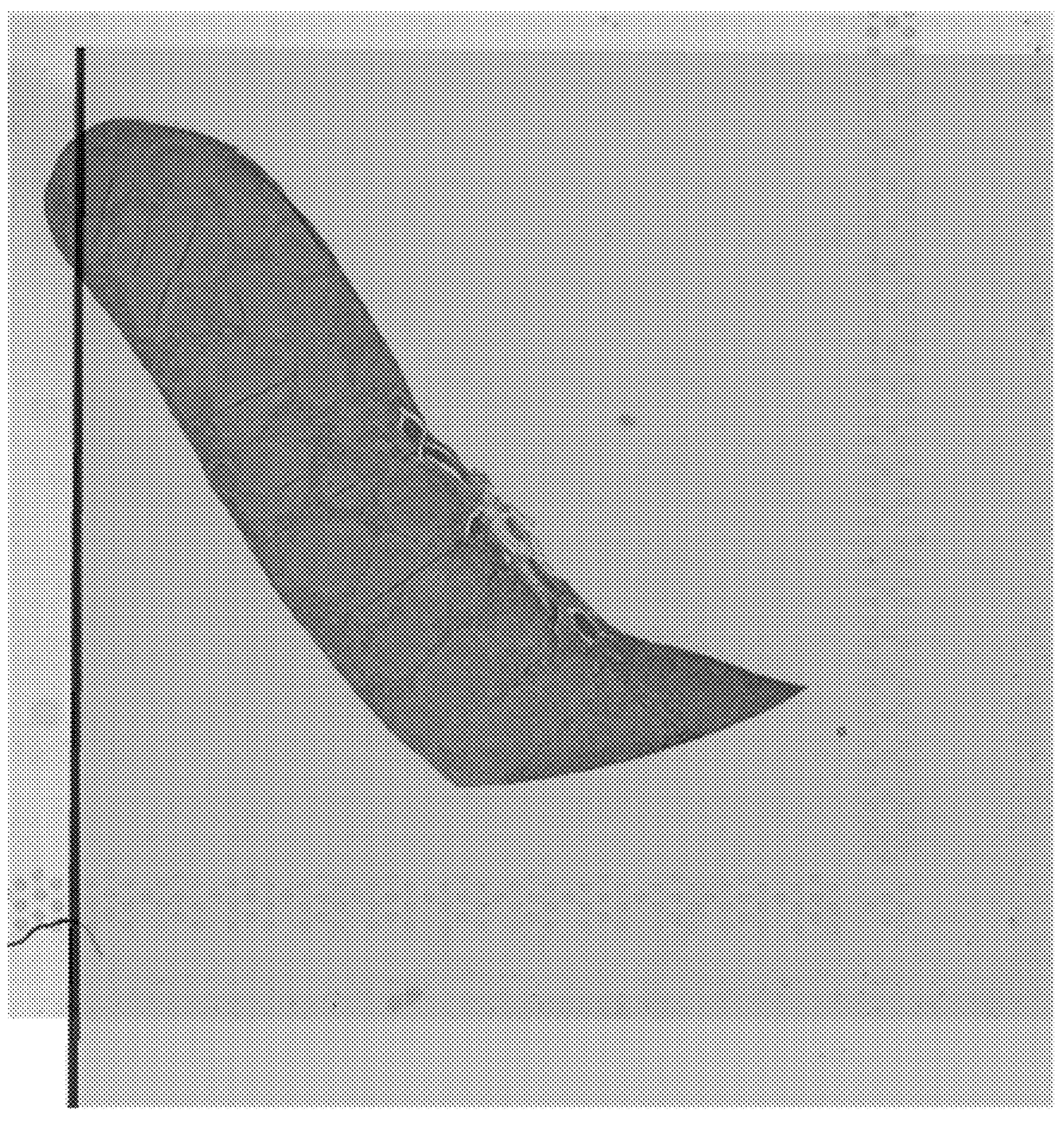
Figure 32D:
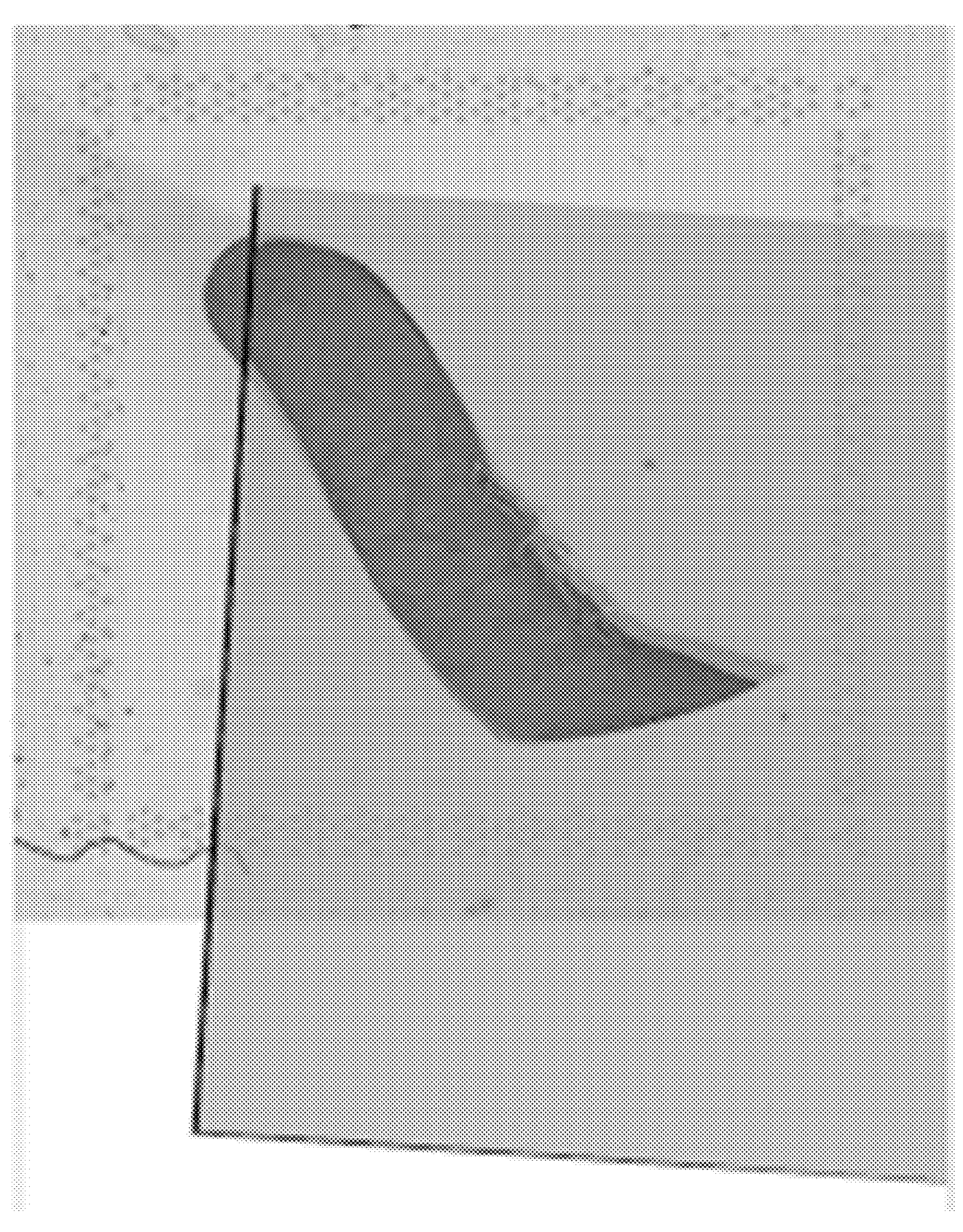

For example, FIGS. 32A-D illustrate various alignments that can occur when an offset between the first and a second reference position, for each respective landmark in one or more landmarks selected for a first image and a second image, is approximately 250 pixels (FIG. 32A), approximately 315 pixels (FIG. 32B), approximately 150 pixels (FIG. 32C), and approximately 248 pixels (FIG. 32D). Notably, an offset of approximately 150 pixels, illustrated in FIG. 32C, was nevertheless sufficient to achieve a robust alignment between the first image and the second image, whereas offsets of approximately 248 pixels or greater (FIGS. 32A, 32B, and 32D) resulted in poor alignments.

In some embodiments, the maximum value for the offset is a number of pixels. In some embodiments, the maximum value for the offset is 300 pixels or less. In some embodiments, the maximum offset value is at least 10, at least 20, at least 50, at least 100, at least 200, at least 300, at least 500, or at least 1000 pixels. In some embodiments, the maximum offset value is no more than 2000, no more than 1000, no more than 500, no more than 300, no more than 200, no more than 100, or no more than 50 pixels. In some embodiments, the maximum offset value is from 20 to 100, from 50 to 400, from 100 to 300, from 200 to 1000, from 400 to 3000, or from 100 to 500 pixels. In some embodiments, the maximum offset value falls within another range starting no lower than 10 pixels and ending no higher than 2000 pixels.

In some embodiments, the maximum offset value is a percentage of the total number of pixels in one or both of the first and second images. In some embodiments, the maximum offset value is at least 0.005%, at least 0.008%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 15%, at least 20%, or at least 30% of the total pixels in one or both of the first and second images. In some embodiments, the maximum offset value is no more than 50%, no more than 30%, no more than 20%, no more than 10%, no more than 5%, no more than 1%, no more than 0.5%, or no more than 0.1% of the total pixels in one or both of the first and second images. In some embodiments, the maximum offset value is from 0.01% to 10%, from 0.1% to 20%, from 0.05% to 1%, from 0.005% to 30%, from 0.5% to 15%, or from 1% to 10% of the total pixels in one or both of the first and second images. In some embodiments, the maximum offset value falls within another range starting no lower than 0.005% of the total pixels in one or both of the first and second images and ending no higher than 50% of the total pixels in one or both of the first and second images.

In some embodiments, the identifying one or more landmarks further comprises displaying, on a display, an assessment guidance window comprising one or more alignment quality assessment recommendations. In some embodiments, the displaying the assessment guidance window is performed responsive to a user selection of an assessment guidance affordance on the display (e.g., as illustrated by affordance 3004 in FIG. 30C).

In some embodiments, the identifying one or more landmarks further comprises performing an autorefinement, responsive to a user selection of an autorefinement affordance on the display.

In some embodiments, the identifying one or more landmarks further comprises displaying, on a display, a troubleshooting guidance window comprising one or more troubleshooting recommendations. In some embodiments, the displaying the troubleshooting guidance window is performed responsive to a user selection of a troubleshooting affordance on the display (e.g., as illustrated by affordance 3006 in FIG. 30C).

In some embodiments, the determining the registration further comprises performing, on a display, via user interaction, a manual alignment of the first image and the second image. In some embodiments, the manual alignment is selected from the group consisting of a translation, a scaling, and a rotation. For instance, in an example embodiment, the determining the registration comprises manually aligning the one or more landmarks by manually selecting, via a user interface on a display, one of the first image and the second image and performing one or more of: translation (e.g., dragging and dropping the selected image onto the other image), scaling (e.g., resizing the selected image based on the size of the other image), rotation and/or flipping (e.g., adjusting the orientation of the selected image based on the orientation of the other image).

In some embodiments, the one or more of the translation, scaling, and rotation results in an overlay of the first image and the second image.

In some embodiments, the manual alignment of the first image and the second image is performed prior to the obtaining a transformation between the first set of landmark coordinates and the second set of landmark coordinates with an alignment algorithm.

Obtaining Transformations.

In some embodiments, the obtaining a transformation transforms one or more reference points in a first respective image to a coordinate system corresponding to a second respective image. In some embodiments, the obtaining a transformation comprises a single transformation. In some embodiments, the obtaining a transformation comprises a plurality of transformations.

In some embodiments, the transformation is a rigid transform. A rigid transformation allows only for translation and rotation. Thus, when a rigid transformation is used, the first set of landmark coordinates for the first image 1122 are rotated and/or translated to minimize a residual error between the first set of landmark coordinates for the first image and the second set of landmark coordinates for the second image.

In some embodiments, the transformation is a similarity transform. A similarity transformation allows for translation, rotation and isotropic (equal-along-each-axis) scaling. Thus, when a similarity transform is used, the first set of landmark coordinates for the first image 1122 are rotated, translated, and/or isotropically scaled to minimize a residual error between the first set of landmark coordinates for the first image and the second set of landmark coordinates for the second image.

In some embodiments, the transformation is a non-rigid transform that comprises anisotropic scaling and skewing of the first set of landmark coordinates for the first image 1122 to minimize a residual error between the first set of landmark coordinates for the first image and the second set of landmark coordinates for the second image. In some embodiments the non-rigid transform is an affine transformation.

In some embodiments, the transformation transforms a first plurality of pixel coordinates for the first image relative to a second plurality of pixel coordinates for the second image, using any of the transformation methods disclosed herein. In some embodiments, the transformation transforms a second plurality of pixel coordinates for the second image relative to a first plurality of pixel coordinates for the first image, using any of the transformation methods disclosed herein.

In some embodiments, the transformation is a two-dimensional similarity transform. In some embodiments, the transformation is selected from the group consisting of: affine transform, azimuth elevation to cartesian transform, BSpline deformable transform, centered affine transform, centered Euler 3D transform, centered rigid 2D transform, centered similarity 2D transform, elastic body reciprocal spline kernel transform, elastic body spline kernel transform, Euler 2D transform, Euler 3D transform, fixed center of rotation affine transform, identity transform, kernel transform, matrix offset transform, quaternion rigid transform, rigid 2D transform, rigid 3D perspective transform, rigid 3D transform, scalable affine transform, scale logarithmic transform, scale skew versor 3D transform, scale transform, scale versor 3D transform, similarity 2D transform, similarity 3D transform, thin plate R2 Log R spline kernel transform, thin plate spline kernel transform, transform, transform base, translation transform, versor rigid 3D transform, versor transform, and volume spline kernel transform.

In some embodiments the alignment algorithm is a coherent point drift algorithm. See, Myronenko et al., 2007, "Non-rigid point set registration: Coherent Point Drift," NIPS, 1009-1016; and Myronenko and Song, "Point Set Registration: Coherent Point Drift," arXiv: 0905.2635v1, 15 May 2009, each of which is hereby incorporated by reference, for disclosure on the coherent point drift algorithm. In some embodiments, the coherent point drift algorithm that is used is an implementation in Python called pycpd. See, the Internet at github.com/siavashk/pycpd, which is hereby incorporated by reference.

In some embodiments the alignment algorithm is an iterative closest point algorithm. See, for example, Chetverikov et al., 2002, "the Trimmed Iterative Closest Point Algorithm," Object recognition supported by user interaction for service robots, Quebec City, Quebec, Canada, ISSN: 1051-4651; and Chetverikov et al., 2005, "Robust Euclidean alignment of 3D point sets; the trimmed iterative closest point algorithm," Image and Vision Computing 23(3), pp. 299-309, each of which is hereby incorporated by reference.

In some embodiments the alignment algorithm is a robust point matching algorithm (See, for example, Chui and Rangarajanb, 2003, "A new point matching algorithm for non-rigid registration," Computer Vision and Image Understanding 89(2-3), pp. 114-141, which is hereby incorporated by reference) or a thin-plate-spline robust point matching algorithm (See, for example, Yang, 2011, "The thin plate spline robust point matching (TPS-RPM) algorithm: A revisit," Pattern Recognition Letters 32(7), pp. 910-918, which is hereby incorporated by reference.)

Additional embodiments of transformations and alignment algorithms contemplated for use in the present disclosure are further described in, e.g., U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

In some embodiments, the transformation is used to register the first image 1122-1 to the second image 1122-2. FIGS. 23H and 23I illustrate this transformation. In FIG. 23I, the alignment causes the transformation that maps the coordinates of the first image 1122-1 onto the coordinates of the second image 1122-2. Upon such a mapping, as illustrated in FIG. 23I, it is possible to overlay the first image 1122-1 with the second image 1122-2. In other words, the transformation and the coordinate system of one of the first image and the second image can be used to locate a corresponding position in the other of the first image and the second image.

In some embodiments, the transformation transforms the first set of landmark coordinates for the first image relative to the second set of landmark coordinates for the second image, using any of the transformation methods disclosed herein. In some embodiments, the transformation transforms the second set of landmark coordinates for the second image relative to the first set of landmark coordinates for the first image, using any of the transformation methods disclosed herein.

In some embodiments, the transformation further comprises flipping, rotating, cropping, zooming, panning, or overlaying a grid onto a respective image.

In some embodiments, the method further comprises refining the transformation, thereby obtaining a second (e.g., refined) alignment of the first image with the second image. For instance, in some embodiments, referring to Block 1022, the method further comprises refining the transformation using a refinement algorithm, thereby obtaining a second alignment of the first image with the second image. In some embodiments, the refining comprises adjusting the one or more landmarks identified for the first image and the second image. In some embodiments, the refining comprises adding additional landmarks to the one or more identified landmarks. In some embodiments, the refining comprises deleting one or more landmarks from the one or more identified landmarks.

Referring to Block 1024, in some embodiments, the refining is performed if a first similarity metric for the first alignment fails to satisfy an alignment quality parameter. Thus, in some embodiments, the first alignment of the first image with the second image obtained using the transformation is assessed by determining a score (e.g., a similarity metric) and determining whether the score meets or fails to meet an acceptance parameter. Similarity metrics suitable for use herein are further described below (see, for example, the section entitled "Assessment of image alignment").

Referring to Block 1026, in some embodiments, the refining is performed, responsive to a manual user selection, based on a visual assessment by the user of an alignment quality of the first alignment (e.g., as displayed on a display). Thus, in some embodiments, the first alignment of the first image with the second image obtained using the transformation is assessed by visual assessment on a display, and, when the user determines that the alignment is in need of improvement or is otherwise not acceptable, the user can elect to refine the transformation (e.g., using the refinement algorithm and/or using a manual adjustment).

In some embodiments, the refining is performed at least 1 time. In some embodiments, the refining is performed at least 2, at least 3, at least 4, at least 5, at least 6, at least 7, at least 8, at least 9, or at least 10 times. In some embodiments, the refining is performed no more than 20, no more than 15, no more than 10, or no more than 5 times. In some such embodiments, each respective refinement results in a corresponding respective alignment of the first image with the second image. For instance, in some embodiments, each respective refinement in a plurality of refinements results in a corresponding respective refined alignment, thus generating a plurality of refined alignments of the first image with the second image.

In some embodiments, the method further comprises selecting one of a plurality of alignments including the first alignment and one or more refined alignments obtained from a corresponding one or more refinements, thereby aligning the first image with the second image.

For instance, referring to Block 1028, in some embodiments, the method further includes selecting one of the first alignment and the second alignment (e.g., a refined alignment) based on a comparison between a first similarity metric for the first alignment and a second similarity metric for the second alignment, thereby aligning the first image with the second image. Thus, in some embodiments, the first alignment is assessed by determining a score (e.g., a similarity metric) for the first alignment, and each respective refined alignment in one or more refined alignments is similarly assessed by determining a respective score (e.g., a similarity metric) for the respective refined alignment. In some such embodiments, the plurality of scores are compared, and the alignment having the best score is selected. Similarity metrics suitable for use herein are further described below (see, for example, the section entitled "Assessment of image alignment").

Referring to Block 1030, in some embodiments, the method further includes selecting, responsive to a manual user selection, one of the first alignment and the second alignment based on a visual assessment by the user of an alignment quality of the first alignment compared to an alignment quality of the second alignment, thereby aligning the first image with the second image.

In some embodiments, the method includes selecting, responsive to a manual user selection, one of the first alignment and one or more refined alignments obtained from a corresponding one or more refinements, based on a visual assessment by the user of an alignment quality of each respective alignment in the plurality of alignments including the first alignment and the one or more refined alignments, thereby aligning the first image with the second image.

Assessment of Image Alignment.

In some embodiments, a respective alignment of the first image and the second image is assessed by determining a score (e.g., a similarity metric) that evaluates the degree of similarity (or dissimilarity) between the two images.

Figure 10A:
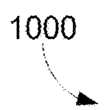
Figure 10B:
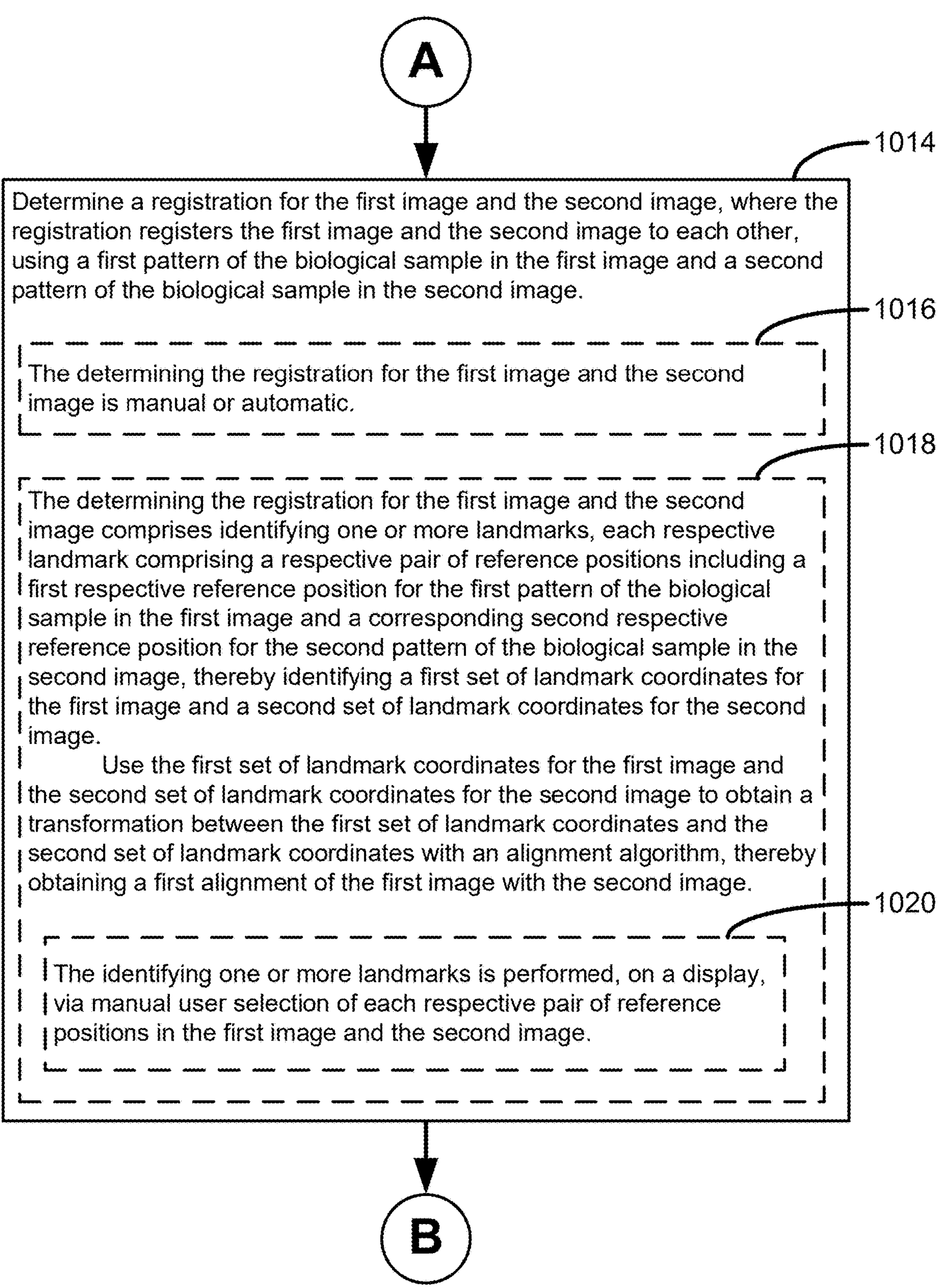
Figure 10C:
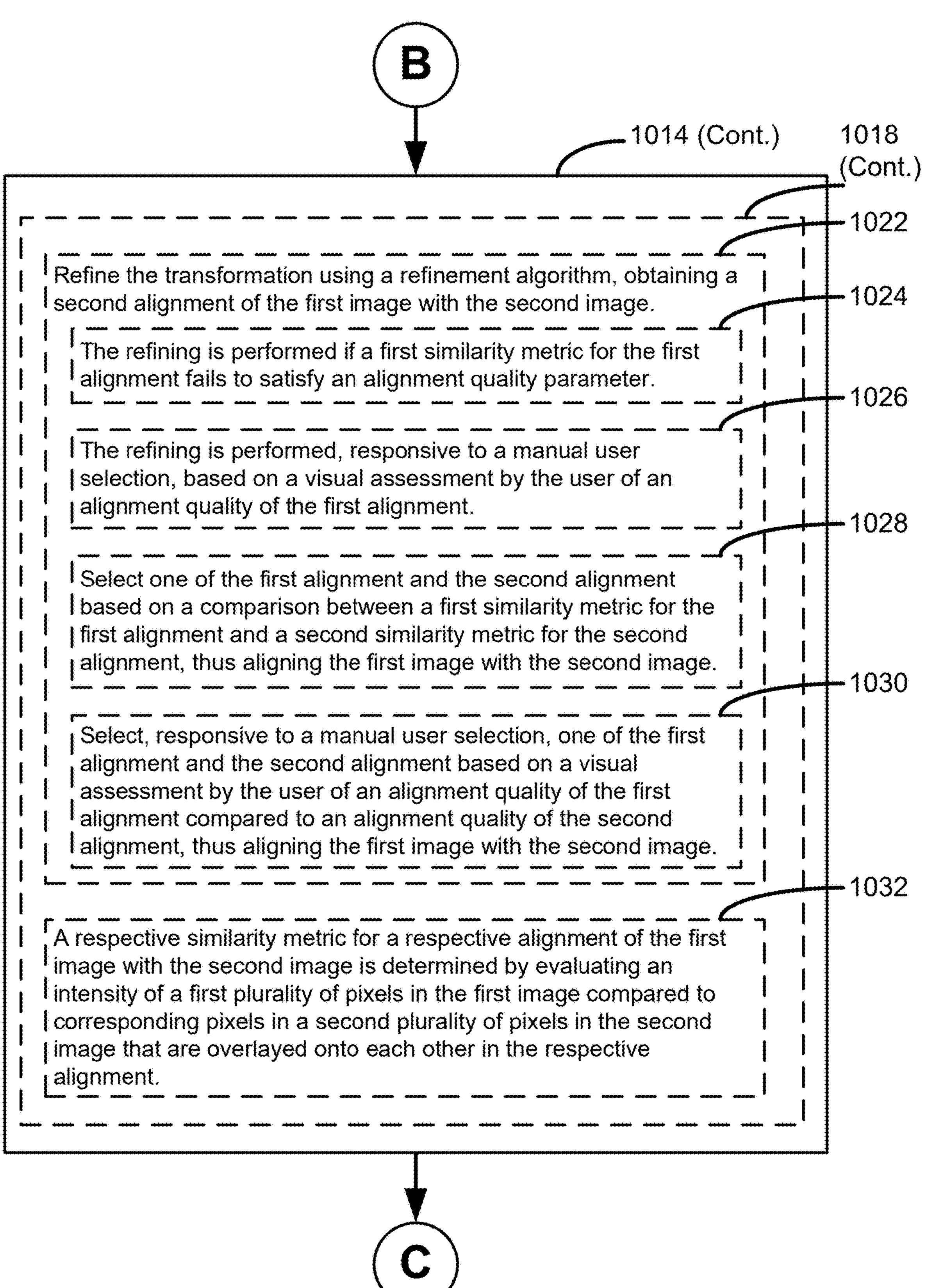
Figure 10E:
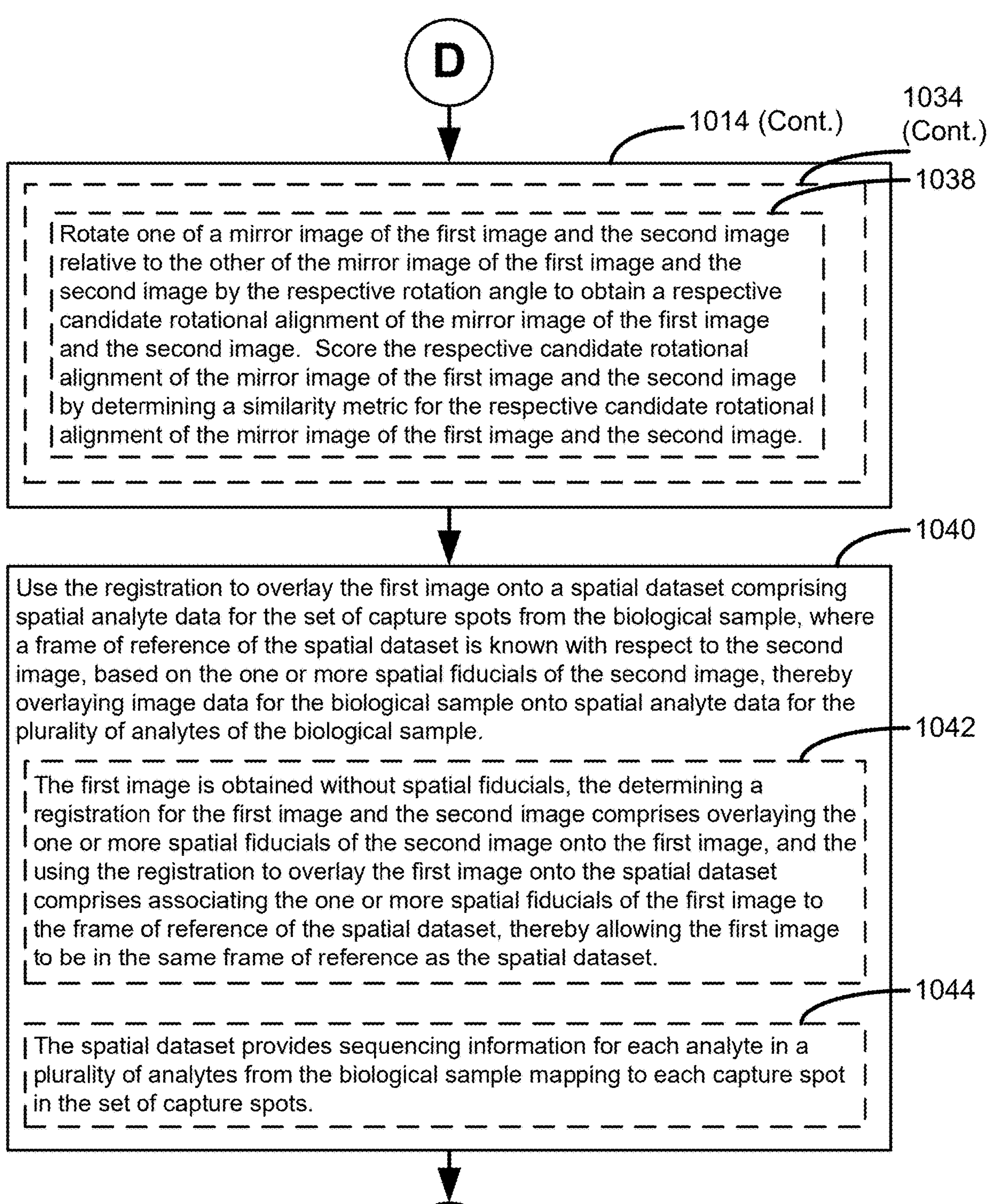
Figure 10G:
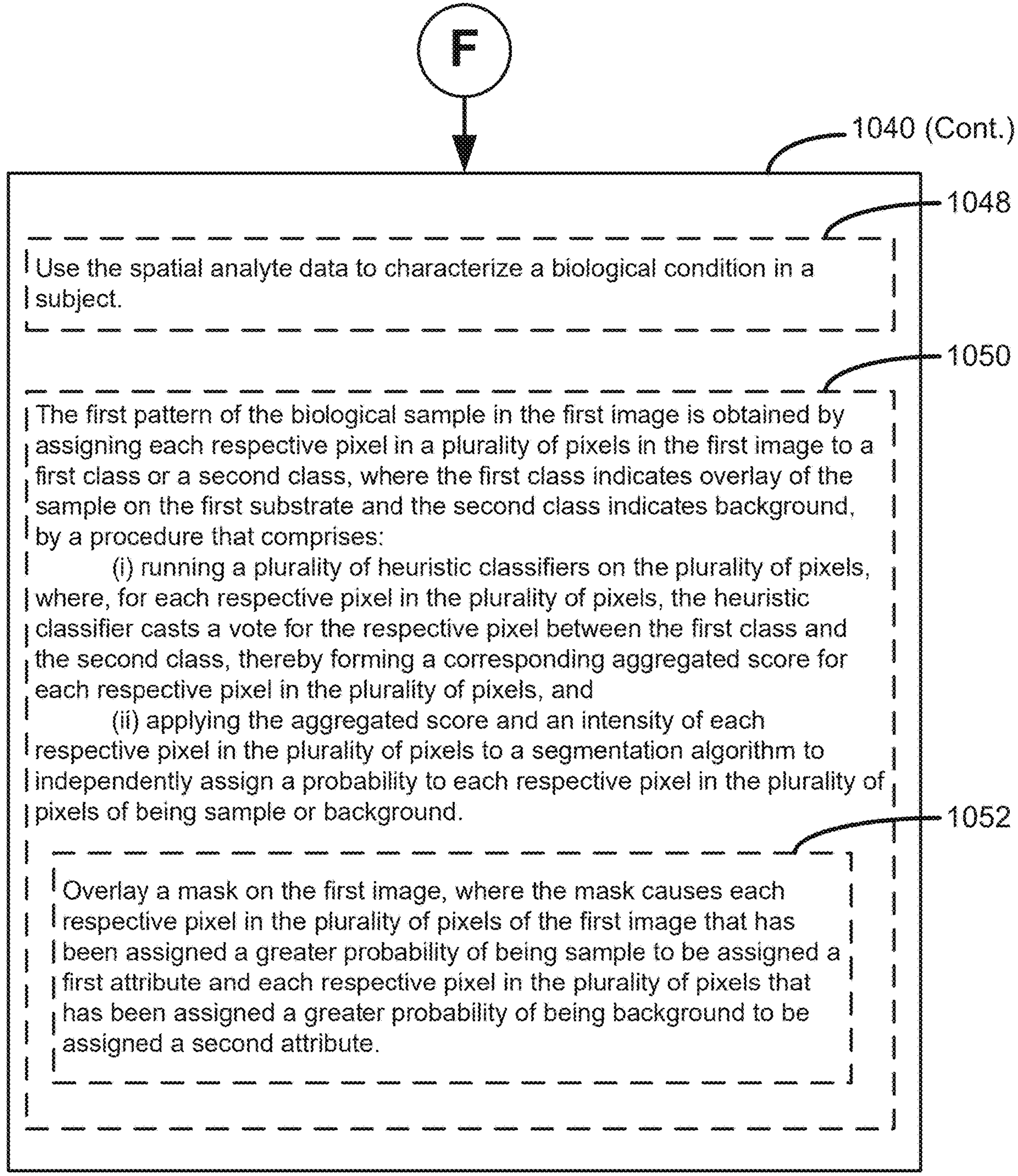

Referring to Block 1032 of FIG. 10C, in some embodiments, a respective similarity metric for a respective alignment of the first image with the second image is determined by evaluating an intensity of a first plurality of pixels in the first image compared to corresponding pixels in a second plurality of pixels in the second image that are overlayed onto each other in the respective alignment.

In some embodiments, the similarity metric is determined where each respective pixel in the first plurality of pixels in the first image has a one-to-one correspondence with each respective pixel in the second plurality of pixels in the second image.

In some embodiments, the similarity metric is determined where each respective pixel in the first plurality of pixels in the first image does not have a one-to-one correspondence with each respective pixel in the second plurality of pixels in the second image. In some such embodiments, the first plurality of pixels in the first image comprises a greater number of pixels compared to the second plurality of pixels in the second image. In some embodiments, the second plurality of pixels in the second image comprises a greater number of pixels compared to the first plurality of pixels in the first image.

For example, in some embodiments, each respective pixel in the corresponding pixels in the second plurality of pixels in the second image corresponds to a respective pixel in the first plurality of pixels in the first image. In some embodiments, each respective pixel in the corresponding pixels in the second plurality of pixels in the second image corresponds to multiple pixels in the first plurality of pixels in the first image.

In some embodiments, each respective pixel in the first plurality of pixels in the first image corresponds to a respective pixel in the corresponding pixels in the second plurality of pixels in the second image. In some embodiments, each respective pixel in the first plurality of pixels in the first image corresponds to multiple pixels in the corresponding pixels in the second plurality of pixels in the second image.

In some embodiments, the first plurality of pixels in the first image used for determining the similarity metric comprises all or a subset (e.g., less than all) of the total pixels in the first image.

In some embodiments, the corresponding pixels in the second plurality of pixels in the second image used for determining the similarity metric comprises all or a subset (e.g., less than all) of the total pixels in the second image.

Accordingly, in some embodiments, the plurality of pixels in a respective image (e.g., the first image and/or the second image) used for determining a similarity metric comprises at least 0.005%, at least 0.008%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 15%, at least 20%, at least 30%, or at least 50% of the total pixels in the respective image. In some embodiments, the plurality of pixels in a respective image (e.g., the first image and/or the second image) used for determining a similarity metric comprises no more than 70%, no more than 50%, no more than 30%, no more than 20%, no more than 10%, no more than 5%, no more than 1%, no more than 0.5%, or no more than 0.1% of the total pixels in the respective image. In some embodiments, the plurality of pixels in a respective image (e.g., the first image and/or the second image) used for determining a similarity metric comprises from 0.01% to 10%, from 0.1% to 20%, from 0.05% to 1%, from 0.005% to 30%, from 0.5% to 15%, or from 1% to 10% of the total pixels in the respective image.

In some embodiments, a respective similarity metric is selected from the group consisting of Pearson's correlation, Spearman's correlation, Kendall's Tau, Cosine similarity, Jaccard similarity, Euclidean distance, and Manhattan distance.

In some embodiments, a respective similarity metric is Mean Squares, Normalized Correlation, or Pattern Intensity.

Mean squares refers to a sum of squared differences between intensity values. In typical embodiments, determining mean squares requires the plurality of pixels in the first image and the plurality of pixels in the second image to have intensity values that fall within the same range.

Normalized correlation refers to a correlation between intensity values divided by the square rooted autocorrelation of both target and reference objects according to the formula:

$$\frac{\Sigma_i^n a_i \times b_i}{\Sigma_i^n a_i^2 \Sigma_i^n b_i^2}$$

Normalized correlation allows for the registration of images whose intensity values are related by a linear transformation.

Pattern intensity is determined by calculating the squared differences between intensity values transformed by a function of type 1/(1+x) and obtaining the sum. This metric has the advantage of increasing simultaneously when more samples are available and when intensity values are close.

In some embodiments, a respective similarity metric is Mutual Information. Generally, mutual information is based in an information theory concept. Mutual information between two sets measures how much can be known from one set if only the other set is known. Given a set of values $A=\{a_i\}$, its entropy H(A) is defined by $$H(A) = \sum_i^n -p(\alpha_i)\log(p(a_i))$$

where $p(a_i)$ are the probabilities of the values in the set. Entropy can be interpreted as a measure of the mean uncertainty reduction that is obtained when one of the particular values is found during sampling. Given two sets $A=\{a_i\}$ and $B=\{b_i\}$, its joint entropy is given by the joint probabilities $p(a_i, b_i)$ as $$H(A, B) = \sum_i^n -p(a_i, b_i)\log(p(a_i b_i)).$$

Mutual information is obtained by subtracting the entropy of both sets from the joint entropy, as H(A,B)=H(A)−H(B), and indicates how much uncertainty about one set is reduced by the knowledge of the second set. In some embodiments, mutual information is the metric of choice when image from different modalities need to be registered.

For example, in some embodiments, a respective similarity metric is a mutual information I(X,Y) between the first image and the second image of the form:

$$I(X, Y) = H(X) + H(Y) - H(X, Y)$$

where X is a first spatial random variable defined by pixel intensities in the first plurality of pixels, Y is a second spatial random variable defined by pixel intensities in the second plurality of pixels, H(X) is an entropy of X, H(Y) is an entropy of Y, and H(X,Y) is a joint entropy of X and Y.

In some embodiments, a respective similarity metric is obtained using an image analysis software. Image analysis software can include the Insight Toolkit (ITK). See, for example, McCormick et al., "ITK: enabling reproducible research and open science," Front Neuroinform 2014; 8:13; doi:10.3389/fninf.2014.00013; and Yoo et al., "Engineering and Algorithm Design for an Image Processing API: A Technical Report on ITK—The Insight Toolkit," In Proc of Medicine Meets Virtual Reality, J Westwood, ed, IOS Press Amsterdam pp 586-592 (2002), each of which is hereby incorporated herein by reference in its entirety. Other suitable methods of determining similarity metrics are contemplated, as will be apparent to one skilled in the art.

In some embodiments, a respective alignment of the first image and the second image is assessed by determining a visual assessment, by a user, of the alignment displayed on a display, such that the user visually evaluates the degree of similarity (or dissimilarity) between the two images.

In some embodiments, the method further comprises displaying, on a display, an image overlay for the first image aligned with the second image, where the first image is displayed in color and the second image is displayed in grayscale. In some embodiments, the method further comprises displaying, on a display, an image overlay for the first image aligned with the second image, where the first image is displayed in grayscale and the second image is displayed in color.

In some embodiments, the image overlay for the first image aligned with the second image is displayed as a checkerboard, where dissimilarities between the images are displayed as irregularities in the checkerboard pattern.

In some embodiments, the image overlay is interactive. In some such embodiments, the method further comprises, responsive to a user interaction, performing an action on the image overlay selected from the group consisting of zooming, panning, and adjusting the opacity of one or both images in the image overlay. Advantageously, such manual user interactions can facilitate improved viewing of the first image and/or the second image within the overlay, so as to visually determine the quality of the alignment.

Figure 23B:
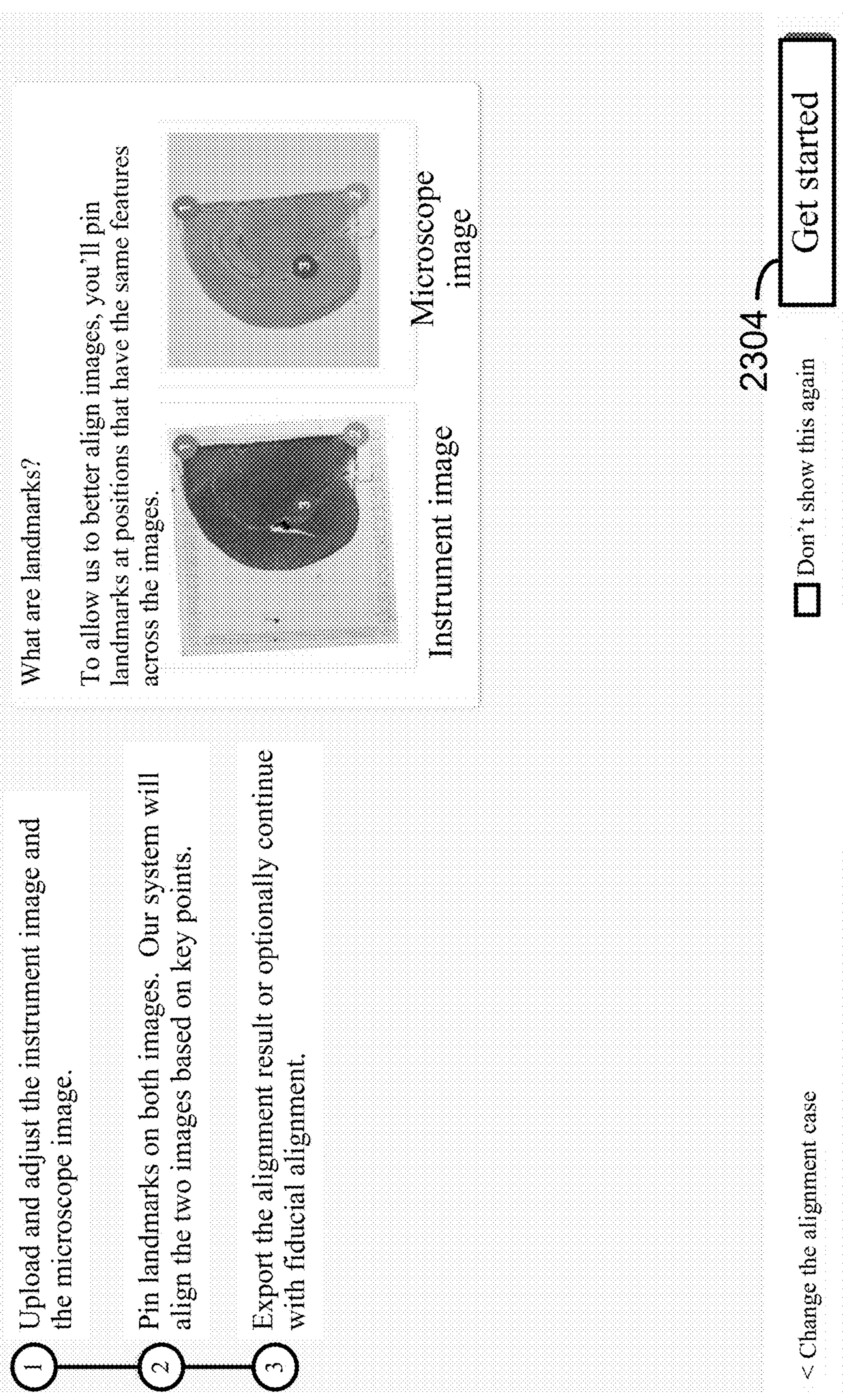
Figure 23C:
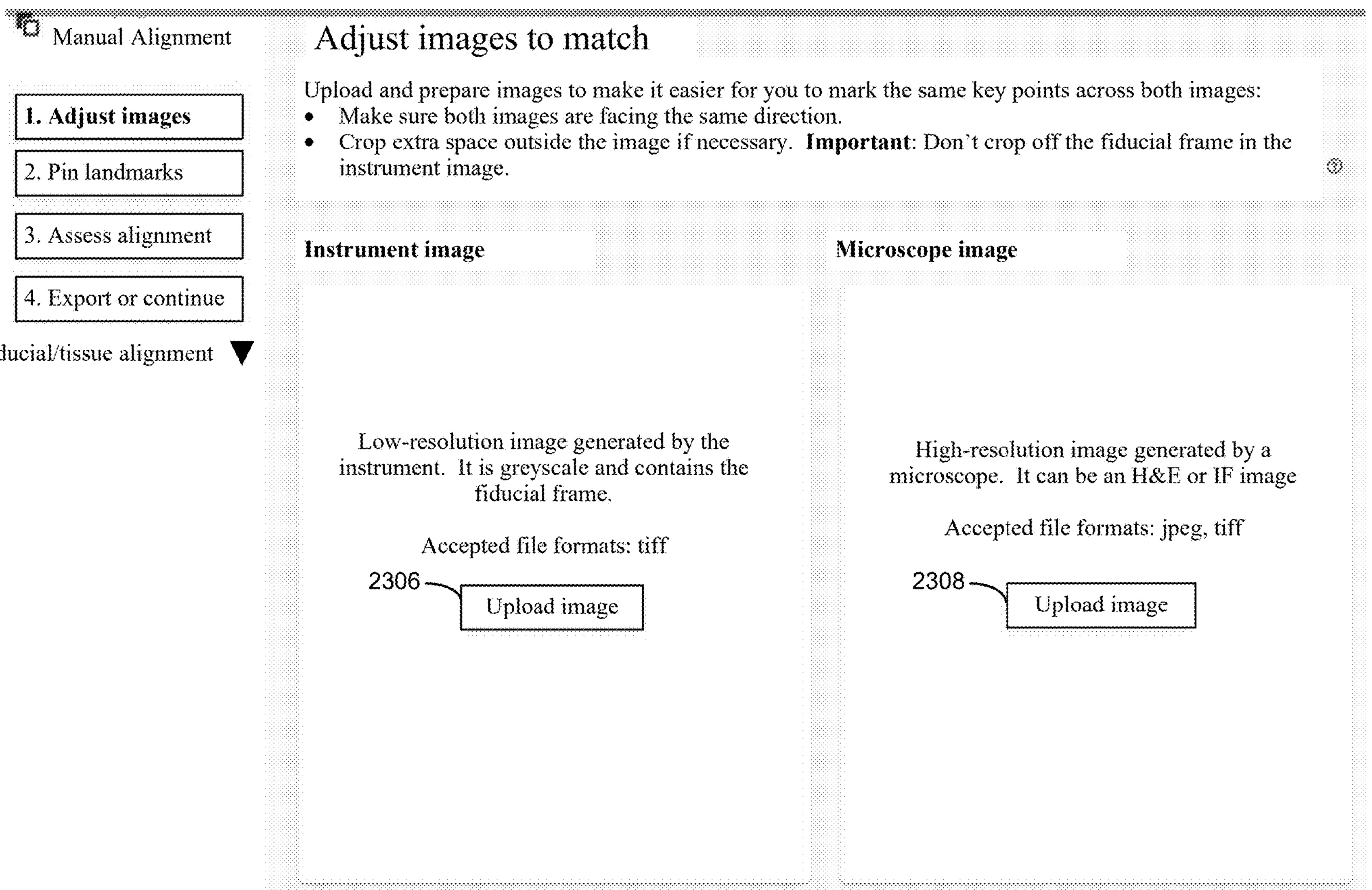
Figure 23D:
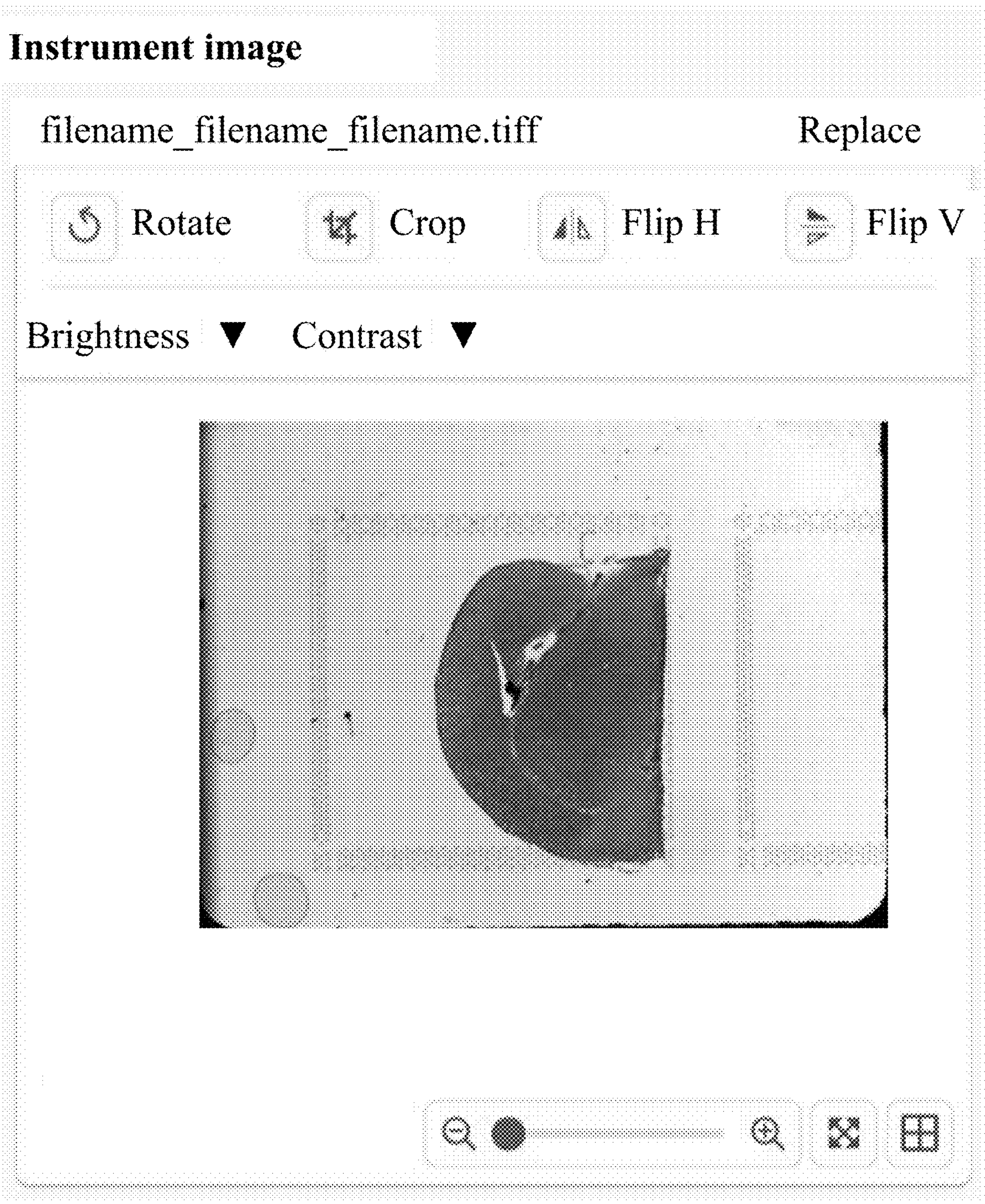
Figure 23E:
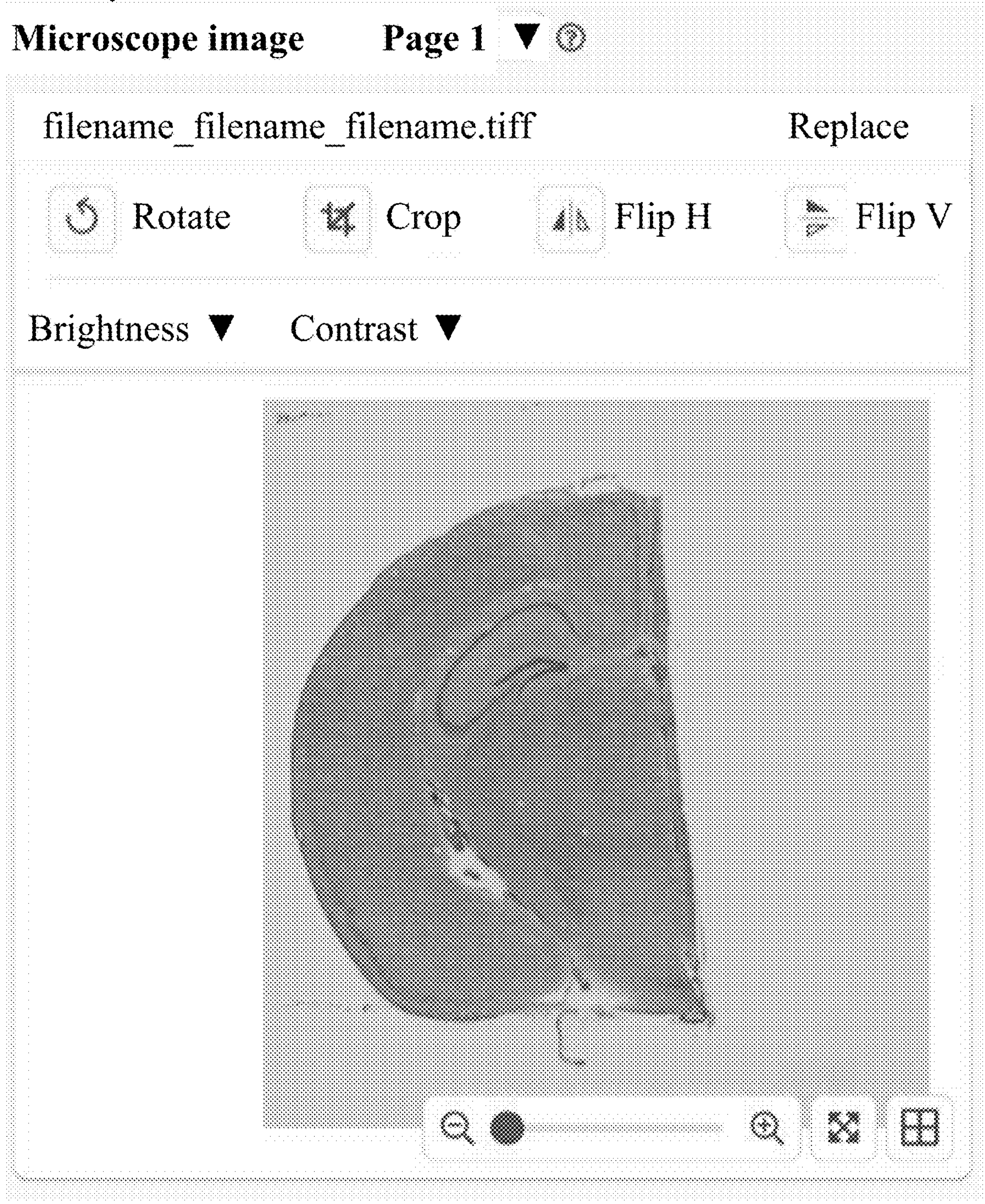
Figure 23F:
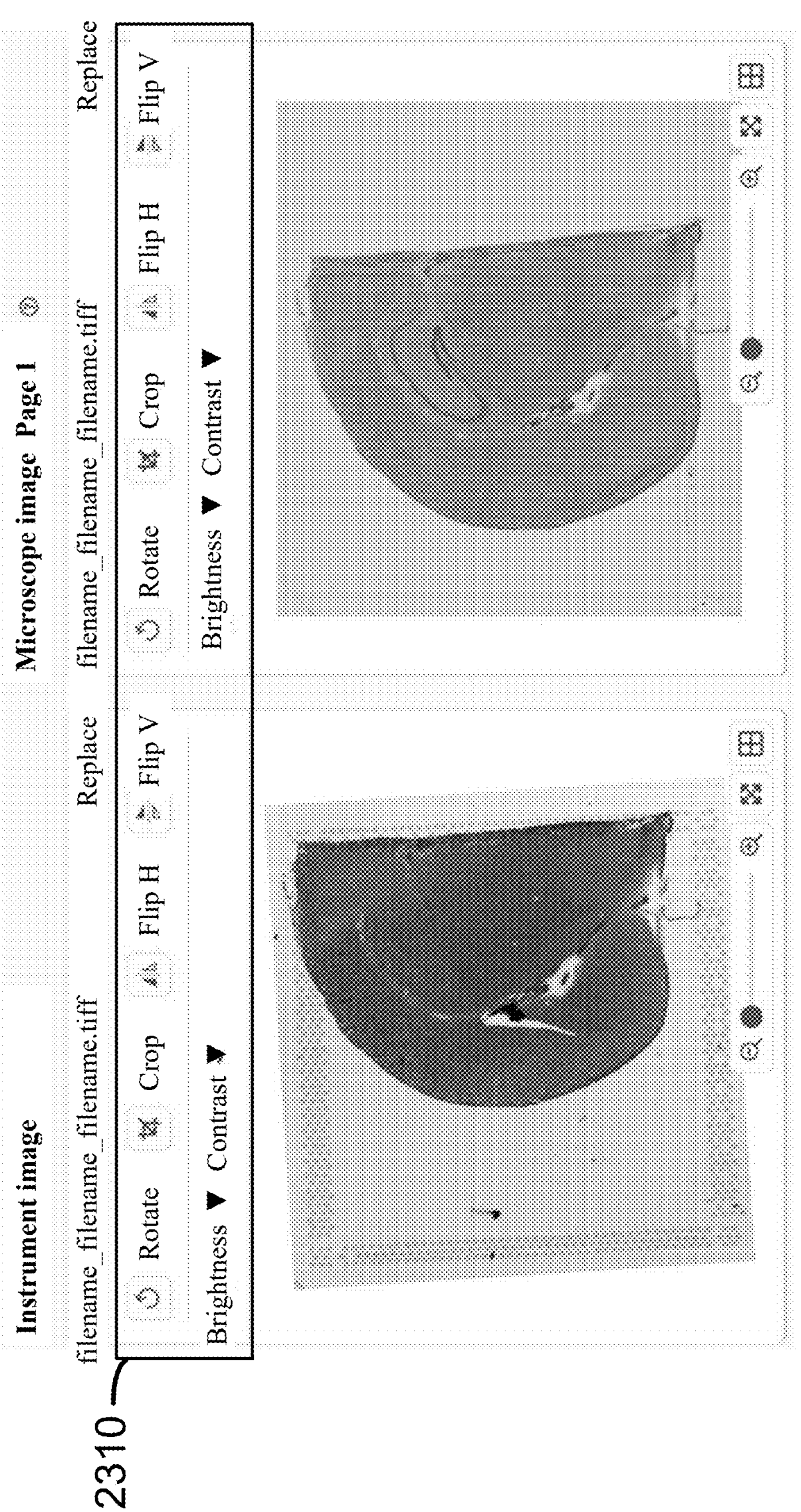
Figure 23G:
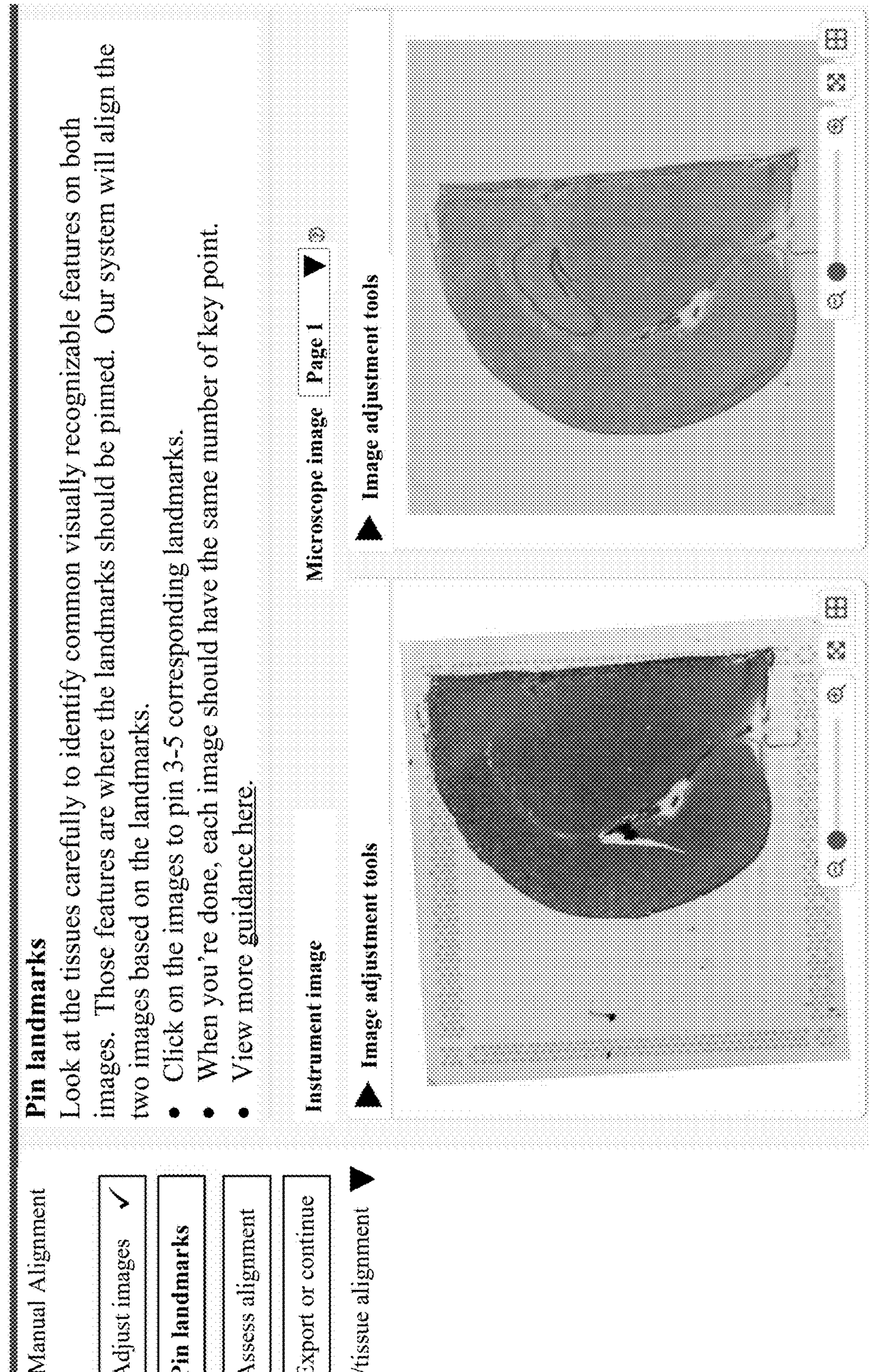
Figure 23H:
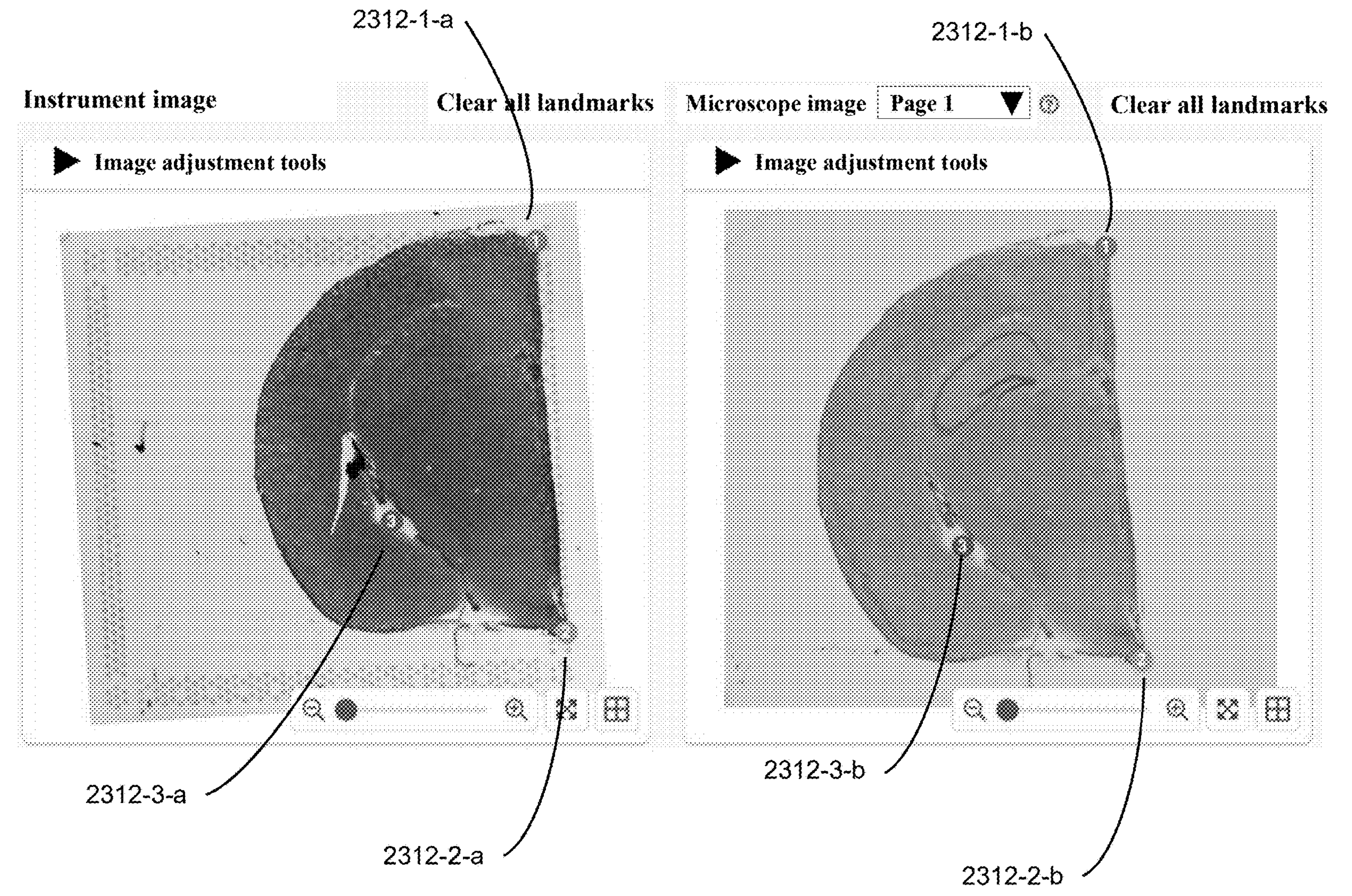
Figure 23I:
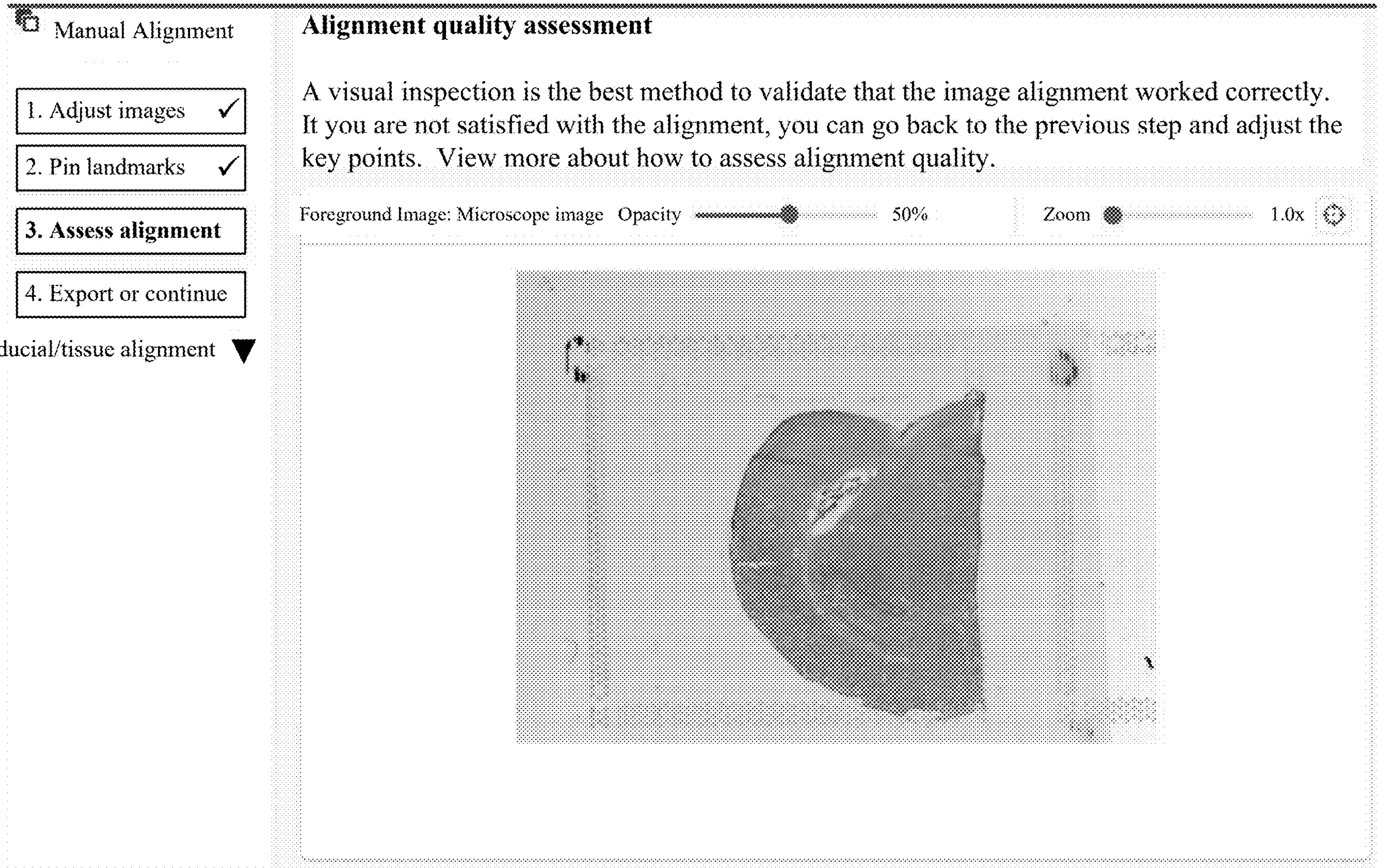

An example embodiment of a method for determining a registration for the first image and the second image using landmark selection is provided in FIGS. 23A-23I. In FIG. 23A, a user affordance 2302 for selecting a manual image registration process 1902 is displayed on a display of a visualization system. In FIG. 23B, selection of the user affordance 2302 displays instructions for performing manual image registration and a user affordance 2304 for initializing the manual image registration process. In FIGS. 23C-E, the user is prompted to obtain a first image of a biological sample on a first substrate using a user affordance 2308. The user is further prompted to receive a second image of the biological sample on the first substrate overlayed on a second substrate, where the second substrate includes one or more spatial fiducials and a set of capture spots, using a user affordance 2306. In some such embodiments, the first image is a microscope image (e.g., a high-resolution image such as an H&E image or an immunofluorescence image) and the second image is an image comprising the one or more spatial fiducials and obtained using a sample handling device 706 (e.g., a low-resolution image). In FIG. 23F, the display further displays visualization tools 2310 allowing the user to modify the first image and/or the second image (e.g., using rotation, cropping, flipping, scaling, expanding, applying a grid, adjusting brightness and/or adjusting contrast). As shown in FIG. 23G, user interaction with one or more of the visualization tools 2310 allows the user to adjust the images such that they are in similar in scale and orientation, thus improving the identification of landmarks.

FIG. 23G illustrates the selection of landmarks 2312, each comprising a pair of reference positions including a first respective reference position for the first image and a corresponding second respective reference position for the second image. For instance, a first landmark 2312-1 comprises a first reference position on the first image 2312-1-*b* and a corresponding reference position on the second image 2312-1-*a*. A second landmark 2312-2 comprises a first reference position on the first image 2312-2-*b* and a corresponding reference position on the second image 2312-2-*a*. Similarly, a third landmark 2312-3 comprises a first reference position on the first image 2312-3-*b* and a corresponding reference position on the second image 2312-3-*a*. FIG. 23H illustrates an overlay representing the first alignment of the first image and the second image, based on the transformation used to register the first image to the second image. In some embodiments, the overlay is used to determine a similarity metric and/or to perform a visual assessment of alignment quality. In some embodiments, the method further comprises performing a refinement of the alignment, thereby obtaining a second alignment of the first image and the second image. Image registration algorithms.

In some embodiments, as described above and shown in FIGS. 19B and 20A, the determining the registration for the first image and the second image does not include the manual image registration process 1902. In some such embodiments, the determining the registration comprises an automated image registration process.

In some embodiments, the determining the registration for the first and second image comprises obtaining one or more respective calculated sample metrics and/or features (e.g., an area and/or a centroid) of the first pattern for the biological sample in the first image and obtaining one or more respective calculated sample metrics and/or features (e.g., an area and/or a centroid) of the second pattern for the biological sample in the second image. The method may include obtaining an initial alignment of the first image and the second image based on an initial transformation (e.g., scaling and/or centering) of the one or more calculated sample metrics and/or features of the first pattern corresponding to the one or more calculated sample metrics and/or features of the second pattern.

In some embodiments, the method includes sampling, for each respective rotation angle in a plurality of rotation angles, a corresponding transformation between the first and second image, using a sampling procedure. The sampling procedure may include rotating one of the first and second image relative to the other of the first and second image by the respective rotation angle to obtain a respective candidate rotational alignment of the first and second image and refining the respective candidate rotational alignment to obtain a respective refined candidate rotational alignment. The sampling procedure may further comprise scoring the respective refined candidate rotational alignment of the first and second image by determining a similarity metric for the first image compared to the second image (e.g., across a respective intensity of a first plurality of pixels in the first image compared to corresponding pixels in a second plurality of pixels in the second image that are overlayed onto each other by the respective candidate rotational alignment of the first and second image). A plurality of refined candidate rotational alignments and a corresponding plurality of similarity metrics may thus be obtained. The method may further include selecting the rotational alignment from among the plurality of refined candidate rotational alignments that yields the highest similarity metric in the corresponding plurality of similarity metrics as the registration for the first and second image.

Methods for performing image registration based on one or more calculated sample metrics and/or features are known in the art. Generally, image registration algorithms can be classified into area-based methods and feature-based methods. Area-based methods are typically used when distinctive structural elements are not readily available in the images to be registered and thus rely predominantly on pixel intensities (e.g., grayscale levels and/or colors) in the images. Area-based methods can be further classified into cross correlation (CC)-like methods, Fourier transform-based methods, and mutual information methods. Feature-based methods are typically applied where structural information can be found in the images, and in some instances make use of feature extraction algorithms to detect and identify distinctive image features (e.g., edges, corners, contours, surfaces, points of intersection, etc.) for registration. Feature-based methods also typically comprise performing a series of steps, including feature detection, feature matching, mapping function design, and image transformation and resampling.

Accordingly, in some embodiments, the determining the registration for the first and second image is performed using an area-based image registration algorithm. In some embodiments, the determining the registration for the first and second image is performed using a feature-based image registration algorithm. In some embodiments, the determining the registration for the first and second image is performed using point mapping, contour-based image registration, multimodal image registration using mutual information, frequency domain methods, genetic algorithms, and/or embedded maps. In some embodiments, the determining the registration for the first and second image is performed using any registration algorithm disclosed herein, or any substitutions, modifications, additions, deletions, and/or combinations thereof, as will be apparent to one skilled in the art. Methods for image registration are further described, for example, in Phogat et al., 2012, "Different Image Registration Methods—An Overview," Int J Sci Eng Res 5(12): 44-49, which is hereby incorporated herein by reference in its entirety.

In some embodiments, the one or more respective calculated sample metrics and/or features includes a calculated sample metric (e.g., an area, an outline, a circumference, a measure of central tendency, a centroid, an orientation, a density function, and/or a histogram). In some embodiments, the one or more respective calculated sample metrics and/or features includes a sample feature (e.g., an edge, a corner, a contour, a surface, and/or a point of intersection).

Accordingly, referring to Block 1034, in some embodiments, the determining the registration for the first and second image comprises obtaining a respective first area of the first pattern and a respective first centroid for the first area from an analysis of the first pattern and obtaining a respective second area of the second pattern and a respective second centroid for the second area from an analysis of the second pattern. At least one of the first image and the second image is scaled based on a relative proportion of the first and second area, and the first image is centered with the second image based on an alignment between the first and second centroid.

In some embodiments, for each respective rotation angle in a plurality of rotation angles, a corresponding transformation between the first and second image is sampled by a sampling procedure. The sampling procedure may comprise rotating one of the first and second image relative to the other of the first and second image by the respective rotation angle to obtain a respective candidate rotational alignment of the first and second image and refining the respective candidate rotational alignment to obtain a respective refined candidate rotational alignment. The sampling procedure may further include scoring the respective refined candidate rotational alignment of the first and second image by determining a similarity metric across a respective intensity of a first plurality of pixels in the first image compared to corresponding pixels in a second plurality of pixels in the second image that are overlayed onto each other by the respective candidate rotational alignment of the first and second image. Thus, a plurality of refined candidate rotational alignments and a corresponding plurality of similarity metrics can be obtained.

The method may further include selecting the rotational alignment from among the plurality of refined candidate rotational alignments that yields the highest similarity metric in the corresponding plurality of similarity metrics as the registration for the first and second image.

As described above, in some embodiments, the respective pattern of the biological sample in a respective image indicates the location of the biological sample in the respective image (e.g., where the biological sample is overlayed onto a substrate). In some embodiments, a respective pattern of the biological sample in a respective image denotes regions of the image that contain sample (e.g., tissue) compared to regions of the image that contain background (e.g., non-tissue). In some embodiments, the first pattern of the biological sample in the first image and the second pattern of the biological sample in the second image are obtained using an image segmentation process. Image segmentation processes suitable for use in obtaining the first pattern of the biological sample and the second pattern of the biological sample are further described herein (see, e.g., the section entitled "Image segmentation," below).

In some embodiments, the first pattern for the biological sample in the first image and the second pattern for the biological sample in the second image are used for the obtaining the one or more respective calculated sample metrics and/or features (e.g., an area and/or a centroid) of the respective pattern of the respective image. In some such embodiments, the sampling procedure is performed using the first image and the second image, rather than their respective patterns.

In some embodiments, the first pattern for the biological sample in the first image and the second pattern for the biological sample in the second image are used for both the obtaining the one or more respective calculated sample metrics and/or features and for the sampling procedure.

In some embodiments, the determining the registration for the first and second image comprises obtaining the one or more respective calculated sample metrics and/or features (e.g., an area and/or a centroid) of the first image and the second image. In other words, in some such embodiments, the first image and the second image, rather than their respective patterns, are used for obtaining the one or more respective calculated sample metrics and/or features (e.g., an area and/or a centroid). In some such embodiments, the sampling procedure is further performed using the first image and the second image, rather than their respective patterns.

In some embodiments, the initial transformation (e.g., the scaling and centering) is performed for the first image relative to the second image.

In some embodiments, the initial transformation (e.g., the scaling and centering) is performed for the second image relative to the first image.

Referring to Block 1036, in some embodiments, the plurality of rotation angles comprises 4 or more different rotation angles, where each rotation angle in the plurality of rotation angles is between 0 and $2\pi$ radians. In some embodiments, the plurality of rotation angles comprises at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 25, at least 30, at least 35, at least 40, or at least 50 rotation angles. In some embodiments, the plurality of rotation angles comprises no more than 100, no more than 50, no more than 30, no more than 20, no more than 15, no more than 10, or no more than 5 rotation angles. In some embodiments, the plurality of rotation angles comprises from 2 to 20, from 4 to 10, from 3 to 30, from 5 to 40, or from 10 to 20 rotation angles. In some embodiments, the plurality of rotation angles falls within another range starting no lower than 3 rotation angles and ending no higher than 100 rotation angles.

In some embodiments, the plurality of rotation angles consists of between 8 and 24 different rotation angles, where each rotation angle in the plurality of rotation angles is between 0 and $2\pi$ radians.

In some embodiments, the plurality of rotation angles comprises increments of 10°, 15°, 30°, 45°, or 90°. In some embodiments, the plurality of rotation angles comprises increments of 10°, 15°, 20°, 25°, 30°, 35°, 40°, 45°, 50°, 55°, 60°, 65°, 70°, 75°, 80°, 85°, 90°, 100°, 120°, 150°, or 180°. In some embodiments, the plurality of rotation angles comprises increments of below 10°.

In some embodiments, the method further comprises flipping (e.g., obtaining a mirror image of) one of the first image and the second image, and repeating the sampling procedure for the flipped image relative to the other (e.g., unflipped) image. Thus, each possible orientation of the first image relative to the second image is sampled by the sampling procedure.

Accordingly, referring to Block 1038, in some embodiments, the sampling procedure further comprises rotating one of a mirror image of the first image and the second image relative to the other of the mirror image of the first image and the second image by the respective rotation angle to obtain a respective candidate rotational alignment of the mirror image of the first image and the second image, and scoring the respective candidate rotational alignment of the mirror image of the first image and the second image by determining a similarity metric for the respective candidate rotational alignment of the mirror image of the first image and the second image.

Figures 21A, 21B:
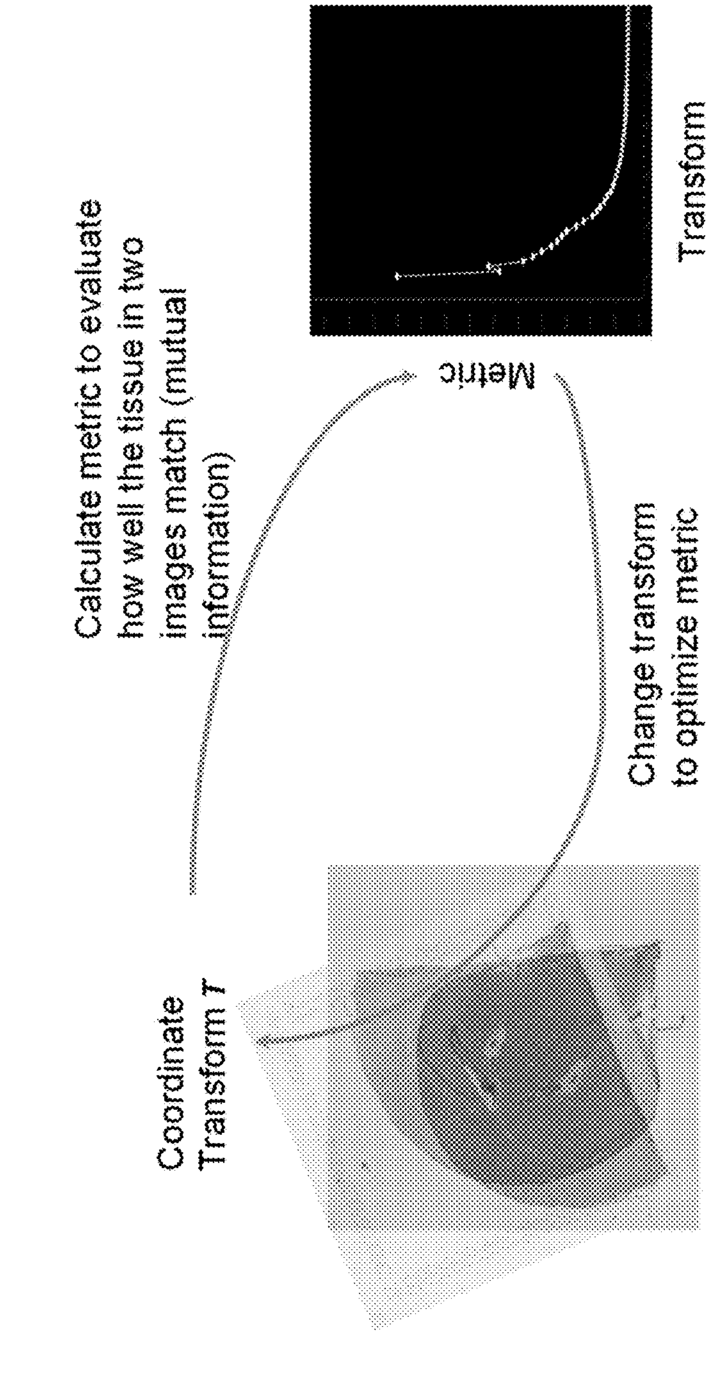
FIGS. 21A and 21B illustrate example automated workflows for determining a registration for a first image and a second image by sampling transformations between the first and second image, in accordance with some embodiments of the present disclosure.

In some embodiments, the refining the respective candidate rotational alignment to obtain a respective refined candidate rotational alignment comprises performing an optimization procedure, for each the respective candidate rotational alignment corresponding to respective rotation angle in a plurality of rotation angles. In some embodiments, the optimization procedure includes, for each optimization iteration in a plurality of optimization iterations, determining a similarity metric for the respective candidate rotational alignment and adjusting the respective candidate rotational alignment in accordance with a calculated loss, thus obtaining a respective refined candidate rotational alignment. In some embodiments, the optimization procedure is repeated for a number of iterations until the similarity metric reaches a convergence. Optimization of similarity metrics over a plurality of iterations is illustrated, for example, in FIGS. 21A-21B. In particular, FIG. 21B shows the convergence of the similarity metric over a number of refinements to the transformation (e.g., a two-dimensional transform) for the respective candidate rotational alignment.

In some embodiments, the transformation is a two-dimensional similarity transform. In some embodiments, the transformation is selected from the group consisting of: affine transform, azimuth elevation to cartesian transform, BSpline deformable transform, centered affine transform, centered Euler 3D transform, centered rigid 2D transform, centered similarity 2D transform, elastic body reciprocal spline kernel transform, elastic body spline kernel transform, Euler 2D transform, Euler 3D transform, fixed center of rotation affine transform, identity transform, kernel transform, matrix offset transform, quaternion rigid transform, rigid 2D transform, rigid 3D perspective transform, rigid 3D transform, scalable affine transform, scale logarithmic transform, scale skew versor 3D transform, scale transform, scale versor 3D transform, similarity 2D transform, similarity 3D transform, thin plate R2 Log R spline kernel transform, thin plate spline kernel transform, transform, transform base, translation transform, versor rigid 3D transform, versor transform, and volume spline kernel transform.

Any of the transformations described herein are contemplated for use in the automated image registration method (see, e.g., the section entitled "Obtaining transformations," above). Additional suitable transformations contemplated for use in the present disclosure are further described in, e.g., U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

In some embodiments, a respective similarity metric in the plurality of similarity metrics is selected from the group consisting of Pearson's correlation, Spearman's correlation, Kendall's Tau, Cosine similarity, Jaccard similarity, Euclidean distance, and Manhattan distance. In some embodiments, a respective similarity metric in the plurality of similarity metrics is Mean Squares, Normalized Correlation, Pattern Intensity, or Mutual Information.

In some embodiments, a respective similarity metric for a is determined by evaluating an intensity of a first plurality of pixels in the first image compared to corresponding pixels in a second plurality of pixels in the second image that are overlayed onto each other in the respective alignment.

In some embodiments, the similarity metric is determined where each respective pixel in the first plurality of pixels in the first image has a one-to-one correspondence with each respective pixel in the second plurality of pixels in the second image. In some embodiments, the similarity metric is determined where each respective pixel in the first plurality of pixels in the first image does not have a one-to-one correspondence with each respective pixel in the second plurality of pixels in the second image. In some such embodiments, the first plurality of pixels in the first image comprises a greater number of pixels compared to the second plurality of pixels in the second image. In some embodiments, the second plurality of pixels in the second image comprises a greater number of pixels compared to the first plurality of pixels in the first image.

For example, in some embodiments, each respective pixel in the corresponding pixels in the second plurality of pixels in the second image corresponds to a respective pixel in the first plurality of pixels in the first image. In some embodiments, each respective pixel in the corresponding pixels in the second plurality of pixels in the second image corresponds to multiple pixels in the first plurality of pixels in the first image. In some embodiments, each respective pixel in the first plurality of pixels in the first image corresponds to a respective pixel in the corresponding pixels in the second plurality of pixels in the second image. In some embodiments, each respective pixel in the first plurality of pixels in the first image corresponds to multiple pixels in the corresponding pixels in the second plurality of pixels in the second image.

In some embodiments, the first plurality of pixels in the first image used for determining the similarity metric comprises all or a subset of the total pixels in the first image. In some embodiments, the corresponding pixels in the second plurality of pixels in the second image used for determining the similarity metric comprises all or a subset of the total pixels in the second image.

Accordingly, in some embodiments, the plurality of pixels in a respective image (e.g., the first image and/or the second image) used for determining a similarity metric comprises at least 0.005%, at least 0.008%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 15%, at least 20%, at least 30%, or at least 50% of the total pixels in the respective image. In some embodiments, the plurality of pixels in a respective image (e.g., the first image and/or the second image) used for determining a similarity metric comprises no more than 70%, no more than 50%, no more than 30%, no more than 20%, no more than 10%, no more than 5%, no more than 1%, no more than 0.5%, or no more than 0.1% of the total pixels in the respective image. In some embodiments, the plurality of pixels in a respective image (e.g., the first image and/or the second image) used for determining a similarity metric comprises from 0.01% to 10%, from 0.1% to 20%, from 0.05% to 1%, from 0.005% to 30%, from 0.5% to 15%, or from 1% to 10% of the total pixels in the respective image.

Any of the similarity metrics and/or methods of evaluating image alignment quality described herein are contemplated for use in the automated image registration method (see, e.g., the section entitled "Assessment of image alignment," above).

In some embodiments, the determining the registration for the first image and the second image is performed using an image registration algorithm including a plurality of parameters. In some embodiments, the plurality of parameters includes, but is not limited to, a sampling rate, a bin number (e.g., a number of histogram bins), a learning rate, a sampling strategy, a sampling percentage, a learning rate, a minimum step, a number of iterations, a gradient magnitude tolerance, a relaxation factor, a shrink factors per level, and/or a smoothing sigmas per level.

In some embodiments, the plurality of parameters includes a sampling rate, and the sampling rate is at least 0.01, at least 0.02, at least 0.03, at least 0.04, at least 0.05, at least 0.06, at least 0.07, at least 0.08, at least 0.09, at least 0.1, at least 0.2, at least 0.3, at least 0.4, at least 0.5, at least 0.6, at least 0.7, at least 0.8, at least 0.9, or at least 1. In some embodiments, the sampling rate is from 0.01 to 0.4, from 0.05 to 0.8, from 0.1 to 0.5, or from 0.1 to 1.

In some embodiments, the plurality of parameters includes a bin number. In some embodiments, the bin number is at least 5, at least 10, at least 15, at least 20, at least 30, at least 40, at least 50, at least 60, at least 70, at least 80, at least 90, at least 100, at least 500, or at least 1000. In some embodiments, the bin number is no more than 2000, no more than 1000, no more than 500, no more than 100, no more than 50, or no more than 20. In some embodiments, the bin number is from 5 to 100, from 20 to 200, from 40 to 80, from 10 to 1000, or from 50 to 2000. In some embodiments, the bin number falls within another range starting no lower than 5 and ending no higher than 2000.

In some embodiments, the plurality of parameters includes a learning rate. In some embodiments, the learning rate is at least 1, at least 2, at least 3, at least 4, at least 5, at least 10, at least 15, at least 20, at least 30, at least 40, at least 50, at least 60, at least 70, at least 80, at least 90, at least 100, or at least 200. In some embodiments, the learning rate is no more than 500, no more than 200, no more than 100, no more than 50, or no more than 20. In some embodiments, the bin number is from 5 to 100, from 2 to 200, from 4 to 15, from 10 to 150, or from 3 to 20. In some embodiments, the bin number falls within another range starting no lower than 1 and ending no higher than 500.

In some embodiments, the plurality of parameters includes a minimum step parameter. In some embodiments, the minimum step parameter is at least 0.001, at least 0.002, at least 0.003, at least 0.004, at least 0.005, at least 0.006, at least 0.007, at least 0.008, at least 0.009, at least 0.01, at least 0.02, at least 0.03, at least 0.04, at least 0.05, at least 0.06, at least 0.07, at least 0.08, at least 0.09, at least 0.1, at least 0.2, at least 0.3, at least 0.4, at least 0.5, at least 0.6, at least 0.7, at least 0.8, or at least 0.9. In some embodiments, the minimum step parameter is no more than 1, no more than 0.5, no more than 0.1, no more than 0.05, or no more than 0.01. In some embodiments, the sampling rate is from 0.001 to 0.04, from 0.005 to 0.08, from 0.01 to 0.5, or from 0.005 to 1.

In some embodiments, the plurality of parameters includes a number of iterations. In some embodiments, the number of iterations is at least 5, at least 10, at least 15, at least 20, at least 30, at least 40, at least 50, at least 60, at least 70, at least 80, at least 90, at least 100, at least 500, at least 1000, or at least 2000. In some embodiments, the number of iterations is no more than 2000, no more than 5000, no more than 1000, no more than 500, no more than 100, no more than 50, or no more than 20. In some embodiments, the number of iterations is from 5 to 100, from 20 to 200, from 40 to 80, from 10 to 1000, or from 50 to 2000. In some embodiments, the number of iterations falls within another range starting no lower than 5 iterations and ending no higher than 5000 iterations.

In some embodiments, the plurality of parameters includes a gradient magnitude tolerance. In some embodiments, the gradient magnitude tolerance is at least $1\times10^{-9}$, at least $1\times10^{-8}$, at least $1\times10^{-7}$, at least $1\times10^{-6}$, at least $1\times10^{-5}$, at least $1\times10^{-4}$, at least $1\times10^{-3}$, or at least $1\times10^{-2}$. In some embodiments, the gradient magnitude tolerance is no more than 0.1, no more than $1\times10^{-2}$, no more than $1\times10^{-3}$, no more than $1\times10^{-4}$, no more than $1\times10^{-5}$, no more than $1\times10^{-6}$, or no more than $1\times10^{-7}$. In some embodiments, the gradient magnitude tolerance is from $1\times10^{-7}$ to $1\times10^{-5}$, from $1\times10^{-8}$ to $1\times10^{-3}$, or from $1\times10^{-9}$ to $1\times10^{-4}$. In some embodiments, the gradient magnitude tolerance falls within another range starting no lower than $1\times10^{-9}$ and ending no higher than 0.1.

In some embodiments, the plurality of parameters includes a relaxation factor. In some embodiments, the relaxation factor is at least 0.01, at least 0.02, at least 0.03, at least 0.04, at least 0.05, at least 0.06, at least 0.07, at least 0.08, at least 0.09, at least 0.1, at least 0.2, at least 0.3, at least 0.4, at least 0.5, at least 0.6, at least 0.7, at least 0.8, at least 0.9, or at least 1. In some embodiments, the relaxation factor is from 0.01 to 0.4, from 0.05 to 0.8, from 0.1 to 0.5, or from 0.1 to 1.

In some embodiments, open source software is used to perform automated image registration. Open source software can include the Insight Toolkit (ITK). See, for example, McCormick et al., "ITK: enabling reproducible research and open science," Front Neuroinform 2014; 8:13; doi:10.3389/fninf.2014.00013; and Yoo et al., "Engineering and Algorithm Design for an Image Processing API: A Technical Report on ITK—The Insight Toolkit," In Proc of Medicine Meets Virtual Reality, J Westwood, ed, IOS Press Amsterdam pp 586-592 (2002), each of which is hereby incorporated herein by reference in its entirety. Other suitable methods of performing automated image registration, including parameters for image registration algorithms, are contemplated for use in the present disclosure, as will be apparent to one skilled in the art.

Additional Embodiments for Image Registration.

In some embodiments, the determining the registration for the first image and the second image comprises aligning all or a portion of the first image to all or a portion of the second image.

For instance, in some embodiments, the first image comprises 10,000 or more pixel values, the second image comprises 10,000 or more pixel values, and the registration for the first image and the second image takes into consideration an alignment of at least one percent of the pixels in the first image with corresponding pixels in the second image.

In some embodiments, the first image comprises 10,000 or more pixel values, the second image comprises 10,000 or more pixel values, and the registration for the first image and the second image takes into consideration an alignment of at least 0.005%, at least 0.008%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 15%, at least 20%, at least 30%, or at least 50% of the pixels in the first image with corresponding pixels in the second image. In some embodiments, the first image comprises 10,000 or more pixel values, the second image comprises 10,000 or more pixel values, and the registration for the first image and the second image takes into consideration an alignment of no more than 70%, no more than 50%, no more than 30%, no more than 20%, no more than 10%, no more than 5%, no more than 1%, no more than 0.5%, or no more than 0.1% of the pixels in the first image with corresponding pixels in the second image. In some embodiments, the first image comprises 10,000 or more pixel values, the second image comprises 10,000 or more pixel values, and the registration for the first image and the second image takes into consideration an alignment of from 0.01% to 10%, from 0.1% to 20%, from 0.05% to 1%, from 0.005% to 30%, from 0.5% to 15%, or from 1% to 10% of the pixels in the first image with corresponding pixels in the second image.

In some embodiments, the first image comprises 100,000 or more pixel values, the second image comprises 100,000 or more pixel values, and the registration for the first image and the second image takes into consideration an alignment of at least one percent of the pixels in the first image with corresponding pixels in the second image.

In some embodiments, the first image comprises 100,000 or more pixel values, the second image comprises 100,000 or more pixel values, and the registration for the first image and the second image takes into consideration an alignment of at least 0.005%, at least 0.008%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 15%, at least 20%, at least 30%, or at least 50% of the pixels in the first image with corresponding pixels in the second image. In some embodiments, the first image comprises 100,000 or more pixel values, the second image comprises 100,000 or more pixel values, and the registration for the first image and the second image takes into consideration an alignment of no more than 70%, no more than 50%, no more than 30%, no more than 20%, no more than 10%, no more than 5%, no more than 1%, no more than 0.5%, or no more than 0.1% of the pixels in the first image with corresponding pixels in the second image. In some embodiments, the first image comprises 100,000 or more pixel values, the second image comprises 100,000 or more pixel values, and the registration for the first image and the second image takes into consideration an alignment of from 0.01% to 10%, from 0.1% to 20%, from 0.05% to 1%, from 0.005% to 30%, from 0.5% to 15%, or from 1% to 10% of the pixels in the first image with corresponding pixels in the second image.

In some embodiments, the first image comprises 500,000 or more pixel values, the second image comprises 500,000 or more pixel values, and the registration for the first image and the second image takes into consideration an alignment of at least one percent of the pixels in the first image with corresponding pixels in the second image.

In some embodiments, the first image comprises 500,000 or more pixel values, the second image comprises 500,000 or more pixel values, and the registration for the first image and the second image takes into consideration an alignment of at least 0.005%, at least 0.008%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 15%, at least 20%, at least 30%, or at least 50% of the pixels in the first image with corresponding pixels in the second image. In some embodiments, the first image comprises 500,000 or more pixel values, the second image comprises 500,000 or more pixel values, and the registration for the first image and the second image takes into consideration an alignment of no more than 70%, no more than 50%, no more than 30%, no more than 20%, no more than 10%, no more than 5%, no more than 1%, no more than 0.5%, or no more than 0.1% of the pixels in the first image with corresponding pixels in the second image. In some embodiments, the first image comprises 500,000 or more pixel values, the second image comprises 500,000 or more pixel values, and the registration for the first image and the second image takes into consideration an alignment of from 0.01% to 10%, from 0.1% to 20%, from 0.05% to 1%, from 0.005% to 30%, from 0.5% to 15%, or from 1% to 10% of the pixels in the first image with corresponding pixels in the second image.

In some embodiments, the first image comprises 10,000 or more (e.g., 100,000 or more and/or 500,000 or more) pixel values, the second image comprises 10,000 (e.g., 100,000 or more and/or 500,000 or more) or more pixel values, and the registration for the first image and the second image takes into consideration an alignment of at least 0.005%, at least 0.008%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9%, at least 10%, at least 15%, at least 20%, at least 30%, or at least 50% of the corresponding pixels in the second image with the pixels in the first image. In some embodiments, the first image comprises 10,000 or more (e.g., 100,000 or more and/or 500,000 or more) pixel values, the second image comprises 10,000 or more (e.g., 100,000 or more and/or 500,000 or more) pixel values, and the registration for the first image and the second image takes into consideration an alignment of no more than 70%, no more than 50%, no more than 30%, no more than 20%, no more than 10%, no more than 5%, no more than 1%, no more than 0.5%, or no more than 0.1% of the corresponding pixels in the second image with the pixels in the first image. In some embodiments, the first image comprises 10,000 or more (e.g., 100,000 or more and/or 500,000 or more) pixel values, the second image comprises 10,000 or more (e.g., 100,000 or more and/or 500,000 or more) pixel values, and the registration for the first image and the second image takes into consideration an alignment of from 0.01% to 10%, from 0.1% to 20%, from 0.05% to 1%, from 0.005% to 30%, from 0.5% to 15%, or from 1% to 10% of the corresponding pixels in the second image with the pixels in the first image.

In some embodiments, the method further comprises determining the registration for the first image and the second image by a manual alignment, after the selecting the rotational alignment from among the plurality of refined candidate rotational alignments. In some embodiments, the determining the registration for the first image and the second image by a manual alignment is performed, responsive to a manual user selection, based on a visual assessment by the user of an alignment quality of the automated image registration (e.g., as displayed on a display).

In some embodiments, the method further comprises determining the registration for the first image and the second image by an automated image registration process, after determining the registration for the first image and the second image by a manual image registration process. In some embodiments, the determining the registration for the first image and the second image by an automated image registration process is performed, responsive to a manual user selection, based on a visual assessment by the user of an alignment quality of the manual image registration (e.g., as displayed on a display).

In some embodiments, the method comprises providing, to a user, a registration error warning when a highest similarity metric obtained for a respective registration procedure fails to satisfy an alignment quality parameter. In some embodiments, the method comprises providing, to a user, an input error warning when one or more of the first image, the second image, and the spatial dataset are not available.

In some embodiments, the determining the registration further comprises exporting an alignment file (e.g., a JSON alignment file) comprising the registration for the first image and the second image.

Spatial Analyte Analysis.

Referring to Block 1040, the method further comprises using the registration to overlay the first image onto a spatial dataset comprising spatial analyte data for the set of capture spots from the biological sample, where a frame of reference of the spatial dataset is known with respect to the second image, based on the one or more spatial fiducials of the second image. Thus, the image data for the biological sample is overlayed onto spatial analyte data for the plurality of analytes of the biological sample.

For instance, as described above with reference to FIG. 20B, referring to Block 1042, in some embodiments, the first image is obtained without spatial fiducials. In this instance, determining a registration for the first image and the second image, using any of the image registration techniques disclosed herein for registration of the first image and second image, allows for the overlay of the one or more spatial fiducials of the second image onto the first image once the first and second images have been registered. Advantageously, with this overlay between the first and second images, it is now possible to relate the frame of reference of the first image, which now has the overlayed fiducials of the second image, into the frame of reference of the spatial dataset, because the frame of reference of the spatial dataset is known, or is determinable, from the fiducials of the second image because the spatial dataset was acquired from a chip or substrate (e.g., second substrate 1304) that contained the very same fiducials found in the second image. Thus, because of the alignment of the first image (which initially had no fiducials in some embodiments) with the second image (which had fiducials in some embodiments), and because the second image and the spatial dataset were acquired from a substrate with the fiducials, it is now possible to map the second image all the way to the spatial data set using the fiducials. Thus, the registration between the first and second images is used to overlay the first image onto the spatial dataset by associating the one or more spatial fiducials, now mapped onto the first image from the second image, to the frame of reference of the spatial dataset (which is based on the very same fiducials found in the first image), thereby allowing the first image to be in the same frame of reference as the spatial dataset. The spatial dataset is acquired from a substrate (e.g., second substrate) that is overlayed with the biological sample and contains the fiducials. The spatial dataset can represent abundance values of analytes captured by capture probes in capture spots. Each capture spot has a unique spatial barcode. The spatial position of each capture spot with respect to the fiducials is known and the identity of each respective capture spot on the substrate is given by its unique corresponding one or more spatial barcodes. Such information is determined and recorded when manufacturing the substrate onto which the biological sample is loaded (e.g., second substrate 1304). When the second image is taken of the substrate with the fiducials, it is possible to align the second image to the spatial dataset by superimposing the coordinates of each fiducial in the second image onto the coordinates of the fiducials in the reference file for the second substrate. Moreover, in some embodiments the second image is taken while the spatial dataset is being formed of the biological sample or while the biological sample is still in the position (e.g., on the first substrate 1302) it was in when being exposed to the second substrate (e.g., substrate 1304) in order to form the spatial dataset. In such embodiments, the frame of reference of the second image and the frame of reference of the spatial dataset is the same because they were acquired when the tissue sample was in the same frame of reference. In embodiments where mapping of the frame of reference of the second image to the spatial dataset is necessary, automated techniques for determining the coordinates of fiducials in the second image can be performed, such as those disclosed in U.S. Patent Publication No. 2021/0158522 A1, entitled "SYSTEMS AND METHODS FOR SPATIAL ANALYSIS OF ANALYTES USING FIDUCIAL ALIGNMENT," published May 23, 2021, which is hereby incorporated by reference (hereinafter, the '522 publication"). The '522 publication details systems and methods for performing spatial analysis of analytes that comprise A) obtaining a data structure in electronic form comprising (i) an image of a sample on a substrate (e.g., the second image) and (ii) a substrate identifier unique to the substrate, where the substrate includes a plurality of fiducial markers, the substrate includes a set of capture spots, and the image comprises an array of pixel values, B) analyzing the array of pixel values to identify a plurality of derived fiducial spots of the image, C) using the substrate identifier of the data structure to select a first template in a plurality of templates, where each template in the plurality of templates comprises reference positions for a corresponding plurality of reference fiducial spots and a corresponding coordinate system, D) aligning the plurality of derived fiducial spots of the image with the corresponding plurality of reference fiducial spots of the first template using an alignment algorithm (e.g., a coherent point drift algorithm, an Iterative Closest Point algorithm, a Robust Point Matching algorithm or a Thin-Plate-Spline Robust Point Matching algorithm) to obtain a transformation between the plurality of derived fiducial spots of the image and the corresponding plurality of reference fiducial spots of the first template, E) using the transformation and the coordinate system of the first template to register the image to the set of capture spots (in this way, the second image and the spatial dataset are registered to each other); and F) analyzing the image after the using in E) in conjunction with spatial analyte data associated with each capture spot, thereby performing spatial analysis of analytes.

Example coherent point drift algorithms are disclosed in Myronenko et al., 2007, "Non-rigid point set registration: Coherent Point Drift," NIPS, 1009-1016; and Myronenko and Song, "Point Set Registration: Coherent Point Drift," arXiv: 0905.2635v1, 15 May 2009, each of which is hereby incorporated by reference, for disclosure on the coherent point drift algorithm. In some embodiments, the coherent point drift algorithm that is used is an implementation in Python called pycpd." See, the Internet at github.com/siavashk/pycpd, which is hereby incorporated by reference. Iterative closest point algorithm are disclosed in for example, Chetverikov et al., 2002, "The Trimmed Iterative Closest Point Algorithm," Object recognition supported by user interaction for service robots, Quebec City, Quebec, Canada, ISSN: 1051-4651; and Chetverikov et al., 2005, "Robust Euclidean alignment of 3D point sets; the trimmed iterative closest point algorithm," Image and Vision Computing 23(3), pp. 299-309, each of which is hereby incorporated by reference.

Example Robust point matching algorithms and Thin-Plate-Spline Robust Point Matching algorithm are disclosed in, for example, in Chui and Rangarajanb, 2003, "A new point matching algorithm for non-rigid registration," Computer Vision and Image Understanding 89(2-3), pp. 114-141, which is hereby incorporated by reference) or a thin-plate-spline robust point matching algorithm (See, for example, Yang, 2011, "The thin plate spline robust point matching (TPS-RPM) algorithm: A revisit," Pattern Recognition Letters 32(7), pp. 910-918, which is hereby incorporated by reference.)

Thus, such disclosures address ways for finding fiducials in an image. Once the fiducials are found in an image the frame of reference of the spatial dataset is known with respect to the second image.

In some embodiments, the spatial dataset generates a spatial context, for each respective capture spot in the set of capture spots, on the overlayed image data of the biological sample.

For instance, in some embodiments, the spatial analyte data provides a classification of one or more capture spots in the set of capture spots, based on the plurality of analytes for the biological sample. In some embodiments, the classification includes an abundance, a detection (e.g., yes or no, presence or absence, etc.), a biological condition (e.g., a tissue type, cell type, a lineage, a disease status, etc.), and/or an annotation (e.g., of membership in a panel of interest and/or a cluster of analytes determined using clustering analysis) of one or more analytes in the plurality of analytes.

Referring to Block 1044, in some embodiments, the spatial dataset provides sequencing information for each analyte in a plurality of analytes from the biological sample mapping to each capture spot in the set of capture spots. In some embodiments, the sequencing information is for a plurality of nucleic acids (e.g., RNA and/or DNA). In some embodiments, the spatial dataset provides abundance information for each analyte in a plurality of analytes. In some embodiments, the abundance information is for DNA, RNA, proteins, or a combination thereof.

In some embodiments, the spatial dataset is obtained by any suitable method. For example, in some embodiments, the spatial dataset is obtained using a sequencing device such as, without limitation, a sequencing system by Illumina®, Pacific Biosciences (PacBio®), Oxford Nanopore®, or Life Technologies (Ion Torrent®). Alternatively or in addition, the spatial dataset may be obtained by sequencing using nucleic acid amplification, polymerase chain reaction (PCR) (e.g., digital PCR, quantitative PCR, or real time PCR), or isothermal amplification. In some examples, such systems provide sequencing reads (also "reads" herein). A read may include a string of nucleic acid bases corresponding to a sequence of a nucleic acid molecule that has been sequenced. Apparatuses suitable for obtaining the sequencing information of a spatial dataset are further described in, e.g., U.S. Patent Application No. 63/080,547, entitled "Sample Handling Apparatus and Image Registration Methods," filed Sep. 18, 2020, U.S. Patent Application No. 63/080,514, entitled "Sample Handling Apparatus and Fluid Delivery Methods," filed Sep. 18, 2020, U.S. Patent Application No. 63/155,173, entitled "Sample Handling Apparatus and Image Registration Methods," filed Mar. 1, 2021, and PCT Application No. US2019/065100, entitled "Imaging system hardware," filed Dec. 6, 2019, each of which is hereby incorporated by reference herein in its entirety.

In some embodiments, the spatial dataset is obtained for the biological sample on the first substrate overlayed on the second substrate (e.g., in a sandwich configuration). An example workflow for obtaining spatial analyte data from a biological sample on a first substrate overlayed on a second substrate in a "sandwich configuration" is described with reference to FIG. 13.

Figure 13:
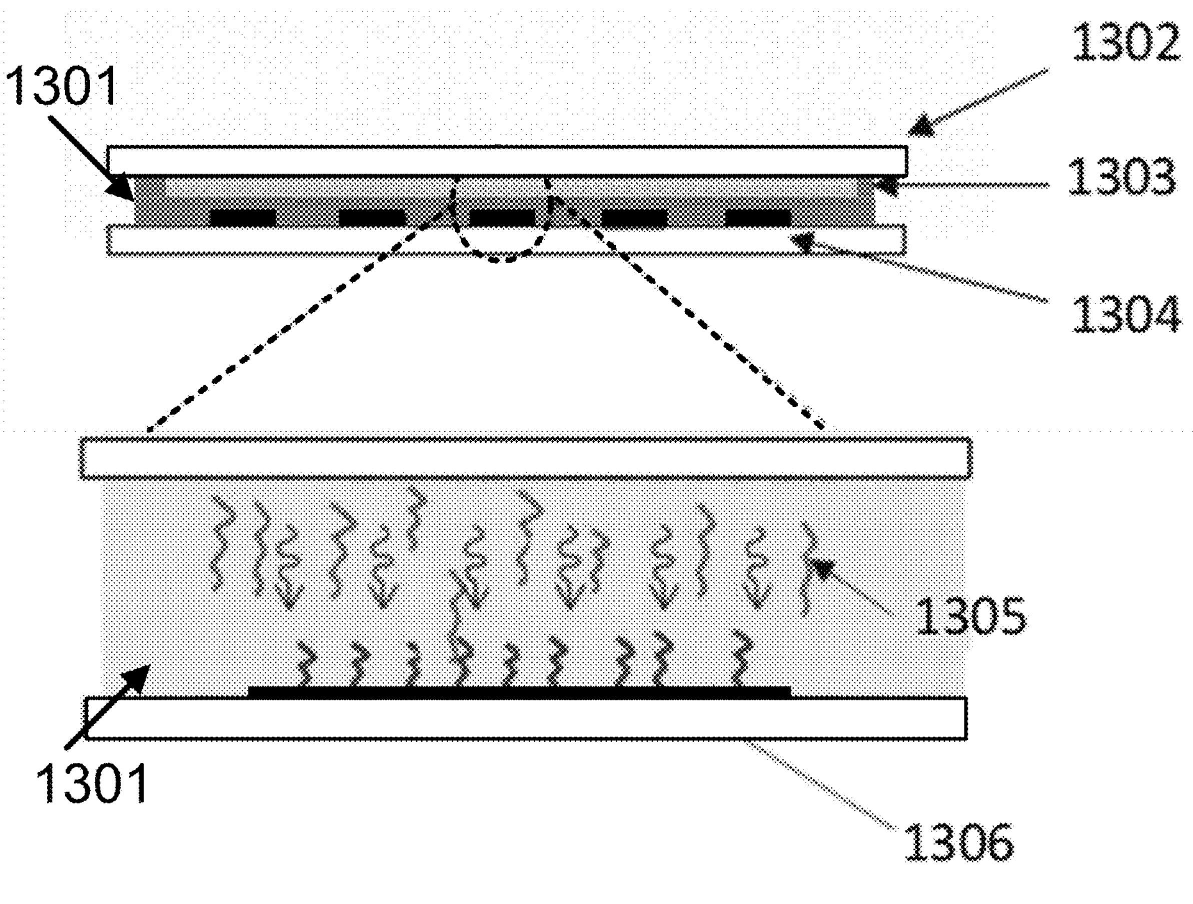
FIG. 13 illustrates a biological sample on a first substrate overlayed on a second substrate, in accordance with some embodiments of the present disclosure.

FIG. 13 is an illustration of an exemplary sandwich configuration. The first substrate 1302 can be contacted with (e.g., attached to) a sample 1303. In FIG. 13, a second substrate 1304 is populated with a plurality of capture probes 1306 at each capture spot 1136 in a set of capture spots, and the sample 1303, including analytes 1305, is contacted with the plurality of capture probes 1306 on the second substrate 1304. In some embodiments, the second substrate comprises a spatially barcoded array of capture probes 1306. In some embodiments, a fiducial frame surrounds the array. Accordingly, the sample 1303 is sandwiched between the first substrate 1302 and the second substrate 1304. When a permeabilization solution 1301 is applied to the sample, analytes 1305 migrate toward the capture probes 1306.

Advantageously, the sandwich configuration of the biological sample, the first substrate, and the second substrate provides benefits over other methods of spatial analysis and/or analyte capture. For example, the sandwich configuration can decouple sample preparation/tissue imaging from the second substrate and enable selection of a particular region of interest of analysis (e.g., for a tissue section larger than the region of the second substrate on which the capture spots are located). The sandwich configuration also beneficially enables spatial analyte assays without having to place a tissue section directly on the second substrate (e.g., directly on the capture spots).

The sandwich configuration described herein further provides the beneficial ability to quality check or select specific sections of tissue prior to committing additional time and resources to the analysis workflow. This can be advantageous to reduce costs and risk or mistakes or issues that can arise during sample preparation. Additionally, the sandwich configuration can enable the ability to select which area of a sample to sequence when a sample section is larger than an array. Another benefit of using the sandwich configuration described herein is the ability to separate fiducial imaging and high-resolution sample imaging. This can enable the separation of expertise required to perform histology workflows and molecular biology workflows and can further enable the assay and the sample to be moved between different laboratories. Additionally, the sandwich configuration described herein can provide greater flexibility and more options in sample preparation conditions since, in some embodiments, there are no capture probes on the first substrate. This can reduce the likelihood that a sample will fall off the substrate and can reduce the likelihood that capture probes are damaged due to high temperatures or interactions with other reagents during sample preparation. The sandwich configuration described herein can also improve the sensitivity and spatial resolution by vertically confining target analytes within the diffusion distance.

The sandwich configuration described above can be implemented using a variety of hardware components, such as sample handling apparatus 706. It should be understood that in general, the various steps and techniques discussed herein can be performed using a variety of different devices and system components, not all of which are expressly set forth. Embodiments of sandwich configurations, including methods of assembling and analyzing the same for spatial analyte data, are further described in U.S. Patent Application No. 63/080,547, entitled "Sample Handling Apparatus and Image Registration Methods," filed Sep. 18, 2020, U.S. Patent Application No. 63/080,514, entitled "Sample Handling Apparatus and Fluid Delivery Methods," filed Sep. 18, 2020, U.S. Patent Application No. 63/155,173, entitled "Sample Handling Apparatus and Image Registration Methods," filed Mar. 1, 2021, and PCT Application No. US2019/065100, entitled "Imaging system hardware," filed Dec. 6, 2019, entitled "Imaging system hardware," filed Dec. 6, 2019, each of which is hereby incorporated by reference herein in its entirety.

With reference to FIG. 13 for context, the disclosed systems and methods therefore provide an advance to the field of spatial sequencing by enabling tissue samples to be placed on a first substrate 1302, such as a standard glass slide, that allows for images to be taken of the tissue sample, and mapping the morphological data of such tissue images, to analyte sequence data of a spatial dataset acquired of the tissue sample using another substrate, e.g., substrate 1304, that has capture spots for capturing analytes from the tissue sample in a location specific manner. The disclosed methods overcome the many hurdles facing such comparisons of morphological data of images of a tissue to spatial sequencing data of the tissue, including providing ways to register the morphological data to the spatial analyte data while still allowing for the tissue images and the spatial datasets to be acquired on different respective substrates that are optimized respectively for tissue imaging and spatial analyte acquisition.

Referring to Block 1046 of FIG. 10F, in some embodiments, the spatial dataset is obtained by a procedure comprising obtaining one or more images of the biological sample on the second substrate 1304, where each respective image of the one or more images comprises a corresponding plurality of pixels in the form of an array of pixel values (e.g., wherein the array of pixel values comprises at least 100,000 pixel values). The method may further include obtaining a plurality of sequence reads (e.g., at least 10,000 sequence reads), in electronic form, from the set of capture spots. Each respective capture probe plurality in a set of capture probe pluralities is (i) at a different capture spot in the set of capture spots and (ii) directly or indirectly associates with one or more analytes from the biological sample, and each respective capture probe plurality in the set of capture probe pluralities is characterized by at least one unique spatial barcode in a plurality of spatial barcodes. The plurality of sequence reads may comprise sequence reads corresponding to all or portions of the plurality of analytes, and/or intermediate agents disclosed herein, and each respective sequence read in the plurality of sequence reads includes a spatial barcode of the corresponding capture probe plurality in the set of capture probe pluralities or a complement thereof. The method may further include using all or a subset of the plurality of spatial barcodes to localize respective sequence reads in the plurality of sequence reads to corresponding capture spots in the set of capture spots, thereby dividing the plurality of sequence reads into a plurality of subsets of sequence reads, each respective subset of sequence reads corresponding to a different capture spot in the plurality of capture spots. The one or more spatial fiducials of the second substrate may be used to provide a composite representation comprising (i) the one or more images aligned to the set of capture spots on the substrate and (ii) a representation of all or a portion of each subset of sequence reads at each respective position within the one or more images that maps to a respective capture spot corresponding to the respective position of the one or more analytes in the sample.

Figure 9:
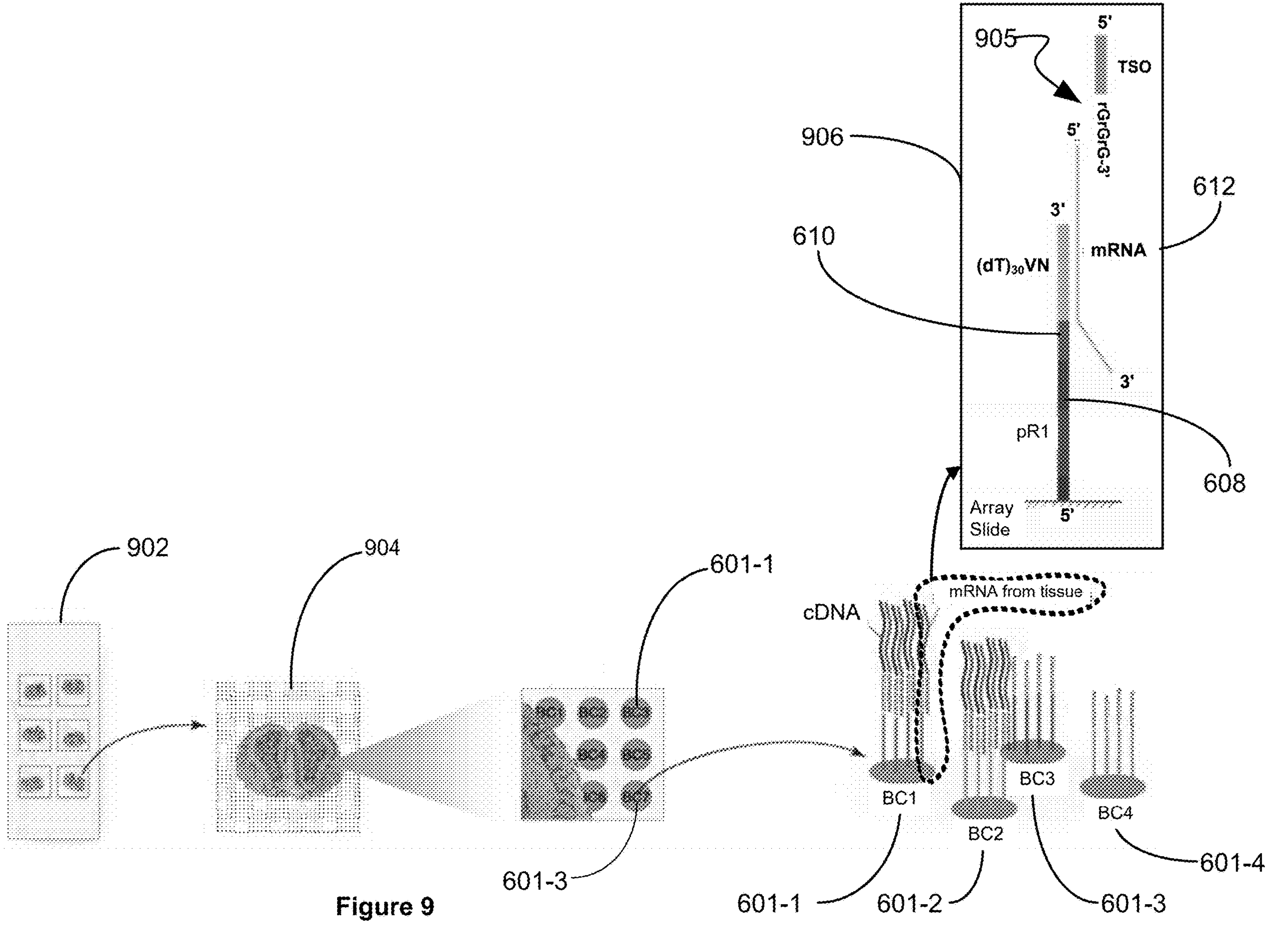
FIG. 9 illustrates details of a spatial capture spot and capture probe in accordance with an embodiment of the present disclosure.

For instance, as illustrated in FIG. 9, a substrate (e.g., array slide 902) containing marked capture spot arrays 904 is used for placement and imaging of thin tissue sections of a biological sample. Each capture spot array 904 contains a plurality of capture spots 601 (e.g., 601-1, 601-2, 601-3, 601-4) comprising barcoded capture probes. A method of spatial analyte analysis is performed, in which the tissue section is permeabilized and a plurality of analytes for the biological sample (e.g., mRNAs from the tissue) are contacted (e.g., directly or indirectly) with the barcoded capture probes 905. As shown in more detail in panel 906, a method of spatial analyte analysis includes performing a reverse transcription step (e.g., using template switching oligo 905) to generate nucleic acid molecules including, for a particular capture probe 602, the spatial barcode 608 of the respective probe, a unique UMI identifier 610 of the respective probe, and a nucleic acid sequence corresponding to the respective analyte 612 contacted with the respective probe. The inclusion of the UMI 610 and the spatial barcode 608 in nucleic acid molecules and/or sequence reads corresponding to the contacted analyte ensures that the spatial location of the analyte within the tissue is captured at the level of capture spot 601 resolution.

In some embodiments, the unique spatial barcode encodes a unique predetermined value selected from the set {1, . . . , 1024}, {1, . . . , 4096}, {1, . . . , 16384}, {1, . . . , 65536}, {1, . . . , 262144}, {1, . . . , 1048576}, {1, . . . , 4194304}, {1, . . . , 16777216}, {1, . . . , 67108864}, or {1, . . . , $1\times10^{12}$}. In some embodiments, the plurality of spatial barcodes is used to localize respective sequence reads in the plurality of sequence reads to corresponding capture spots in the set of capture spots, thereby dividing a plurality of sequence reads of a respective image 1122 into a plurality of subsets of sequence reads. Each respective subset of sequence reads corresponds to a different capture spot in the plurality of capture spots.

In some embodiments, the plurality of sequence reads comprises 10,000 or more sequence reads, 50,000 or more sequence reads, 100,000 or more sequence reads, or $1\times10^6$ or more sequence reads. In some embodiments, the plurality of sequence reads comprises at least 100,000, at least 200,000, at least 500,000, at least 800,000, at least $1\times10^6$, at least $2\times10^6$, at least $5\times10^6$, at least $8\times10^6$, at least $1\times10^7$, or at least $1\times10^8$ sequence reads. In some embodiments, the plurality of sequence reads comprises no more than $1\times10^9$, no more than $1\times10^8$, no more than $1\times10^7$, no more than $1\times10^6$, no more than 500,000, no more than 200,000 or no more than 100,000 sequence reads. In some embodiments, the plurality of sequence reads comprises from 10,000 to $1\times10^7$, from 100,000 to $1\times10^8$, from $1\times10^5$ to $1\times10^8$, or from 10,000 to 500,000 sequence reads. In some embodiments, the plurality of sequence reads falls within another range starting no lower than 10,000 sequence reads and ending no higher than $1\times10^9$ sequence reads.

In some embodiments, the obtaining the plurality of sequence reads comprises high-throughput sequencing.

A wide variety of different sequencing methods can be used to obtain the spatial dataset. In general, sequence reads can be obtained from, for example, nucleic acid molecules such as deoxyribonucleic acid (DNA) or ribonucleic acid (RNA), including variants or derivatives thereof (e.g., single stranded DNA or DNA/RNA hybrids, and nucleic acid molecules with a nucleotide analog). Sequencing can be performed by various commercial systems. More generally, sequencing can be performed using nucleic acid amplification, polymerase chain reaction (PCR) (e.g., digital PCR and droplet digital PCR (ddPCR), quantitative PCR, real time PCR, multiplex PCR, PCR-based singleplex methods, emulsion PCR), and/or isothermal amplification.

Other examples of methods for sequencing include, but are not limited to, DNA hybridization methods (e.g., Southern blotting), restriction enzyme digestion methods, Sanger sequencing methods, next-generation sequencing methods (e.g., single-molecule real-time sequencing, nanopore sequencing, and Polony sequencing), ligation methods, and microarray methods. Additional examples of sequencing methods that can be used include targeted sequencing, single molecule real-time sequencing, exon sequencing, electron microscopy-based sequencing, panel sequencing, transistor-mediated sequencing, direct sequencing, random shotgun sequencing, Sanger dideoxy termination sequencing, whole-genome sequencing, sequencing by hybridization, pyrosequencing, capillary electrophoresis, gel electrophoresis, duplex sequencing, cycle sequencing, single-base extension sequencing, solid-phase sequencing, high-throughput sequencing, massively parallel signature sequencing, co-amplification at lower denaturation temperature-PCR (COLD-PCR), sequencing by reversible dye terminator, paired-end sequencing, near-term sequencing, exonuclease sequencing, sequencing by ligation, short-read sequencing, single-molecule sequencing, sequencing-by-synthesis, real-time sequencing, reverse-terminator sequencing, nanopore sequencing, 454 sequencing, Solexa Genome Analyzer sequencing, SOLID™ sequencing, MS-PET sequencing, and any combinations thereof.

In some embodiments, a respective capture probe plurality in the set of capture probe pluralities includes 1000 or more capture probes, 2000 or more capture probes, 10,000 or more capture probes, 100,000 or more capture probes, $1\times10^6$ or more capture probes, $2\times10^6$ or more capture probes, or $5\times10^6$ or more capture probes. In some embodiments, each capture probe in the respective capture probe plurality includes a poly-T sequence and the unique spatial barcode that characterizes the different capture spot. In some embodiments, each capture probe in the respective capture probe plurality includes the same spatial barcode from the plurality of spatial barcodes. In some embodiments, each capture probe in the respective capture probe plurality includes a different spatial barcode from the plurality of spatial barcodes.

Additional methods for obtaining spatial analyte data that are contemplated for use in the present disclosure, including but not limited to sequencing, sequence reads, and methods of processing and analyzing the same, are further described in U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

Referring again to Block 1046, in some embodiments, the composite representation indicates a behavior (e.g., an abundance, a presence or absence, a classification, etc.) of one or more analytes at each capture spot in the plurality of capture spots. See also, U.S. Provisional Application No. 62/909,071, entitled "Systems and Methods for Visualizing a Pattern in a Dataset," filed Oct. 1, 2019, which is hereby incorporated by reference, for additional illustrations of composite representations of the relative abundance of nucleic acid fragments mapping to each gene in a plurality of genes at each capture spot in the plurality of capture spots.

In some embodiments, an image 1122, for example image 1916-1 or 1916-2 of FIG. 20B, is aligned to the set of capture spots 1136 on a substrate, for example the second substrate 1304 of FIG. 13, by a procedure that comprises analyzing the array of pixel values 1124 to identify a plurality of spatial fiducials 1130 of the respective image. The plurality of spatial fiducials 1130 of the respective image 1122 are aligned with a corresponding plurality of reference spatial fiducials on the substrate (e.g. second substrate 1304 of FIG. 13) using an alignment algorithm to obtain a transformation between the plurality of spatial fiducials 1130 of the respective image 1122 (e.g., second image) and the corresponding plurality of reference spatial fiducials on the substrate (e.g., second substrate). The transformation and a coordinate system corresponding to the plurality of reference spatial fiducials (e.g., of the second image) are then used to locate a corresponding position in the image (e.g. the second image) of each capture spot in the set of capture spots.

FIG. 14 illustrates an image 1122 of a tissue 1204 on a substrate, where the image includes a plurality of spatial fiducials, in accordance with some embodiments. FIG. 14 is a close up view of image 1916-1 or 1916-2 of FIG. 20B and can be referred to herein as a second image. The spatial fiducials are arranged along the external border of the substrate, surrounding a capture spot array and the tissue. In some such embodiments, the spatial fiducials comprise patterned spots, and the patterned spots indicate the edges and corners of the capture spot array. In some such embodiments, a different pattern of spatial fiducials is provided at each corner, allowing the image to be correlated with spatial information using any orientation (e.g., rotated and/or mirror image).

Accordingly, the frame of reference of the spatial dataset is known, or can be determined, with respect to the second image, based on the one or more spatial fiducials of the second image.

Methods for spatial analysis of analytes, including but not limited to fiducial registration, fiducial alignment and transformation, analytes, substrates, capture spots, capture probes, and sequencing, are further described above (see, e.g., "Definitions: (A) General Definitions: Analytes; Capture probes; Capture spots; Substrates; and Spatial fiducials; and (B) Methods for Spatial Analysis of Analytes") and in U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

Applications and Visualization of Spatial Analyte Analysis.

Referring to Block 1048 of FIG. 10F, in some embodiments, the method further comprises using the spatial analyte data to characterize a biological condition in a subject.

In some embodiments, the spatial dataset is used to associated one or more different species of analytes (e.g., polynucleotides, polypeptides, etc.) from the biological sample with one or more physical properties of the biological sample. For example, the one or more different species of analytes can be associated with locations of the analytes in the biological sample. Such information (e.g., proteomic information when the analyte binding moiety(ies) recognizes a polypeptide(s)) can be used in association with other spatial information (e.g., genetic information from the biological sample, such as DNA sequence information, transcriptome information, for example sequences of transcripts, or both). For example, a cell surface protein of a cell can be associated with one or more physical properties of the cell (e.g., a shape, size, activity, or a type of the cell). The one or more physical properties can be characterized by imaging the cell. The cell can be bound by an analyte capture agent comprising an analyte binding moiety that binds to the cell surface protein and an analyte binding moiety barcode that identifies that analyte binding moiety, and the cell can be subjected to spatial analysis (e.g., any of the variety of spatial analysis methods described herein). For example, an analyte capture agent bound to a cell surface protein (or a portion of such analyte capture agent, e.g., a portion comprising the analyte binding moiety barcode) can be bound to a capture probe (e.g., a capture probe on an array), where the capture probe includes a capture domain that interacts with an analyte capture sequence present on the capture agent barcode domain of the analyte capture agent. In some embodiments, profiles of individual cells or populations of cells in a spatial dataset can be compared to profiles from other cells, e.g., 'normal' cells, to identify variations in analytes, which can provide diagnostically relevant information. In some embodiments, these profiles can be useful in the diagnosis of a variety of disorders that are characterized by variations in cell surface receptors, such as cancer and other disorders.

In some embodiments, the spatial dataset comprises an image representation of the dataset.

In some embodiments, the computer system further comprises a display and the image data for the biological sample overlayed onto spatial analyte data for the plurality of analytes of the biological sample is displayed, on the display, as an image representation.

In some embodiments, method further comprises visualizing, on a visualization system (e.g., a computer with a display), the biological sample overlayed onto spatial analyte data for the plurality of analytes of the biological sample. In some embodiments, the visualization system comprises a display on the computer system comprising one or more processing cores and a memory. In some embodiments, the visualization system is a display on a device, such as sample handling apparatus 706.

In some embodiments, the visualization system includes visualization tools that can be configured to provide the first image, the second image, the spatial dataset, and/or any features or overlays thereof as described herein, in one or more visual formats. In some embodiments, the first image, the second image, the spatial dataset, and/or any features or overlays thereof as described herein, are provided in a GUI of a display of the sample handling apparatus 706. In some embodiments, the visualization tools can be configured on a remote computing device that is communicatively coupled to the sample handling apparatus 706, such that the first image, the second image, the spatial dataset, and/or any features or overlays thereof as described herein, can be visualized and/or manipulated on the remote computing device.

In some embodiments, the visualization tools are configured to provide a user input system and user interface, such as a desktop application that provides interactive visualization functionality to perform any of the workflows or processes described herein. In some embodiments, the visualization tools include a browser that can be configured to enable users to evaluate and interact with different views of the spatial analyte data to quickly gain insights into the underlying biology of the samples being analyzed. The browser can be configured to evaluate significant analytes (e.g., genes), characterize and refine clusters of data, and to perform differential analysis (e.g., expression analysis) within the spatial context of an image and/or a spatial dataset.

In some embodiments, the visualization tools are configured to read from and write to files generated by a spatial analyte analysis and/or image analysis workflow. The files can be configured to include tiled and untiled versions of images and analyte data, including but not limited to, gene expression data for all barcoded locations on a substrate or slide, alignment data associated with alignment of a sample or portions of the sample and the barcoded locations of an array, and gene expression-based clustering information for the barcoded locations. The gene expression-based clustering information can include t-Distributed Stochastic Neighbor Embedding (t-SNE) and Uniform Manifold Approximation and Projection (UMAP) projections.

In some embodiments, the visualization system includes image setting functionality configured to adjust or configured settings associated with any of the workflows or processes described herein, including but not limited to fiducial display, scale display, rotation, and/or resetting the image data. In some embodiments, the visualization system includes one or more image manipulation tools, such as a pointer to select data or menu items, a lasso to select data, and a pen to annotate or mark data. The analyte data can be provided in a primary viewing panel.

In some embodiments, the visualization system includes a presentation of spatial analyte data organized with respect to clusters. In some embodiments, the presentation can provide representative clusters as violin plots, although a number of other non-limiting plot types can be envisioned. In some embodiments, the visualization system includes secondary viewing panels. The secondary viewing panels can provide one or more projections of the spatial analyte data provided in the primary viewing panel. For example, the secondary viewing panel can provide a spatial projection of the analyte data so that a user can interact with the spatial opacity and magnification settings of the data. The secondary viewing panel can provide an additional projection of the spatial analyte data other than or in addition to that shown on the primary viewing panel.

The primary viewing panel and secondary viewing panels can each individually be configured with image manipulation tools including, but not limited to, image resize functionality, image cropping functionality, image zoom functionality, image capture functionality, tile view functionality, list view functionality, or the like.

Visualization and applications of spatial analyte data, including spatial analyte data overlayed on biological sample images, that are contemplated for use in the present disclosure are further described in U.S. patent application Ser. No. 16/951,843, entitled "SYSTEMS AND METHODS FOR SPATIAL ANALYSIS OF ANALYTES USING FIDU- CIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; U.S. patent application Ser. No. 16/951,864, entitled "Spatial Analysis of Analytes," filed Nov. 18, 2020; and in U.S. Patent Application No. 63/080,547, entitled "Sample Handling Apparatus and Image Registration Methods," filed Sep. 18, 2020, U.S. Patent Application No. 63/080,514, entitled "Sample Handling Apparatus and Fluid Delivery Methods," filed Sep. 18, 2020, U.S. Patent Application No. 63/155,173, entitled "Sample Handling Apparatus and Image Registration Methods," filed Mar. 1, 2021, and PCT Application No. US2019/065100, entitled "Imaging system hardware," filed Dec. 6, 2019, each of which is hereby incorporated by reference herein in its entirety.

Fiducial Registration.

As described above, in some embodiments, a workflow for overlaying image data for a biological sample onto spatial analyte data for a plurality of analytes of the biological sample further includes performing fiducial registration, such as fiducial registration 2004 and/or manual fiducial registration 1904.

Generally, fiducial registration (e.g., fiducial alignment) can be used to determine a position of an element in a spatial dataset with respect to the coordinate system of an image of the biological sample (e.g., the second image), thus obtaining a frame of reference of the spatial dataset that is known with respect to the image.

In some embodiments, the fiducial registration is performed at a computing system, such as a system 1100. For instance, in some embodiments, the computing system determines one or more spatial fiducials located on a respective substrate, such as the second substrate. In some embodiments, the one or more spatial fiducials are determined using computer vision and/or image processing functionality provided in an image processing pipeline configured within the sample handling apparatus 706. For example, as described above, in some embodiments, an image 1122 is aligned to the set of capture spots 1136 on a substrate by a procedure that comprises analyzing the array of pixel values 1124 to identify one or more spatial fiducials 1130 of the respective image. In some embodiments, the one or more spatial fiducials include a high contrast or uniquely shaped mark to aid in determination of the spatial fiducial via the computer vision and/or image processing functionality provided in an image processing pipeline, or other methods.

In some embodiments, the one or more spatial fiducials 1130 of the respective image 1122 are aligned with a corresponding one or more reference spatial fiducials using an alignment algorithm to obtain a transformation between the one or more spatial fiducials 1130 of the respective image 1122 and the corresponding one or more reference spatial fiducials. The transformation and a coordinate system corresponding to the one or more reference spatial fiducials are then used to locate a corresponding position in the respective image of each capture spot in the set of capture spots.

In some embodiments, one or more imaging algorithms (e.g., an image segmentation algorithm) can be configured to determine where a biological sample, such as tissue, has been placed, thus generating a respective pattern for the biological sample, and aligning the respective pattern with the one or more spatial fiducials. In some embodiments, tissue detection 2006 (e.g., image segmentation) is used to identify which capture spots, and therefore which capture probes, in the spatial dataset will be used for spatial analyte analysis. In some embodiments, fiducial alignment 2004 is performed to determine where in the image an individual capture spot resides, since each user may set a slightly different field of view when imaging the sample area. In some embodiments, the method further comprises performing manual fiducial alignment 1904 and manual tissue selection 1906 via the computing system.

Methods and embodiments for fiducial registration contemplated for use in the present disclosure are further described in U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; U.S. patent application Ser. No. 16/951,864, entitled "Spatial Analysis of Analytes," filed Nov. 18, 2020; U.S. Patent Application No. 63/080,547, entitled "Sample Handling Apparatus and Image Registration Methods," filed Sep. 18, 2020, U.S. Patent Application No. 63/080,514, entitled "Sample Handling Apparatus and Fluid Delivery Methods," filed Sep. 18, 2020, U.S. Patent Application No. 63/155,173, entitled "Sample Handling Apparatus and Image Registration Methods," filed Mar. 1, 2021, and PCT Application No. US2019/065100, entitled "Imaging system hardware," filed Dec. 6, 2019, each of which is hereby incorporated by reference herein in its entirety.

Image Segmentation.

As described above, in some embodiments, a workflow for overlaying image data for a biological sample onto spatial analyte data for a plurality of analytes of the biological sample further includes performing image segmentation (e.g., tissue detection), such as image segmentation 2006 and/or manual image segmentation 1906. In some embodiments, referring again to Block 1014 in the method of FIG. 10, image segmentation is used to obtain the first pattern of the biological sample in the first image and the second pattern of the biological sample in the second image, each of which are used to determine a registration for the first image and the second image.

Moreover, as described above, in some embodiments, the respective pattern of the biological sample in a respective image indicates the location of the biological sample in the respective image (e.g., where the biological sample is overlayed onto a substrate). In some embodiments, a respective pattern of the biological sample in a respective image denotes regions of the image that contain sample (e.g., tissue) compared to regions of the image that contain background (e.g., non-tissue). In some embodiments, the first pattern of the biological sample in the first image and the second pattern of the biological sample in the second image are obtained using an image segmentation process.

In some embodiments, the first pattern of the biological sample in the first image and the second pattern of the biological sample in the second image are obtained manually or automatically. For example, in some embodiments, a respective pattern of the biological sample in a respective image is obtained manually via a user selection (e.g., circling, bounding, clicking, etc.), at a graphical user interface, of a location of the biological sample in the respective image displayed on a display. In some embodiments, a respective pattern of the biological sample in a respective image is obtained by training a statistical classifier to label each pixel within the respective image as either tissue or background. In some such embodiments, the tissue detection algorithm can be configured to receive an image with a smooth, bright background and darker tissue with a complex structure.

In some embodiments, the obtaining the first pattern includes any of the embodiments disclosed herein with respect to the obtaining the second pattern. In some embodiments, the obtaining the second pattern includes any of the embodiments disclosed herein with respect to the obtaining the first pattern.

In some embodiments, a respective pattern (e.g., the first pattern and/or the second pattern) for the biological sample is any measure of a signal (e.g., a pixel intensity) that can be spatially represented in the respective image. In some embodiments, a respective pattern (e.g., the first pattern and/or the second pattern) for the biological sample is represented as a function of two-dimensional coordinates over the respective image.

In some embodiments, a respective pattern (e.g., the first pattern and/or the second pattern) is obtained using mutual information.

Other methods of obtaining spatial patterns for a biological sample are contemplated, as will be apparent to one skilled in the art.

For instance, referring to Block 1050 and FIGS. 24A-24I, in some embodiments, the first pattern of the biological sample in the first image is obtained by assigning each respective pixel in a plurality of pixels in the first image to a first class or a second class, where the first class indicates overlay of the sample on the first substrate and the second class indicates background, by a procedure comprising (i) running a plurality of heuristic classifiers on the plurality of pixels, where, for each respective pixel in the plurality of pixels, the heuristic classifier casts a vote for the respective pixel between the first class and the second class, thereby forming a corresponding aggregated score for each respective pixel in the plurality of pixels, and (ii) applying the aggregated score and an intensity of each respective pixel in the plurality of pixels to a segmentation algorithm to independently assign a probability to each respective pixel in the plurality of pixels of being sample or background.

Although methods of obtaining the first pattern of the biological sample in the first image are discussed herein as an example, in some embodiments, the second pattern of the biological sample in the second image is obtained using the method described above and/or using any of the methods disclosed herein with respect to the first pattern of the biological sample in the first image.

Figure 24A:
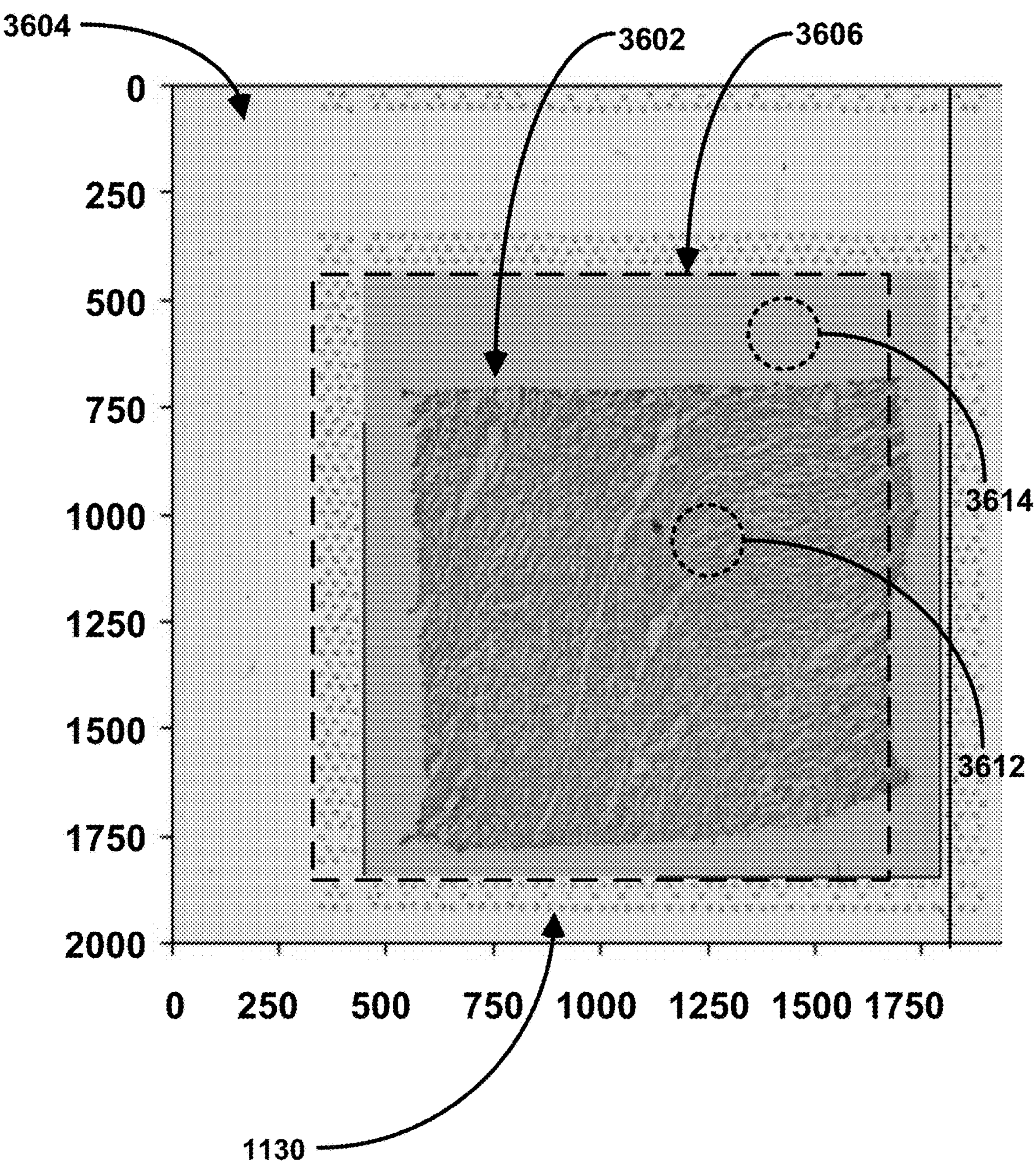
FIGS. 24A, 24B, 24C, 24D, 24E, 24F, 24G, 24H, and 24I illustrate the image input FIG. 24A of a tissue section on a substrate, the outputs of a variety of heuristic classifiers FIGS. 24B, 24C, 24D, 24E, 24F, and 24G, and the outputs of a segmentation algorithm FIGS. 24H and 24I in accordance with some embodiments of the present disclosure.

Referring to FIG. 24A, in some embodiments, each respective pixel in the plurality of pixels of the image is assigned to a first class or a second class. The first class indicates the tissue sample 3602 on the substrate 3604 and the second class indicates background (e.g., no tissue sample 3602 on the substrate). Thus, for instance, in FIG. 24A, most of the pixels within example region 3612 should be assigned the first class and the pixels in example region 3614 should be assigned the second class. In some embodiments, the assigning of each respective pixel as tissue (first class) or background (second class) provides information as to the regions of interest, such that any subsequent spatial analysis of the image (e.g., in accordance with the systems and methods disclosed herein) can be accurately performed using capture spots and/or analytes that correspond to tissue rather than to background. For example, in some instances, obtained images include imaging artifacts including but not limited to debris, background staining, holes or gaps in the tissue section, and/or air bubbles (e.g., under a cover slip and/or under the tissue section preventing the tissue section from contacting the capture array). Then, in some such instances, the ability to distinguish pixels corresponding to tissue from pixels corresponding to background in the obtained image improves the resolution of spatial analysis, e.g., by removing background signals that can impact or obscure downstream analysis, thus limiting the analysis of the plurality of capture probes and/or analytes to a subset of capture probes and/or analytes that correspond to a region of interest (e.g., tissue). See, Uchida, 2013, "Image processing and recognition for biological images," Develop. Growth Differ. 55, 523-549, doi:10.1111/dgd.12054, which is hereby incorporated herein by reference in its entirety, for further embodiments of applications for biological image processing.

Referring to Block 1052, in some embodiments, the obtaining the first pattern further comprises overlaying a mask on the first image, where the mask causes each respective pixel in the plurality of pixels of the first image that has been assigned a greater probability of being sample to be assigned a first attribute and each respective pixel in the plurality of pixels that has been assigned a greater probability of being background to be assigned a second attribute.

In some embodiments, the first attribute is a first color, and the second attribute is a second color.

In some embodiments, the first attribute is a first level of brightness or opacity and the second attribute is a second level of brightness or opacity.

In some embodiments, the plurality of heuristic classifiers comprises a first heuristic classifier that identifies a single intensity threshold that divides the plurality of pixels into the first class and the second class, thereby causing the first heuristic classifier to cast a vote for each respective pixel in the plurality of pixels for either the first class or the second class, and where the single intensity threshold represents a minimization of intra-class intensity variance between the first and second class or a maximization of inter-class variance between the first class and the second class.

Figure 24B:
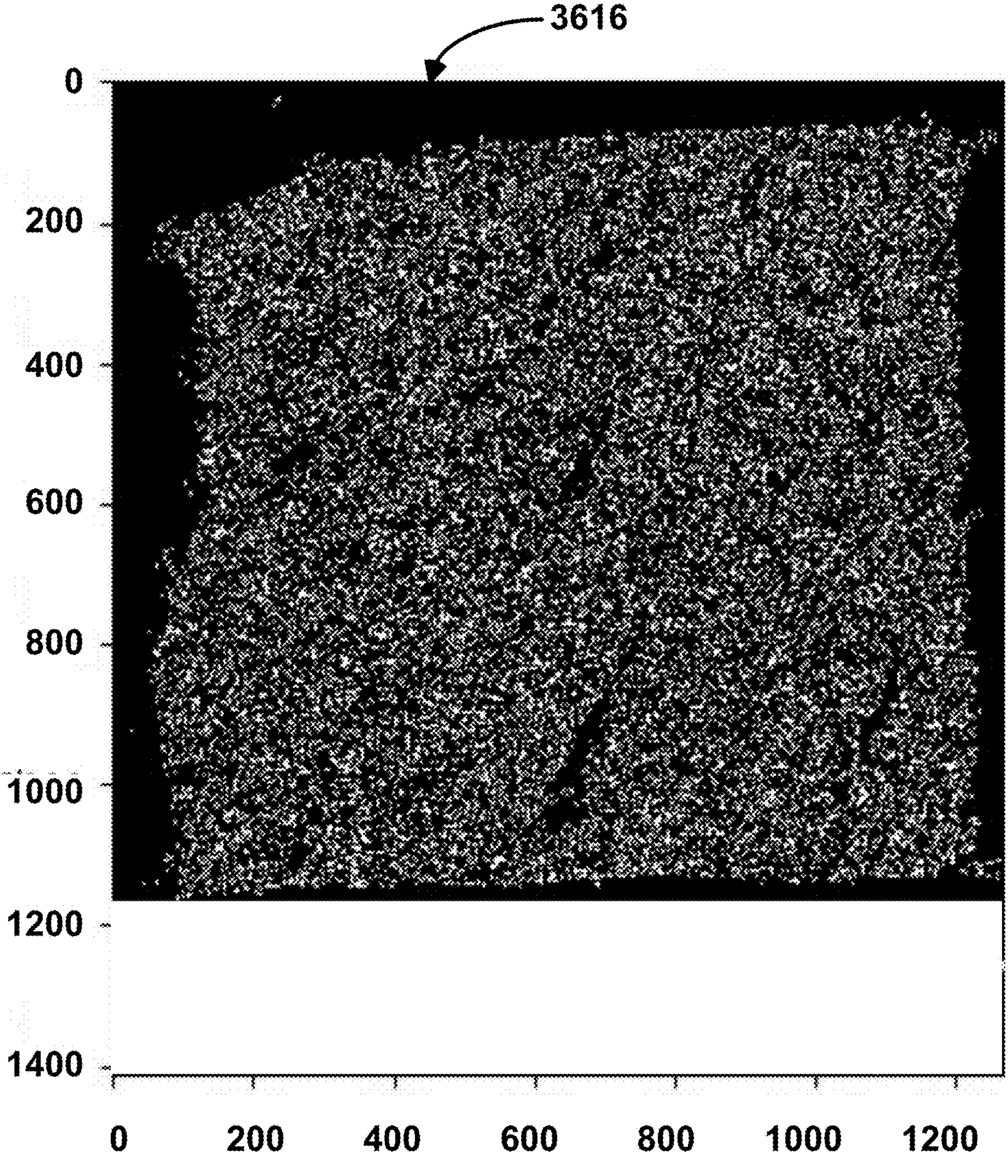
Figure 24C:
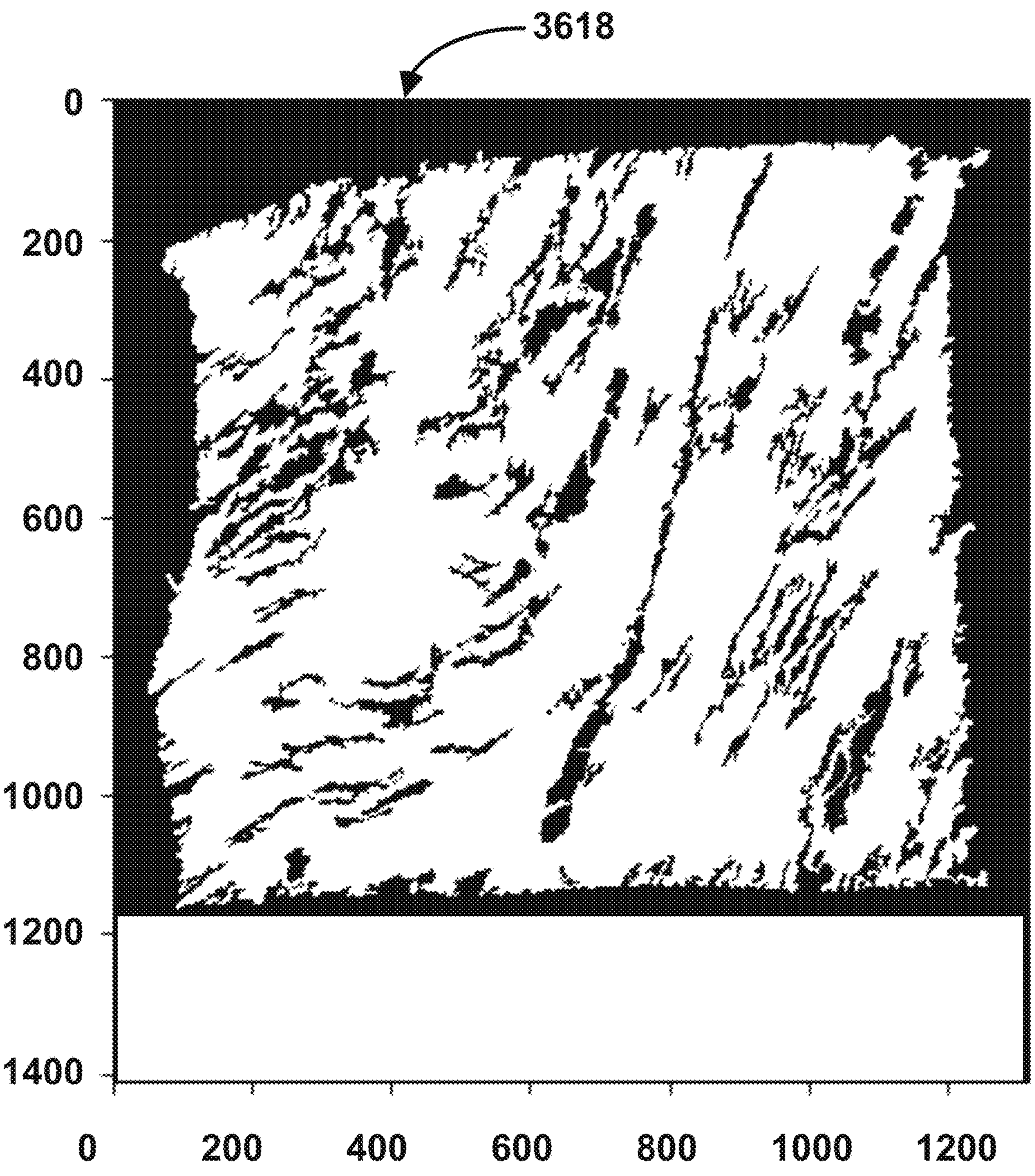

In some embodiments, the single intensity threshold is determined using Otsu's method, where the first heuristic classifier identifies a threshold that minimizes intra-class variance or equivalently maximizes inter-class variance. An example of an outcome of a heuristic classifier using Otsu's method is illustrated in FIG. 24C, which depicts a thresholded image 3618 (e.g., a mask or a layer) after conversion of the acquired image, where each pixel in the plurality of pixels is represented as either a white or a black pixel. Here, Otsu's method is an example of a binarization method using global thresholding. In some embodiments, Otsu's method is robust when the variances of the two classes (e.g., foreground and background) are smaller than the mean variance over the obtained image as a whole.

In some embodiments, the plurality of heuristic classifiers comprises a second heuristic classifier that identifies local neighborhoods of pixels with the same class identified using the first heuristic classifier and applies a smoothed measure of maximum difference in intensity between pixels in the local neighborhood thereby causing the second heuristic classifier to cast a vote for each respective pixel in the plurality of pixels for either the first class or the second class.

Figure 24D:
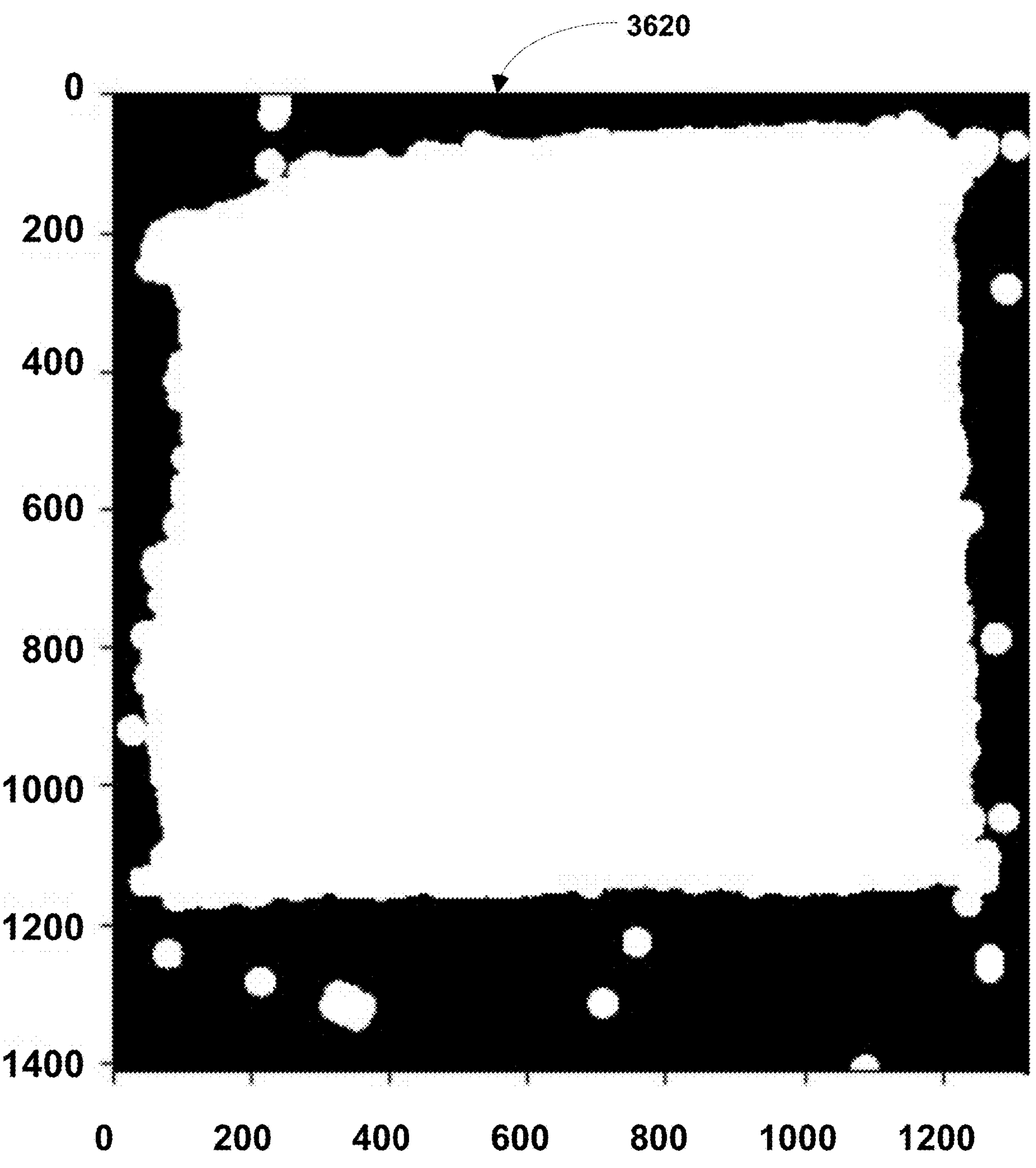
Figure 24E:
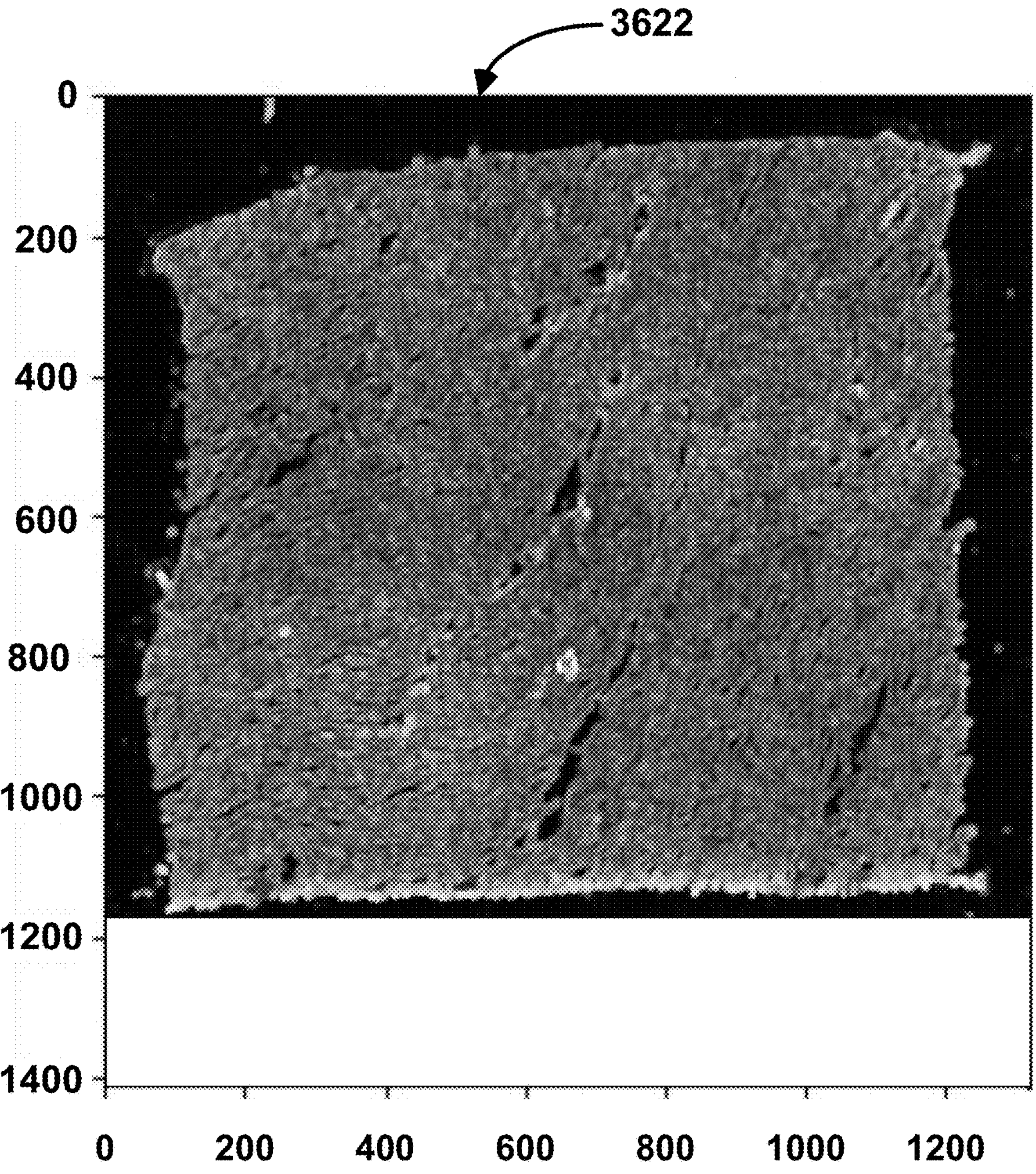

FIG. 24E illustrates a mask 3622 of an obtained image where each pixel in the plurality of pixels in the obtained image is converted to a grayscale value that is a difference in local intensity values. Unlike the global thresholding methods (e.g., Otsu's method) described above, local intensity gradients are a measure of granularity rather than intensity. For example, whereas global thresholding methods distinguish subsets of pixels that are relatively "light" from subsets of pixels that are relatively "dark," local intensity gradients distinguish regions with patterns of alternating lightness and darkness (e.g., texture) from regions with relatively constant intensities (e.g., smoothness). Local intensity gradient methods are therefore robust in some instances where images comprise textured tissue and moderate resolution, and/or where global thresholding techniques fail to distinguish between classes due to various limitations. These include, in some embodiments, small foreground size compared to background size, small mean difference between foreground and background intensities, high intra-class variance (e.g., inconsistent exposure or high contrast within foreground and/or background regions), and/or background noise (e.g., due to punctate staining, punctate fluorescence, or other intensely pigmented areas resulting from overstaining, overexposure, dye residue and/or debris).

Figure 24F:
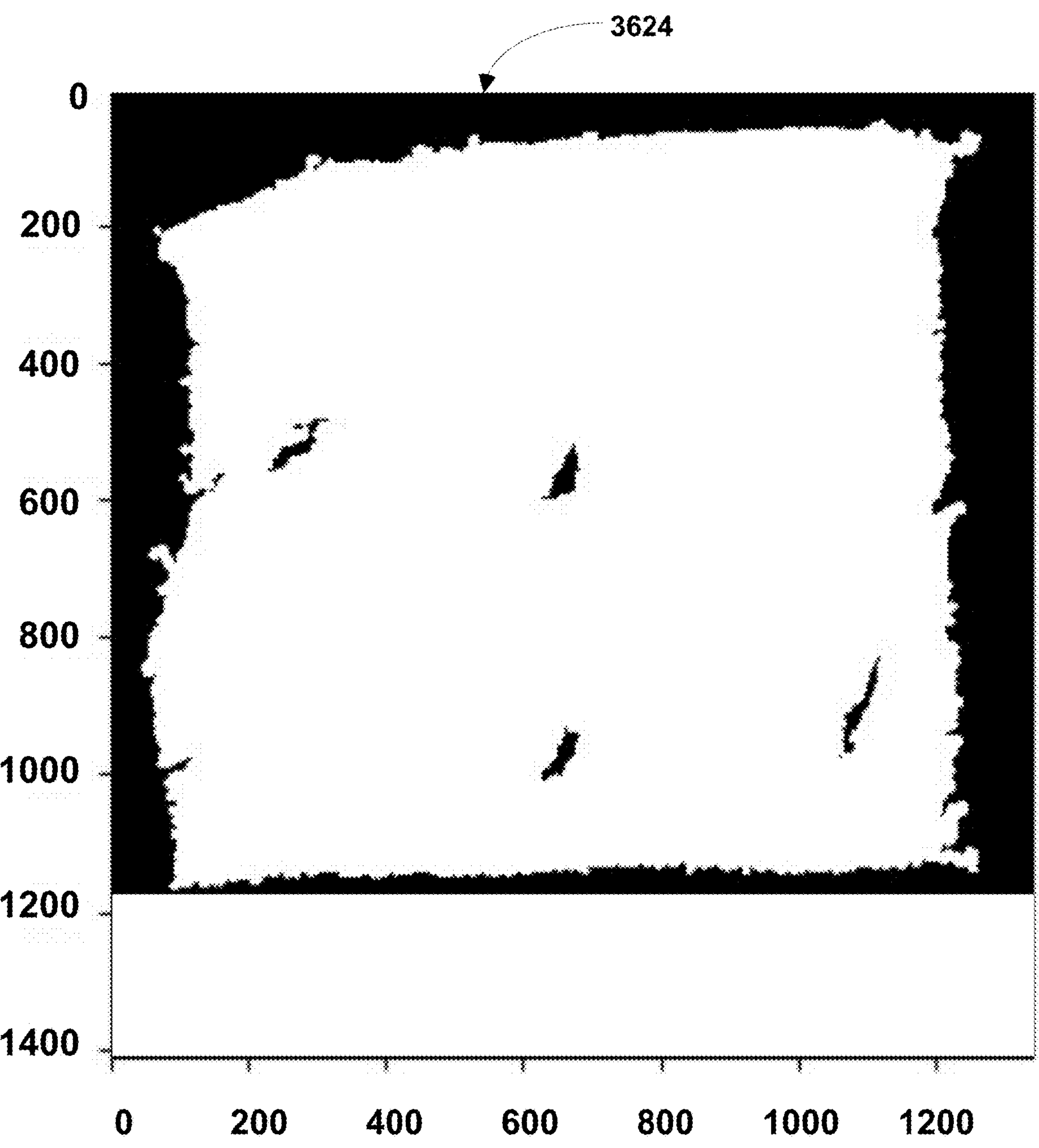

In some embodiments, a global thresholding method is further applied to an image mask comprising the outcome of a local intensity gradient filter represented as an array (e.g., a matrix) of grayscale pixel values. In some such embodiments, the local intensity gradient array is binarized into two classes using Otsu's method, such that each pixel in the plurality of pixels is converted to a white or a black pixel (e.g., having pixel value of 1 or 0, respectively), representing foreground or background, respectively. FIG. 24F illustrates an example 3624 of the characterization of pixels into the first and second class using Otsu's method applied to a local intensity gradient filter from an obtained image, such that binarization is applied to regions of high and low granularity rather than regions of high and low pixel intensity. This provides an alternative method for classifying foreground and background regions over global thresholding methods.

In some embodiments, the plurality of heuristic classifiers comprises a third heuristic classifier that performs edge detection on the plurality of pixels to form a plurality of edges in the respective image, morphologically closes the plurality of edges to form a plurality of morphologically closed regions in the first image and assigns pixels in the morphologically closed regions to the first class and pixels outside the morphologically closed regions to the second class, thereby causing the third heuristic classifier to cast a vote for each respective pixel in the plurality of pixels for either the first class or the second class.

In some embodiments, a Canny edge detection algorithm is used to detect edges on a grayscale image. In some such embodiments, edges are identified using a convolution algorithm that identifies the pixel intensity value 1124 for each respective pixel in a plurality of pixels in an array (e.g., an image or a mask) and compares two or more pixels to an edge detection filter (e.g., a box operator that represents a threshold difference in pixel intensity). An edge is thus defined as a set of pixels with a large difference in pixel intensities. Identification of edges is determined by calculating the first-order or second-order derivatives of neighboring pixel intensity values. In some embodiments, the Canny edge detection algorithm results in a binary image where a particular first assigned color value (e.g., white) is applied to pixels that represent edges whereas pixels that are not part of an edge are assigned a second color value (e.g., black). See, Canny, 1986, "A Computational Approach to Edge Detection," IEEE Trans Pattern Anal Mach Intell. 8(6):679-98. FIG. 24B illustrates an image mask 3616 comprising the output of a Canny edge detection algorithm on an obtained image.

In some embodiments, edges in the plurality of edges are closed to form a plurality of morphologically closed regions. FIG. 24D illustrates an image mask 3620 in which closed regions are formed by morphologically closing a plurality of edges identified using a Canny edge detection algorithm, as pictured in FIG. 24B.

Figure 24G:
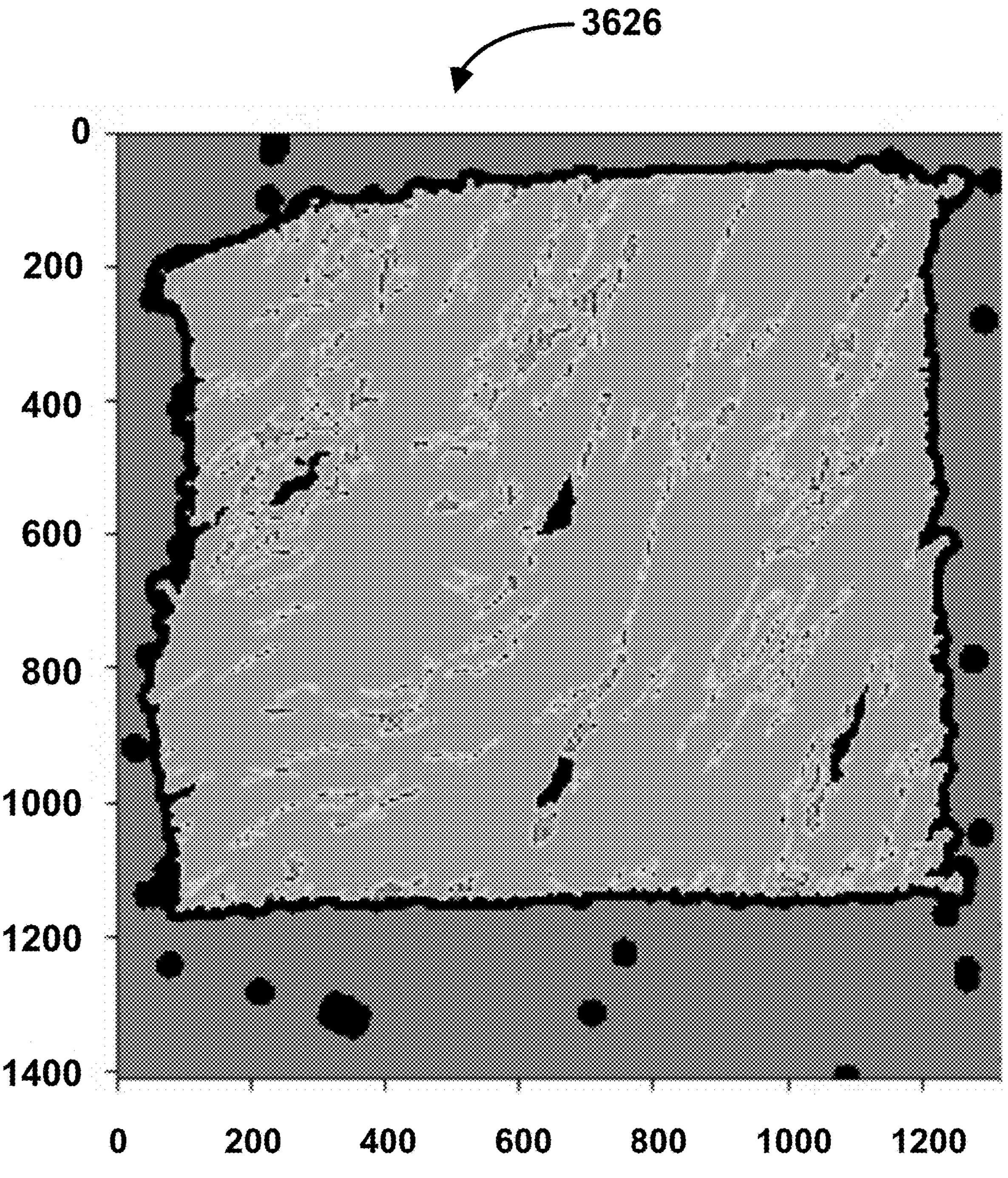
Figure 24H:
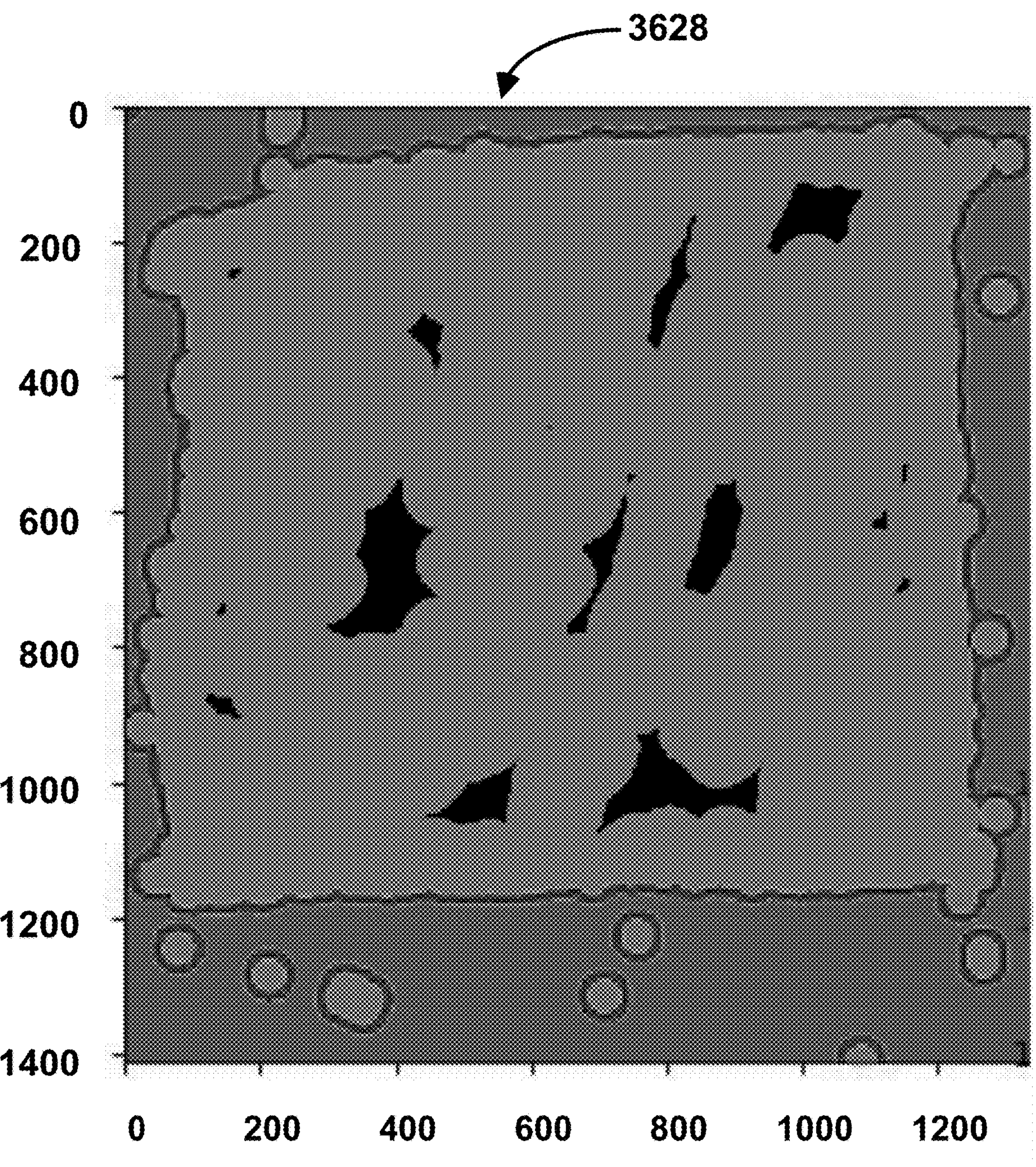
Figure 24I:
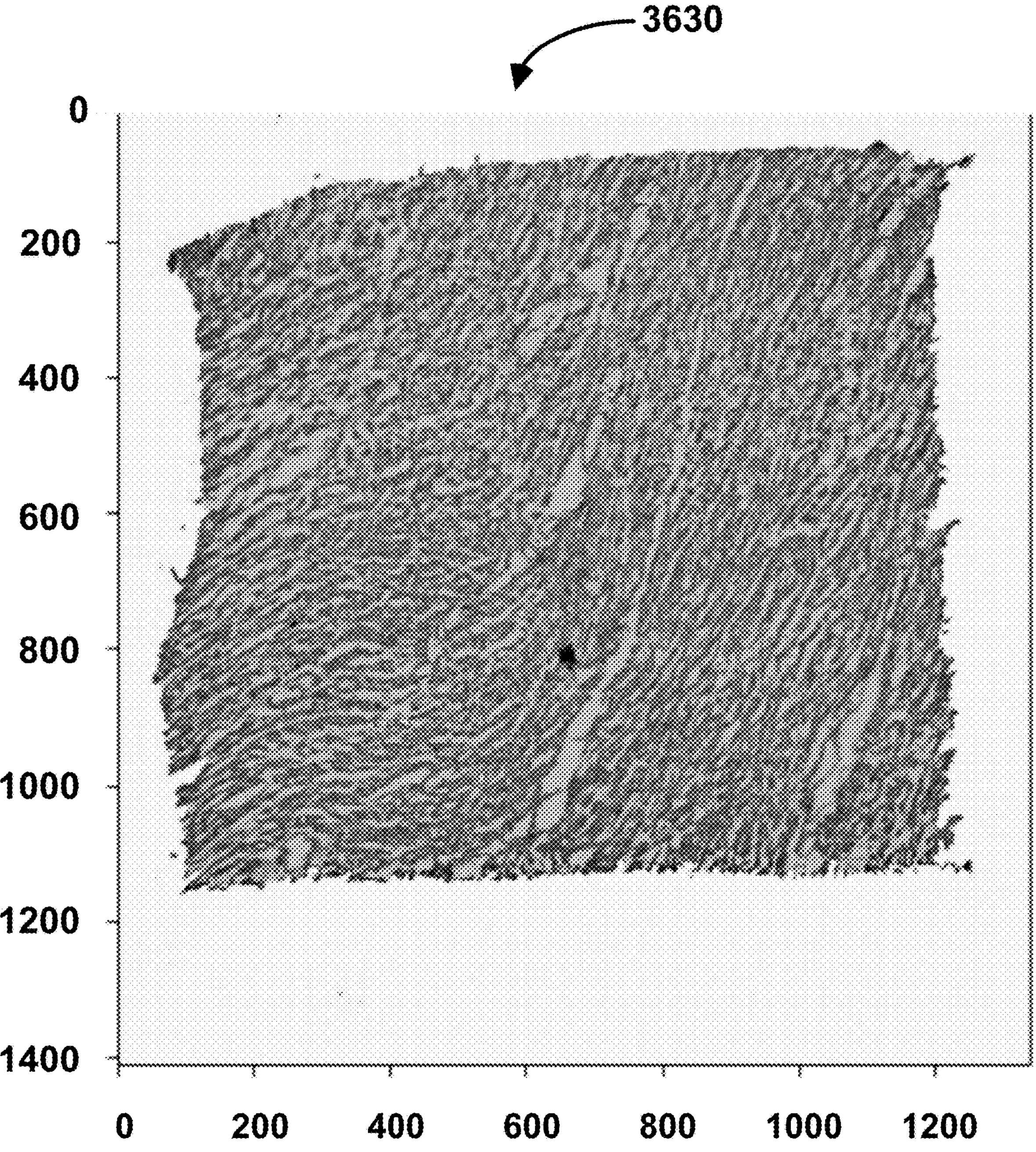

In some embodiments, as illustrated in FIG. 24G, an image mask 3626 represents a sum of a plurality of heuristic classifiers, where each aggregate score is represented as one of a set of four unique classes comprising 0, 1, 2, and 3 (e.g., obvious first class, likely first class, likely second class, and obvious second class). In some embodiments, the classifying of each respective pixel in the plurality of pixels to a class in a set of classes based on the aggregated score generates a separate array (e.g., image mask), where each pixel in the array comprises a respective separate value or attribute corresponding to the assigned class in the set of classes. FIG. 24H illustrates an image mask 3628 where each pixel is represented by an attribute corresponding to each of the set of four classes.

In some embodiments, the first pattern of the biological sample in the first image and the second pattern of the biological sample in the second image are obtained using a graph cut segmentation algorithm.

Graph cut is an optimization-based binarization technique as described above, which uses polynomial-order computations to achieve robust segmentation even when foreground and background pixel intensities are poorly segregated. See, Rother et al., 2004, "'GrabCut'—Interactive Foreground Extraction using Iterated Graph Cuts," ACM Transactions on Graphics. 23 (3): 309-314, doi:10.1145/1186562.1015720, which is hereby incorporated herein by reference in its entirety. See also, Boykov and Jolly, 2001, "Interactive graph cuts for optimal boundary and region segmentation of objects in N-D images," Proc. IEEE Int. Conf. on Computer Vision, CD-ROM, and Greig et al., 1989, "Exact MAP estimation for binary images," J. Roy. Stat. Soc. B. 51, 271-279, for details on graph cut segmentation algorithms; and Chuang et al., 2001, "A Bayesian approach to digital matting," Proc. IEEE Conf. Computer Vision and Pattern Recog., CD-ROM, for details on Bayes matting models and alpha-mattes, each of which is hereby incorporated herein by reference in its entirety. An example of the output is image 3630 of FIG. 24I.

In some embodiments, the graph cut segmentation algorithm is a GrabCut segmentation algorithm.

Additional methods and embodiments for image segmentation are contemplated for use in the present disclosure, as further described in U.S. patent application Ser. No. 16/951,843, entitled "SYSTEMS AND METHODS FOR SPATIAL ANALYSIS OF ANALYTES USING FIDUCIAL ALIGNMENT," filed Nov. 18, 2020; U.S. patent application Ser. No. 16/951,854, entitled "SYSTEMS AND METHODS FOR TISSUE CLASSIFICATION," filed Nov. 18, 2020; U.S. patent application Ser. No. 17/039,935, entitled "Systems and Methods for Identifying Morphological Patterns in Tissue Samples," filed Sep. 30, 2020; and U.S. patent application Ser. No. 16/951,864, entitled "Spatial Analysis of Analytes," filed Nov. 18, 2020, each of which is hereby incorporated herein by reference in its entirety.

Additional Embodiments for Systems and Devices.

Another aspect of the present disclosure provides a computer system comprising one or more processors, memory, and one or more programs, where the one or more programs are stored in the memory and configured to be executed by the one or more processors. The one or more programs include instructions for overlaying image data for a biological sample onto spatial analyte data for a plurality of analytes of the biological sample. The method comprises obtaining a first image of the biological sample on a first substrate and receiving a second image of the biological sample on the first substrate overlayed on a second substrate, where the second substrate comprises one or more spatial fiducials and a set of capture spots (e.g., at least 1000 capture spots). In some embodiments, at least one of the first substrate and the second substrate is transparent. The method further includes determining a registration for the first image and the second image, where the registration registers the first image and the second image to each other, using a first pattern of the biological sample in the first image and a second pattern of the biological sample in the second image. The registration is used to overlay the first image onto a spatial dataset comprising spatial analyte data for the set of capture spots from the biological sample, where a frame of reference of the spatial dataset is known with respect to the second image, based on the one or more spatial fiducials of the second image. Thus, image data for the biological sample is overlayed onto spatial analyte data for the plurality of analytes of the biological sample.

Another aspect of the present disclosure provides a computer readable storage medium storing one or more programs, the one or more programs comprising instructions, which when executed by an electronic device with one or more processors and a memory cause the electronic device to perform a method for overlaying image data for a biological sample onto spatial analyte data for a plurality of analytes of the biological sample. The method comprises obtaining a first image of the biological sample on a first substrate and receiving a second image of the biological sample on the first substrate overlayed on a second substrate, where the second substrate comprises one or more spatial fiducials and a set of capture spots (e.g., at least 1000 capture spots). In some embodiments, at least one of the first substrate and the second substrate is transparent. The method further includes determining a registration for the first image and the second image, where the registration registers the first image and the second image to each other, using a first pattern of the biological sample in the first image and a second pattern of the biological sample in the second image. The registration is used to overlay the first image onto a spatial dataset comprising spatial analyte data for the set of capture spots from the biological sample, where a frame of reference of the spatial dataset is known with respect to the second image, based on the one or more spatial fiducials of the second image. Thus, image data for the biological sample is overlayed onto spatial analyte data for the plurality of analytes of the biological sample.

Another aspect of the present disclosure provides a computer system comprising one or more processors, memory, and one or more programs, where the one or more programs are stored in the memory and configured to be executed by the one or more processors. The one or more programs include instructions for any of the methods, workflows, processes, or embodiments disclosed herein, and/or any substitutions, modifications, additions, deletions, and/or combinations thereof, as will be apparent to one skilled in the art.

Another aspect of the present disclosure provides a computer readable storage medium storing one or more programs, the one or more programs comprising instructions, which when executed by an electronic device with one or more processors and a memory cause the electronic device to perform any of the methods, workflows, processes, or embodiments disclosed herein, and/or any substitutions, modifications, additions, deletions, and/or combinations thereof, as will be apparent to one skilled in the art.

EXAMPLES

Example 1: Automated Image Alignment Across Various Sample Types

Archived tissue-mounted standard glass slides containing hematoxylin/eosin stained or DAPI-stained sections were used. A wide range of tissue types were tested, including: human lung, human heart, human colon, human breast cancer, human kidney, human spleen, human ovarian cancer, mouse kidney, mouse liver, mouse thymus, and mouse brain. For each of the tested tissues, an RGB microscope image of the hematoxylin/eosin stained or fluorescent image of DAPI stained sections on the standard glass slides were obtained. H&E stained tissue sections were subjected to a hematoxylin destaining step. DAPI stained sections were stained with eosin. Slides were briefly dried at 37° C., then mounted in an instrument along with a spatially barcoded array slide. The spatially barcoded array was surrounded by a fiducial frame. The instrument aligned the tissue slide and array slide in a sandwich configuration with a permeabilization buffer comprising sarkosyl and proteinase K. Upon sandwich closure in the instrument, instrument images of the tissue section overlaid on the array slide and including the fiducial frame were captured under red illumination and green illumination. The instrument red illumination image was used to increase the contrast of the fiducials relative to the tissue section. The instrument green image was used to increase the contrast of the tissue section relative to background (see FIG. 20B). The tissue sections were permeabilized and analytes (e.g., transcripts) were captured on the array.

The microscope images and instrument images were used as inputs for image analysis and image registration using the fully automated registration algorithm disclosed herein. The image analysis and registration used the instrument red illumination image, the instrument green illumination, and the microscope image for, e.g., fiducial registration, tissue segmentation, and image registration in accordance with the methods disclosed above in conjunction with FIG. 10. The registration was used to overlay the microscope image onto the image generated by the instrument.

Figure 25:
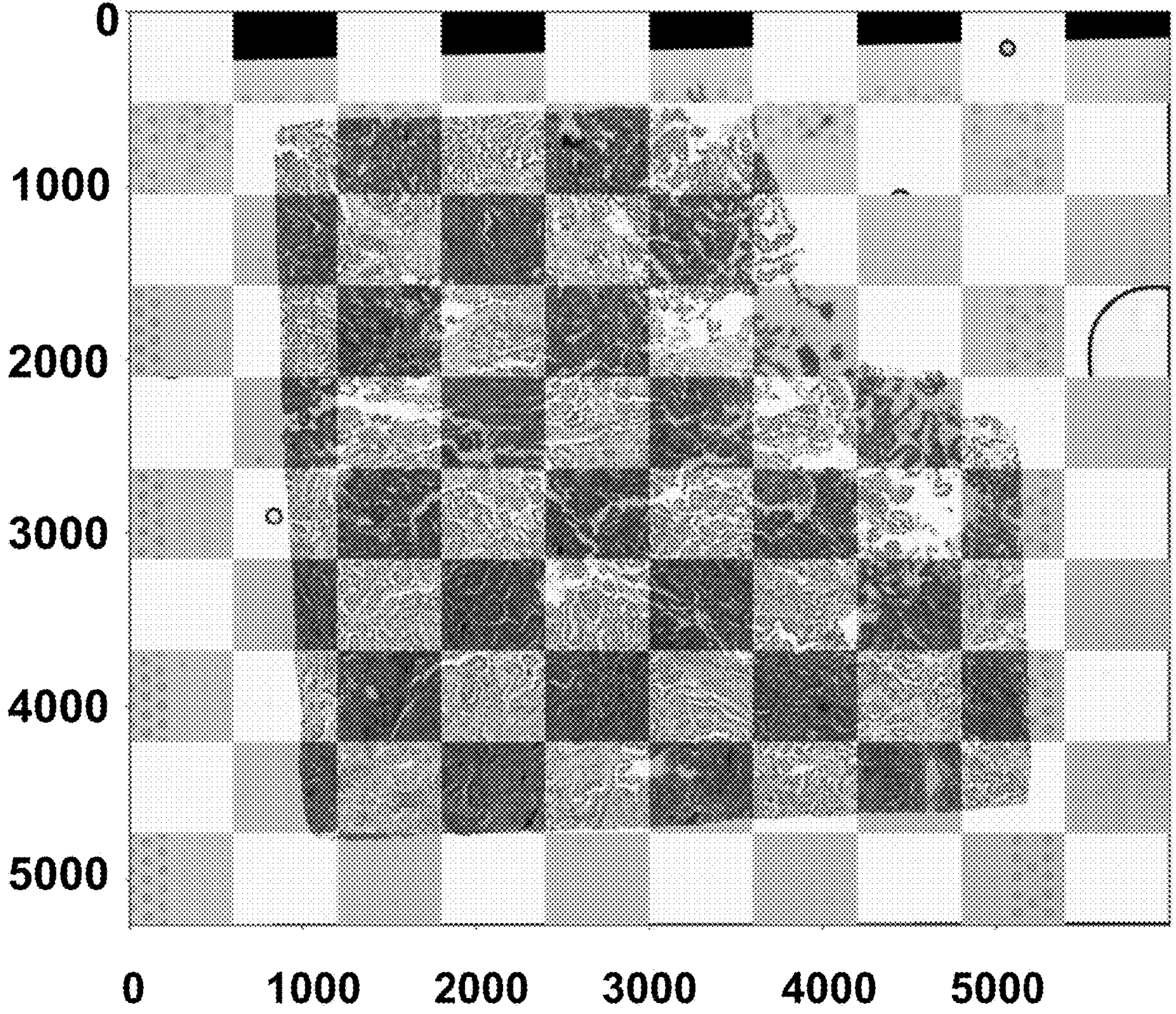
FIG. 25 depicts the overlay of a hematoxylin and eosin (H&E) microscope image and instrument image of a human ovarian cancer sample in a checkerboard pattern, where the checkerboard overlay indicates successful registration of the microscope image and instrument image in accordance with some embodiments of the present disclosure.

FIG. 25 depicts the overlay of the H&E microscope image and instrument image of a human ovarian cancer sample in a checkerboard pattern. The checkerboard overlay indicates successful registration of the microscope image and instrument image.

Figure 26:
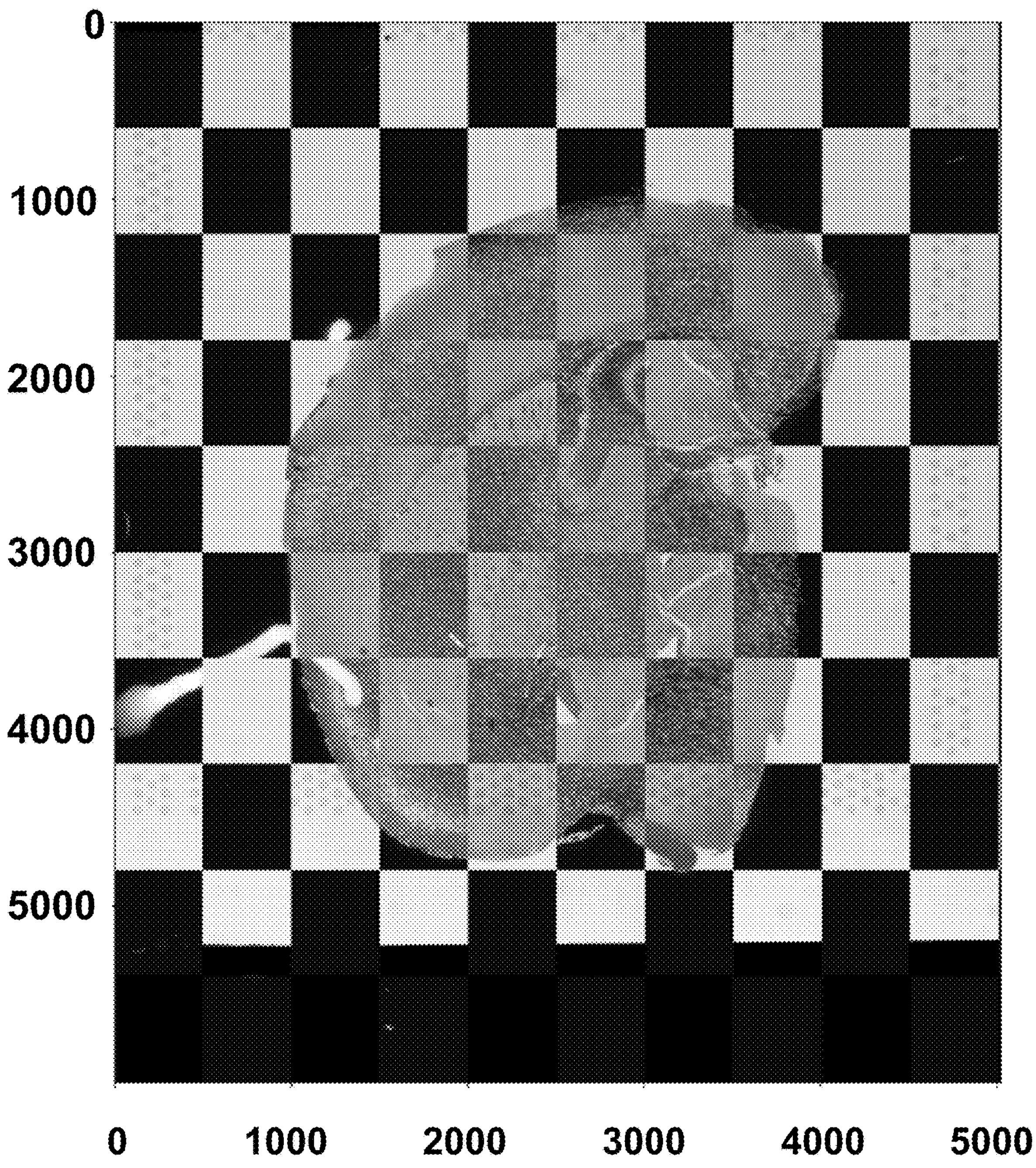
FIG. 26 depicts the overlay of a DAPI microscope and instrument image of a mouse brain sample in a checkerboard pattern, where the checkerboard overlay indicates successful registration of the microscope image and instrument image in accordance with some embodiments of the present disclosure.

FIG. 26 depicts the overlay of the DAPI microscope and instrument image of a mouse brain sample in a checkerboard pattern. The checkerboard overlay indicates successful registration of the microscope image and instrument image.

Figure 27:
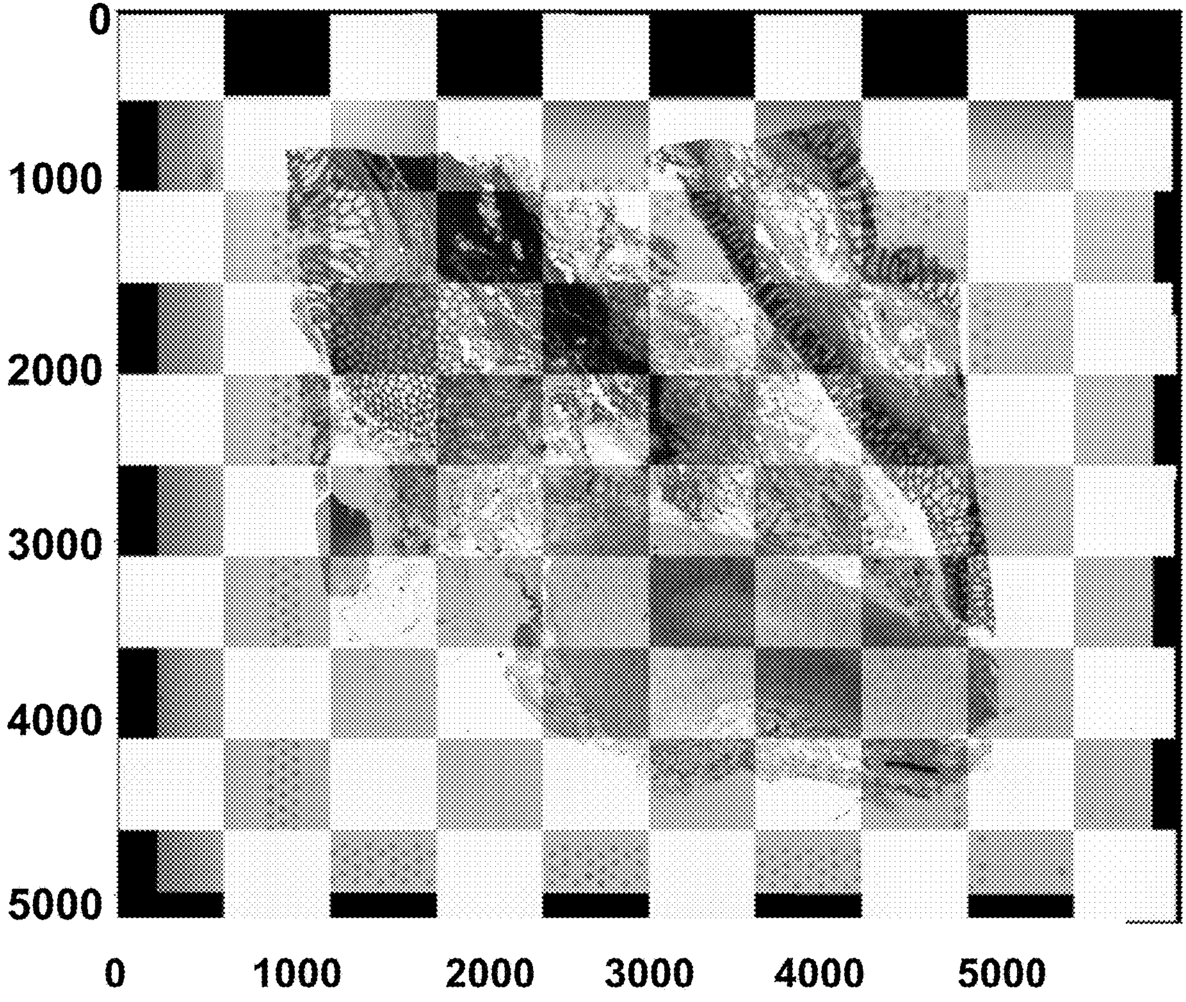
FIG. 27 depicts the overlay of the H&E microscope and instrument image of a human colon sample in a checkerboard pattern, where the checkerboard overlay indicates successful registration of the microscope image and instrument image in accordance with some embodiments of the present disclosure.

FIG. 27 depicts the overlay of the H&E microscope and instrument image of a human colon sample in a checkerboard pattern. The checkerboard overlay indicates successful registration of the microscope image and instrument image. Similar results were obtained for all of the tested tissue types, for both H&E microscope images and DAPI images.

Example 2: Image Alignment Using Manual Landmark Selection

Archived tissue-mounted standard glass slides containing hematoxylin/eosin stained mouse brain section were used. A high resolution microscope image of the hematoxylin/eosin stained section on a standard glass slide was obtained as described in Example 1. The H&E stained tissue section was subjected to a hematoxylin destaining step. The slide was briefly dried at 37° C., then mounted in an instrument along with a spatially barcoded array slide. The spatially barcoded array was surrounded by a fiducial frame. The instrument aligned the tissue slide and array slide in a sandwich configuration with a permeabilization buffer comprising sarkosyl and proteinase K. Upon sandwich closure in the instrument, instrument images of the tissue section overlaid on the array slide and including the fiducial frame were captured as described in Example 1. The tissue sections were permeabilized and analytes (e.g., transcripts) were captured on the array.

Figure 28A:
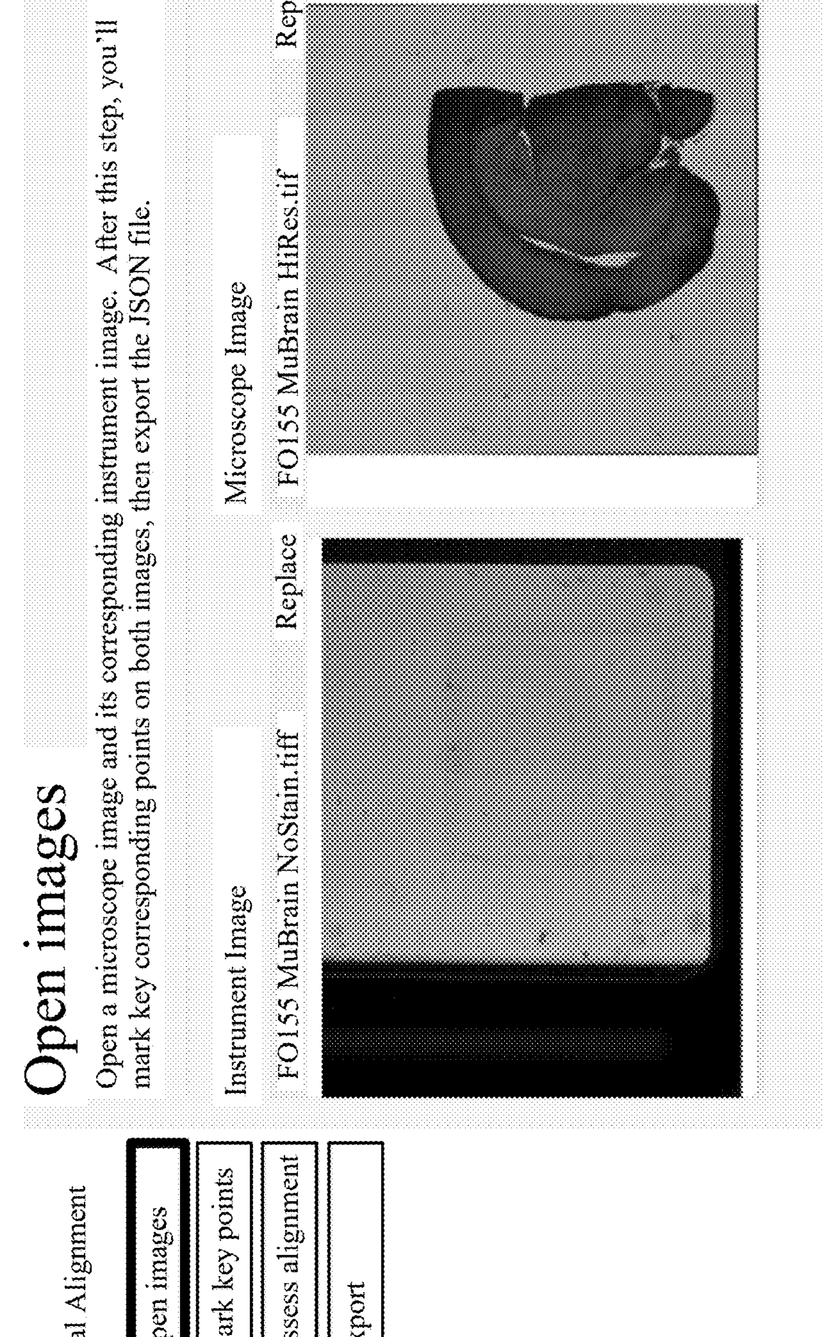
Figure 28C:
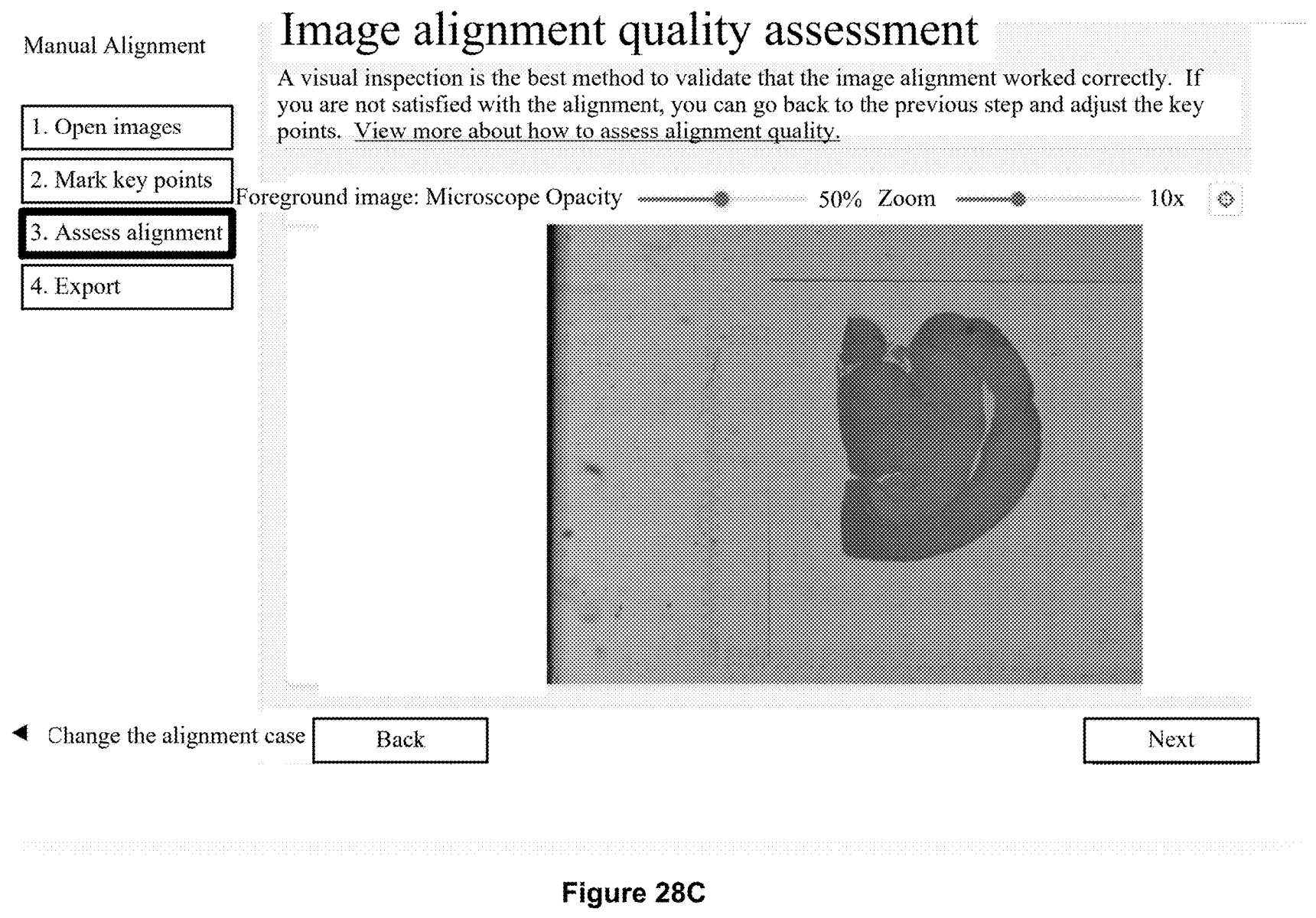

Manual image registration was performed using a visualization system disclosed herein. Briefly, a user opened the image of the tissue section overlaid on the array slide upon sandwich closure (the instrument image) and the image of the H&E tissue section obtained by the microscope. See FIG. 28A. The user then selected five landmarks corresponding to five reference positions on the microscope image and corresponding landmarks corresponding to the same five reference positions on the instrument image. See FIG. 28B. Responsive to the landmark selection, a transformation was obtained and used to register the microscope image to the instrument image, thereby overlaying the microscope image of the tissue section with the instrument image including the fiducial frame. FIG. 28C shows a resulting display of the microscope image overlaid with the instrument image. As shown in FIG. 28C, image registration based on user-selected landmarks was successfully used to generate an overlay of the microscope image onto the instrument image comprising the fiducial frame.

REFERENCES CITED AND ALTERNATIVE EMBODIMENTS

All publications, patents, patent applications, and information available on the internet and mentioned in this specification are herein incorporated by reference to the same extent as if each individual publication, patent, patent application, or item of information was specifically and individually indicated to be incorporated by reference. To the extent publications, patents, patent applications, and items of information incorporated by reference contradict the disclosure contained in the specification, the specification is intended to supersede and/or take precedence over any such contradictory material.

The present invention can be implemented as a computer program product that comprises a computer program mechanism embedded in a non-transitory computer readable storage medium. For instance, the computer program product could contain the program modules shown in FIGS. 11A and 11B, and/or described in FIGS. 10A, 10B, 10C, 10D, 10E, 10F, and 10G. These program modules can be stored on a CD-ROM, DVD, magnetic disk storage product, USB key, or any other non-transitory computer readable data or program storage product.

As used herein, the terms "about" or "approximately" refer to an acceptable error range for a particular value as determined by one of ordinary skill in the art, which can depend in part on how the value is measured or determined, e.g., the limitations of the measurement system. For example, "about" can mean within 1 or more than 1 standard deviation, per the practice in the art. "About" can mean a range of +20%, +10%, +5%, or +1% of a given value. The term "about" or "approximately" can mean within an order of magnitude, within 5-fold, or within 2-fold, of a value. Where particular values are described in the application and claims, unless otherwise stated the term "about" meaning within an acceptable error range for the particular value should be assumed. The term "about" can have the meaning as commonly understood by one of ordinary skill in the art. The term "about" can refer to +10%. The term "about" can refer to +5%.

Where values are described in terms of ranges, it should be understood that the description includes the disclosure of all possible sub-ranges within such ranges, as well as specific numerical values that fall within such ranges irrespective of whether a specific numerical value or specific sub-range is expressly stated. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. As used herein, the term "between" used in a range is intended to include the recited endpoints. For example, a number "between X and Y" can be X, Y, or any value from X to Y.

The term "each," when used in reference to a collection of items, is intended to identify an individual item in the collection but does not necessarily refer to every item in the collection, unless expressly stated otherwise, or unless the context of the usage clearly indicates otherwise.

As used herein, the singular forms "a," "an," and "the" include the plural forms as well, unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements or use of a "negative" limitation. Furthermore, to the extent that the terms "including," "includes," "having," "has," "with," or variants thereof are used in either the detailed description and/or the claims, such terms are intended to be inclusive in a manner similar to the term "comprising."

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed:

1. A method for overlaying image data for a biological sample onto spatial analyte data for a plurality of analytes of the biological sample, the method comprising:

using a computer system comprising one or more processing cores and a memory:

obtaining a first image of the biological sample on a first substrate;

receiving a second image of the biological sample on the first substrate overlayed on a second substrate, wherein the second substrate comprises one or more spatial fiducials and a set of capture spots, and wherein the set of capture spots comprises at least 1000 capture spots, wherein at least one of the first substrate and the second substrate is transparent;

determining a registration for the first image and the second image, wherein the registration registers the first image and the second image to each other, using a first pattern of the biological sample in the first image and a second pattern of the biological sample in the second image; and using the registration to overlay the first image onto a spatial dataset comprising spatial analyte data for the set of capture spots from the biological sample, wherein a frame of reference of the spatial dataset is known with respect to the second image, based on the one or more spatial fiducials of the second image, thereby overlaying image data for the biological sample onto spatial analyte data for the plurality of analytes of the biological sample.

2. The method of claim 1, wherein the first image of the biological sample is a histological image of the biological sample.

3. The method of claim 1, wherein the determining the registration for the first image and the second image comprises:

identifying one or more landmarks, each respective landmark comprising a respective pair of reference positions including a first respective reference position for the first pattern of the biological sample in the first image and a corresponding second respective reference position for the second pattern of the biological sample in the second image, thereby identifying a first set of landmark coordinates for the first image and a second set of landmark coordinates for the second image;

using the first set of landmark coordinates for the first image and the second set of landmark coordinates for the second image to obtain a transformation between the first set of landmark coordinates and the second set of landmark coordinates with an alignment algorithm, thereby obtaining a first alignment of the first image with the second image.

4. The method of claim 3, wherein the identifying one or more landmarks is performed, on a display, via manual user selection of each respective pair of reference positions in the first image and the second image.

5. The method of claim 3, further comprising performing, on a display, via user interaction, a manual alignment of the first image and the second image.

6. The method of claim 5, wherein the manual alignment is selected from the group consisting of: a translation, a scaling, and a rotation.

7. The method of claim 3, further comprising refining the transformation using a refinement algorithm, thereby obtaining a second alignment of the first image with the second image.

8. The method of claim 3, wherein a respective similarity metric for a respective alignment of the first image with the second image is determined by evaluating an intensity of a first plurality of pixels in the first image compared to corresponding pixels in a second plurality of pixels in the second image that are overlayed onto each other in the respective alignment.

9. The method of claim 3, wherein the one or more landmarks comprises 3 landmarks.

10. The method of claim 3, wherein the alignment algorithm transforms the first set of landmark coordinates for the first image relative to the second set of landmark coordinates for the second image.

11. The method of claim 3, wherein the alignment algorithm transforms the second set of landmark coordinates for the second image relative to the first set of landmark coordinates for the first image.

12. The method of claim 3, further comprising displaying, on a display, an image overlay for the first image aligned with the second image, wherein the first image is displayed in color and the second image is displayed in grayscale.

13. The method of claim 1, wherein the determining the registration for the first and second image comprises:

obtaining a respective first area of the first pattern and a respective first centroid for the first area from an analysis of the first pattern;

obtaining a respective second area of the second pattern and a respective second centroid for the second area from an analysis of the second pattern;

scaling at least one of the first image and the second image based on a relative proportion of the first and second area;

centering the first image with the second image based on an alignment between the first and second centroid;

sampling, for each respective rotation angle in a plurality of rotation angles, a corresponding transformation between the first and second image, by a procedure that comprises:

rotating one of the first and second image relative to the other of the first and second image by the respective rotation angle to obtain a respective candidate rotational alignment of the first and second image;

refining the respective candidate rotational alignment to obtain a respective refined candidate rotational alignment; and scoring the respective refined candidate rotational alignment of the first and second image by determining a similarity metric across a respective intensity of a first plurality of pixels in the first image compared to corresponding pixels in a second plurality of pixels in the second image that are overlayed onto each other by the respective candidate rotational alignment of the first and second image, thereby obtaining a plurality of refined candidate rotational alignments and a corresponding plurality of similarity metrics; and selecting the rotational alignment from among the plurality of refined candidate rotational alignments that yields the highest similarity metric in the corresponding plurality of similarity metrics as the registration for the first and second image.

14. The method of claim 13, wherein the plurality of rotation angles comprises 4 or more different rotation angles, wherein each rotation angle in the plurality of rotation angles is between 0 and $2\pi$ radians.

15. The method of claim 13, wherein the procedure further comprises:

rotating one of a mirror image of the first image and the second image relative to the other of the mirror image of the first image and the second image by the respective rotation angle to obtain a respective candidate rotational alignment of the mirror image of the first image and the second image; and scoring the respective candidate rotational alignment of the mirror image of the first image and the second image by determining a similarity metric for the respective candidate rotational alignment of the mirror image of the first image and the second image.

16. The method of claim 1, wherein:

the first image is obtained without spatial fiducials, the determining a registration for the first image and the second image comprises overlaying the one or more spatial fiducials of the second image onto the first image, and the using the registration to overlay the first image onto the spatial dataset comprises associating the one or more spatial fiducials of the first image to the frame of reference of the spatial dataset, thereby allowing the first image to be in the same frame of reference as the spatial dataset.

17. The method of claim 1, wherein the first image and the second image have different image resolutions.

18. The method of claim 1, wherein the biological sample is prepared for imaging on the first substrate using a stain selected from the group consisting of: live/dead stain, trypan blue, periodic acid-Schiff reaction stain, Masson's trichrome, Alcian blue, van Gieson, reticulin, Azan, Giemsa, Toluidine blue, isamin blue, sudan black and osmium, acridine orange, Bismarck brown, carmine, Coomassie blue, cresyl violet, DAPI, eosin, ethidium bromide, acid fuchsine, hematoxylin, Hoechst stains, iodine, methyl green, methylene blue, neutral red, Nile blue, Nile red, osmium tetroxide, propidium iodide, rhodamine, safranin, or a combination thereof.

19. The method of claim 1, wherein the first image is obtained when the sample is not in contact with the second substrate and wherein the second image is obtained when the biological sample is in contact with the second substrate.

20. A computer system comprising:

one or more processors;

memory; and one or more programs, wherein the one or more programs are stored in the memory and configured to be executed by the one or more processors, the one or more programs including instructions for overlaying image data for a biological sample onto spatial analyte data for a plurality of analytes of the biological sample by a method comprising:

obtaining a first image of the biological sample on a first substrate;

receiving a second image of the biological sample on the first substrate overlayed on a second substrate, wherein the second substrate comprises one or more spatial fiducials and a set of capture spots, and wherein the set of capture spots comprises at least 1000 capture spots, wherein at least one of the first substrate and the second substrate is transparent;

determining a registration for the first image and the second image, wherein the registration registers the first image and the second image to each other, using a first pattern of the biological sample in the first image and a second pattern of the biological sample in the second image; and using the registration to overlay the first image onto a spatial dataset comprising spatial analyte data for the set of capture spots from the biological sample, wherein a frame of reference of the spatial dataset is known with respect to the second image, based on the one or more spatial fiducials of the second image, thereby overlaying image data for the biological sample onto spatial analyte data for the plurality of analytes of the biological sample.

21. A non-transitory computer readable storage medium storing one or more programs, the one or more programs comprising instructions, which when executed by an electronic device with one or more processors and a memory cause the electronic device to perform a method for overlaying image data for a biological sample onto spatial analyte data for a plurality of analytes of the biological sample, comprising:

obtaining a first image of the biological sample on a first substrate;

receiving a second image of the biological sample on the first substrate overlayed on a second substrate, wherein the second substrate comprises one or more spatial fiducials and a set of capture spots, and wherein the set of capture spots comprises at least 1000 capture spots, wherein at least one of the first substrate and the second substrate is transparent;

determining a registration for the first image and the second image, wherein the registration registers the first image and the second image to each other, using a first pattern of the biological sample in the first image and a second pattern of the biological sample in the second image; and using the registration to overlay the first image onto a spatial dataset comprising spatial analyte data for the set of capture spots from the biological sample, wherein a frame of reference of the spatial dataset is known with respect to the second image, based on the one or more spatial fiducials of the second image, thereby overlaying image data for the biological sample onto spatial analyte data for the plurality of analytes of the biological sample.

* * * * *